(12) United States Patent
Matsuura et al.

(10) Patent No.: US 7,110,917 B2
(45) Date of Patent: Sep. 19, 2006

(54) ABNORMALITY DETERMINING METHOD, AND ABNORMALITY DETERMINING APPARATUS AND IMAGE FORMING APPARATUS USING SAME

(75) Inventors: Nekka Matsuura, Kanagawa (JP); Hisashi Shoji, Kanagawa (JP); Satoshi Ouchi, Tokyo (JP); Katsuaki Miyawaki, Kanagawa (JP); Osamu Satoh, Kanagawa (JP); Masaaki Yamada, Tokyo (JP); Shuji Hirai, Tokyo (JP); Yoshinori Nakagawa, Kanagawa (JP); Yasushi Nakazato, Tokyo (JP); Tomoko Takahashi, Kanagawa (JP); Takashi Seto, Kanagawa (JP); Seiji Hoshino, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/986,781

(22) Filed: Nov. 15, 2004

(65) Prior Publication Data
US 2005/0154562 A1    Jul. 14, 2005

(30) Foreign Application Priority Data

| Nov. 14, 2003 | (JP) | ............................. 2003-385781 |
| Nov. 28, 2003 | (JP) | ............................. 2003-400250 |
| Feb. 10, 2004 | (JP) | ............................. 2004-034055 |
| Jun. 28, 2004 | (JP) | ............................. 2004-189988 |
| Aug. 2, 2004  | (JP) | ............................. 2004-226139 |

(51) Int. Cl.
*G06F 19/00* (2006.01)

(52) U.S. Cl. ...................... 702/185; 702/182; 702/183; 399/12; 399/9; 399/16; 358/1.14

(58) Field of Classification Search .................... None
See application file for complete search history.

(56) References Cited

U.S. PATENT DOCUMENTS

| 4,530,063 | A | * | 7/1985 | Masuda et al. ............ 358/1.12 |
| 4,811,051 | A | * | 3/1989 | Masuda et al. ............... 399/32 |
| 5,003,346 | A | * | 3/1991 | Masuda et al. ............... 355/57 |
| 5,168,307 | A | * | 12/1992 | Masuda et al. .............. 355/57 |
| 5,182,597 | A | * | 1/1993 | Masuda et al. ............... 399/21 |
| 5,317,368 | A | * | 5/1994 | Shimomura et al. .......... 399/12 |
| 5,448,338 | A | * | 9/1995 | Masuda et al. ............... 399/31 |
| 5,619,316 | A |   | 4/1997 | Shoji et al. |
| 5,708,938 | A |   | 1/1998 | Takeuchi et al. |

(Continued)

OTHER PUBLICATIONS

Japanese Standards Association Publication "Technical Developments in the MT System", by Genichi Taguchi (Prior Art 3) pp. i-viii and 1-466 (w/English Abstract).

*Primary Examiner*—Carol S. W. Tsai
(74) *Attorney, Agent, or Firm*—Oblon, Spivak, McClelland, Maier & Neustadt, P.C.

(57) ABSTRACT

An abnormality determining apparatus includes an information storage unit for storing normal index information serving as an index of a normal state of the detection subject, an information obtaining unit for obtaining a plurality of types of information, and an abnormality determining unit for determining the presence of an abnormality in the detection subject on the basis of the normal index information stored in the information storage unit, and the information obtained by the information obtaining unit. The information storage unit stores a plurality of normal index information having different values. The abnormality determining unit selects, at a predetermined timing, normal index information to be used to determine the presence of an abnormality in the detection subject from the plurality of normal index information.

48 Claims, 55 Drawing Sheets

U.S. PATENT DOCUMENTS

| | | | |
|---|---|---|---|
| 5,740,494 A | 4/1998 | Shoji et al. | |
| 5,765,087 A | 6/1998 | Yano et al. | |
| 5,848,329 A | 12/1998 | Aoyama et al. | |
| 5,911,004 A | 6/1999 | Ohuchi et al. | |
| 5,915,155 A | 6/1999 | Shoji et al. | |
| 5,937,228 A | 8/1999 | Shoji et al. | |
| 5,968,301 A | 10/1999 | Murakami et al. | |
| 5,970,280 A | 10/1999 | Suzuki et al. | |
| 5,999,762 A | 12/1999 | Shoji | |
| 6,000,784 A | 12/1999 | Takemoto et al. | |
| 6,034,792 A | 3/2000 | Nakazato et al. | |
| 6,052,205 A | 4/2000 | Matsuura | |
| 6,108,508 A | 8/2000 | Takeuchi et al. | |
| 6,125,243 A | 9/2000 | Shoji et al. | |
| 6,160,979 A | 12/2000 | Shoji | |
| 6,224,183 B1* | 5/2001 | Kono et al. | 347/19 |
| 6,236,820 B1 | 5/2001 | Nakazato et al. | |
| 6,259,813 B1 | 7/2001 | Ouchi | |
| 6,295,435 B1 | 9/2001 | Shinohara et al. | |
| 6,324,374 B1 | 11/2001 | Sasamoto et al. | |
| 6,336,007 B1* | 1/2002 | Sugisaki et al. | 399/11 |
| 6,345,170 B1 | 2/2002 | Nakazato et al. | |
| 6,381,435 B1 | 4/2002 | Shinohara et al. | |
| 6,400,917 B1 | 6/2002 | Nakazato et al. | |
| 6,422,696 B1 | 7/2002 | Takahashi et al. | |
| 6,456,806 B1 | 9/2002 | Shoji et al. | |
| 6,459,816 B1 | 10/2002 | Matsuura et al. | |
| 6,460,973 B1 | 10/2002 | Takahashi et al. | |
| 6,466,754 B1 | 10/2002 | Nakazato et al. | |
| 6,470,169 B1 | 10/2002 | Nakazato | |
| 6,480,623 B1 | 11/2002 | Yagishita et al. | |
| 6,505,014 B1 | 1/2003 | Aoki et al. | |
| 6,507,674 B1 | 1/2003 | Yagishita et al. | |
| 6,515,747 B1 | 2/2003 | Satoh et al. | |
| 6,519,052 B1 | 2/2003 | Oneda et al. | |
| 6,556,707 B1 | 4/2003 | Yagishita et al. | |
| 6,556,802 B1 | 4/2003 | Sasamoto et al. | |
| 6,560,438 B1 | 5/2003 | Kosuge | |
| 6,571,071 B1 | 5/2003 | Kanoshima et al. | |
| 6,580,887 B1 | 6/2003 | Nakazato et al. | |
| 6,597,885 B1 | 7/2003 | Kai et al. | |
| 6,603,884 B1 | 8/2003 | Matsuura et al. | |
| 6,623,816 B1 | 9/2003 | Tanikawa et al. | |
| 6,627,015 B1 | 9/2003 | Takemoto et al. | |
| 6,628,908 B1 | 9/2003 | Matsumoto et al. | |
| 6,628,915 B1 | 9/2003 | Muramatsu et al. | |
| 6,644,236 B1 | 11/2003 | Sahashi | |
| 6,667,691 B1* | 12/2003 | Sapir | 340/635 |
| 6,669,189 B1 | 12/2003 | Seto et al. | |
| 6,671,484 B1 | 12/2003 | Miyoshi et al. | |
| 6,674,982 B1 | 1/2004 | Saitoh et al. | |
| 6,681,096 B1 | 1/2004 | Seto et al. | |
| 6,683,987 B1* | 1/2004 | Sugahara | 382/235 |
| 6,683,990 B1 | 1/2004 | Yagishita et al. | |
| 6,694,112 B1 | 2/2004 | Sasaki et al. | |
| 6,697,588 B1 | 2/2004 | Nakazato et al. | |
| 6,704,444 B1 | 3/2004 | Yagishita et al. | |
| 6,704,455 B1 | 3/2004 | Yamazaki et al. | |
| 6,707,480 B1 | 3/2004 | Ameyama et al. | |
| 6,714,685 B1 | 3/2004 | Matsuura et al. | |
| 6,721,516 B1 | 4/2004 | Aoki et al. | |
| 6,721,523 B1 | 4/2004 | Sugiura et al. | |
| 6,721,534 B1 | 4/2004 | Takahashi | |
| 6,725,003 B1 | 4/2004 | Shinkai et al. | |
| 6,736,500 B1 | 5/2004 | Takahashi et al. | |
| 6,741,831 B1 | 5/2004 | Seto | |
| 6,757,509 B1 | 6/2004 | Shoji et al. | |
| 6,757,512 B1 | 6/2004 | Miyawaki et al. | |
| 6,760,557 B1 | 7/2004 | Nakazato et al. | |
| 6,768,879 B1 | 7/2004 | Kosuge | |
| 6,768,886 B1 | 7/2004 | Nakazato et al. | |
| 6,768,891 B1 | 7/2004 | Sasamoto et al. | |
| 6,774,632 B1* | 8/2004 | Kono | 324/318 |
| 6,778,805 B1 | 8/2004 | Kai et al. | |
| 6,782,225 B1 | 8/2004 | Kai et al. | |
| 6,785,490 B1 | 8/2004 | Tsukamoto et al. | |
| 6,788,811 B1 | 9/2004 | Matsuura et al. | |
| 6,799,012 B1 | 9/2004 | Shakuto et al. | |
| 6,819,901 B1 | 11/2004 | Yasutomi et al. | |
| 6,959,155 B1* | 10/2005 | Kim | 399/21 |
| 2002/0009312 A1 | 1/2002 | Sugimoto et al. | |
| 2002/0025172 A1* | 2/2002 | Tsuda et al. | 399/8 |
| 2002/0152056 A1* | 10/2002 | Herzog et al. | 703/2 |
| 2002/0171861 A1 | 11/2002 | Katsuragi | |
| 2002/0171874 A1 | 11/2002 | Hirano et al. | |
| 2003/0012445 A1 | 1/2003 | Matsuura et al. | |
| 2003/0038968 A1 | 2/2003 | Kawaura | |
| 2003/0039494 A1 | 2/2003 | Shakuto et al. | |
| 2003/0044185 A1 | 3/2003 | Kawaura | |
| 2003/0058465 A1 | 3/2003 | Miyagi et al. | |
| 2003/0058706 A1 | 3/2003 | Okamoto et al. | |
| 2003/0086722 A1 | 5/2003 | Nakazato et al. | |
| 2003/0095287 A1 | 5/2003 | Miyagi et al. | |
| 2003/0128243 A1 | 7/2003 | Okamoto et al. | |
| 2003/0142158 A1* | 7/2003 | Lee | 347/12 |
| 2003/0169325 A1 | 9/2003 | Takeyama et al. | |
| 2003/0215260 A1 | 11/2003 | Morii et al. | |
| 2003/0224268 A1 | 12/2003 | Ikuno et al. | |
| 2004/0008245 A1 | 1/2004 | Hirai et al. | |
| 2004/0013442 A1 | 1/2004 | Suzuki et al. | |
| 2004/0033088 A1 | 2/2004 | Muramatsu et al. | |
| 2004/0036754 A1 | 2/2004 | Tanikawa et al. | |
| 2004/0042823 A1 | 3/2004 | Sugiura et al. | |
| 2004/0052545 A1 | 3/2004 | Satoh | |
| 2004/0067076 A1 | 4/2004 | Shinkai et al. | |
| 2004/0076448 A1 | 4/2004 | Nakazato et al. | |
| 2004/0076449 A1 | 4/2004 | Nakazato et al. | |
| 2004/0086291 A1 | 5/2004 | Sasaki et al. | |
| 2004/0091287 A1 | 5/2004 | Matsumoto et al. | |
| 2004/0105116 A1* | 6/2004 | Kim | 358/1.14 |
| 2004/0109610 A1 | 6/2004 | Kodama et al. | |
| 2004/0114815 A1 | 6/2004 | Shibaki et al. | |
| 2004/0114819 A1 | 6/2004 | Matsuura et al. | |
| 2004/0120733 A1 | 6/2004 | Aoki et al. | |
| 2004/0121254 A1 | 6/2004 | Nagayama et al. | |
| 2004/0126029 A1 | 7/2004 | Sakuyama et al. | |
| 2004/0126148 A1 | 7/2004 | Iwai et al. | |
| 2004/0130738 A1 | 7/2004 | Yagishita et al. | |
| 2004/0134978 A1 | 7/2004 | Hara et al. | |
| 2004/0141651 A1 | 7/2004 | Hara et al. | |
| 2004/0151386 A1 | 8/2004 | Kodama et al. | |
| 2004/0151387 A1 | 8/2004 | Sakuyama et al. | |
| 2004/0151514 A1 | 8/2004 | Shuji | |
| 2004/0179237 A1 | 9/2004 | Takenaka et al. | |
| 2004/0190782 A1 | 9/2004 | Nomizu et al. | |
| 2004/0201593 A1 | 10/2004 | Nishimura et al. | |
| 2004/0202371 A1 | 10/2004 | Kodama et al. | |
| 2004/0208379 A1 | 10/2004 | Kodama et al. | |
| 2004/0213600 A1 | 10/2004 | Watanabe et al. | |
| 2004/0217887 A1 | 11/2004 | Nomizu et al. | |
| 2004/0218817 A1 | 11/2004 | Kodama et al. | |
| 2005/0062599 A1* | 3/2005 | Neubauer et al. | 340/506 |
| 2005/0111343 A1* | 5/2005 | Ogawa et al. | 369/275.3 |
| 2005/0154562 A1* | 7/2005 | Matsuura et al. | 702/185 |

\* cited by examiner

FIG. 49

| GROUP NUMBER (i) | INFORMATION TYPE (j) | | | | |
|---|---|---|---|---|---|
| | (1) | (2) | ... | (k) |
| 1 | $y_{11}$ | $y_{12}$ | ... | $y_{1k}$ |
| 2 | $y_{21}$ | $y_{22}$ | ... | $y_{2k}$ |
| .. | .. | .. | ... | .. |
| n | $y_{n1}$ | $y_{n2}$ | ... | $y_{nk}$ |
| AVERAGE ($\bar{y}$) | $\bar{y}_1$ | $\bar{y}_2$ | ... | $\bar{y}_k$ |
| STANDARD DEVIATION ($\sigma$) | $\sigma_1$ | $\sigma_2$ | ... | $\sigma_k$ |

FIG. 50

| GROUP NUMBER (i) | INFORMATION TYPE (j) | | | | | AVERAGE ($\bar{y}$) | STANDARD DEVIATION ($\sigma$) |
|---|---|---|---|---|---|---|---|
| | (1) | (2) | ... | (k) | | | |
| 1 | $Y_{11}$ | $Y_{12}$ | ... | $Y_{1k}$ | | | |
| 2 | $Y_{21}$ | $Y_{22}$ | ... | $Y_{2k}$ | | | |
| .. | .. | .. | ... | .. | | | |
| n | $Y_{n1}$ | $Y_{n2}$ | ... | $Y_{nk}$ | | | |
| | 0 | 0 | ... | 0 | | | |
| | 1 | 1 | ... | 1 | | | |

FIG. 51

| SAMPLE NUMBER | LINEAR BELT SPEED [mm/sec] | LINEAR DRUM SPEED [mm/sec] | $D^2$ |
|---|---|---|---|
| S1 | 130 | 130 | 4.843 |
| S2 | 110 | 110 | 3.242 |
| S3 | 100 | 100 | 1.061 |
| S4 | 90 | 90 | 1.001 |
| S5 | 80 | 80 | 0.360 |
| S6 | 70 | 70 | 0.040 |
| S7 | 60 | 60 | 0.040 |
| S8 | 50 | 50 | 0.360 |
| S9 | 40 | 40 | 1.001 |
| S10 | 30 | 30 | 1.962 |
| S11 | 20 | 20 | 4.843 |

FIG. 52

| INFORMATION TYPE | TYPE OF INDIVIDUAL ABNORMALITY | | |
| --- | --- | --- | --- |
| | PAPER JAM | PHOTOSENSITIVE BODY DETERIORATION | IMAGE DENSITY VARIATION |
| (1) TEMPERATURE | ○ | ○ | ○ |
| (2) HUMIDITY | ○ | ○ | ○ |
| (3) OSCILLATION | ○ | | |
| (4) TONER CONCENTRATION (FOR FOUR COLORS) | | | ○ |
| (5) UNIFORM CHARGING POTENTIAL OF PHOTOSENSITIVE BODY (FOR FOUR COLORS) | ○ | ○ | ○ |
| (6) POTENTIAL OF PHOTOSENSITIVE BODY AFTER EXPOSURE (FOR FOUR COLORS) | | ○ | ○ |
| (7) COLORED AREA RATIO (FOR FOUR COLORS) | ○ | ○ | ○ |
| (8) DEVELOPMENT TONER AMOUNT (FOR FOUR COLORS) | ○ | | ○ |
| (9) SLANTING OF PAPER FRONT END POSITION | ○ | | |
| (10) PAPER DISCHARGE TIMING | | | |
| (11) TOTAL CURRENT OF PHOTOSENSITIVE BODY (FOR FOUR COLORS) | | ○ | |
| (12) DRIVE POWER OF PHOTOSENSITIVE BODY (FOR FOUR COLORS) | | ○ | |

FIG. 53

| PAPER JAM | STANDARD THRESHOLD | |
|---|---|---|
| | PHOTOSENSITIVE BODY DETRIORATION | IMAGE DENSITY VARIATION |
| 1.8 | 1.5 | 2.1 |

FIG. 54

| PROFICIENCY | THRESHOLD COEFFICIENT |
|---|---|
| LOW | 0.9 |
| MEDIUM | 1.0 |
| HIGH | 1.2 |

FIG 55

| FAULT APPRECIATION | THRESHOLD COEFFICIENT |
|---|---|
| LOW | 1.2 |
| MEDIUM | 1.0 |
| HIGH | 0.8 |

FIG. 56

| INDUSTRY SECTOR / DEPARTMENT | TECHNOLOGY | PRODUCTION | SALES | CLERICAL |
|---|---|---|---|---|
| MANUFACTURING | 1.1 | 1.2 | 1.2 | 1.2 |
| CONSTRUCTION | 1.0 | 1.1 | 1.0 | 1.2 |
| PRINTING | 1.0 | 0.8 | 0.9 | 1.1 |

FIG. 57

| ORDER OF OUTPUT FREQUENCY (IN ORDER OF HIGHEST FREQUENCY) | | | | THRESHOLD COEFFICIENT |
|---|---|---|---|---|
| TEXT DOCUMENT | DRAWINGS | ADVERTISING LEAFLETS | PHOTOGRAPHS | |
| 1 | 2 | 3 | 4 | 1.00 |
| 1 | 2 | 4 | 3 | 1.05 |
| 1 | 3 | 2 | 4 | 1.05 |
| 1 | 3 | 4 | 2 | 1.15 |
| 1 | 4 | 2 | 3 | 1.15 |
| 1 | 4 | 3 | 2 | 1.20 |
| 2 | 1 | 3 | 4 | 1.05 |
| 2 | 1 | 4 | 3 | 1.10 |
| 2 | 3 | 1 | 4 | 1.15 |
| 2 | 3 | 4 | 1 | 1.30 |
| 2 | 4 | 1 | 3 | 1.25 |
| 2 | 4 | 3 | 1 | 1.35 |
| 3 | 1 | 2 | 4 | 1.15 |
| 3 | 1 | 4 | 2 | 1.25 |
| 3 | 2 | 1 | 4 | 1.20 |
| 3 | 2 | 4 | 1 | 1.35 |
| 3 | 4 | 1 | 2 | 1.40 |
| 4 | 4 | 2 | 1 | 1.45 |
| 4 | 1 | 2 | 3 | 1.30 |
| 4 | 1 | 3 | 2 | 1.35 |
| 4 | 2 | 1 | 3 | 1.35 |
| 4 | 2 | 3 | 1 | 1.45 |
| 4 | 3 | 1 | 2 | 1.45 |
| 4 | 3 | 2 | 1 | 1.50 |

ABNORMALITY DETERMINING METHOD, AND ABNORMALITY DETERMINING APPARATUS AND IMAGE FORMING APPARATUS USING SAME

BACKGROUND OF THE INVENTION

1. Field of the Invention

The present invention relates to an abnormality determining method for determining the presence of an abnormality in a detection subject on the basis of a result obtained by information obtaining means for obtaining information about an object, and also to an abnormality determining apparatus and image forming apparatus using this method.

2. Description of the Background Art

In a conventional image forming apparatus such as a copier, facsimile, or printer, maintenance is required to replace consumables (toner, for example) and components (a photosensitive body, for example), repair faults, and so on. When a fault occurs, the device must be halted from the occurrence of the fault to the completion of repairs, causing a great time loss for the user. It is therefore desirable to predict the occurrence of a fault in the image forming apparatus, the end of the life of a component, and so on in order to provide the user with a maintenance preparation period, thereby reducing the amount of downtime. It is also desirable that downtime be reduced in various devices, such as manufacturing machines and electric appliances, as well as image forming apparatuses.

In a proposed image forming apparatus which is capable of making such a prediction, predetermined information regarding the interior of the device is obtained by information obtaining means such as a sensor, and early detection of an abnormality in the device is performed by comparing the obtained information with prestored normal index information. In Japanese Unexamined Patent Application Publication H5-281809 (Prior Art 1), for example, an image forming apparatus is proposed in which driving load information regarding a driving source, serving as predetermined information, is detected, and early detection of an abnormality in the driving system is performed by comparing the detection result with a standard value serving as normal index information. According to this constitution, by detecting an abnormality in the driving system before a fault occurs, a user can be provided with a maintenance preparation period for preparing replacement components or the like.

In this image forming apparatus, however, abnormalities are not always detected at a timing which is appropriate for the user. This is due to the following reason. For example, a user who is highly conversant with the image forming apparatus may be able to repair a fault in the image forming apparatus that a general user could not repair. In such a case, the user would not contact a repair service organization to request repairs. If a serviceperson is dispatched nevertheless on the basis of the predicted fault, the resulting wasted labor would lead to an increase in service costs. Moreover, depending on the type of fault, each user has a widely differing perception thereof. For example, one user may suspect a fault in the paper feeding system even when a paper jam occurs rarely, whereas another user may not suspect a fault in the paper feeding system even when paper jams occur comparatively frequently. In the case of the latter user, repair requests are rarely made, even if a serviceperson is dispatched at the stage when the abnormality in the paper feeding system has barely begun to occur. This manner of dispatch also leads to an increase in service costs.

Meanwhile, a remote fault diagnosing system described in Japanese Unexamined Patent Application Publication H8-30152 (Prior Art 2) is known as a system in which abnormalities can be detected at a timing that is appropriate for the user. In this remote fault diagnosing system, basic diagnosis data transmitted from a plurality of image forming apparatuses serving as diagnosis subjects are received in a central diagnosing device, and various abnormalities in the individual image forming apparatuses are diagnosed on the basis of these basic data. These various abnormalities include a paper feeding abnormality, an image quality abnormality, and so on. By diagnosing the various abnormalities respectively, a fault in the paper feeding system or image forming system caused by the progression of the diagnosed abnormality can be predicted before its occurrence. Moreover, when diagnosing the various abnormalities, the remote fault diagnosing system takes into account the proficiency of the user of the image forming apparatus and the degree of perception of the fault. In so doing, abnormality diagnosis can be performed in accordance with the individual user, thus enabling a reduction in service costs. Note that as a result of dedicated research, the present inventors have discovered that, from among various abnormalities, the degree of perception of each user varies particularly widely in regard to an abnormality in the image quality.

A Mahalanobis Taguchi System, described in the Japanese Standards Association publication "Technical Developments in the MT System" by Genichi TAGUCHI (Prior Art 3), is known as a method of measuring the degree of normality in the state of an object. This MTS method measures the degree of normality in the state of an object in the following manner. First, a plurality of normal values relating to a group of information comprising a plurality of types of information indicating the state of a detection subject is obtained, and a normal group data set is constructed therefrom. To take a medical examination as an example, first normal values comprising the gender, various blood test results, height, weight, and so on of a healthy person are obtained in advance from a plurality of healthy people, and a normal group data set is constructed therefrom. Next, a multidimensional space is constructed on the basis of the normal group data set. The Mahalanobis distance, which indicates the position of the grouped information obtained from the detection subject in this multidimensional space, is then determined, and an evaluation is performed to determine the degree of similarity between the grouped information for the detection subject and the normal group data set. According to this MTS method, the degree of normality of the detection subject can be determined comprehensively on the basis of the correlation among the various information.

The present inventors learned through experience that in a conventional image forming apparatus, faults include those having a clearly identified cause, such as an abnormality in the driving system or the like, and those which do not have a clearly identified cause. In the latter case, even when an obvious abnormality cannot be identified in the individual members of the mechanical location (process cartridge or the like) that is believed to be the cause of the fault, the fault (an abnormal image or the like) disappears when the entire mechanical location is replaced.

In the image forming apparatus of the aforementioned Prior Art 1, in which an abnormality in the device is detected early by comparing the obtained results of predetermined information such as driving load information and the like with normal index information, a fault can be predicted in advance through early detection of the abnormality. However, since the fault occurs due to the progression of the detected abnormality, faults without a clearly identified cause cannot be predicted.

Hence the present inventors are currently developing a novel abnormality determining apparatus which is capable of predicting the occurrence of a fault without a clearly identified cause using the MTS method (this abnormality determining apparatus will be referred to as the "device in development" hereafter). The device in development stores data relating to a multidimensional space constructed on the basis of a normal combined data set comprising a photosensitive body charging amount, temperature, feed speed, and so on of an image forming apparatus serving as the detection subject. The Mahalanobis distance in the multidimensional space is then determined for the combined data (detected data) obtained during an image forming operation, and a determination is made as to whether or not an abnormality is present. With this constitution, unlike the image forming apparatus of Prior Art 1, the occurrence of a fault without a clearly identified cause can be predicted by determining the presence of an abnormality in combined data detected by a sensor or the like.

However, the present inventors discovered that, in this device in development, a normal state is sometimes detected mistakenly when an abnormality is present. More specifically, in a typical image forming apparatus, for example, a user may often select between a high speed mode, in which high speed printing takes priority over high image quality, and a high image quality mode, in which high image quality takes precedence. With this type of constitution, in which the user may select from a plurality of operating modes, the normal value of the paper conveyance speed in the device differs according to the operating mode setting. More specifically, the normal value of the paper conveyance speed is approximately 100 [mm/sec] in the high speed mode, but approximately 50 [mm/sec] in the high image quality mode. Hence if a multidimensional space is constructed on the basis of a normal data set obtained while mixing the plurality of modes, a detection data value of 75 [mm/sec] for the paper conveyance speed is mistakenly detected as normal when it should be detected as abnormal. In a typical image forming apparatus, detected data regarding the toner bulk density, electric resistance value, and so on may also have different normal values according to the environment (temperature and humidity). However, if a multidimensional space is constructed on the basis of a normal data set detected in a plurality of environments, a similar misdetection occurs.

The reason for these misdetections is that, despite the fact that the normal values of information results obtained by the information obtaining means differ according to the content of specific information such as the operating mode setting and environment, the determination as to the abnormality of the information is performed on the basis of only one normal data set. Note that the occurrence of such misdetections is not limited to a case in which an abnormality is determined using the MTS method, and may occur with any abnormality determining method that uses only one set of normal index information such as a normal data set.

Meanwhile, in the remote fault diagnosing system of the aforementioned Prior Art 2, although faults are diagnosed in consideration of the user's proficiency and perception of the fault, when the user changes, it is impossible to take into account an appropriate degree of proficiency and fault perception for the new user. As a result, faults cannot be notified at an appropriate timing for the new user.

Moreover, the fault diagnosing system of Prior Art 2 diagnoses a plurality of abnormalities occurring inside the diagnosis subject image forming apparatus individually. Therefore, as the types of abnormality to be diagnosed increase, the calculation amount required for the diagnoses rises, making control more complicated.

With the device in development described above, such increasingly complicated control can be suppressed. The reason for this is as follows. In the device in development, various abnormalities in a detection subject such as an image forming apparatus are determined comprehensively as a single general abnormality, rather than individually. When at least one of the various abnormalities occurs, a general abnormality determination of "abnormality present" is made comprehensively. In so doing, increasingly complicated control due to an increase in the types of abnormality in the determination subject can be suppressed, unlike the remote fault diagnosing system of Prior Art 2, in which control becomes more complicated as the types of abnormality used in the determination increase.

However, the device in development is unable to determine various abnormalities in consideration of the user's proficiency and degree of fault perception. As a result, the abnormality determination precision is not always suited to the user, and depending on the user, abnormalities may be detected unnecessarily, the detection timing may be too late, and so on.

Further, when a general abnormality is determined as "present", as in the device in development, using a method of perceiving the degree of deviation from a normal state, rather than perceiving the presence of individual abnormalities, the maintenance response following the detection of an abnormality becomes complicated. This is because it is difficult to specify the type of abnormality that has occurred from among all of the abnormalities that may be incorporated in the general abnormality.

SUMMARY OF THE INVENTION

It is therefore a first object of the present invention to provide an abnormality determining method that is capable of avoiding mistaken determinations caused by differences in the normal values of information obtained by information obtaining means depending on the content of specific information such as an operating mode setting, and reductions in the determination precision when a user of a detection subject changes, and also to provide an abnormality determining apparatus and an image forming apparatus using this method.

A second object of the present invention is to provide an abnormality determining method and so on which can avoid mistaken determinations caused by differences in the normal values of information obtained by information obtaining means depending on the content of specific information such as an operating mode setting.

A third object of the present invention is to provide an abnormality determining method and so on which is capable of determining the presence of an abnormality with a precision suited to each individual user, while suppressing increasingly complicated control occurring when various abnormalities are determined individually and an increasingly complicated maintenance response following a determination.

In accordance with the present invention, an abnormality determining method determines the presence of an abnormality in a detection subject on the basis of normal index information serving as an index of a normal state of the detection subject, and obtained information obtained by information obtaining means for obtaining a plurality of types of information. A plurality of normal index information having different values is prepared as the normal index information, and the normal index information to be used to determine the presence of an abnormality in the detection subject is selected from the plurality of normal index information at a predetermined timing.

In accordance with the present invention, an abnormality determining apparatus comprises information storage means for storing normal index information serving as an index of a normal state of a detection subject; information obtaining means for obtaining a plurality of types of information; and determining means for determining the presence of an abnormality in the detection subject on the basis of the normal index information stored in the information storage means, and the information obtained by the information obtaining means. The information storage means store a plurality of the normal index information having different values, and the determining means select the normal index information to be used to determine the presence of an abnormality in the detection subject from the plurality of normal index information at a predetermined timing.

In accordance with the present invention, an abnormality determining method comprises the steps of storing normal index information, serving as an index of a normal state of a detection subject, in information storage means; obtaining information about an object using information obtaining means; and determining the presence of an abnormality in the detection subject on the basis of the normal index information in the storage means and the obtained results of the information obtaining means A plurality of means for obtaining different types of information is used as the information obtaining means, a plurality of information having different content depending on the content of specific information, which is at least one of the plurality of types of information obtained individually by said plurality of information obtaining means, is used as the normal index information, and in the determining step, information corresponding to the obtained results of the specific information obtained by the information obtaining means is specified from the plurality of normal index information and used to determine the presence of an abnormality.

In accordance with the present invention, an abnormality determining apparatus comprises information storage means for storing normal index information serving as an index of a normal state of a detection subject; information obtaining means for obtaining information about an object; and determining means for determining the presence of an abnormality in said detection subject on the basis of the normal index information in the information storage means and the obtained results obtained by the information obtaining means. A plurality of the information obtaining means is provided for obtaining different types of information, a plurality of information having different content depending on the content of specific information, which is at least one of the plurality of types of information obtained individually by said plurality of information obtaining means, is used as the normal index information, and the determining means specify information corresponding to the obtained results of the specific information, obtained by the information obtaining means, from the plurality of normal index information, and use the specified information to determine the presence of an abnormality.

In accordance with the present invention, an image forming apparatus comprises recording medium conveying means for conveying a recording medium; visible image forming means for forming a visible image on the recording medium conveyed by the recording medium conveying means; and abnormality determining means for determining the presence of an abnormality in the entire apparatus or a part thereof. The abnormality determining means comprises information storage means for storing normal index information serving as an index of a normal state of a detection subject; information obtaining means for obtaining information about an object; and determining means for determining the presence of an abnormality in the detection subject on the basis of the normal index information in the information storage means and the obtained results obtained by the information obtaining means. A plurality of the information obtaining means is provided for obtaining different types of information, a plurality of information having different content depending on the content of specific information, which is at least one of the plurality of types of information obtained individually by the plurality of information obtaining means, is used as the normal index information, and the determining means specify information corresponding to the obtained results of the specific information, obtained by the information obtaining means, from the plurality of normal index information, and use the specified information to determine the presence of an abnormality.

In accordance with the present invention, an abnormality determining method implements an information obtaining step for obtaining information about an object using information obtaining means, and a determining step for determining the presence of an abnormality in a detection subject on the basis of the obtained information of the information obtaining means. A calculating step for performing a predetermined calculation on the basis of the information obtained by the information obtaining means, and a comparing step for comparing the calculation result of the calculating step with a predetermined threshold, are implemented in the determining step. An abnormality is determined as present when the calculation result reaches the threshold, exceeds the threshold, or falls below the threshold in the comparing step. A general abnormality determining step for determining the presence of a general abnormality, which is capable of incorporating a plurality of types of abnormality, by comparing said calculation result based on the plurality of types of obtained information to a general abnormality threshold, and an individual abnormality determining step in which the presence of individual abnormalities, which are a plurality of types of abnormality that can be incorporated into the general abnormality, is determined in succession only when the general abnormality is determined as present in the general abnormality determining step, by comparing the calculation result based on at least one of the plurality of types of obtained information to an individual abnormality threshold for each individual abnormality, are implemented in the determining step, and initial setting is performed for the general abnormality threshold and at least one of the plurality of individual abnormality thresholds corresponding individually to the individual abnormalities in accordance with information regarding a user of the detection subject.

In accordance with the present invention, an abnormality determining apparatus comprises information obtaining means for obtaining information about an object; and determining means for implementing a predetermined calculation on the basis of the information obtained by the information obtaining means, and determining an abnormality in the detection subject as present when the result of the calculation reaches a predetermined threshold, exceeds the threshold, or falls below the threshold. The determining means are constituted to determine the presence of a general abnormality, which is capable of incorporating a plurality of types of abnormality, by comparing the calculation result based on the plurality of types of obtained information to a general abnormality threshold, and determine in succession the presence of individual abnormalities, which are a plurality of types of abnormality that can be incorporated into the general abnormality, only when the general abnormality is determined as present, by comparing the calculation result based on at least one of the plurality of types of obtained information to an individual abnormality threshold for each individual abnormality.

In accordance with the present invention, an image forming apparatus comprises visible image forming means for forming a visible image on a recording medium; and abnormality determining means for determining the presence of an abnormality in the apparatus. The abnormality determining means comprises information storage means for storing normal index information serving as an index of a normal state of a detection subject; information obtaining means for obtaining a plurality of types of information; and determining means for determining the presence of an abnormality in the detection subject on the basis of the normal index information stored in the information storage means, and the information obtained by the information obtaining means. The information storage means store a plurality of the normal index information having different values, and the determining means select the normal index information to be used to determine the presence of an abnormality in said detection subject from the plurality of normal index information at a predetermined timing.

In accordance with the present invention, an image forming apparatus comprises visible image forming means for forming a visible image on a recording medium; and abnormality determining means for determining the presence of an abnormality in the apparatus. The abnormality determining means comprises information storage means for storing normal index information serving as an index of a normal state of a detection subject; information obtaining means for obtaining information about an object; and determining means for determining the presence of an abnormality in the detection subject on the basis of the normal index information in the information storage means and the obtained results obtained by the information obtaining means. A plurality of said information obtaining means is provided for obtaining different types of information, a plurality of information having different content depending on the content of specific information, which is at least one of the plurality of types of information obtained individually by said plurality of information obtaining means, is used as the normal index information, and the determining means specify information corresponding to the obtained results of the specific information, obtained by the information obtaining means, from the plurality of normal index information, and use the specified information to determine the presence of an abnormality.

In accordance with the present invention, an image forming apparatus comprises visible image forming means for forming a visible image on a recording medium; and abnormality determining means for determining the presence of an abnormality in the apparatus. The abnormality determining means comprises information obtaining means for obtaining information about an object; and determining means for implementing a predetermined calculation on the basis of the information obtained by the information obtaining means, and determining an abnormality in the detection subject as present when the result of the calculation reaches a predetermined threshold, exceeds the threshold, or falls below said threshold. The determining means are constituted to determine the presence of a general abnormality, which is capable of incorporating a plurality of types of abnormality, by comparing said calculation result based on the plurality of types of obtained information to a general abnormality threshold, and determine in succession the presence of individual abnormalities, which are a plurality of types of abnormality that can be incorporated into the general abnormality, only when the general abnormality is determined as present, by comparing the calculation result based on at least one of the plurality of types of obtained information to an individual abnormality threshold for each individual abnormality.

In accordance with the present invention, an abnormality determining apparatus comprises data storage means for storing data; information obtaining means for obtaining information about an object; and determining means for determining the presence of an abnormality in a detection subject on the basis of standard information stored in the data storage means, and the obtained results of the information obtaining means. A plurality of the information obtaining means is provided for obtaining a plurality of different types of information, the data storage means store normal relationship information showing a normal relationship between a value of first specific information, which is at least one of the plurality of types of information obtained individually by said plurality of information obtaining means, and a value of second specific information, which is different information to the first specific information, and the determining means correct an obtained value of the second specific information on the basis of the obtained value of the first specific information and the normal relationship information, and use the correction result to determine the presence of an abnormality.

In accordance with the present invention, an image forming apparatus comprises recording medium conveying means for conveying a recording medium; visible image forming means for forming a visible image on the recording medium conveyed by the recording medium conveying means; and abnormality determining means for determining the presence of an abnormality in the entire apparatus or a part thereof. The abnormality determining means comprises data storage means for storing data; information obtaining means for obtaining information about an object; and determining means for determining the presence of an abnormality in a detection subject on the basis of standard information stored in the data storage means, and the obtained results of the information obtaining means. A plurality of the information obtaining means is provided for obtaining a plurality of different types of information, the data storage means store normal relationship information showing a normal relationship between a value of first specific information, which is at least one of the plurality of types of information obtained individually by the plurality of information obtaining means, and a value of second specific information, which is different information to the first specific information, and the determining means correct an obtained value of the second specific information on the basis of the obtained value of the first specific information and the normal relationship information, and use the correction result to determine the presence of an abnormality.

BRIEF DESCRIPTION OF THE DRAWINGS

The above and other objects, features, and advantages of the present invention will become more apparent from the following detailed description taken with the accompanying drawings, in which:

FIGS. 49 and 50 are obtained data tables illustrating an information obtaining step;

FIG. 51 is a view showing a square value of the Mahalanobis distance D calculated for each sample;

FIG. 52 is a table showing an example of a relationship between various individual abnormalities in a copier, and the grouped information required to determine the presence of these abnormalities;

FIG. 53 is a view showing an example of standard thresholds relating to three individual abnormality thresholds relating to a paper jam, deterioration of a photosensitive body, and variation in image density;

FIG. 54 is a view showing an example of a relationship between a user proficiency level and a threshold coefficient;

FIG. 55 is a view showing an example of a relationship between a user's degree of perception of a fault and the threshold coefficient;

FIG. 56 is a view showing a relationship between the industry sector of the user, the department, and the threshold coefficient;

FIG. 57 is a view showing a relationship between an output frequency type, an output frequency, and the threshold coefficient;

DESCRIPTION OF THE PREFERRED EMBODIMENTS

Figure 1:
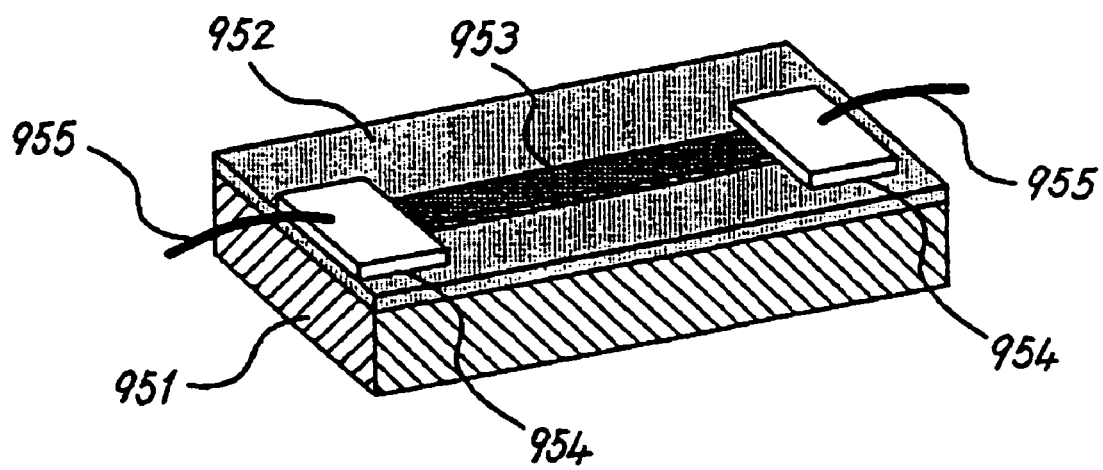
FIG. 1 is a perspective view showing a resistance variation element of a temperature sensor installed in a copier which serves as a detection subject for an abnormality determining apparatus according to a first embodiment of the present invention.

Embodiments of the present invention will now be described in detail.

First Embodiment

An abnormality determining apparatus according to the first embodiment determines the presence of abnormalities in an image forming apparatus constituted by a copier, which serves as a detection subject. The constitution of the copier serving as the detection subject of this abnormality determining apparatus is identical to that of a detection subject copier of an abnormality determining apparatus according to a third embodiment to be described below. The constitution of the copier will be described in detail below in the third embodiment.

Examples of the information that is obtained from the copier serving as an image forming apparatus include sensing information, control parameter information, input information, and image reading information. This information will now be described in detail.

(a) Sensing Information

The sensing information may be considered as obtained information regarding driving relationships, various characteristics of a recording medium, developer characteristics, photosensitive body characteristics, various states of an electrophotographic process, environmental conditions, various characteristics of recorded objects, and soon. An outline of these various types of sensing information is provided below.

(a-1) Driving Information:

detecting the rotation speed of a photosensitive drum using an encoder, reading the current value of a drive motor, reading the temperature of the drive motor;

similarly detecting the driving condition of cylindrical or belt-form rotating components such as a fixing roller, a conveyance roller, a drive roller, and so on; and detecting sounds generated by driving using a microphone disposed within or outside the device.

(a-2) Paper Conveyance Condition:

reading the position of the front end and rear end of conveyed paper using a transmission or reflection optical sensor or a contact-type sensor, detecting a paper jam, reading deviations in the transit timing of the front end and rear end of the paper and variation in a perpendicular direction to the conveyance direction;

similarly determining the traveling speed of the paper by means of the detection timing of a plurality of sensors; and determining slippage between a feed roller and the paper during paper feeding by comparing a measured value of the roller rotation speed and the travel of the paper.

(a-3) Various Characteristics of a Recording Medium Such as Paper

This information greatly affects the image quality and sheet conveyance stability. The following methods are used to obtain information relating to the paper type:

the paper thickness is determined by fixing the paper between two rollers and detecting the relative positional displacement of the rollers using an optical sensor or the like, or detecting an equal displacement to the travel of a member that is pushed upward when the paper is introduced;

the surface roughness of the paper is determined by causing a guide or the like to contact the surface of the paper prior to transfer, and detecting the oscillation, sliding sound, or the like produced by this contact;

the gloss of the paper is determined by irradiating luminous flux of a prescribed angle of aperture at a prescribed angle of incidence, and measuring the luminous flux of a prescribed angle of aperture that is reflected in a specular reflection direction using a sensor;

the rigidity of the paper is determined by detecting the amount of deformation (curvature) of a pressed piece of paper;

a determination as to whether or not the paper is recycled paper is performed by irradiating the paper with ultraviolet light and detecting its transmittivity;

a determination as to whether or not the paper is backing paper is performed by irradiating the paper with light from a linear light source such as an LED array, and detecting the light reflected from the transfer surface using a solid state imaging element such as a CCD;

a determination as to whether or not the paper is an OHP sheet is performed by irradiating the paper with light, and detecting regular reflected light having a different angle to that of the transmitted light;

the moisture content of the paper is determined by measuring the absorption of infrared light or μ wave light;

the curl is detected using an optical sensor, contact sensor, or similar;

the electric resistance of the paper is determined by causing a pair of electrodes (feed rollers or the like) to contact the recording paper and measuring the electric resistance directly, or measuring the surface potential of the photosensitive body or intermediate transfer body following transfer, and estimating the resistance value of the recording paper from the measured value.

(a-4) Developer Characteristics

The characteristics of the developer (toner/carrier) in the device fundamentally affect the electrophotographic process function, and are therefore an important factor in the operation and output of the system. It is vital to obtain information regarding the developer. The following items may be cited as examples of developer characteristics.

Regarding the toner, the charging amount and distribution, fluidity, cohesion, bulk density, electric resistance, external additive amount, consumption amount or remaining amount, fluidity, and toner concentration (mixing ratio of toner and carrier) may be cited as characteristics.

Regarding the carrier, the magnetic property, coating thickness, spent amount, and so on may be cited as characteristics.

It is usually difficult to detect these items individually in the interior of the copier. Therefore, an overall characteristic of the developer is detected. The overall characteristic of the developer may be measured in the following ways, for example:

a test latent image is formed on the photosensitive body, developed under predetermined developing conditions, and the reflection density (optical reflectance) of the formed toner image is measured;

a pair of electrodes is provided in the developing device, and the relationship between the applied voltage and current (resistance, permittivity, and so on) is measured;

a coil is provided in the developing device, and the voltage-current characteristic (inductance) is measured;

a level sensor is provided in the developing device, and the developer volume is detected. The level sensor may be an optical sensor, a capacitance sensor, or similar.

(a-5) Photosensitive Body Characteristics

Similarly to the developer characteristics, the photosensitive body characteristics relate closely to the electrophotographic process function. Examples of information regarding the photosensitive body characteristics include the photosensitive film thickness, the surface characteristics (coefficient of friction, irregularities), surf ace potential (before and after each process), surface energy, scattered light, temperature, color, surface position (deflection), linear speed, potential attenuation speed, resistance/capacitance, surface moisture content, and so on. From among these examples, the following information can be detected within the copier.

Variation in the capacitance accompanying film thickness variation can be detected by detecting the current flowing from a charging member to the photosensitive body, and simultaneously comparing the voltage applied to the charging member with the voltage-current characteristic of a preset dielectric thickness of the photosensitive body to determine the film thickness.

The surface potential and temperature can be determined by a well-known sensor.

The linear speed is detected by an encoder or the like attached to a rotary shaft of the photosensitive body.

Scattered light from the surface of the photosensitive body is detected by an optical sensor.

(a-6) State of the Electrophotographic Process

As is well-known, toner image formation through electrophotography is performed by a succession of processes comprising: uniform charging of the photosensitive body; latent image formation (image exposure) by means of laser light or the like; development using toner (coloring particles) carrying an electric charge; transfer of the toner image onto a transfer material (in the case of a color image, this is performed by superposing toner onto an intermediate transfer body or the recording medium, which is the final transfer body, or by means of superposition development onto the photosensitive body during development); and fixing of the toner image on the recording medium. The various information at each of these stages greatly affects the image and other system output. It is important to obtain this information in order to evaluate the stability of the system. Specific examples of ways in which information relating to the state of the electrophotographic process is obtained are as follows:

the charging potential and exposure unit potential are detected by a well-known surface potential sensor;

the gap between the charging member and photosensitive body during non-contact charging is detected by measuring the amount of light passing through the gap;

the electromagnetic wave caused by charging is perceived by a wideband antenna;

the sound generated by charging;

the exposure intensity; and the exposure optical wavelength.

The following methods may also be employed to obtain various states of the toner image.

The pile height (height of the toner image) is detected by measuring depth from the vertical direction using a displacement sensor, and measuring shielding length from the horizontal direction using a parallel ray linear sensor.

The toner charging amount is measured by a potential sensor which measures the potential of an electrostatic latent image on a solid portion, and measures the potential when the latent image has been developed, and determined from the ratio thereof to an adhesion amount calculated by a reflection density sensor in the same location.

Dot fluctuation or scattering is determined by detecting a dot pattern image using an infrared light area sensor on the photosensitive body and area sensors of wavelengths corresponding to each color on the intermediate transfer body, and then implementing appropriate processing.

The offset amount (after fixing) is read by sensors in locations corresponding to the surface of the recording paper and the surface of the fixing roller respectively, and determined by comparing the two obtained sensor values.

The remaining transfer amount is determined by disposing an optical sensor after the transfer step (on the PD and the belt) and measuring the amount of reflected light from the remaining transfer pattern following the transfer of a specific pattern.

Color unevenness during superposition is detected by a full color sensor which detects the surface of the recording paper following fixing.

(a-7) Formed Toner Image Characteristics

Image density and color are detected optically (by either reflected light or transmitted light; the projection wavelength is selected according to the color). To obtain density and single color information, this detection may be performed on the photosensitive body or intermediate transfer body, but to measure a color combination, such as color unevenness, the detection must be performed on the paper.

Gradation is determined using an optical sensor by detecting the reflection density of a toner image formed on the photosensitive body or a toner image transferred onto a transfer body at each gradation level.

Definition is detected using a monocular sensor with a small spot diameter or a high resolution line sensor by reading a developed or transferred image to determine a repeated line pattern[i].

Graininess (sense of roughness) is determined by the same method used to detect the definition, by reading the halftone image and calculating the noise component.

Resist skew is determined by providing an optical sensor at each end of the main scanning direction after the resist, and measuring the difference between the ON timing of the registration roller and the detection timing of the two sensors.

Mis-color registration is detected at the edge portions of a superposed image on the intermediate transfer body or recording paper by a monocular small-diameter spot sensor or a high resolution line sensor.

Banding (density unevenness in the conveyance direction) is detected by measuring density unevenness in the sub scanning direction of the recording paper using a small-diameter spot sensor or a high resolution line sensor, and measuring the signal quantity at a specific frequency.

Glossiness (unevenness) is detected by providing a piece of recording paper formed with a uniform image so as to be scanned by a regular reflection-type optical sensor.

Fogging is detected using a method of reading an image background portion using an optical sensor for scanning a comparatively wide region on the photosensitive body, intermediate transfer body, or recording paper, or a method of obtaining image information for each area of the background region using a high resolution area sensor, and counting the number of toner particles in the image.

(a-8) Physical Characteristics of Printed Objects in the Copier

Image deletion/fading and so on is determined by scanning a toner image on the photosensitive body, intermediate transfer body, or recording paper using an area sensor, and subjecting the obtained image information to image processing.

Scattering is determined by scanning an image on the recording paper using a high resolution line sensor or an area sensor, and calculating the amount of toner scattered around the periphery of the pattern portion.

Rear end blank spots and betacross blank spots[ii] are detected by a high resolution line sensor on the photosensitive body, intermediate transfer body, or recording paper.

Curling, rippling, and folding are detected by a displacement sensor. It is effective to dispose a sensor in a location near to the two end parts of the recording paper to detect folding.

Contamination and flaws on the cross-cut surface are detected by an area sensor provided vertically in a delivery tray by capturing an image of and analyzing the cross-cut surface when a certain amount of delivered paper has accumulated.

(a-9) Environmental Conditions

To detect temperature, a thermocouple system which extracts as a signal a thermoelectromotive force generated at a contact point joining two different metals or a metal and a semiconductor, a resistivity variation element using temperature-based variation in the resistivity of a metal or semiconductor, a pyroelectric element in which, with a certain type of crystal, the charge in the crystal is polarized with an increase in temperature to generate a surface potential, a thermomagnetic effect element which detects change in magnetic property according to temperature, and so on may be employed.

To detect humidity, an optical measurement method for measuring the optical absorption of $H_2O$ or an OH group, a humidity sensor which measures variation in the electric resistance value of a material due to water vapor adsorption, and so on may be employed.

Various gases are detected by measuring change in the electric resistance of an oxide semiconductor basically accompanying gas adsorption.

To detect airflow (direction, flow speed, gas type), an optical measurement method or the like may be used, but an air-bridge type flow sensor which, when installed in the system, is capable of reducing the size of the system, is particularly useful.

To detect air pressure and pressure, methods such as using a pressure sensitive material to measure the mechanical displacement of a membrane may be employed. Similar methods may be used to detect oscillation.

(b) Re: Control Parameter Information

An operation of the copier is determined by the control unit, and hence it is effective to use the input/output parameters of the control unit directly.

(b-1) Image Formation Parameters

These are direct parameters output as a result of calculation processing performed by the control unit for the purpose of image formation, such as the following:

set values of the process conditions set by the control unit, for example the charging potential, developing bias value, fixing temperature set value, and so on;

similarly, set values of various image formation parameters for halftone processing, color correction, and so on;

various parameters set by the control unit to operate the device, for example the paper conveyance timing, the execution period of a preparatory mode prior to image formation, and so on.

(b-2) User Operating History

Frequency of various operations selected by user such as number of colors, number of sheets, and image quality instruction.

Frequency of paper size set by user.

(b-3) Power Consumption

The total power consumption over an entire period or a specific time unit (one day, one week, one month, etc.), or the distribution, variation (derivative), and cumulative value (integral) thereof.

(b-4) Information Regarding Consumption of Consumables

Usage of the toner, photosensitive body, and paper over the entire period or a specific time unit (one day, one week, one month, etc.), or the distribution, variation (derivative), and cumulative value (integral) thereof.

(b-5) Information Regarding the Occurrence of a Fault

The frequency with which a fault occurs (by type) over the entire period or a specific time unit (one day, one week, one month, etc.), or the distribution, variation (derivative), and cumulative value (integral) thereof.

(c) Input Image Information

The following information can be obtained from image information transmitted from a host computer as direct data or image information obtained after being read from an original image by a scanner and subjected to image processing.

The cumulative number of color pixels is determined by counting image data by GRB signal for each pixel.

Using a method such as that described in Japanese Patent Publication No. 2621879, for example, an original image can be divided into characters, halftone dots, photographs, and background, and thus the ratio of the character portion, halftone portion, and so on can be determined. The ratio of colored characters can be determined in a similar manner.

By counting the cumulative value of the color pixels in each of a plurality of regions partitioned in the main scanning direction, the toner consumption distribution in the main scanning direction can be determined.

The image size is determined according to image size signals generated by the control unit or the distribution of color pixels in the image data.

The character type (size, font) is determined from the attribute data of the characters.

Next, specific examples of methods for obtaining various information from within the copier serving as a detection subject will be described. Note that the following is a description of methods for obtaining various information regarding the interior of the copier. When the abnormality determining apparatus of the present invention is constituted integrally with a copier, the following information obtaining means may function without further modification as the information obtaining means of the abnormality determining apparatus. When the abnormality determining apparatus is constituted separately from the copier, the various information obtained by the information obtaining means of the copier to be described below may be received in reception means which constitute the information obtaining means of the abnormality determining apparatus.

(1) Temperature

The copier serving as a detection subject comprises a temperature sensor using a resistance variation element to obtain temperature information due to the simple principles and constitution of the resistance variation element and the possibility of reducing the element to an extremely small size. FIG. 1 is a perspective view showing a thin film-type resistance variation element in this temperature sensor. The resistance variation element may be constructed as follows. First, a dielectric film 952 is formed on a substrate 951, and then a thin film-form sensor unit 953 constituted by a metallic or semiconductor material is provided thereabove. Pad electrodes 954 are provided at each end of the sensor unit 953, and finally, a lead wire 955 is connected to the pad electrodes 954. In this resistance variation element, the electric resistance of the sensor unit 953 varies with a variation in the ambient temperature, and this variation may be derived as a variation in voltage or current. Since the sensor unit 953 is a thin film, the entire element can be reduced in size, and is therefore easy to incorporate into the system.

Figure 2:
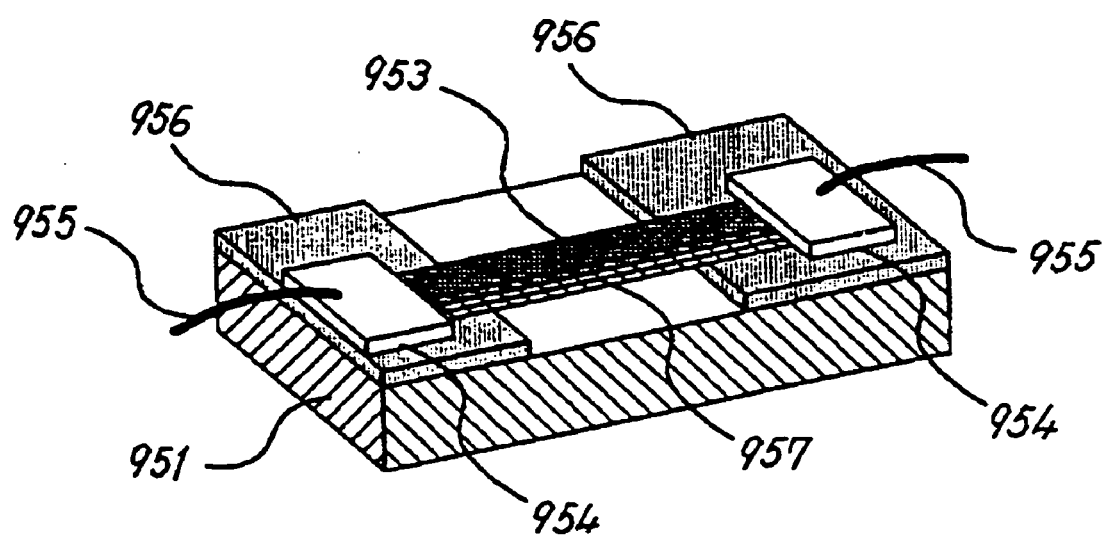
FIG. 2 is a perspective view showing a different resistance variation element to that shown in FIG. 1.

FIG. 2 is a perspective view showing a resistance variation element having a different constitution to that shown in FIG. 1. This resistance variation element differs from the resistance variation element shown in FIG. 1 in that the thin film-form sensor unit 953 is disposed on a thin film bridge 957 which is suspended in midair and separated from the substrate 951 via a spacer 956. By means of such a constitution, heat dissipation from the sensor unit 953 is prevented, and the responsiveness of the sensor unit 953 to temperature is improved. With this constitution, it is possible to detect only radiation heat from the measured portion, which is favorable during non-contact measurement.

(2) Humidity

Figure 3:
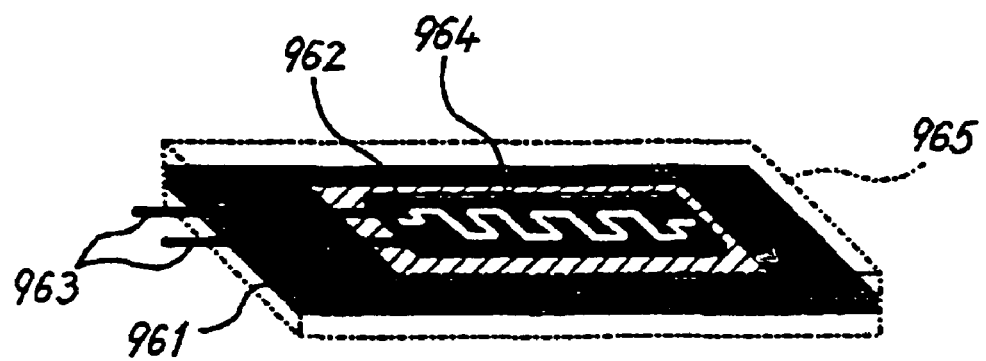
FIG. 3 is a perspective view showing a humidity sensor installed in the same copier.

A humidity sensor which can be reduced to a small size is useful. The basic principles thereof are that water vapor is adsorbed to a moisture-sensitive ceramic, and that ion conduction increases due to the adsorbed water such that the electric resistance of the ceramic decreases. The moisture-sensitive ceramic material is a porous material such as an alumina-based ceramic, apatite-based ceramic, $ZrO_2$—MgO based ceramic, or similar. FIG. 3 is a perspective view showing a humidity sensor installed in the detection subject copier. A comb-shaped electrode 962 is provided on an insulating substrate 961, and terminals 963 are connected to each end thereof. A moisture-sensitive layer 964 (typically, a moisture-sensitive ceramic) is provided and the entire sensor is covered by a case 965. When water vapor is adsorbed to the moisture-sensitive ceramic through the case 965, the electric resistance falls, and this may be measured as a voltage or current variation.

(3) Oscillation

Figure 4:
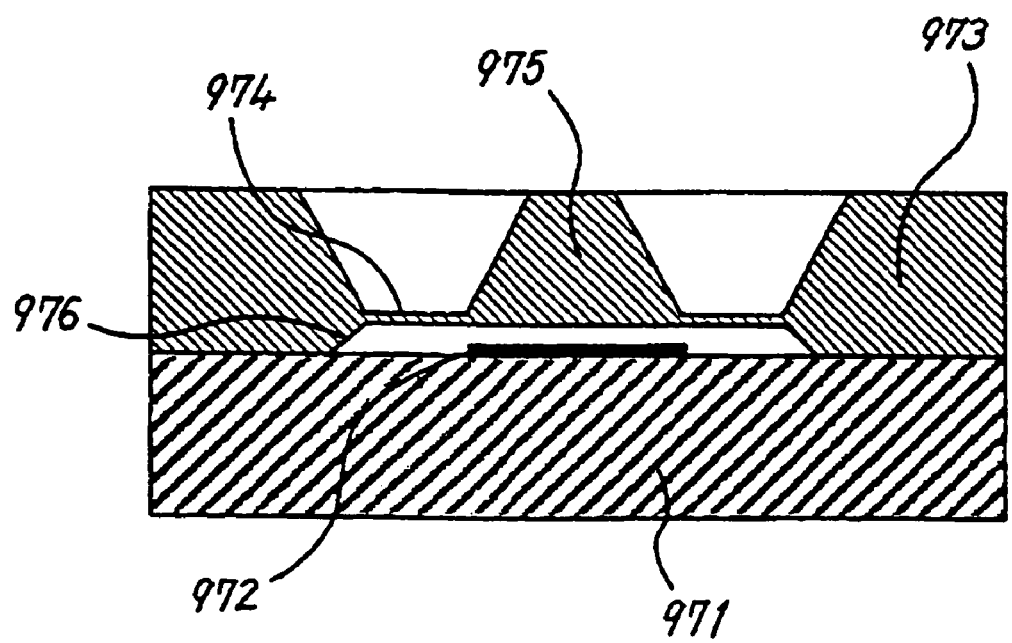
FIG. 4 is a perspective view showing an oscillation sensor installed in the same copier.

The oscillation sensor is basically the same as a sensor which measures air pressure and pressure, and a sensor using silicon, which can be reduced to an extremely small size and installed in the system easily, is particularly useful. The motion of an oscillator manufactured on a thin silicon diaphragm can be measured by measuring volumetric change between the oscillator and a counter electrode provided opposite the oscillator, or using the piezoresistance effect of the Si diaphragm itself. FIG. 4 is a sectional view showing an oscillation sensor installed in the detection subject copier. A counter electrode 972 is provided on an insulating substrate 971. Next, a thin diaphragm 974 and an oscillator 975 are provided on a silicon substrate 973. A stepped portion 976 is then formed to maintain the gap with the counter electrode 972, and joined to the substrate 971 comprising the counter electrode 972 formed in advance. When peripheral oscillation or pressure is applied to the sensor in this state, the oscillator 975 begins to oscillate, and this may be measured as volumetric change between the oscillator 975 and the counter electrode 972.

(4) Toner Concentration (for Four Colors)

Figure 5:
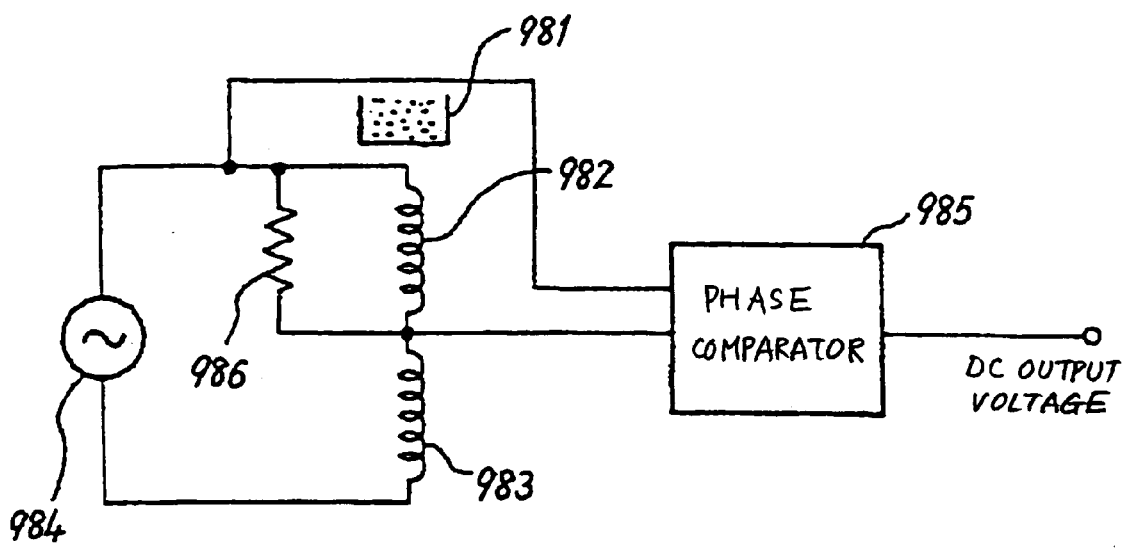
FIG. 5 is a block diagram showing the constitution of an electric circuit of a toner concentration sensor installed in the same copier.
Figure 6:
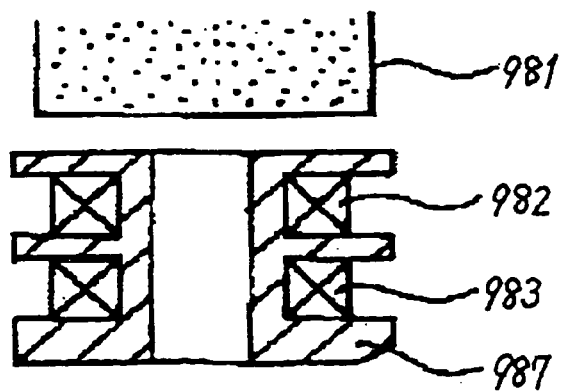
FIG. 6 is a view showing an outline of the constitution of a concentration detection portion of the same toner concentration sensor.

The toner concentration is detected for each color. A known sensor may be used as the toner concentration sensor. For example, the toner concentration may be detected using a sensing system disclosed in Japanese Unexamined Patent Application Publication H6-289717, which measures variation in the magnetic permeability of the developer in a developing device. FIG. 5 is a block diagram showing the electric circuit of a toner concentration sensor installed in the detection subject copier. FIG. 6 is a schematic diagram showing the concentration detection unit of this toner concentration sensor. For example, a reference coil 983 is connected differentially to a detection coil 982 disposed in the vicinity of a developer 981 formed from a mixture of a magnetic carrier and a non-magnetic toner. The inductance of the detection coil 982 varies in accordance with variation in the magnetic permeability caused by a direct increase or decrease in the toner concentration, or an increase or decrease in the magnetic carrier, whereas the inductance of the reference coil 983 is not affected by variation in the toner concentration. An alternating current drive source 984 which oscillates at 500 [kHz], for example, is connected to the series circuit constituted by the two coils 982, 983 so as to drive the two coils 982, 983. A differential output is derived from the connection point of the two coils 982, 983, and this output is connected to a phase comparator 985. One of the outputs of the alternating current drive source 984 is connected separately to the phase comparator 985, and thus the phase of the voltage and differential output voltage from the drive source 984 are compared. A sensitivity setting resistance 986 (R1) is connected in series with at least one of the detection coil 982 and the reference coil 983 (the detection coil 982 in the illustrated example) in order to increase sensitivity to variation in the toner concentration, thereby enabling control of the sensitivity characteristic. The two coils 982, 983 are wound on a tubular coil support 987 adjacent to each other in the vertical direction of the drawing. The detection coil 982 is positioned on the side nearest the developer 981 in order to detect variation in the magnetic permeability, and the reference coil 983 is disposed on the far side so that the magnetic permeability does not change even when the toner concentration varies.

(5) Photosensitive Body Uniform Charging Potential (for Four Colors)

Figure 7:
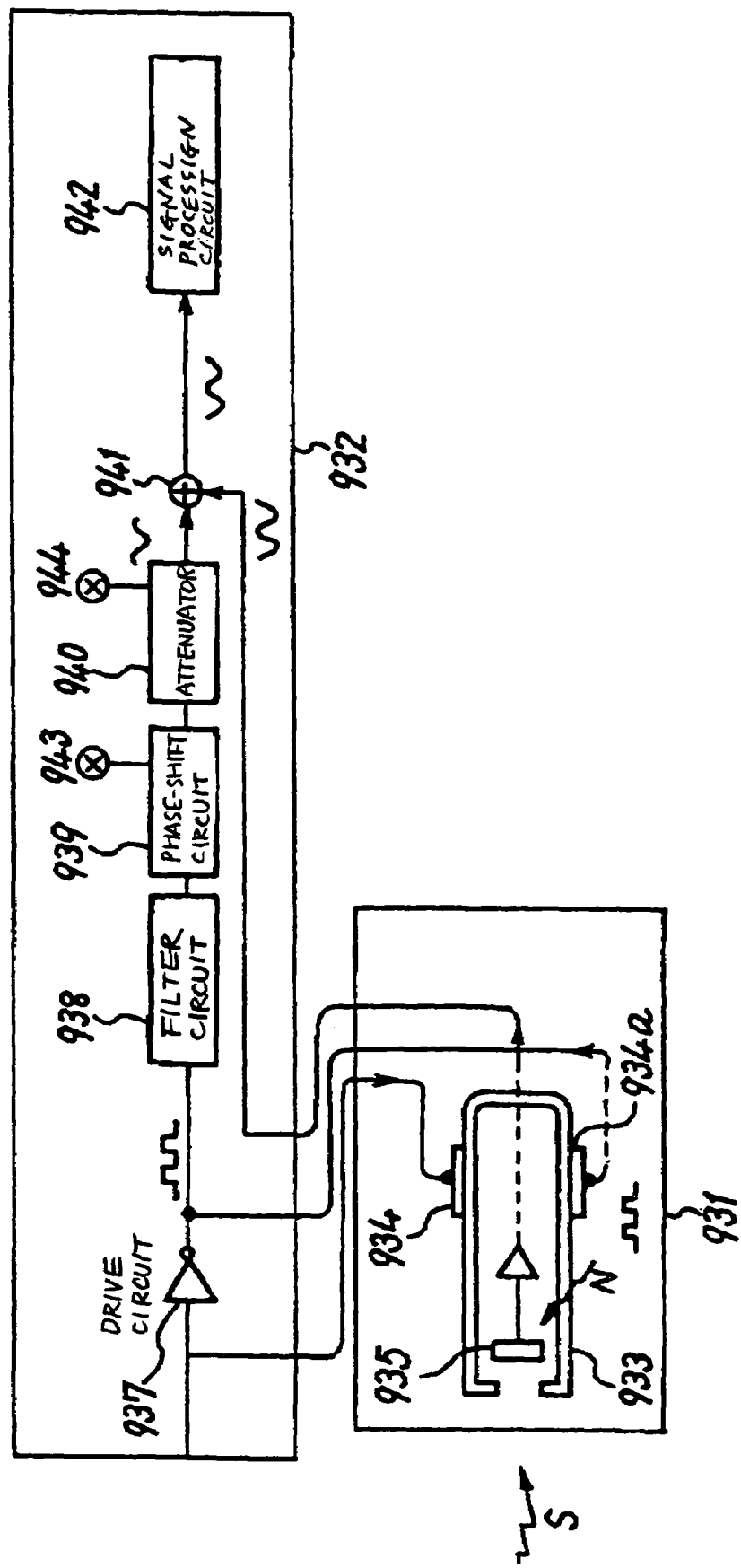
FIG. 7 is a view showing an outline of the constitution of a potential measuring system installed in the same copier.

The uniform charging potential is detected in the photosensitive bodies 40K, Y, M, C of each color. FIG. 7 is a schematic diagram showing a potential measuring system installed in the detection subject copier. In the drawing, the reference numeral 931 denotes a sensor unit substrate attached opposite a physical object (not shown). The reference numeral 932 denotes a signal processing unit substrate for transmitting drive signals to and receiving sensor output from the sensor unit substrate. A tuning fork 933 serving as chopping means and a piezoelectric element 934 are provided within the sensor unit substrate. The piezoelectric element 934 is driven by a drive signal from the signal processing unit substrate 932. In this potential measuring system, a self-oscillation system loop is used such that when one piezoelectric element 934 is driven, the resulting oscillation is transmitted to another piezoelectric element 934a through the tuning fork 933, and then returns to the drive source. The reference numeral 935 denotes a measuring electrode (to be referred to as "electrode" hereafter) which receives an electric line of force from the physical object. The reference numeral 936 denotes an amplifier which amplifies the temporal variation in the electric line of force S received by the electrode 935. A piezoelectric element drive circuit 937, a filter 938, and a piezoelectric element drive circuit $939^{iii}$ are provided in the signal processing unit substrate 932. The filter 938 shapes a waveform. The phase-shift circuit 939 aims to shift the phase difference between the drive signal fed into the sensor and the actual drive signal by 180° so that they cancel each other out. The phase difference between the two signals typically differs according to the feed path. An attenuator 940 serves to adjust the size of a phase-adjusted correction signal. An adding circuit 941 adds the correction signal to the sensor output. A processing circuit 942 processes the final signal output, and thus determines the potential of the physical object. The reference numerals 943, 944 denote a phase-shift circuit and an attenuator adjusting volume respectively. With this constitution, the phase-shift and attenuator gain are optimized such that an opposite phase and a signal of the same level can be added as a correction signal, thus enabling only sensor output based on the actual physical object to be detected. Further, by providing adjustment means, characteristic variation accompanying secular change can be dealt with by means of adjustment, and thus the reliability of the sensor is improved.

(6) Post-Development Potential of Photosensitive Body (for Four Colors)

The surface potential of the photosensitive bodies 40K, Y, M, C following optical recording is detected in the same manner as that described in (5) above.

(7) Colored Area Ratio (for Four Colors)

The colored area ratio is determined for each color from the ratio of the total cumulative value of the pixels to be colored and the total cumulative value of all of the pixels, which is learned from the input image information.

(8) Development Toner Amount (for Four Colors)

The toner adhesion amount per unit area on each of the toner images developed on the photosensitive bodies 40K, Y, M, C is determined on the basis of the optical reflectance produced by a reflection photosensor. The reflection photosensor irradiates a physical object with LED light, and detects the reflected light using a light-receiving element. A correlative relationship is established between the toner adhesion amount and the optical reflectance, and hence the toner adhesion amount can be determined on the basis of the optical reflectance.

(9) Slanting of Paper Front End Position

A pair of optical sensors is disposed at a point on the paper feeding path from a feed roller of a paper feeding portion 200 to a secondary transfer nip to detect the transfer paper at both ends of an orthogonal direction to the conveyance direction, and thus the two ends of the conveyed transfer paper in the vicinity of the front end thereof are detected. The two optical sensors are used to measure the time required for the paper to pass through, using the time at which a feed roller drive signal is issued as a reference, and slanting of the transfer paper in relation to the conveyance direction is determined on the basis of a difference in this time.

(10) Paper Discharge Timing

The transfer paper is detected by an optical sensor after passing through a pair of discharge rollers for discharging the transfer paper outside of the machine. Similarly in this case, measurement is performed with the time at which the feed roller drive signal is issued as a reference.

(11) Photosensitive Body Total Current (for Four Colors)

The current flowing out to an earth from the photosensitive bodies 40K, Y, M, C is detected. This current can be detected by providing current measuring means between the photosensitive body substrate and the ground terminal.

(12) Drive Power of Photosensitive Body (for Four Colors)

The drive power (current×voltage) consumed by the drive source (motor) of the photosensitive bodies during driving is detected by an ammeter, a voltmeter, and so on.

Figure 8:
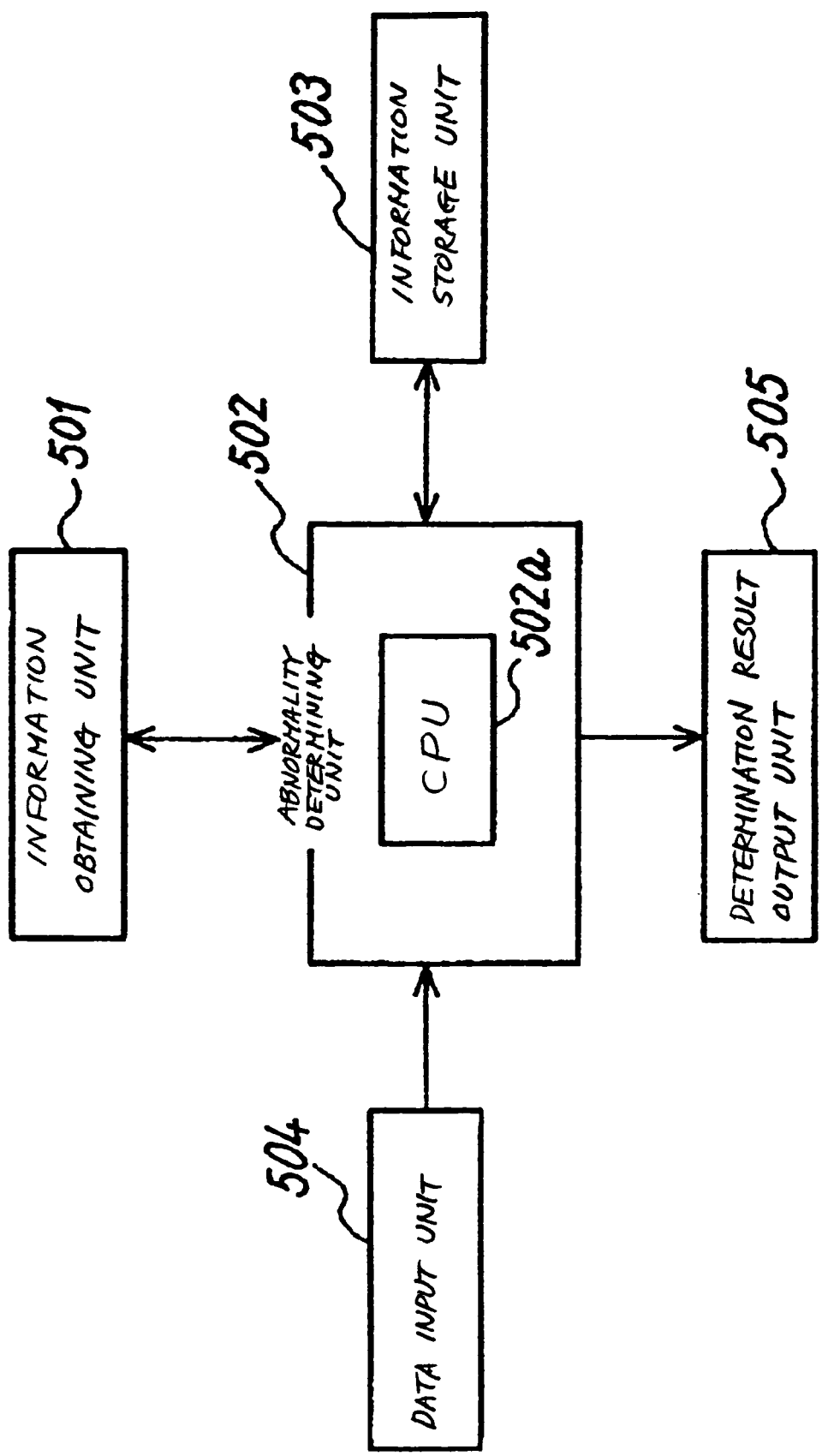
FIG. 8 is a block diagram showing the constitution of the main parts of an electric circuit in the same abnormality determining apparatus.

FIG. 8 is a block diagram showing the main parts of an electric circuit in the abnormality determining apparatus. In the diagram, the abnormality determining apparatus comprises an information obtaining unit 501 serving as information obtaining means for obtaining information about an object, an abnormality determining unit 502 serving as determining means, an information storage unit 503 serving as information storage means, a data input unit 504 serving as data input means, and so on. A determination result output unit 505 for outputting the result of a determination performed by the abnormality determining means is also provided.

The information obtaining unit 501 obtains at least two types of the various information described above from the detection subject copier, not shown in the drawing. The plurality of information obtained by the information obtaining unit 501 is transmitted to the abnormality determining unit 502. The abnormality determining unit 502 comprises calculation means (a CPU 501a in the illustrated example) for performing various calculations required to determine the presence of an abnormality. Hence the information transmitted from the information obtaining unit 501 is used as is in the calculation processing for determining an abnormality, or used after being stored in the information storage unit 503. More specifically, predetermined calculations are implemented on the basis of the various information transmitted from the information obtaining unit 501, and the presence of an abnormality in the copier is determined on the basis of the result of a comparison between the calculation result and a predetermined threshold stored in the information storage unit 503.

The result of the determination performed by the abnormality determining unit 502 is output by the determination result output unit 505. This output may be output as characters to be recognized by a user of the copier, output as an image display, audio output, and so on, and also includes a mode in which determination result information is output to an external device such as a personal computer or printer. By means of these various output modes, an approaching fault can be indicated, numerical values such as the Mahalanobis distance, to be described below, can be notified, and graphs, characters, and so on can be provided. The following can be cited as output modes:

(O-1) displaying the determination result on display means such as a display;
(O-2) outputting a message or warning sound on sound generating means such as a speaker;
(O-3) outputting characters such as written information on a recording medium such as transfer paper; and
(O-4) outputting the determination result as electronic information to an external machine through a wired line or wireless line.

By means of this output, the result of the determination performed by the abnormality determining unit 502 is recognized by the user of the copier, a remote serviceperson, or similar. Note that the information obtaining unit 501 is constituted by RAM, ROM, a hard disk, or similar, and that a control program and information such as algorithms, for example, are stored as well as the various information obtained by the information obtaining unit 501. Moreover, the determination result may be stored in storage means (memory, for example) of an external device such as another copier, a printer server, or a monitoring center.

When an abnormality is discovered as a result of the determination, it is preferable that, as well as outputting the determination result, some processing is performed on the detection subject copier, for example processing to halt the copier forcibly and issue a maintenance request. Alternatively, processing may be performed to restrict a part of the functions of the copier. The following may be cited as examples of the processing performed when an abnormality is discovered:

(h-1) restricting the number of output colors in a color copier;
(h-2) restricting the image formation speed;
(h-3) restricting the number of output pixels (the number of lines, for example) in the halftone portion of an output image;
(h-4) restricting the tone reproduction method;
(h-5) restricting the paper type;
(h-6) restricting the parameters of resist control; and
(h-7) restricting the parameters of the image formation process (in the case of an electrophotograph, for example, the charging potential, exposure, development bias, transfer bias, and so on).

Depending on the type of abnormality that has occurred, processing may be executed to encourage the user to replenish or replace consumables or components. Further, when a reparable abnormality occurs, processing may be executed to repair the abnormality automatically.

The information storage unit 503 stores a plurality of normal group data, i.e. combinations of various information obtained in advance from the detection subject copier, in a normal state. Hereafter, this collection of a plurality of normal group data will be referred to as a normal group data set.

The abnormality determining unit 502 determines a Mahalanobis distance on the basis of the results of the various information obtained from the detection subject copier by the information obtaining unit 501 and the normal group data set stored in advance in the information storage unit 503. The Mahalanobis distance is an index indicating the normality of an object, which will be described in detail in the following second embodiment and third embodiment. More specifically, the Mahalanobis distance indicates the coordinates of obtained data constituted by a combination of a plurality of types of information obtained from a detection subject in a multidimensional space determined on the basis of a normal group data set which is a collection of normal group data constituted by a combination of the same plurality of types of information. As the coordinates become further removed from the coordinates of the normal group data set, the detection subject becomes further removed from a normal state. The Mahalanobis distance denotes the extent to which the coordinates of the former are distanced from the coordinates of the latter. When the Mahalanobis distance exceeds a preset threshold, a fault is determined to be "present" in the detection subject.

In this type of determining method, the normal group data set (the obtained data table, normalized data table, correlation coefficient matrix R, or inverse matrix A, to be described below) functions as normal index information serving as an index of the normal state of the detection subject. The threshold with which the Mahalanobis distance is compared also functions as normal index information serving as an index of the normal state of the detection subject.

As the normal group data set, the information storage unit 503 of the abnormality determining apparatus stores a plurality of normal group data sets corresponding individually to a plurality of types of specific information, having differing content, in advance. This specific information indicates one type of the plurality of types of information obtained from the detection subject copier, for example information regarding an operating mode setting value indicating either high speed print mode or low speed print mode. During abnormality determination, the normal group data set corresponding to the content of the specific information obtained from the copier is selected and used to calculate the Mahalanobis distance. For example, when the content of the specific information obtained from the copier is a value indicating the high speed print mode, the normal group data set for high speed print mode is selected from the plurality of normal group data sets.

Figure 9:
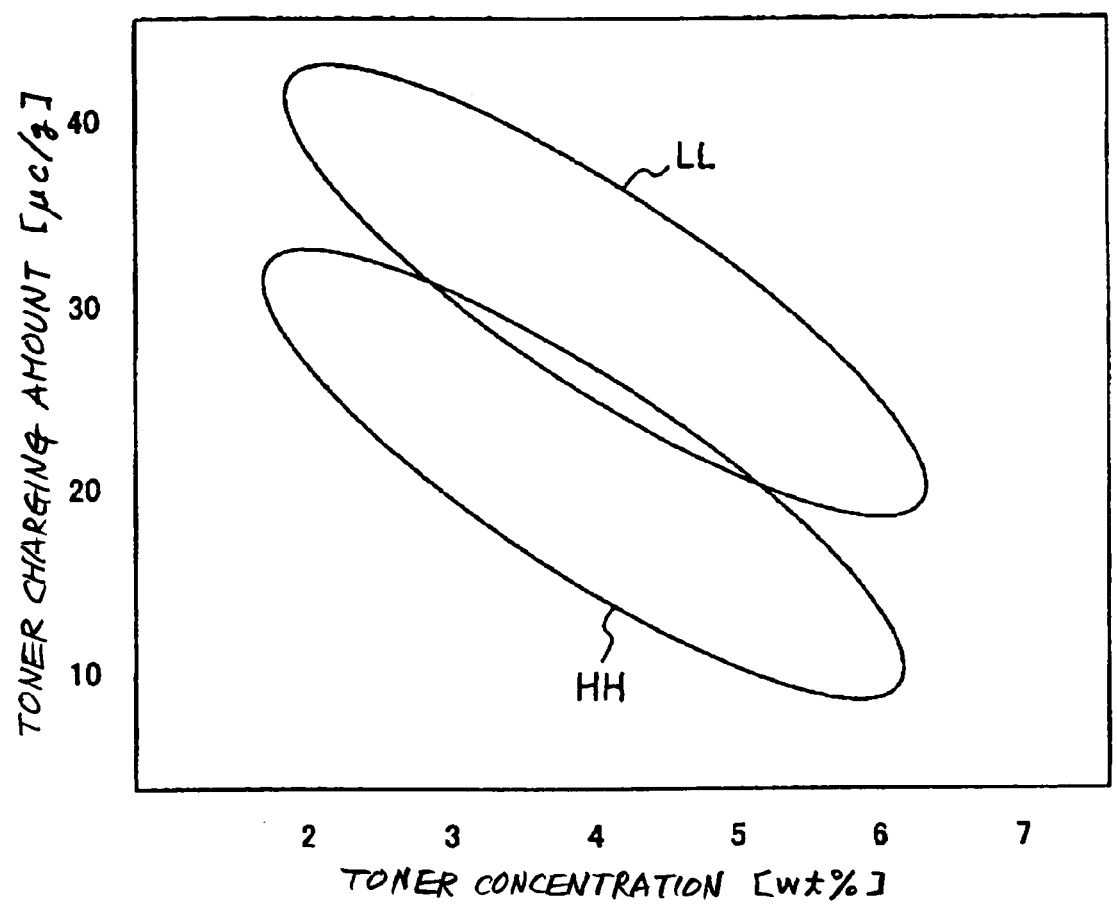
FIG. 9 is a graph showing a relationship between the toner charging amount and toner concentration in the same copier.

FIG. 9 is a graph showing a relationship between the toner charging amount and the toner concentration in the copier (in the illustrated example, the charging polarity of the toner is positive). In an image forming apparatus such as a copier, the toner charging amount and the toner concentration of the developer show a strong correlation (inverse correlation). As the toner concentration rises, the toner charging amount decreases. The toner charging amount and toner concentration also establish a correlative relationship with the environment. For example, the region surrounded by the LL line in the drawing is a two-dimensional space determined on the basis of a normal group data set which is a collection of normal group data constituted by a combination of the toner charging amount and toner concentration obtained from a normal copier in a low-temperature, low-humidity environment. If the normal group data obtained from the detection subject copier lie within this region, the copier may safely be determined as being in a normal state. However, if the normal group data lie outside of this region, there is a high possibility of an abnormality in the copier. Hence, by determining the Mahalanobis distance from the normal group data set on the basis of the normal group data set obtained from a copier in a normal state and the toner charging amount and toner concentration obtained from the detection subject copier, and comparing this Mahalanobis distance with a threshold, the presence of an abnormality can be determined.

However, the region surrounded by the LL line in the drawing is a normal two-dimensional space of the toner charging amount and toner concentration of a copier in a low-temperature, low-humidity environment. In a high-temperature, high-humidity environment, the normal two-dimensional space shifts to an HH region in the drawing. In this case, if the normal group data set obtained from the detection subject copier moves outside of the region surrounded by the HH line, and even when the normal group data set is positioned within the region surrounded by the LL line, the detection subject should be determined as abnormal. If the normal group data set obtained in a low-temperature, low-humidity environment and the normal group data set obtained in a high-temperature, high-humidity environment are considered together as a single normal group data set, however, then the detection subject may be determined mistakenly as normal when the normal group data set is within the region surrounded by the LL line, even when the normal group data set moves outside of the region surrounded by the HH line.

Hence in the abnormality determining apparatus of the present invention, a plurality of normal group data sets corresponding individually to specific information such as environmental information, for example, is stored in advance in the information storage unit 503 as the normal group data set. The normal group data set to be used is then selected according to the content of the specific information. In so doing, it is possible to use only the collection of normal group data within the LL region in the drawing as the normal group data set in a low-temperature, low-humidity environment, for example. Also, it is possible to use only the collection of normal group data within the HH region in the drawing as the normal group data set in a high-temperature, high-humidity environment. As a result, mistaken determinations caused when the normal value of the information obtained by the information obtaining unit 501 differs according to the content of the specific information can be avoided.

Next, various modified devices of the abnormality determining apparatus according to the first embodiment will be described.

[First Modified Device]

Figure 10:
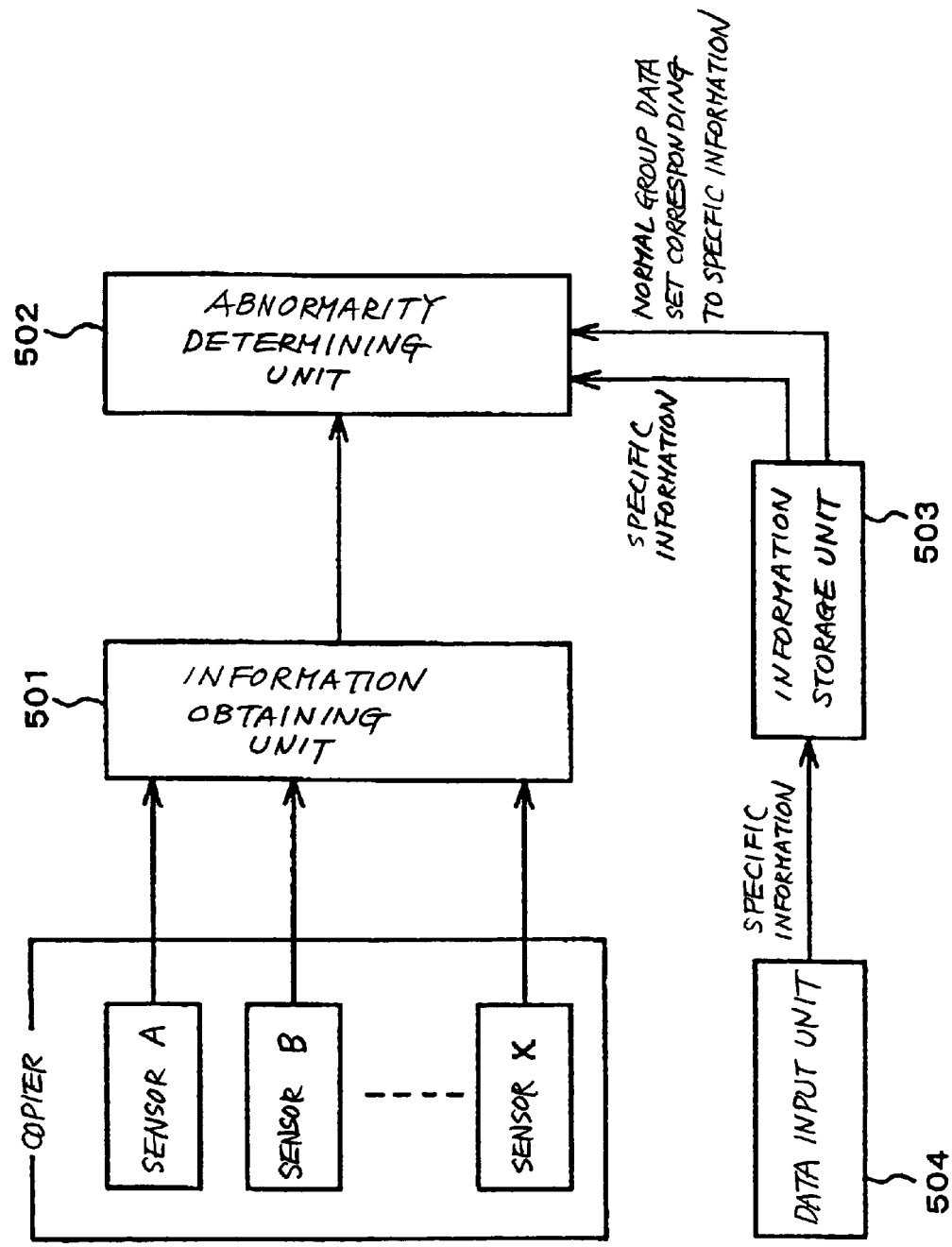
FIG. 10 is a block diagram showing the constitution of a part of an electric circuit in a first modified device of the same abnormality determining apparatus.

FIG. 10 is a block diagram showing a part of an electric circuit in the first modified device. In the first modified device, the data input unit 504 receives specific information (for example, the operating mode setting value, environmental information, and so on) input by the user. The received specific information is then stored in the information storage unit 503. The abnormality determining unit 502 specifies a single normal group data set corresponding to the content of the specific information stored in the information storage unit 503 from the plurality of normal group data sets stored in the information storage unit 503, and reads this normal group data set from the information storage unit 503. The Mahalanobis distance is then calculated on the basis of the various information (information obtained by sensors A, B, . . . , X, and so on) obtained by the information obtaining unit 501 and the normal group data set read from the information storage unit 503. This is effective when adjusting or modifying past determination results, when a serviceperson performs a test during maintenance, and so on.

Note that the specific information may also be obtained by the information obtaining unit 501 and transmitted from the information obtaining unit 501 to the abnormality determining unit 502 rather than being stored in the information storage unit 503.

[Second Modified Device]

Figure 11:
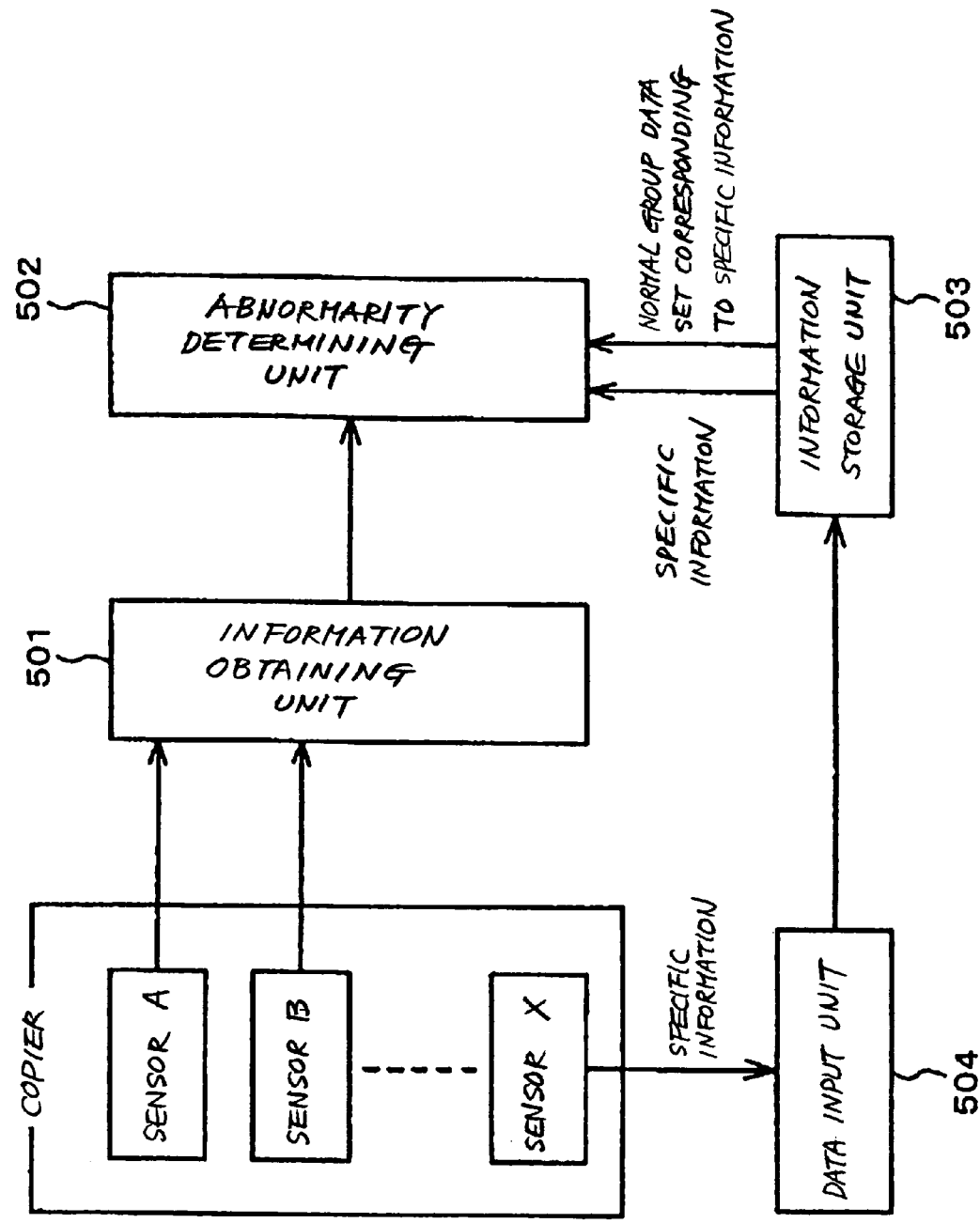
FIG. 11 is a block diagram showing the constitution of a part of an electric circuit in a second modified device of the same abnormality determining apparatus.

FIG. 11 is a block diagram showing a part of an electric circuit in the second modified device. In the second modified device, the information obtaining unit 501 obtains the various information obtained by the sensor A, sensor B, and so on disposed in the interior of the copier from data transmission means and the like, not shown in the drawing, of the copier. The information obtained by the sensor X disposed in the interior of the copier is received by the data input unit 504 as specific information. The received specific information is then stored in the information storage unit 503. The abnormality determining unit 502* specifies a single normal group data set corresponding to the content of the specific information stored in the information storage unit 503 from the plurality of normal group data sets stored in the information storage unit 503, and reads this normal group data set from the information storage unit 503. The Mahalanobis distance is then calculated on the basis of the various information obtained by the information obtaining unit 501 and the normal group data set read from the information storage unit 503. The abnormality determining unit 502 may be informed automatically of changes in the content of the specific information such as the environment (temperature and humidity) within the copier or the surface potential of the photosensitive bodies. A normal group data set which reflects this change in the content of the specific information can then be selected for use in the calculation of the Mahalanobis distance.

[Third Modified Device]

Figure 12:
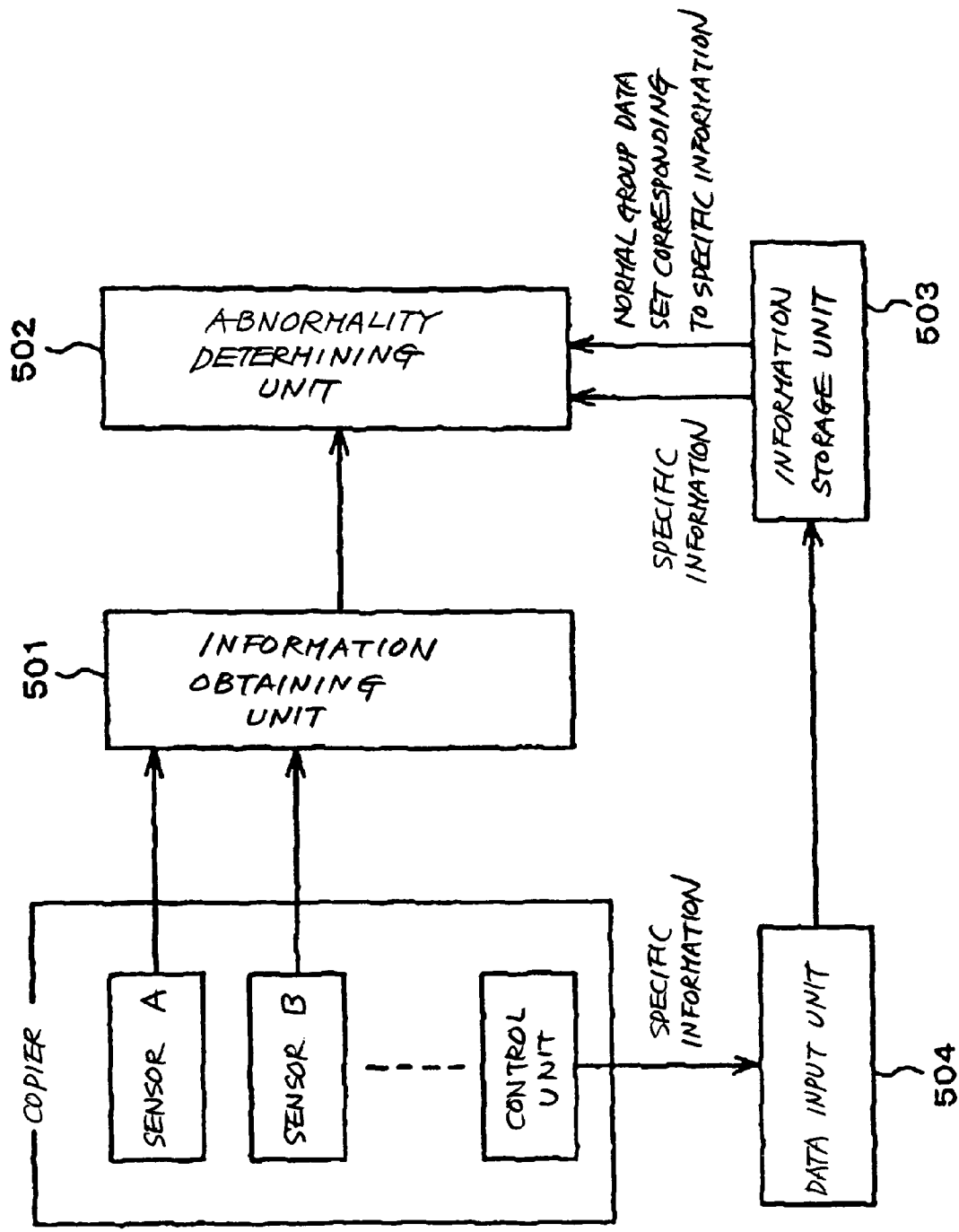
FIG. 12 is a block diagram showing the constitution of a part of an electric circuit in a third modified device of the same abnormality determining apparatus.

FIG. 12 is a block diagram showing a part of an electric circuit in the third modified device. In the third modified device, the information obtaining unit 501 obtains the various information obtained by the sensor A, sensor B, and so on disposed in the interior of the copier from the data transmission means and the like, not shown in the drawing, of the copier. Information obtained by a control unit disposed in the interior of the copier is received by the data input unit 504 as specific information. The received specific information is then stored in the information storage unit 503. The abnormality determining unit 502* specifies a single normal group data set corresponding to the content of the specific information stored in the information storage unit 503 from the plurality of normal group data sets stored in the information storage unit 503, and reads this normal group data set from the information storage unit 503. The Mahalanobis distance is then calculated on the basis of the various information obtained by the information obtaining unit 501 and the normal group data set read from the information storage unit 503. When the content of the control information that can be obtained by the control unit of the copier, for example specific information such as information relating to the color mode usage condition and the frequency of consecutive numbers of sheets, changes, the abnormality determining unit 502 can be notified thereof automatically. A normal group data set which reflects this change in the content of the specific information can then be selected for use in the calculation of the Mahalanobis distance.

[Fourth Modified Device]

Figure 13:
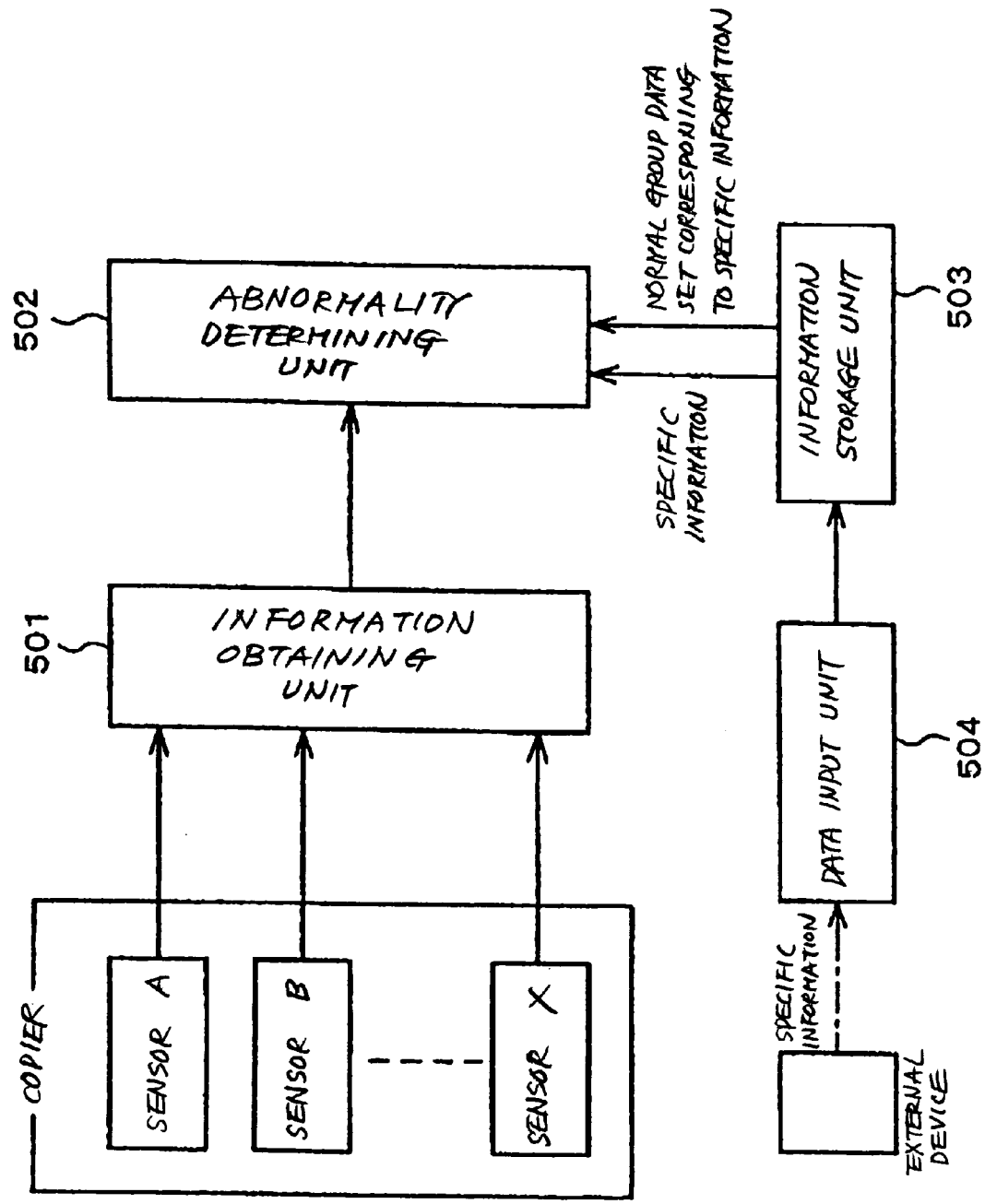
FIG. 13 is a block diagram showing the constitution of a part of an electric circuit in a fourth modified device of the same abnormality determining apparatus.

FIG. 13 is a block diagram showing a part of an electric circuit in the fourth modified device. In the fourth modified device, the information obtaining unit 501 obtains the various information obtained by the sensor A, sensor B, and so on disposed in the interior of the copier from the data transmission means and the like, not shown in the drawing, of the copier. Information transmitted from an external device other than the detection subject copier or the fourth modified device is received by the data input unit 504 as specific information. The received specific information is then stored in the information storage unit 503. The abnormality determining unit 502 specifies a single normal group data set corresponding to the content of the specific information stored in the information storage unit 503 from the plurality of normal group data sets stored in the information storage unit 503, and reads this normal group data set from the information storage unit 503. The Mahalanobis distance is then calculated on the basis of the various information obtained by the information obtaining unit 501 and the normal group data set read from the information storage unit 503. When the content of the specific information transmitted from the external device such as a remote diagnosing system changes, the abnormality determining unit 502 can be informed thereof automatically. A normal group data set which reflects this change in the content of the specific information can then be selected for use in the calculation of the Mahalanobis distance.

[Fifth Modified Device]

The fifth modified device differs from the first modified device through fourth modified device in the following points. First, only one normal group data set is stored in the information storage unit 503. The information storage unit 503 only stores a normal group data set corresponding to specific information of a specific value from the specific information that changes to various values (this normal group data set will be referred to as a standard normal group data set hereafter). When the content of the specific information obtained from the data input unit 504 and information obtaining unit 501 differs from the content of the specific information corresponding to the standard normal group data set stored in the information storage unit 503, the abnormality determining unit 502 corrects the standard normal group data set. More specifically, each piece of data within the standard normal group data set is corrected to a value which corresponds to the content of the specific information obtained from the data input unit 504 and information obtaining unit 501.

Examples of methods of correcting the data in the standard normal group data set include a method of correcting the data in the obtained data table to be described in the second embodiment and third embodiment. Alternatively, the data in the normalized data table may be corrected. Alternatively, the data in the correlation coefficient matrix R or the data in the inverse matrix A may be corrected. Alternatively, an average value y (y1 ... yk) in an Equation (2) of the second embodiment and third embodiment may be corrected. Alternatively, the following Equation (1) may be used instead of the Equation (2).

$$Yij = K(yij - \overline{yj})/\sigma j \qquad \text{Eq. (1)}$$

where K is a correction coefficient.

In the method of correcting the average value y, a plurality of correction coefficients, the values of which differ according to the content of the specific information, are prepared, and the correction coefficient which corresponds to the value of the specific information at the time of abnormality determination is multiplied by the average value y. Note that the correction coefficients are determined in advance through experiment.

Further, in the method using Equation (1), a plurality of correction coefficients k, the values of which differ according to the content of the specific information, are prepared. These correction coefficients are also determined in advance through experiment. Then, when the number of information types is 20 (j=1, 2, ..., 20), for example, correction is performed by multiplying all of the types (j) by the same correction coefficient k. When the normal value cannot be expressed appropriately simply by multiplying all of the types (j) by the same correction coefficient k, the correction coefficient k may be prepared for each type (k1, k2, . . . , k20)

By correcting the standard normal group data set in this manner, only one standard normal group data set need be stored in the information storage unit 503 rather than a plurality of normal group data sets having differing values according to the content of the specific information. As a result, the storage capacity of the information storage unit 503 can be reduced.

Figure 14:
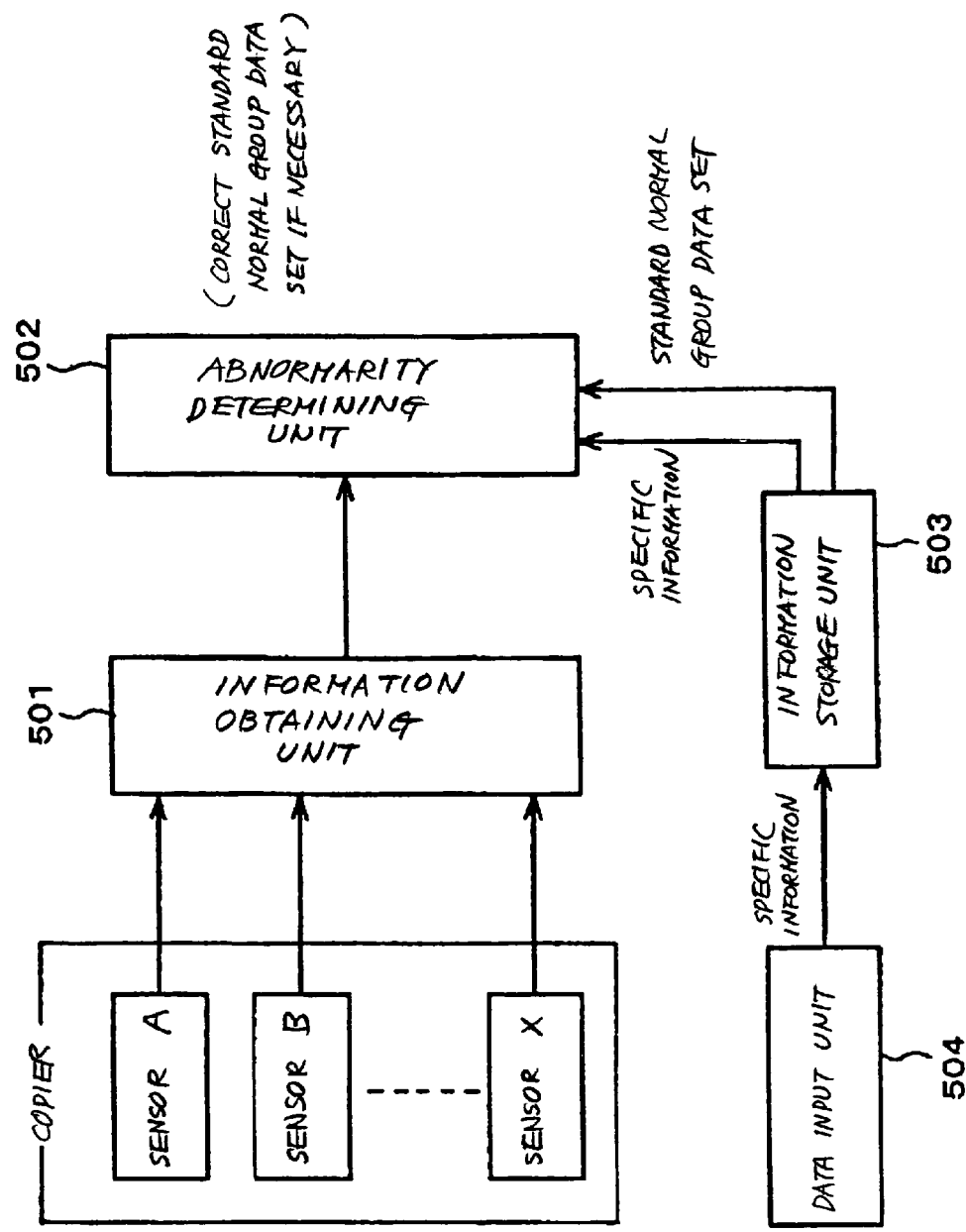
FIG. 14 is a block diagram showing the constitution of a part of an electric circuit in a fifth modified device of the same abnormality determining apparatus.

FIG. 14 is a block diagram showing a part of an electric circuit in the fifth modified device. In the fifth modified device, the data input unit 504 receives specific information (for example, the operating mode setting value, environmental information, and so on) input by the user. The received specific information is then stored in the information storage unit 503. The abnormality determining unit 502 reads the specific information stored in the information storage unit 503 and the standard normal group data set stored in the information storage unit 503. When the standard normal group data set does not correspond to the content of the specific information, the data in the standard normal group data set are corrected respectively to values corresponding to the content of the specific information. The Mahalanobis distance is then calculated on the basis of the various information (information obtained by the sensors A, B, . . . , X, and so on) obtained by the information obtaining unit 501 and the standard normal group data set, or if necessary, the corrected normal group data set.

Note that the specific information may also be obtained by the information obtaining unit 501 and transmitted from the information obtaining unit 501 to the abnormality determining unit 502 rather than being stored in the information storage unit 503.

[Sixth Modified Device]

Similarly to the fifth modified device, the sixth modified device only stores the standard normal group data set in the information storage unit 503 as the normal group data set. If necessary, the standard normal group data set is corrected and used to calculate the Mahalanobis distance.

Figure 15:
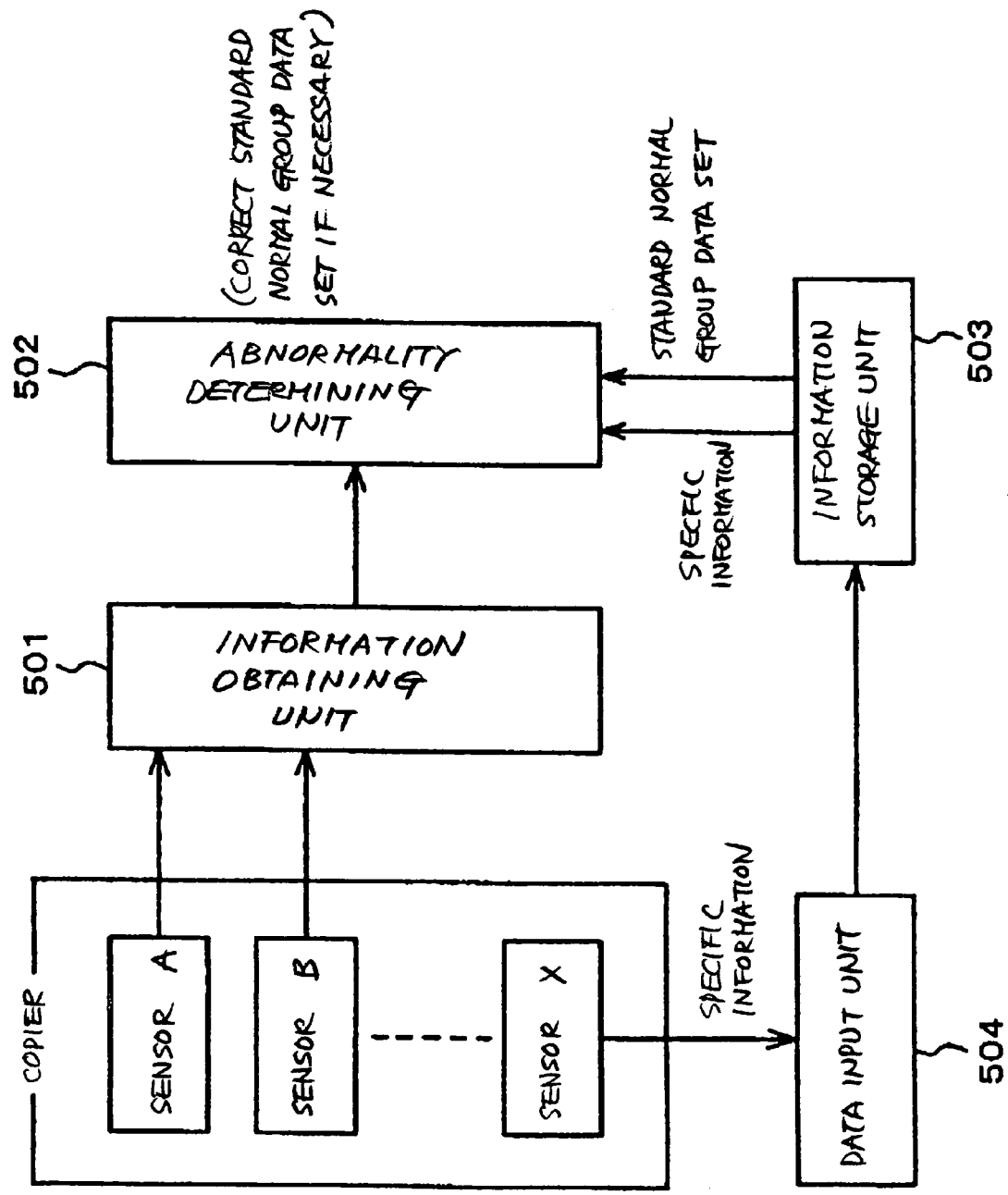
FIG. 15 is a block diagram showing the constitution of a part of an electric circuit in a sixth modified device of the same abnormality determining apparatus.

FIG. 15 is a block diagram showing a part of an electric circuit in the sixth modified device. In the sixth modified device, the information obtaining unit 501 obtains the various information obtained by the sensor A, sensor B, and so on disposed in the interior of the copier from the data transmission means and the like, not shown in the drawing, of the copier. Information obtained by the sensor X disposed in the interior of the copier is received by the data input unit 504 as specific information. The received specific information is then stored in the information storage unit 503. The abnormality determining unit 502* reads the specific information stored in the information storage unit 503 and the standard normal group data set stored in the information storage unit 503. When the standard normal group data set does not correspond to the content of the specific information, the data in the standard normal group dataset are corrected respectively to values corresponding to the content of the specific information. The Mahalanobis distance is then calculated on the basis of the various information obtained by the information obtaining unit 501 and the standard normal group data set or corrected normal group data set read from the information storage unit 503. Likewise with this constitution, the storage capacity of the information storage unit 503 can be reduced.

[Seventh Modified Device]

Similarly to the fifth modified device, the seventh modified device only stores the standard normal group data set in the information storage unit 503. If necessary, the standard normal group data set is corrected and used to calculate the Mahalanobis distance.

Figure 16:
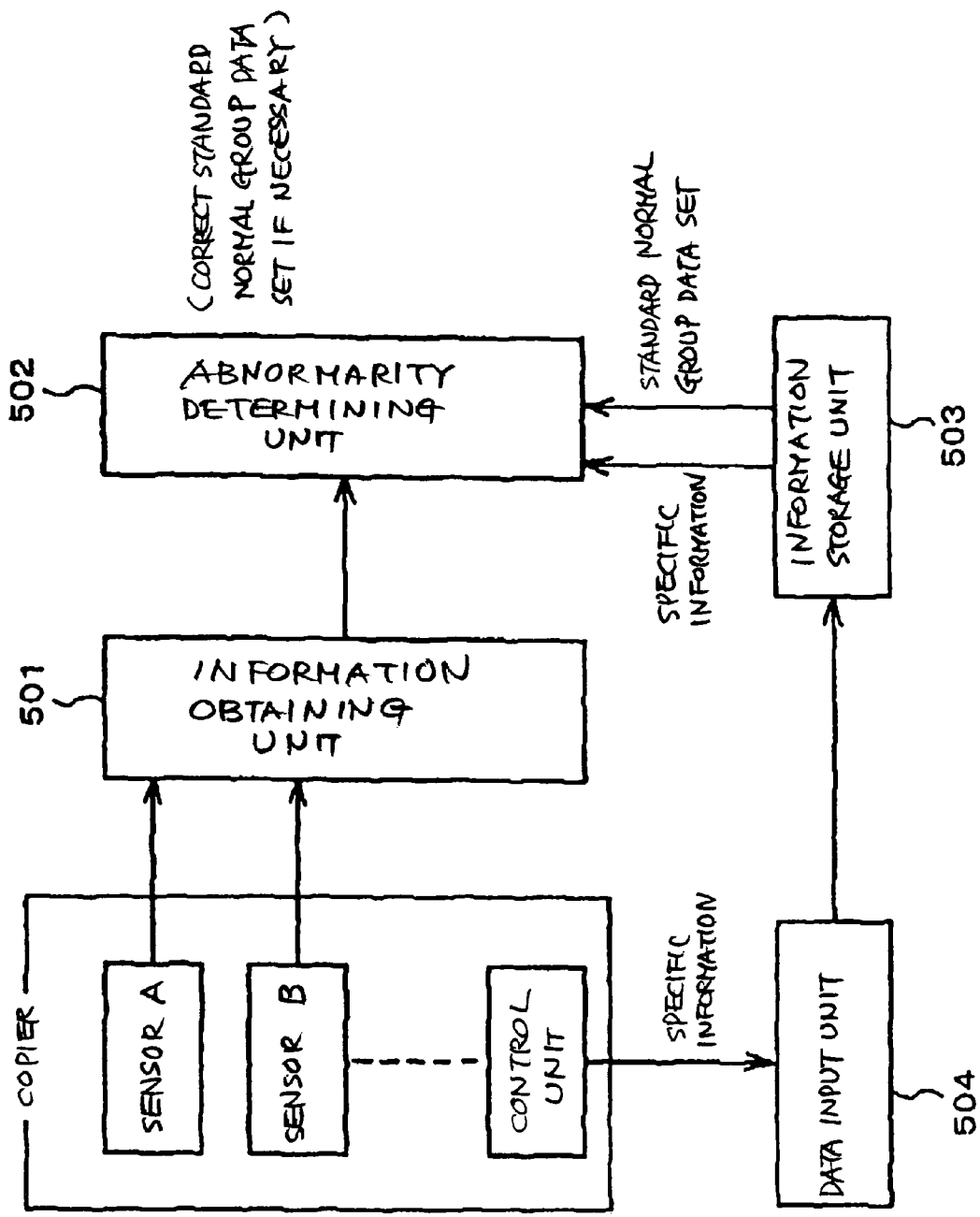
FIG. 16 is a block diagram showing the constitution of a part of an electric circuit in a seventh modified device of the same abnormality determining apparatus.

FIG. 16 is a block diagram showing a part of an electric circuit in the seventh modified device. In the seventh modified device, the information obtaining unit 501 obtains the various information obtained by the sensor A, sensor B, and so on disposed in the interior of the copier from the data transmission means and the like, not shown in the drawing, of the copier. Information obtained by the control unit disposed in the interior of the copier is received by the data input unit 504 as specific information. The received specific information is then stored in the information storage unit 503. The abnormality determining unit 502* reads the specific information stored in the information storage unit 503 and the standard normal group data set stored in the information storage unit 503. When the standard normal group data set does not correspond to the content of the specific information, the data in the standard normal group data set are corrected respectively to values corresponding to the content of the specific information. The Mahalanobis distance is then calculated on the basis of the various information obtained by the information obtaining unit 501 and the standard normal group data set or corrected normal group data set. Likewise with this constitution, the storage capacity of the information storage unit 503 can be reduced.

[Eighth Modified Device]

Similarly to the fifth modified device, the eighth modified device only stores the standard normal group data set in the information storage unit 503. If necessary, the standard normal group data set is corrected and used to calculate the Mahalanobis distance.

Figure 17:
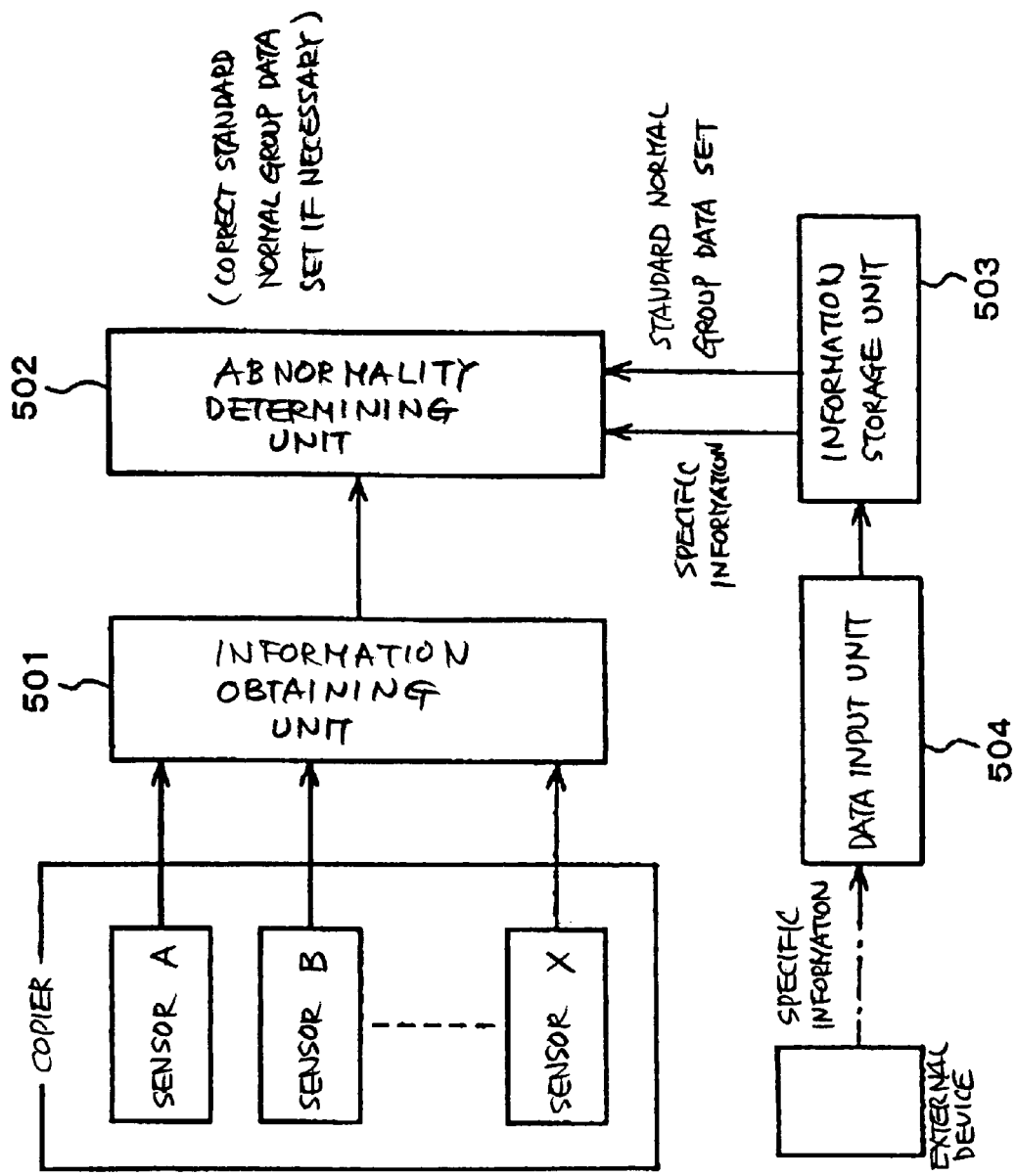
FIG. 17 is a block diagram showing the constitution of a part of an electric circuit in an eighth modified device of the same abnormality determining apparatus.

FIG. 17 is a block diagram showing a part of an electric circuit in the eighth modified device. In the eighth modified device, the information obtaining unit 501 obtains the various information obtained by the sensor A, sensor B, and so on disposed in the interior of the copier from the data transmission means and the like, not shown in the drawing, of the copier. Information transmitted from an external device other than the detection subject copier and eighth modified device is received by the data input unit 504 as specific information. The received specific information is then stored in the information storage unit 503. The abnormality determining unit 502* reads the specific information stored in the information storage unit 503 and the standard normal group data set stored in the information storage unit 503. When the standard normal group data set does not correspond to the content of the specific information, the data in the standard normal group data set are corrected respectively to values corresponding to the content of the specific information. The Mahalanobis distance is then calculated on the basis of the various information obtained by the information obtaining unit 501 and the standard normal group data set or corrected normal group data set. Likewise with this constitution, the storage capacity of the information storage unit 503 can be reduced.

[Ninth Modified Device]

Likewise in the ninth modified device, only one normal group data set is stored in the information storage unit 503. Here, however, the normal group data set serving as normal index information is not switched as described in the first embodiment and first through eighth modified devices. Instead, the threshold serving as normal index information is switched at a predetermined timing. The threshold is used in the comparison with the Mahalanobis distance, and by switching its value, the degree of the abnormality changes when an abnormality is determined to be "present".

Threshold switching is performed when the content of user information input through the data input unit 504 or obtained by the information obtaining unit 501 changes. When a user uses the copier, s/he inputs user information comprising personal information or group information into the copier or the ninth modified device. When the input user information is the same as the information that was input during the previous copying operation, this indicates that copying is to be performed by the same user or user group as that of the previous copying operation. In this case, the Mahalanobis distance is determined without switching the threshold.

On the other hand, if the input user information is different from that of the previous copying operation, this indicates that copying is to be performed by a different user or user group to that of the previous copying operation. In this case, the degree of fault perception of the current user may differ from that of the previous user. Hence the information storage unit 503 stores unique thresholds individually for each user (or user group). When the input user information differs from that of the previous copying operation, the abnormality determining unit 502 switches the threshold to one which corresponds to the new user. With this constitution, the threshold is switched in accordance with the user information, and hence a reduction in the determination precision due to a change in the user of the detection subject copier can be avoided.

Next, various specific examples of an abnormality determining apparatus, in which a more characteristic constitution has been added to the abnormality determining apparatus according to the first embodiment, will be described.

FIRST SPECIFIC EXAMPLE

In an abnormality determining apparatus according to the first specific example, a plurality of normal group data sets having different values is stored in the information storage unit 503 as the normal group data set serving as normal index information for each value of the disposal environment of the detection subject copier. The disposal environment is information regarding the environment of the location in which the copier is disposed, indicating a low-temperature, low-humidity environment, a medium-temperature, medium-humidity environment, a high-temperature, high-humidity environment, and so on. The user inputs the disposal environment information into the data input unit 504. The abnormality determining unit 502 selects a normal group data set corresponding to the disposal environment information input by the user, from among the plurality of normal group data sets stored in the information storage unit 503, to be used to calculate the Mahalanobis distance. With this constitution, mistaken determinations caused when the normal value of the information obtained by the information obtaining unit 501 differs according to the disposal environment of the copier can be avoided.

Note that when the threshold, serving as the normal index information, is switched in accordance with the disposal environment information instead of the normal group data set, a reduction in the determination precision due to a change in the degree of abnormality perception of the user when the disposal environment of the copier changes can be avoided.

SECOND SPECIFIC EXAMPLE

An abnormality determining apparatus according to the second specific example comprises an environment detection sensor serving as environment detection means for detecting at least one of the temperature, humidity, and air pressure. A plurality of normal group data sets having different values is stored in the information storage unit 503 as the normal group data set serving as normal index information for each environmental information value detected by the environment detection sensor. The abnormality determining unit 502 selects a normal group data set corresponding to the value of the environmental information detected by the environment detection sensor from the plurality of normal group data sets stored in the information storage unit 503, and uses this normal group data set to calculate the Mahalanobis distance. Likewise with this constitution, mistaken determination caused when the normal value of the information obtained by the information obtaining unit 501 differs according to the environment of the copier can be avoided.

Note that when the threshold, serving as the normal index information, is switched in accordance with the environmental information detected by the environment detection sensor instead of the normal group data set, a reduction in the determination precision due to a change in the degree of abnormality perception of the user accompanying a change in environment can be avoided.

THIRD SPECIFIC EXAMPLE

In an abnormality determining apparatus according to the third specific example, a plurality of normal group data sets having different values from each other is stored in the information storage unit 503 as the normal group data set serving as normal index information for each value of operating mode information of the copier. The following may be cited as examples of this operating mode information:

output color information indicating either monochromatic output or polychromatic output;

information indicating either a printing operation or a copying operation;

information indicating either high speed print mode or low speed print mode;

information indicating the set value of the uniform charging potential of the photosensitive body surface;

information indicating a target toner concentration; and information indicating a target fixing temperature.

The normal value of each piece of data in the normal group data set may differ greatly according to whether the operating mode of the copier is set to monochromatic output or polychromatic output. For example, during monochromatic output, or in other words monochrome output, it is almost always the case that only the K photosensitive body, from among the Y, M, C, and K photosensitive bodies to be described below, is charged. Hence, if information regarding the uniform charging potential of each photosensitive body is obtained, the uniform charging potential of the Y, M, and C photosensitive bodies is detected as substantially zero. It is natural therefore that when the uniform charging potential of these photosensitive bodies is detected as being in the vicinity of zero, a normal determination will be made. However, when the uniform charging potential is detected as a numerical value far removed from zero, the presence of an abnormality should be determined. In contrast, during four-color, full-color output, each photosensitive body is charged, and hence the respective uniform charging potentials thereof are detected as being in the vicinity of a certain constant value. However, when the uniform charging potential is detected as being in the vicinity of zero, the presence of an abnormality should be determined. When a normal group data set reflecting the uniform charging potential of each photosensitive body during monochromatic output and polychromatic output is constructed in such a case, mistaken determinations may arise in a similar manner to the relationship between the toner concentration and toner charging amount described above. By dividing the two, storing a normal group data set for each, and selecting one of the two normal group data sets according to whether monochromatic output or polychromatic output is to be performed, such mistaken determinations can be avoided.

The normal value of each piece of data in the normal group data set may differ greatly according to whether the operating mode of the copier is set to perform a printing operation or a copying operation. During a printing operation, for example, original reading by a scanner is not performed, and hence when information relating to the traveling speed of the reading device and the light source in the scanner is obtained, the value of these traveling speeds is zero. When these traveling speeds are detected as being in the vicinity of zero, a normal determination may safely be made. However, when the traveling speed is detected as a numerical value far removed from zero, the presence of an abnormality should be determined. In contrast, during a copying operation, original reading by scanner is performed, and hence the traveling speed of the reading device and light source in the scanner are detected at a certain constant speed. Hence, when the traveling speeds are detected as being in the vicinity of this constant speed, a normal determination may safely be made. However, when the traveling speeds are detected as zero, the presence of an abnormality should be determined. If the traveling speed of the reading device and light source of the scanner during a printing operation and the traveling speed of the reading device and light source of the scanner during a copying operation are used together to construct a normal group data set in such a case, mistaken determinations may arise in a similar manner to the relationship between the toner concentration and toner charging amount described above. By dividing the two, storing a normal group data set for each, and selecting one of the two normal group data sets according to whether a printing operation or a copying operation is to be performed, such mistaken determinations can be avoided.

The normal value of each piece of data in the normal group data set may differ greatly according to whether the operating mode of the copier is set to the high speed print mode or low speed print mode. In the high speed print mode, for example, the surface traveling speed of the photosensitive bodies and the paper conveyance speed are detected as being comparatively high. Hence, when these speeds are detected at such comparatively high levels or the vicinity thereof, a normal determination may safely be made. However, when comparatively low speeds are detected, the presence of an abnormality should be determined. In contrast, in the low speed print mode, the surface traveling speed of the photosensitive bodies and the paper conveyance speed are detected as being comparatively low. Hence, when these speeds are detected at such comparatively low levels or the vicinity thereof, a normal determination may safely be made. However, when comparatively high speeds are detected, the presence of an abnormality should be determined. If the surface traveling speed of the photosensitive bodies and the paper conveyance speed in the high speed print mode and low speed print mode are used together to construct a normal group data set in such a case, mistaken determinations may arise in a similar manner to the relationship between the toner concentration and toner charging amount described above. By dividing the two, storing a normal group data set for each, and selecting one of the two normal group data sets according to whether the high speed print mode or low speed print mode has been set, such mistaken determinations can be avoided.

The normal value of each piece of data in the normal group data set may differ greatly according to the set value of the uniform charging potential of the photosensitive bodies. More specifically, the development performance of the toner differs according to the environment, and hence the set value of the uniform charging potential of the photosensitive bodies may be modified in order to stabilize the development performance. If a normal group data set corresponding to this set value is not used in such a case, mistaken determinations may arise in a similar manner to the relationship between the toner concentration and toner charging amount described above. By storing a plurality of normal group data sets corresponding to each set value of the uniform charging potential, and switching the normal group data set to be used in accordance with the actual set value, such mistaken determinations can be avoided.

The normal value of each piece of data in the normal group data set may differ greatly according to the target toner concentration. More specifically, the development performance of the toner differs according to the environment, and hence the toner concentration of the developer of each color may be modified in order to stabilize the development performance. If a normal group data set corresponding to the target toner concentration is not used in such a case, mistaken determinations may arise in a similar manner to the relationship between the toner concentration and toner charging amount described above. By storing a plurality of normal group data sets corresponding to each target toner concentration, and switching the normal group data set to be used in accordance with the actual target toner concentration, such mistaken determinations can be avoided.

The normal value of each piece of data in the normal group data set may differ greatly according to the target fixing temperature. More specifically, the fixability of a toner image to a sheet of transfer paper differs according to the environment and toner adhesion amount, and hence the fixing temperature may be modified in order to stabilize the fixability. If a normal group data set corresponding to the target fixing temperature is not used in such a case, mistaken determinations may arise in a similar manner to the relationship between the toner concentration and toner charging amount described above. By storing a plurality of normal group data sets corresponding to each target fixing temperature, and switching the normal group data set to be used in accordance with the actual target fixing temperature, such mistaken determinations can be avoided.

FOURTH SPECIFIC EXAMPLE

In an abnormality determining apparatus according to the fourth specific example, a plurality of normal group data sets having different values is stored in the information storage unit 503 as the normal group data set serving as normal index information for each value of operating history information of the user of the copier. A normal group data set corresponding to the operating mode information appearing with the highest frequency in the operating history of the user is then specified from among the plurality of normal group data sets, whereupon the normal group data set corresponding to the result of the specification is selected for use in the calculation of the Mahalanobis distance. With this constitution, a single normal group data set can be selected from the plurality of normal group data sets in accordance with the operating mode information appearing with the highest frequency in the past of the user. As a result, control required to obtain the operating history information and switch the normal group data set can be prevented from becoming excessively complicated.

FIFTH SPECIFIC EXAMPLE

In an abnormality determining apparatus according to the fifth specific example, a plurality of normal group data sets having different values is stored in the information storage unit 503 as the normal group data set serving as normal index information for each value of environmental history information in the copier. A normal group data set corresponding to the environment appearing with the highest frequency is then specified from among the plurality of normal group data sets, whereupon the normal group data set corresponding to the result of the specification is selected for use in the calculation of the Mahalanobis distance. With this constitution, a single normal group data set can be selected from the plurality of normal group data sets in accordance with the environment appearing with the highest frequency in the copier. As a result, control required to obtain the environmental information and switch the normal group data set for each printing operation and each copying information can be prevented from becoming excessively complicated.

Second Embodiment

Next, a second embodiment in which the present invention is applied to an electrophotographic printer (to be referred to simply as "printer" hereafter) serving as an electrophotographic image forming apparatus will be described.

First, the basic constitution of the printer according to the second embodiment will be described.

Figure 18:
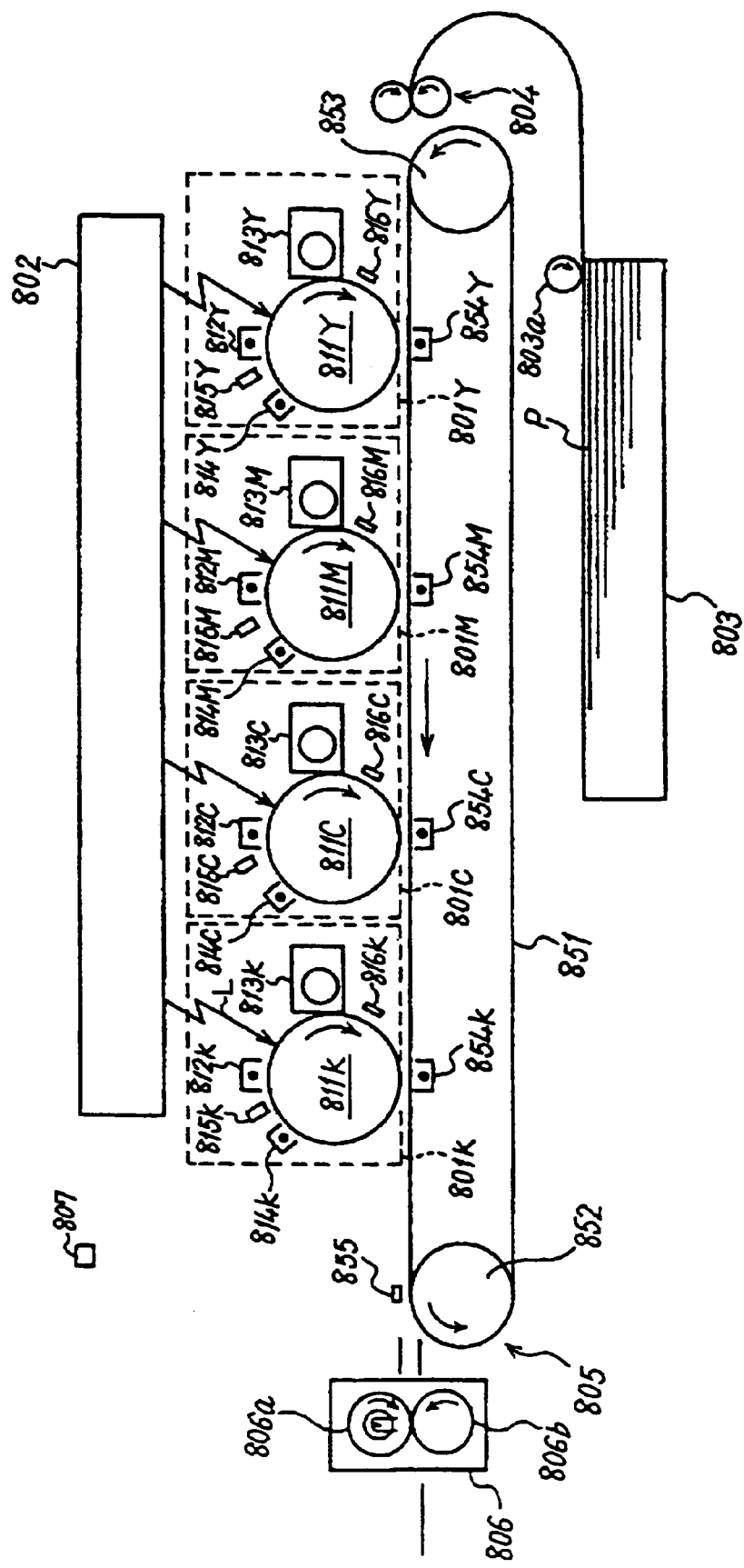
FIG. 18 is a view showing an outline of the constitution of a printer according to a second embodiment of the present invention.

FIG. 18 is a schematic diagram showing the printer. In the diagram, the printer comprises four process units 801Y, M, C, K for forming images in each of four colors, yellow Y, magenta M, cyan C, and black K. Note that the suffixes Y, M, C, K will be used hereafter to denote yellow, magenta, cyan, and black members respectively.

The process units 801Y, M, C, K, arranged in parallel in a horizontal direction, comprise respective drum-form photosensitive bodies 811Y, M, C, K serving as latent image carriers. As well as the process units 801Y, M, C, K, the printer comprises an optical recording unit 802, a paper cassette 803, a pair of registration rollers 804, a paper conveyance unit 805, a fixing unit 806, an internal temperature sensor 807, and so on. Four toner replenishing devices, a power source unit, and so on are also provided, although not shown in the drawing.

The optical recording unit 802 comprises a light source, a polygon mirror, an f-θ lens, a reflection mirror, and so on, not shown in the drawing, and scans the surface of each photosensitive body 811Y, M, C, K with laser light L on the basis of image data.

The process units 801Y, M, C, K are constituted substantially identically apart from the color of the toner used therein. Taking the Y process unit 801Y as an example, as well as the photosensitive body 811Y, this process unit 801Y comprises charging means 812Y, a developing device 813Y, cleaning means 814Y, neutralizing means 815Y, a Y optical sensor 816Y, and so on.

A charger for charging the photosensitive body 811Y by means of corona discharge from a corotron or the like may be used as the charging means 812Y. A system in which a transfer bias is applied to a charging roller or charging brush disposed rotatably opposite the photosensitive body 811Y may also be used.

In the Y photosensitive body 811Y, a scale portion, not shown in the drawing, is provided in the vicinity of one end of the drum shape of the photosensitive body 811Y in the axial direction. On this scale portion, mirror surfaces and non-mirror surfaces are repeated over the entire circumference of the drum. The aforementioned Y optical sensor 816Y is constituted by a reflection photosensor which emits light toward the scale portion from a light-emitting element not shown in the drawing. This light is reflected on the surface of the scale portion and received by a light-receiving element, not shown in the drawing, of the Y optical sensor 816Y. The Y optical sensor 816Y then outputs a voltage signal corresponding to the amount of light received by the light-receiving element to a control unit not shown in the drawing. As the mirror surfaces and non-mirror surfaces of the scale portion on the photosensitive body 811Y pass the opposing Y optical sensor 816Y consecutively, a pulse voltage of a frequency corresponding to the linear speed of the photosensitive body 811Y is output from the Y optical sensor 816Y. A pulse voltage of a frequency corresponding to the linear speed of the photosensitive bodies 811M, C, K is output similarly from the M, C, and K optical sensors 816M, C, K.

As the surface of the photosensitive body 811Y, charged uniformly by the charging means 812Y, is scanned with the laser light L that is modulated and deflected by the optical recording unit 802, an electrostatic latent image is formed on an exposure portion. The electrostatic latent image is developed into a Y toner image by the developing device 813Y to be described below. M, C, and K toner images are formed similarly on the photosensitive bodies 811M, C, K in the other process units 801M, C, K.

The aforementioned paper cassette 803 stores a plurality of sheets of transfer paper P, serving as a recording medium, stacked into a pile. A feed roller 803a presses against the uppermost sheet of the transfer paper P. At a predetermined timing, the feed roller 803a is rotated to convey the transfer paper P onto a paper feed path. The pair of registration rollers 804 is arranged at the end of the paper feed path in order to convey the transfer paper P from the end of the paper feed path at a synchronous timing with the Y toner image formed on the photosensitive body 811Y of the Y process unit 801Y.

The aforementioned paper conveyance unit 805 is disposed beneath the process units 801Y, M, C, K, and comprises a paper conveyor belt 851 which performs an endless motion, a drive roller 852, a tension roller 853, four transfer chargers 854Y, M, C, K, and so on. A belt optical sensor 855 is also provided. The paper conveyor belt 851 is wrapped around the drive roller 852, which is driven to rotate in the anti-clockwise direction of the drawing by a driving system not shown in the drawing, and the tension roller 853, in a horizontal attitude so as to face the photosensitive bodies 811Y, M, C, K. The paper conveyor belt 851 performs an endless motion in the anti-clockwise direction of the drawing as the drive roller 852 rotates, and thus passes Y, M, C, K transfer positions opposite the photosensitive bodies 811Y, M, C, K in succession. At these transfer positions, the transfer chargers 854Y, M, C, K are disposed on the inside of the loop of the paper conveyor belt 851 so as to face the respective photosensitive bodies 811Y, M, C, K through the paper conveyor belt 851. Thus a transfer electric field is formed between the transfer chargers 854Y, M, C, K and photosensitive bodies 811Y, M, C, K. Note that in this printer, the transfer chargers 854Y, M, C, K are provided as transfer means, but instead, a system in which a transfer bias is applied to a transfer bias applying member such as a transfer roller may be employed.

In the paper conveyor belt 851, a scale portion, not shown in the drawing, is provided in the vicinity of one end of the paper conveyor belt 851 in the width direction. On this scale portion, bright portions and dark portions are repeated over the entire circumference of the belt. The aforementioned belt optical sensor 855 is constituted by a reflection photosensor which emits light toward the scale portion from a light-emitting element not shown in the drawing. This light is reflected on the surface of the scale portion and received by a light-receiving element, not shown in the drawing, of the belt optical sensor 855. The belt optical sensor 855 then outputs a voltage signal corresponding to the amount of light received by the light-receiving element to a control unit not shown in the drawing. As the dark portions and light portions of the scale portion on the paper conveyor belt 851 pass the opposing belt optical sensor 855 consecutively, a pulse voltage of a frequency corresponding to the linear speed of the paper conveyor belt 851 is output.

Having been conveyed by the registration roller pair 804 as described above, the transfer paper P passes the Y, M, C, K transfer positions in succession while being held on the front surface (outer loop surface) of the paper conveyor belt 851 of the paper conveyance unit 805. The Y, M, C, K toner images developed on the photosensitive bodies 811Y, M, C, K of each process unit 801Y, M, C, K are superposed onto the transfer paper P, which receives the action of the aforementioned transfer electric field, at the Y, M, C, K transfer positions. As a result of this superposition transfer, a full color image is formed on the transfer paper P.

Once the full color image has been formed, the transfer paper P is conveyed from the right side to the left side of the drawing with the endless motion of the paper conveyor belt 851 and thus passed onto the fixing unit 806 of the paper conveyance unit 805, which is disposed on the left side of the drawing. The fixing unit 806 forms a fixing nip by means of a fixing roller 806a which envelops a heat source such as a halogen lamp and is driven to rotate in the clockwise direction of the drawing, and a pressure roller 806b which contacts the fixing roller 806a and is rotated so as to perform a surface motion in the same direction at the contact portion. The transfer paper P transmitted from the paper conveyance unit 805 is conveyed from right to left in the drawing while being nipped at the fixing nip. As the transfer paper P is conveyed, the full color image is fixed onto the surface of the transfer paper P by nip pressure and heat.

In the Y process unit 801, the surface of the photosensitive body 811Y is subjected to cleaning processing by the cleaning means 814 to remove residual toner after the Y transfer position has passed with the rotation of the paper conveyor belt 851. A device in which a cleaning member such as a blade or brush is caused to contact the surface of the photosensitive body 811Y to scrape away residual toner mechanically may be employed as the cleaning means 814Y. Alternatively, a device in which a cleaning bias is applied to a rotary member such as a cleaning roller which rotates while contacting the photosensitive body 811Y such that the residual toner is removed electrostatically may be employed.

After being subjected to cleaning processing by the cleaning means 814Y, the surface of the photosensitive body 811Y is subjected to neutralization processing by the neutralizing means 815Y such as a neutralizing lamp, and then uniformly charged again by the charging means 812Y.

The developing device 813Y of the Y process unit 801Y comprises a developing roll disposed rotatably such that a part thereof is exposed through a housing opening, developer agitating means, not shown in the drawing, constituted by a screw, paddle, or the like, a magnetic permeability sensor, not shown in the drawing, and so on. A two-component developer, not shown in the drawing, containing a magnetic carrier and a frictionally electrified Y toner is stored in the housing of the developing device 813Y. This two-component developer is carried on the surface of the developing roll while being agitated and conveyed by the developer agitating means described above. As the developing roll rotates, the developer passes through a restricted position that is restricted by a restriction member, not shown in the drawing, where the thickness thereof is restricted. The two-component developer is then conveyed to a developing region opposite the photosensitive body 811Y, where the Y toner is adhered to the electrostatic latent image on the photosensitive body 811Y. By means of this adhesion, a Y toner image is formed on the photosensitive body 811Y. The two-component developer, having been depleted of Y toner by the development process, is then returned to the housing of the developing device 813Y with the rotation of the developing roll.

Y, M, C, K toner replenishing devices, not shown in the drawing, support toner containers, which store Y, M, C, K toner respectively, in a removable fashion. The Y, M, C, K developing devices 813Y, M, C, K are replenished with Y, M, C, K toner from the Y, M, C, K toner containers. A pair of electrodes, which oppose each other at a predetermined interval, is provided in each of the Y, M, C, K toner containers, and a resistance detection bias is applied between the electrodes via leads extending from the printer main body side. Y, M, C, K current detecting sensors are connected to the leads, and thus the respective electric resistance values of the Y, M, C, K toner are determined on the basis of the current detection value and the resistance detection bias value.

The magnetic permeability sensor of the developing device 813Y outputs a voltage of a value which corresponds to the magnetic permeability of the two-component developer stored in the developing device 813Y. The magnetic permeability of the two-component developer exhibits a certain degree of correlation with the toner concentration of the two-component developer, and hence the magnetic permeability sensor outputs a voltage of a value which corresponds to the Y toner concentration. The value of this output voltage is transmitted to the aforementioned control unit, not shown in the drawing. The control unit stores a Y Vtref, which is a target value of the output voltage from the magnetic permeability sensor, in storage means such as RAM. Data for an M Vtref, C Vtref, and K Vtref, which are the target values of the output voltage from the magnetic permeability sensors installed in the developing devices 813M, C, K of the other process units 801M, C, K, are also stored. The Y Vtref is used to control driving of the Y toner replenishing device, not shown in the drawing. More specifically, the control unit drive controls the Y toner replenishing device, not shown in the drawing, such that the value of the output voltage from the magnetic permeability sensor of the Y developing device 813Y approaches the Y Vtref, and thus replenishes the Y developing device 813Y with Y toner. By means of this replenishment, the Y toner concentration of the two-component developer in the Y developing device 813Y is maintained within a predetermined range. Toner replenishment control is implemented similarly in the other developing devices 813M, C, K.

Figure 19:
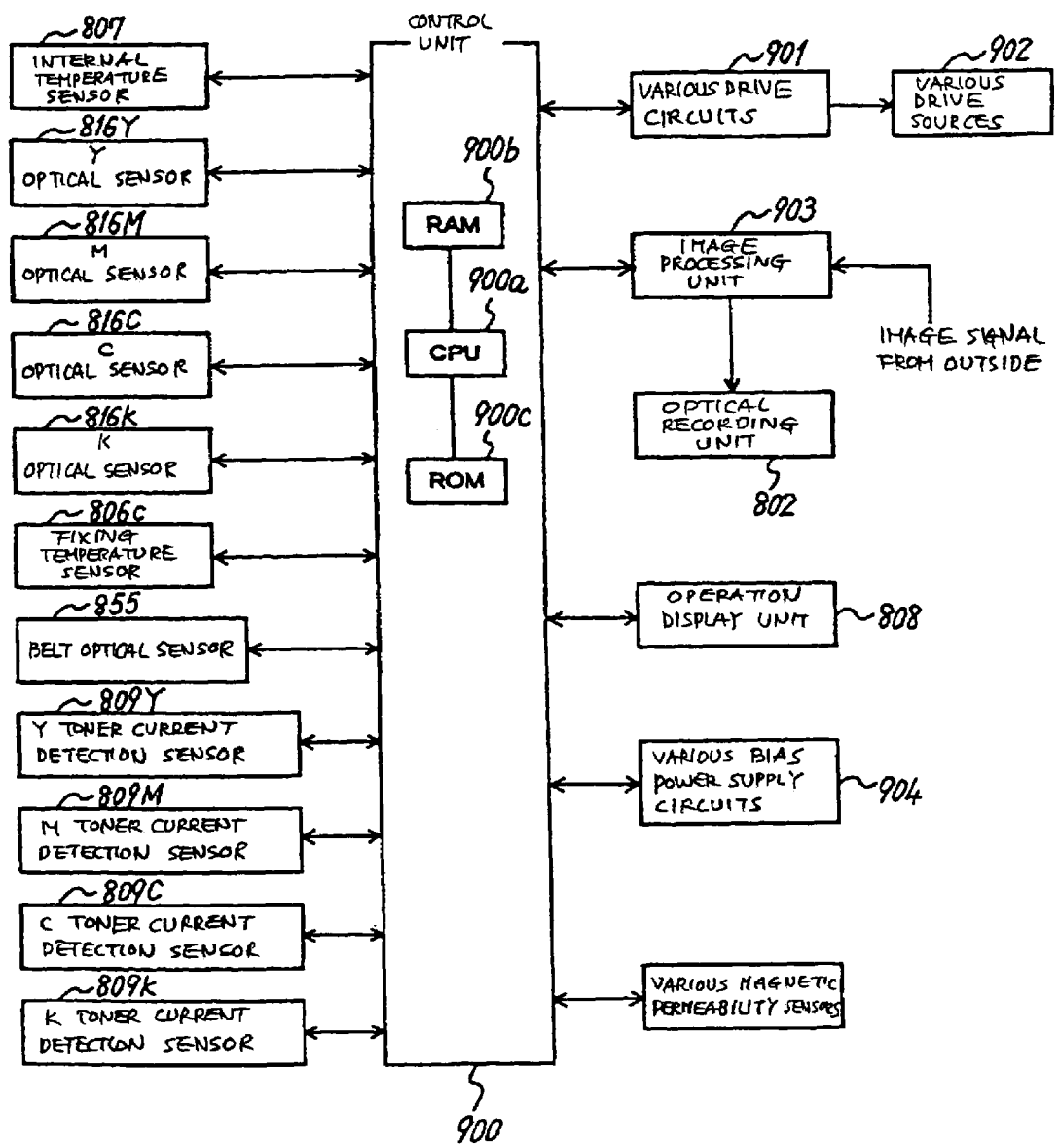
FIG. 19 is a block diagram showing the constitution of a part of an electric circuit in the same printer.

FIG. 19 is a block diagram showing a part of an electric circuit of this printer. In the diagram, a control unit 900 is constituted by control means for controlling the entire printer, and comprises a CPU 900a for performing calculation processing, RAM 900b and ROM 900c serving as storage means, and so on. An internal temperature sensor 807 for detecting the temperature inside the printer is connected to the control unit 900 constituted in this manner by a well-known technique. The magnetic permeability sensors in the developing devices 813Y, M, C, K of each color, the Y, M, C, K optical sensors 816Y, M, C, K provided respectively in the process units 801Y, M, C, K, the Y, M, C, K current detection sensors 809Y, M, C, K which detect the current value flowing through the Y, M, C, K toner stored in the toner containers of each color, not shown in the drawing, various drive circuits 901, an image processing unit 903, an operation display unit 808, various bias power supply circuits 904, and so on are also connected to the control unit 900.

With this constitution, the magnetic permeability sensors of the developing devices 813Y, M, C, K of each color function respectively as information detecting means for obtaining information relating to an object such as the two-component developer. Further, the Y, M, C, K optical sensors 816Y, M, C, K* function respectively as information detecting means for obtaining information relating to the optical reflectance of an object such as the photosensitive bodies 811Y, M, C, K. A fixing temperature sensor 806c functions as information detecting means for obtaining information regarding the surface temperature of an object such as the fixing roller 806a. The belt optical sensor 855 functions as information detecting means for obtaining information regarding the optical reflectance of an object such as the paper conveyor belt 851. The Y, M, C, K current detection sensors 809Y, M, C, K function as information detecting means for obtaining information regarding the current value flowing through the Y, M, C, K toner stored in the toner containers, not shown in the drawing, respectively. The control unit 900 functions as information detecting means for obtaining information stored in the RAM 900b and ROM 900c serving as storage means, information transmitted from the various connected devices, and so on. Thus the printer comprises a plurality of information obtaining means for obtaining various information.

The aforementioned various drive circuits 901 are used to ON/OFF control the driving of various drive sources 902 such as a main motor, not shown in the drawing, on the basis of a control signal from the control unit. Note, however, that driving of the light source in the optical recording unit 802* described above must be ON/OFF controlled at a considerably high speed, and hence the image processing unit 903 which controls the driving thereof is provided separately to the control unit. The image processing unit 903 controls the driving of the light source and a polygon motor (the drive source of the polygon mirror) in the optical recording unit 802 on the basis of an image signal transmitted from an external device such as a personal computer.

The operation display unit 808 comprises a display unit, not shown in the drawing, constituted by a liquid crystal display or the like for displaying images, and an operating unit, not shown in the drawing, constituted by a keypad or the like for receiving operating information from the user. Predetermined images are displayed on the display unit on the basis of a control signal from the control unit 900, and operating information received by the operating unit is transmitted to the control unit 900. The operation display unit 808 also functions as information obtaining means for obtaining an object such as operating information.

The aforementioned various bias power source circuits are used to control various bias values, such as the developing bias applied to the developing roll, on the basis of a control signal from the control unit 900.

In the present invention, examples of the information that is obtained by the information obtaining means include sensing information, parameter storage information, and image information.

The sensing information is obtained by various sensors such as an optical sensor, pressure sensor, and current sensor. In an image forming apparatus, information such as dimension, drive speed, time (timing), weight, current value, voltage value, oscillation, sound, magnetism, light quantity, temperature, humidity, air pressure, airflow, and various gas concentrations may be obtained by sensors.

Examples of the aforementioned drive speed include the rotation speed of rotary members such as the drive motor, fixing roller, drive roller, registration roller, and conveyance roller, and soon. These speeds may be detected by a well-known encoder or the like.

Examples of the current value include the current value of the drive motor and the transfer current value, which may be detected by a well-known ammeter. The electric resistance value of the detection subject may also be detected by causing a pair of electrodes (the conveyance roller pair or the like) to contact each other via the detection subject (the transfer paper or the like), and measuring the current value between the electrodes or the surface potential of the detection subject.

Examples of the aforementioned sound include sound generated by the drive motor, drive transmission system, and so on, which may be detected using a well-known microphone or the like. The sudden stress on the drive motor and drive transmission system can be detected on the basis of the magnitude of the generated sound. The surface roughness of the transfer paper can be detected by causing a guide member or the like to contact the surface of the transfer paper prior to transfer of the toner image, and detecting the oscillation sound or sliding sound that is generated by this contact.

Examples of the aforementioned temperature include the air temperature, the surface temperature of the fixing roller, and the drive motor temperature, which can be detected using a well-known temperature sensor.

The aforementioned light quantity may be detected by a reflection photosensor, a transmission photosensor, and so on, and used to detect paper conveyed along the conveyance path, the toner adhesion amount on the photosensitive bodies, and so on. The light quantity can also be used to detect the traveling speed of the paper, belt, and so on along the conveyance path according to deviations among a plurality of photosensors in the detection timing of a predetermined quantity of light or more. Slippage between the paper conveyance roller pair and the paper can also be detected by combining the light quantity with the rotation speed of the paper conveyance roller pair and so on, detected by an encoder or the like. The glossiness of the transfer paper surface can also be detected by detecting the amount of light in a predetermined reflection direction that is generated by light emitted onto the transfer paper surface at a predetermined angle of incidence. It is also possible to determine whether the transfer paper is high quality paper, recycled paper, or OHP paper by detecting the amount of infrared radiation that is transmitted in the thickness direction of the transfer paper. It is also possible to determine whether the surface of the transfer paper is the front surface or rear surface by reflecting light emitted from a light source group such as an LED array on the transfer paper surface, and detecting the reflected light in the plurality of light-receiving elements of a CCD or the like. The moisture content of the transfer paper can also be detected by detecting an amount of absorbed infrared radiation of μ wave light from the amount of reflected light and transmitted light.

Examples of the aforementioned dimensions include the thickness of the paper, which is determined by detecting the relative positional displacement of the conveyance roller pair when the paper is trapped therebetween using an optical sensor or the like, or detecting the travel of a member that is pushed upward when the paper is introduced. The rigidity of the transfer paper can also be detected by detecting the amount of deformation (curvature) of the transfer paper when pressed by a predetermined force. The curl amount of the transfer paper can be detected using a photosensor, a contact sensor, or similar.

The characteristics of the developer (one-component or two-component) fundamentally affect the electrophotographic process function, and are therefore an important factor in the operation and output of the system. Hence it is vital to learn the characteristics of the developer in order to determine abnormalities. Examples of toner characteristics include the adhesion amount on the latent image carrier, the charging amount and its distribution, fluidity, cohesion, bulk density in a two-component developer, electric resistance, permittivity, external additive amount, consumption amount, the amount remaining in the container, and concentration in a two-component developer.

The amount of developer that is adhered to the latent image carrier may be detected by forming a test electrostatic latent image on the latent image carrier, developing the test electrostatic latent image under predetermined developing conditions, and measuring the optical reflectance (reflected light amount) from the obtained reference toner image. The electric resistance and permittivity of the developer may be detected by providing a pair of electrodes in the developing device and measuring the relationship between the applied voltage and current. The inductance of the developer can be detected by providing a coil in the developing device and measuring the voltage-current characteristic in the coil. The remaining amount of developer in the container can be detected by providing an optical-type or capacitance-type level sensor in the developer container (including the developing device).

Similarly to the developer characteristics, the characteristics of the photosensitive body also relate closely to the electrophotographic process function. Examples of photosensitive body characteristics include the photosensitive film thickness, the surface characteristics (coefficient of friction, irregularities), surface potential (before and after each process), surface energy, scattered light, temperature, color, surface position (deflection), linear speed, potential attenuation speed, resistance/capacitance, surface moisture content, and so on.

The photosensitive film thickness of the photosensitive body may be detected in the following way. First, the value of a current flowing from a charging member, such as the charging roller which contacts the photosensitive body, to the photosensitive body is detected. Then the voltage applied to the charging member is compared with the voltage-current characteristic relating to a preset dielectric thickness of the photosensitive body, and thus the photosensitive film thickness is determined. The surface potential and temperature of the photosensitive body can be determined by a well-known surface potential sensor and temperature sensor. The gap between the charging member and photosensitive body in a non-contact charging system can be detected by measuring the amount of light passing through the gap. The electromagnetic wave caused by charging can be detected by a wideband antenna.

The characteristics of the toner in use are also important elements in determining the presence of an abnormality in the device. The charging amount of the toner can be determined on the basis of a detected potential value of a solid latent image portion of the photosensitive body and the toner adhesion amount per unit area in the solid image. The amount of toner scattered around the periphery of a dot (pixel image) on the transfer body can be determined by comparing a dot pattern image on the photosensitive body, which is captured with an infrared light are a sensor or the like, and a dot pattern image obtained similarly on the transfer body. The amount of offset caused when the toner is counter-transferred onto a fixing member such as the fixing roller during fixing processing can be determined by comparing the amount of reflected light from the transfer paper prior to fixing and the amount of reflected light from the fixing member after fixing the transfer paper. The residual toner amount on a transfer source such as the photosensitive body can be determined on the basis of variation in the amount of reflected light from the transfer source and transfer destination before and after transfer. The amount of so-called toner fogging caused when toner adheres to a non-image portion of the photosensitive body can be detected by reading an image background portion using an optical sensor for scanning a comparatively wide wavelength region on the photosensitive body or transfer body. Alternatively, the amount of toner fogging can be determined by reading image information for each area of the background portion using a high resolution area sensor, and totaling the number of toner particles in the image.

In the image forming apparatus, the characteristics of the formed toner image are also important elements for determining the presence of an abnormality in the device. The height of the toner image can be determined on the basis of the depth, measured from the vertical direction using a displacement sensor, and the shielding length, measured from the horizontal direction using a parallel ray linear sensor. The image density of the formed toner image can be determined on the basis of a light amount (reflected light amount and transmitted light amount) detected by an optical sensor. The color of the toner image can be determined by detecting the projection wavelength of the reflected light and transmitted light. To obtain the image density and color information, the toner image on the photosensitive body or intermediate transfer body may be used as the detection subject, but to measure a color combination, such as color unevenness, the toner image on the transfer paper must be used as the detection subject. Image gradation can be determined using an optical sensor by detecting the reflection density of a toner image formed on the photosensitive body or a toner image transferred onto the transfer body at each gradation level.

The quality of the formed image, or in other words the image quality, is also an important element in determining the presence of an abnormality in the device. The definition of the toner image can be determined using a monocular sensor with a small spot diameter or a high resolution line sensor by reading a repeated pattern of a line image on the photosensitive body or transfer body. The graininess (sense of roughness) of the toner image can be determined by reading a halftone image using the same method used to detect the definition, and calculating the noise component of the reading result. A relative slant in the toner image on the transfer paper caused by a deviation in the attitude of the paper can be detected in the following manner. Two paper detection sensors are provided for detecting respectively the two ends of the transfer paper in the width direction, and a slant is detected on the basis of a difference in the detection timing of the two sensors. Mis-color registration on a superposed toner image can be determined by detecting an edge portion of the superposed image on the intermediate transfer body or the transfer paper using a monocular small-diameter spot sensor or a high resolution line sensor. Density unevenness in the conveyance direction of the toner image, caused by slippage between the paper and the roller or the like can be determined by measuring density unevenness in the sub scanning direction of the recording paper using a small-diameter spot sensor or a high resolution line sensor, and measuring the signal quantity at a specific frequency. Unevenness in the gloss of the toner image can be determined by detecting the toner image on the transfer paper using a regular reflection-type optical sensor. Image deletion, image fading, and so on can be determined by detecting a toner image on the photosensitive body using an area sensor, and subjecting the obtained image information to image processing. Rear end blank spots and betacross blank spots on the image can be determined by detecting the toner image on the photosensitive body or transfer body using a high resolution line sensor.

To detect the aforementioned temperature, a thermocouple system which detects temperature on the basis of a thermoelectromotive force generated at a contact point joining two different metals or a metal and a semiconductor, a resistivity variation element system using temperature-based varation in the resistivity of a metal or semiconductor, a pyroelectric element system in which, with a certain type of crystal, the charge in the crystal is polarized with an increase in temperature to generate a charge, or a thermomagnetic effect element system which detects variation in the magnetic property according to temperature may be employed as a temperature sensor.

To detect the aforementioned humidity, an optical measurement system for measuring the optical absorption of $H_2O$ or an OH group, or a system of measuring variation in the electric resistance value of a material due to water vapor adsorption may be employed as a humidity sensor. The various gases may be detected by a well-known gas sensor which measures variation in the electric resistance of an oxide semiconductor basically accompanying gas adsorption. To detect the airflow (direction and flow speed), an optical measurement method or the like may be used, but an air-bridge type flow sensor which, when installed in the system, is capable of reducing the size of the system, is particularly useful. To detect the air pressure, methods using a pressure sensitive material such as measuring the mechanical displacement of a membrane or measuring oscillation may be employed.

The aforementioned parameter storage information, serving as one type of the information that is obtained by the information obtaining means, is parameter information stored in storage means such as the RAM. In the image forming apparatus, the control parameters, operating history, power consumption, consumption amount of consumables, setting history of the various image forming conditions (modes), warning history, and so on may be stored in the storage means as parameter information.

The aforementioned control parameters are information set by the control unit such as the charging potential, developing bias value, fixing temperature set value, and so on. As well as the charging potential and so on, the set values of various image processing parameters such as halftone processing and color correction, and various parameters (the paper conveyance timing, the execution period of a preparatory mode prior to image formation, and so on) set by the control unit to operate the device, may also be cited.

Examples of the aforementioned operating history include historical information regarding the operations performed by the user to specify the paper size, number of colors, number of sheets, image quality instruction, and so on. Examples of the aforementioned power consumption include the total power consumption over the entire period or a specific time unit (one day, one week, one month, etc.), and the distribution, variation (derivative), cumulative value (integral), and so on thereof. Examples of the aforementioned consumed amount of consumables include the consumed amount of consumables such as toner and paper over the entire period or a specific time unit (one day, one week, one month, etc.).

The aforementioned image information, which is one type of the information obtained by the information obtaining means, serves as information regarding an output image which is inputted from outside of the image forming apparatus or obtained by reading an original using a scanner or the like. Information regarding the cumulative number of color pixels, character portion ratio, halftone portion ratio, colored character ratio, toner consumption distribution in the main scanning direction, RGB signals (total toner amount in pixel units), original size, edged original, character type (size, font), and so on can be cited as examples of image information. The cumulative number of color pixels can be determined by counting image data by GRB signal for each pixel. The character portion ratio can be determined on the basis of the ratio between the character portion and halftone portion by dividing an original image can be divided into characters, halftone dots, photographs, and background. The ratio of colored characters can be determined in a similar manner. The toner consumption distribution can be determined by counting the cumulative value of the color pixels in each of a plurality of regions partitioned in the main scanning direction. The image size can be determined on the basis of the distribution of color pixels in an image size signal or image data generated by the control unit. The character type (size, font) can be determined on the basis of the attribute data of the characters in the image information.

Note that in the present invention, "information obtained by the information obtaining means" includes both information obtained by the sensors and so on such as current values, and information calculated or specified on the basis of the obtained information.

Next, the characteristic constitution of this printer will be described.

The printer is designed to determine the presence of an abnormality using an MTS method from multiple types of information constituted by the plurality of types of information obtained by the various information obtaining means. To implement this determination, an inverse matrix serving as normal index information obtained in advance from a test machine (a standard printer machine) is stored in the aforementioned ROM 900c serving as storage means.

The control unit 900 determines on the basis of this inverse matrix whether or not an abnormality is present in the grouped information comprising all or a partial combination of the various information obtained in reality, and then displays fault warning information on the operation display unit 808 in accordance with the result. In other words, in this printer the control unit 900 functions as determining means for determining the presence of an abnormality in the detection subject printer. Note that the notification means for notifying the user of the fault warning information may be constituted by sound, characters, a lamp display, and so on instead of the operation display unit 808.

FIG. 49 shows an obtained data table illustrating an information obtaining process performed to construct the inverse matrix on the basis of the various information obtained from the normal test machine. In this obtained data table, an example is illustrated in which the inverse matrix is constructed from n sets of grouped information comprising k types of information.

In the information obtaining process, first, k types of information $y_{11}, y_{12}, \ldots, y_{1k}$, constituting a first set of grouped information, are obtained respectively by the sensors, control unit 900*, and so on, and stored in the storage means as data on the first row of the data table. Next, k types of information $y_{21}, y_{22}, \ldots, y_{2k}$, constituting a second set of grouped information, are obtained respectively by the sensors, control unit 900*, and so on, and stored in the storage means as data on the second row of the data table. The third group to the nth set of grouped information are then obtained similarly and stored in the storage means as data on the third row to the nth row of the data table. Finally, the average and standard deviation σ of the respective n groups are determined for the k types of information constituting each set of grouped information and stored in the storage means as data on the n+1 and n+2 rows.

Once the information obtaining process is complete, an information normalization process is implemented to construct a normalized data table such as that shown in FIG. 50. This normalized data table is constructed on the basis of the obtained data table described above.

Data normalization refers to processing for transforming absolute value information of the obtained information into variable information. The normalized data of each piece of information is calculated on the basis of the following relational expression (2). Note that in the following expression, the symbol i denotes any one of the n sets of grouped information. The symbol j denotes any one of the k types of information.

$$Y_{ij} = (y_{ij} - \overline{y_j})/\sigma_j \qquad \text{Eq. (2)}$$

Once this information normalization process is complete, a correlation coefficient calculation process is performed. In the correlation coefficient calculation process, a correlation coefficient $r_{pq}$ ($r_{pq}$) is calculated on the basis of the following equation (3) for all possible combinations ($_kC_2$ variants) of two different types of the k types of normalized data in the n groups of normalized data sets.

$$r_{pq} = r_{qp} = \frac{\sum_{j=1}^{n}(Y_{ip} \times Y_{iq})}{\sqrt{\sum_{i=1}^{n}(Y_{ip})^2 \times \sum_{i=1}^{n}(Y_{iq})^2}} \qquad \text{Eq. (3)}$$

When the correlation coefficient $r_{pq}$ ($r_{pq}$) has been calculated for all of the combinations, k×k correlation coefficient matrices R having 1 as its diagonal element and the the correlation coefficient $r_{pq}$ as the remaining elements of the rows p and columns q. The content of the correlation coefficient matrix R is as shown in the following equation (4).

$$R = \begin{pmatrix} 1 & r_{12} & r_{13} & \cdots & r_{1k} \\ r_{21} & 1 & r_{23} & \cdots & r_{2k} \\ r_{31} & r_{32} & 1 & \cdots & r_{3k} \\ \cdots & \cdots & \cdots & \cdots & \cdots \\ r_{k1} & r_{k2} & r_{k3} & \cdots & 1 \end{pmatrix} \qquad \text{Eq. (4)}$$

Once this correlation coefficient calculation process is complete, a matrix transformation process is implemented. By means of this matrix transformation process, the correlation coefficient matrix R shown in equation (4) is transformed into an inverse matrix A ($R^{-1}$) shown in the following equation (5). An adjoint matrix of the correlation coefficient matrix R may be used instead of the inverse matrix A (likewise hereafter).

$$A = \begin{pmatrix} a_{11} & a_{12} & a_{13} & \cdots & a_{1k} \\ a_{21} & a_{22} & a_{23} & \cdots & a_{2k} \\ a_{31} & a_{32} & a_{33} & \cdots & a_{3k} \\ \cdots & \cdots & \cdots & \cdots & \cdots \\ a_{k1} & a_{k2} & a_{k3} & \cdots & a_{kk} \end{pmatrix} = R^{-1} \qquad \text{Eq. (5)}$$

In the printer, the inverse matrix A constructed by the series of processes described above, comprising the information obtaining process, the information normalization process, the correlation coefficient calculation process, and the matrix transformation process, is stored in advance in the ROM 900*c* at the time of factory shipment. Then, at the shipment destination, the Mahalanobis distance D on the multidimensional space produced by the inverse matrix A is calculated on the basis of the following equation (6) for the grouped information constituted by all or a partial combination of the various information obtained in reality by the plurality of sensors and so on.

$$D^2 = \frac{1}{k} \sum_{p=1}^{k} \sum_{q=1}^{k} a_{pq} Y_p Y_q \qquad \text{Eq. (6)}$$

The control unit 900 compares the Mahalanobis distance D determined in this manner with a preset threshold. If the Mahalanobis distance D is greater than the threshold, the obtained grouped information is determined as abnormal data deviating greatly from the normal distribution, and the fault warning information is displayed on the operation display unit 808.

According to the printer constituted as described above, abnormalities in the actual measurement values of the grouped information constituted by all or a partial combination of the various information are determined using the MTS method, and hence faults having no clearly identifiable cause can be predicted. However, the present inventors discovered that in a test printer performing such predictions, a mis-detection of a normal state when an abnormality is present sometimes occurs. The cause of these mis-detections was found to be related to the operating mode setting.

In this printer, two operating modes, normal paper print mode and OHP print mode, may be selected by the user by means of an operation on the operation display unit 808. When the normal paper print mode is selected, images are formed under a set condition of a linear process speed of 100 [mm/sec] (the linear speed of each photosensitive body, the paper conveyor belt 851, each conveyance roller, the registration roller pair 804, the fixing roller 806a, and so on). On the other hand, when the OHP print mode is selected, images are formed under a set condition of a linear process speed of 50 [mm/sec].

In the test printer, the present inventors obtained the linear speed of the paper conveyor belt 851 and the linear speed of the photosensitive bodies 811Y, M, C, K from the detection results of the aforementioned optical sensor while mixing the two operating modes. More specifically, a reference image was formed on two hundred sheets of transfer paper while measuring the linear speed of the paper conveyor belt 851 ("linear belt speed" hereafter) and the linear speed of the photosensitive bodies ("linear drum speed" hereafter). Of these two hundred sheets, the reference image was formed on high quality paper in the normal paper print mode ("mode 1" hereafter) on the first one hundred sheets, and the reference image was formed on OHP sheets in the OHP print mode ("mode 2" hereafter) on the last one hundred sheets. The inverse matrix A was then constructed on the basis of the grouped information of the two hundred normal data sets obtained by printing out the two hundred sheets of transfer paper.

Figure 20:
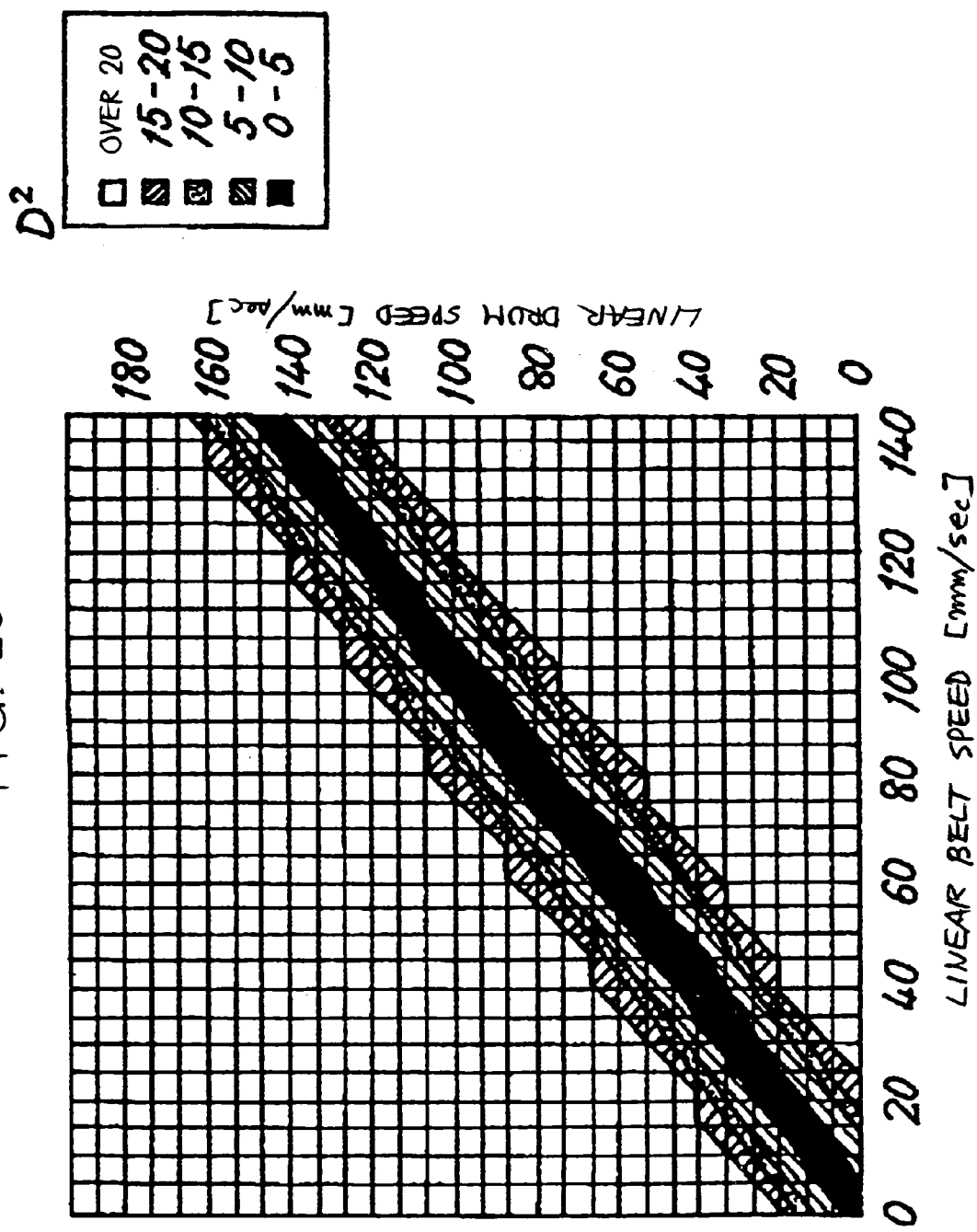
FIG. 20 is a graph showing a relationship between a square value of a Mahalanobis distance, calculated by an MTS method using an inverse matrix which includes information relating to a linear belt speed and linear drum speed, and the linear belt speed and linear drum speed.

FIG. 20 is a graph showing a relationship between a square value of the Mahalanobis distance D, calculated by the MTS method using the inverse matrix A, the linear speed of the paper conveyor belt 851 ("linear belt speed" hereafter), and the linear speed of the photosensitive bodies ("linear drum speed" hereafter). Using the inverse matrix A for establishing this relationship, the Mahalanobis distance D was calculated for the grouped information shown in FIG. 51, obtained during printout, and a determination was made as to the presence of an abnormality in the printer.

In FIG. 51, the grouped information of sample numbers $S_5$, $S_6$, and so on all deviate greatly from the normal linear belt speed and linear drum speed ranges of 100 [mm/sec] or 50 [mm/sec]. Hence an abnormality should be determined regardless of whether the operating mode is mode 1 or mode 2. However, the square values of the Mahalanobis distance D are all comparatively small, and hence a mistaken determination of normal is made.

Hence, in the printer according to the second embodiment, a plurality of inverse matrices A serving as normal index information, having differing content according to specific information such as the operating mode, is stored in the ROM 900c. Taking the operating mode as an example of the specific information, a mode 1 inverse matrix A is constructed and stored on the basis of the plurality of grouped information (for example, linear belt speed and linear drum speed) obtained under a condition in which the operating mode is set to mode 1, and a mode 2 inverse matrix A is constructed and stored on the basis of the plurality of grouped information obtained under a condition in which the operating mode is set to mode 2. Thus, when printing is performed at the shipment destination, the inverse matrix A which corresponds to the result of the operating mode setting value obtained by the CPU 900a is selected from the two inverse matrices A and used to determine an abnormality. The mode 1 inverse matrix A is used when the operating mode setting value obtained during printout is mode 1, and the mode 2 inverse matrix A is used when the operating mode setting value is mode 2.

Figure 21:
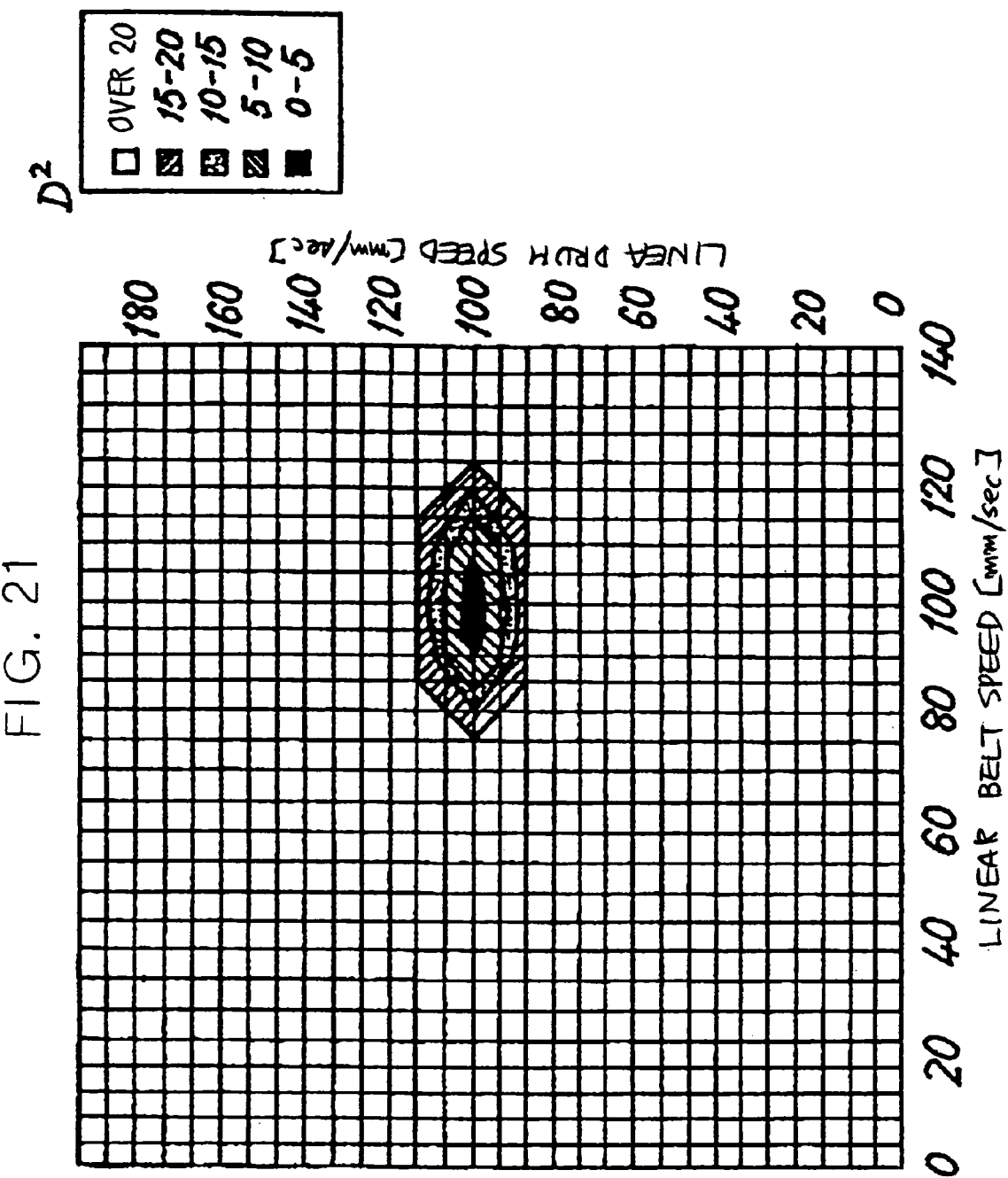
FIG. 21 is a graph showing a relationship between a square value of a Mahalanobis distance, calculated by an MTS method using an inverse matrix A for a mode 1, and the linear belt speed and linear drum speed in the same printer.
Figure 22:
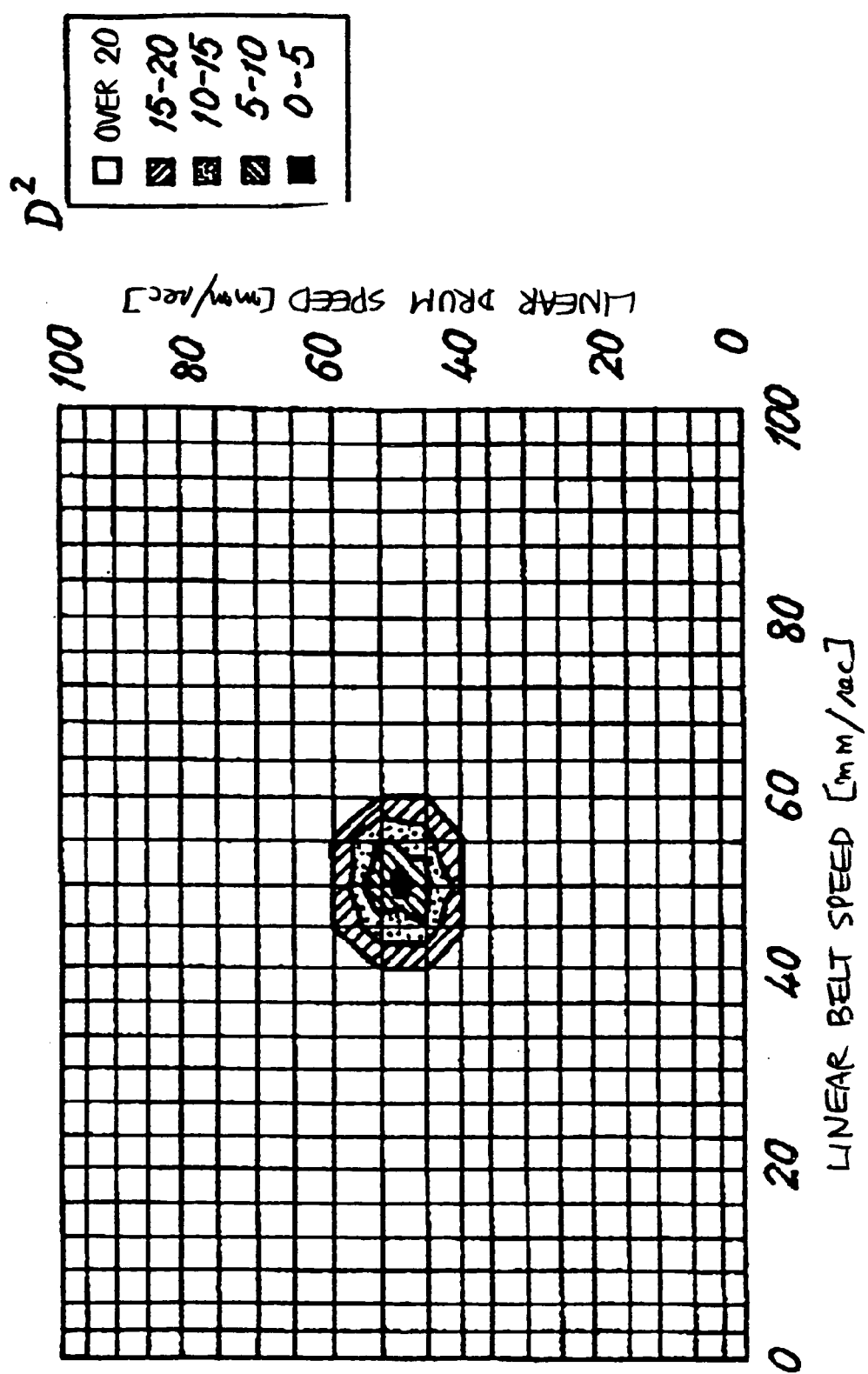
FIG. 22 is a graph showing a relationship between a square value of a Mahalanobis distance, calculated by an MTS method using an inverse matrix A for a mode 2, and the linear belt speed and linear drum speed in the same printer.

FIG. 21 is a graph showing a relationship between the square value of the Mahalanobis distance D calculated by the MTS method using the mode 1 inverse matrix A, and the linear belt speed and linear drum speed. FIG. 22 is a graph showing a relationship between the square value of the Mahalanobis distance D calculated by the MTS method using the mode 2 inverse matrix A, and the linear belt speed and linear drum speed. The square of the Mahalanobis distance D for the grouped information of the sample number $S_5$ in FIG. 51 takes an extremely large value of between 5 and 10 in both of the graphs, and hence this can be determined easily as an abnormality. Thus in this printer, mistaken determinations due to differing normal distributions of the inverse matrix A according to the content of the specific information can be avoided.

Figure 23:
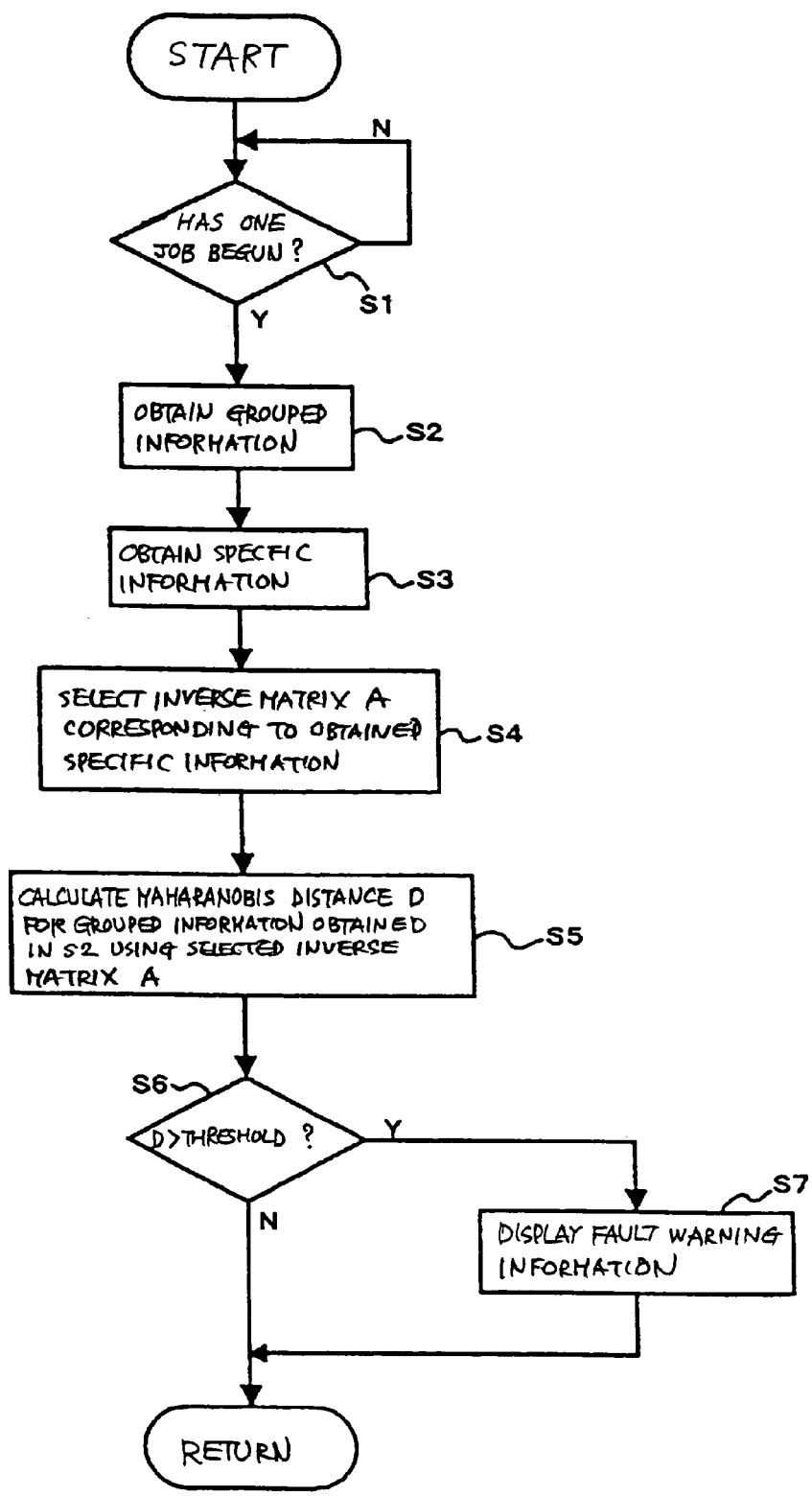
FIG. 23 is a flowchart showing an example of an abnormality determination control flow that is implemented by a control unit of the same printer.

FIG. 23 is a flowchart showing an example of the flow of abnormality determination control implemented by the control unit 900. In this abnormality determination control, first the control remains on standby until one job begins (step 1: "step" will be denoted as "S" hereafter). The term "one job" denotes an operation of the various devices required to print one sheet of transfer paper. When it is determined that one job has begun (Y in S1), grouped information comprising the actual measured values of the linear belt speed and linear drum speed are obtained (S2), whereupon specific information such as the operating mode setting value is obtained (S3). The inverse matrix A which corresponds to the specific information is then selected from the plurality of inverse matrices A stored in the ROM 900c (S4). Next, the Mahalanobis distance D for the grouped information obtained in S2 is calculated by the MTS method using the selected inverse matrix A (S5), and a determination is made as to whether or not the Mahalanobis distance D exceeds a predetermined threshold (S6). If the Mahalanobis distance D exceeds the threshold (Y in S6), it is highly likely that an abnormality has occurred inside the printer for some reason. It is therefore determined that an abnormality has occurred, and fault warning information is displayed on the operation display unit 808. The control flow series then returns to S1. If, on the other hand, the Mahalanobis distance D does not exceed the threshold (N in S6), it is unlikely that an abnormality has occurred, and hence the control flow series returns to S1 without determining the presence of an abnormality.

Note that to facilitate understanding, an example in which the Mahalanobis distance D is determined in a two-dimensional space constituted by the linear belt speed and linear drum speed was described. However, more types of abnormalities can be detected when the Mahalanobis distance D is determined in a space having more dimensions. Also, the specific information such as the operating mode setting value may be included in the inverse matrix A, but need not be included therein.

Further, an example in which the specific information refers to the operating mode setting value was described, but the present invention may also be applied to cases in which the specific information refers to humidity information and temperature information. For example, the electric resistance values of each color toner, which are calculated on the basis of current values obtained by the Y, M, C, K toner current detection sensors 809Y, M, C, K, differ in their normal value distribution according to the internal temperature of the printer. Hence a plurality of the inverse matrices A having different values according to temperature may be stored for the plurality of grouped information comprising information regarding the electric resistance value of the toner, and at the shipment destination, the inverse matrix A which corresponds to the actual measured value of the toner electric resistance may be selected and used to determine an abnormality. In the example described above having a high speed mode and a high image quality mode which differ in linear speed, intermediate linear speed values of 70 [mm/sec] or 80 [mm/sec] must be determined as abnormalities. In the case of factors having a constantly changing value such as temperature, however, intermediate values can also be recognized as normal, and hence the present inventors believe that there is no need to set a normal value distribution for each temperature. However, the present inventors discovered that even in cases where constantly changing factors such as temperature are used, the precision of the abnormality determination can be improved by similarly storing a plurality of normal value distributions and use these appropriately.

Figure 25:
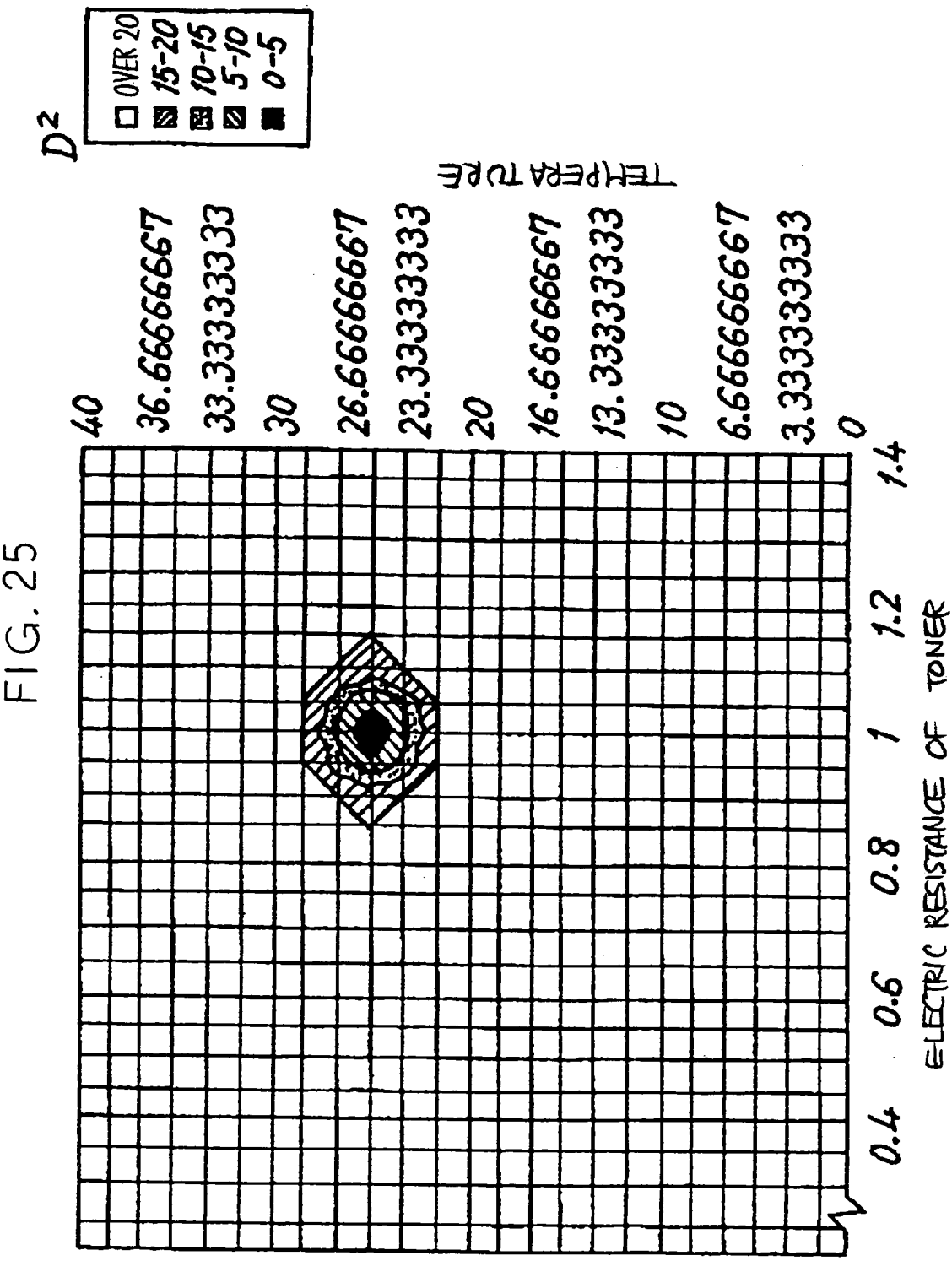
FIG. 25 is a graph showing a relationship between a square value of a Mahalanobis distance calculated by an MTS method which uses an inverse matrix for a temperature range t1, and the temperature and toner electric resistance value, in the same printer.
Figure 26:
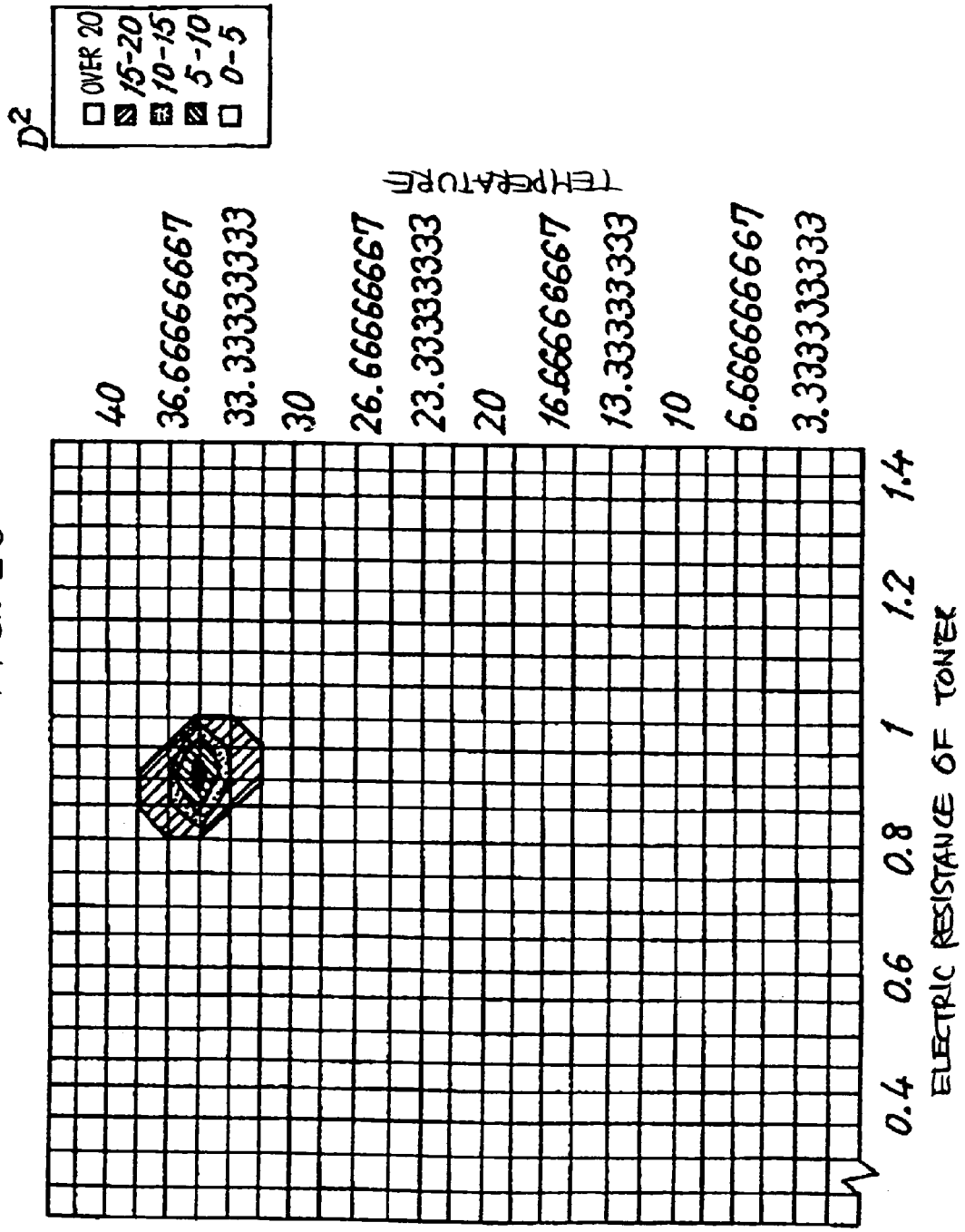
FIG. 26 is a graph showing a relationship between a square value of a Mahalanobis distance calculated by an MTS method which uses an inverse matrix for a temperature range t2, and the temperature and toner electric resistance value, in the same printer.
Figure 27:
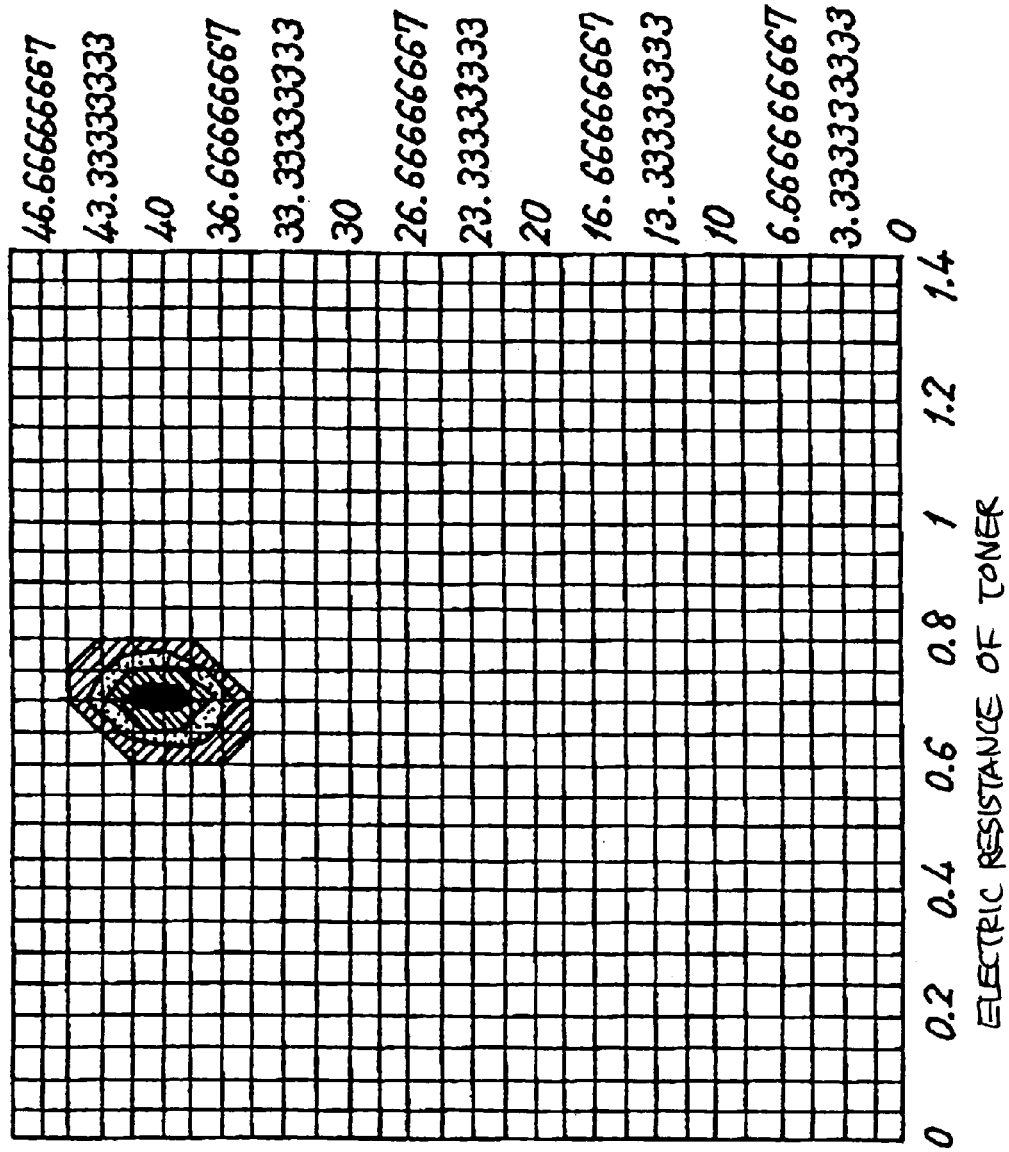
FIG. 27 is a graph showing a relationship between a square value of a Mahalanobis distance calculated by an MTS method which uses an inverse matrix for a temperature range t3, and the temperature and toner electric resistance value, in the same printer.
Figure 48:
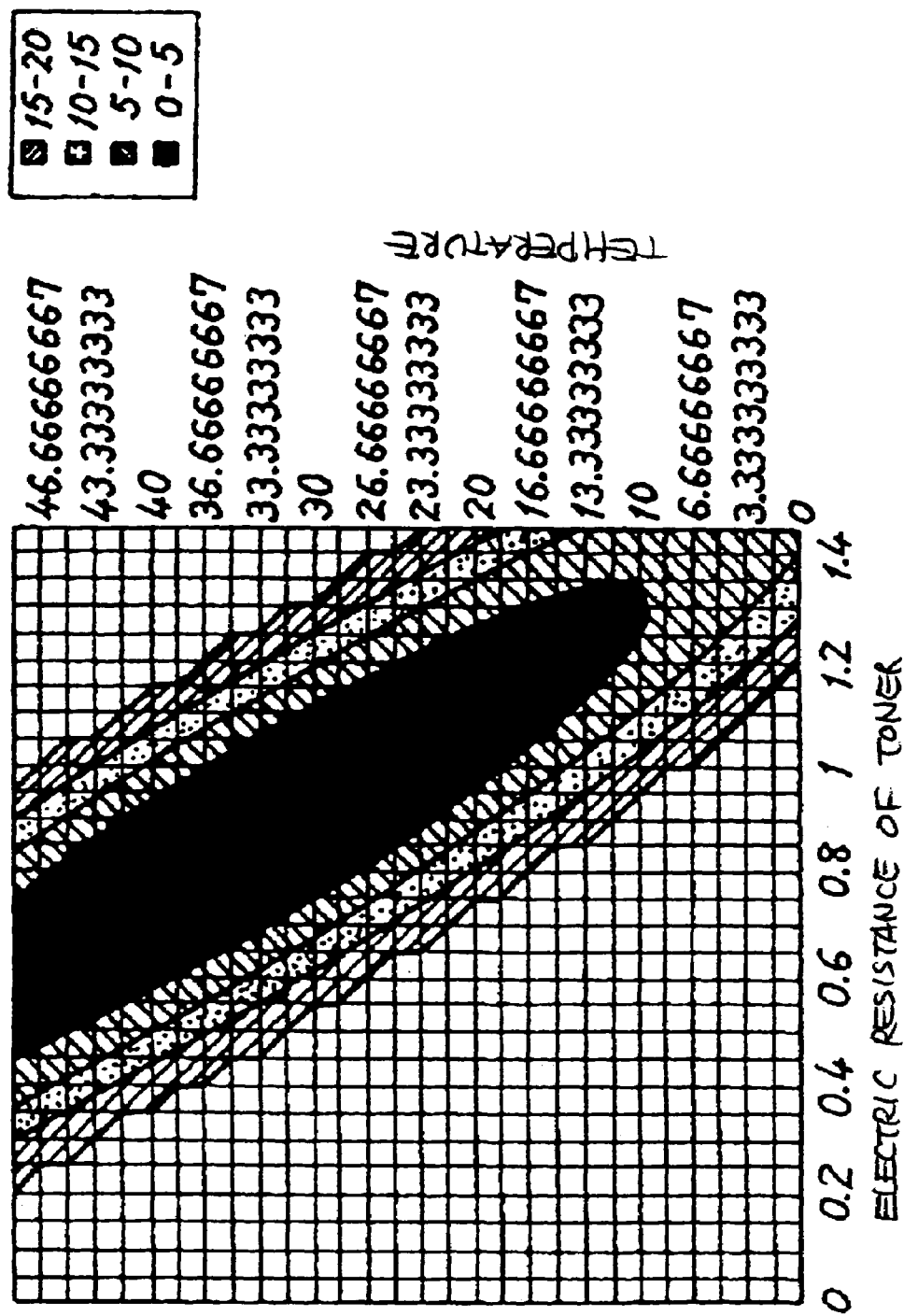
FIG. 48 is a graph showing a relationship between a square value of a Mahalanobis distance calculated by an MTS method, and a temperature and toner electric resistance value.

For example, FIGS. 48, 25, 26, and 27 are graphs showing mapped normal value distributions, each having the temperature on the ordinate and the electric resistance value of the toner, measured by a method to be described below, on the abscissa. FIGS. 25, 26, and 27 show a normal value distribution mapped after implementing image formation 100 times in the vicinity of 25° C., 35° C., and 40° C. respectively. FIG. 48 shows a normal value distribution created on the basis of all of the measured data for the total of 300 measurements obtained by totaling the 100 measurements of each of the three temperatures. When the distribution in FIG. 48 is compared to FIGS. 25, 26, and 27, it can be seen that the distribution in FIG. 48 has a larger normal range than the distribution rings in FIGS. 25, 26, 27. Moreover, points in the regions that are removed from the segment linking each of the center points (temperature 25° C. and electric resistance 1.0, temperature 35° C. and electric resistance 0.9, temperature 40° C. and electric resistance 0.7) of the distributions in FIGS. 25, 26, 27, for example temperature 31.6° C. and electric resistance 0.75 and so on, are also determined as normal.

Figure 24:
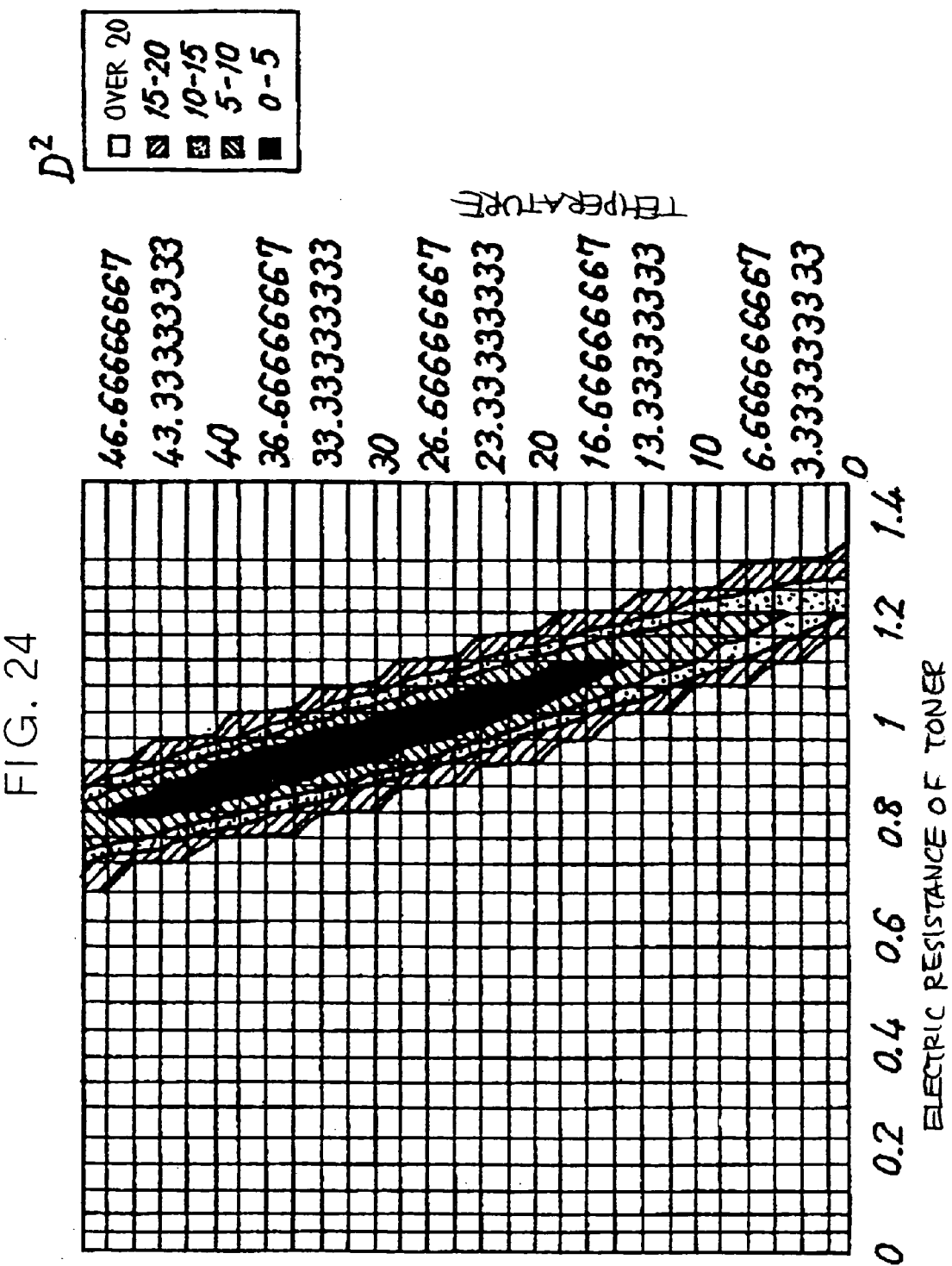
FIG. 24 is a graph showing a relationship between a square value of a Mahalanobis distance calculated using a conventional MTS method, and the temperature and toner electric resistance value.

According to an experiment performed by the present inventors, when the central values of normal values mapped in a space constituted by a plurality of parameters, such as the points in this example (temperature 25° C. and electric resistance 1.0, temperature 35° C. and electric resistance 0.9, temperature 40° C. and electric resistance 0.7), do not fall on a single straight line (i.e. when such points show non-linear variation), the obtained normal value distribution extends greatly beyond the line connecting the central values of the normal values. As another example, when the segment linking temperature 25° C. and electric resistance 1.0 with temperature 40° C. and electric resistance 0.7 is set as a boundary, the normal range extends not only in the direction toward temperature 35° C. and electric resistance 0.9, but also in the opposite direction thereto. If the central values of the normal values mapped in a space constituted by a plurality of parameters do fall on a single straight line, the precision of abnormality determination does not decrease greatly even when individual normal value distributions are not created for every predetermined temperature value. For example, even if abnormality determination at temperature 25° C. and temperature 35° C. is performed using only the normal value distribution shown in FIG. 24, created on the basis of the 200 measured values forming the basis of the graphs in FIGS. 25, 26, the precision does not decrease greatly in comparison with a case in which abnormality determination is performed using the two normal value distributions shown in FIGS. 25 and 26. However, in many cases, the central value of the normal value is likely to vary in a non-linear form. Hence when constantly changing parameters such as temperature are used, the abnormality determination precision falls unless normal value distributions are used appropriately in accordance with the measured temperature value.

When the specific information is capable of taking continuous values, rather than creating a normal value distribution for each temperature value, it is more realistic to divide the temperature into predetermined temperature ranges such as "less than 0° C.", "no less than 0° C. and less than 10° C.", "no less than 10° C. and less than 20° C.", and "no less than 20° C. and less than 30° C.", for example, and then select the normal value distribution to be used in abnormality determination in accordance with the temperature range to which the measured temperature belongs. When the specific information is divided into predetermined ranges in this manner, the normal value distribution corresponding to the value of the specific information may vary within a single range. For example, within the same range of "no less than 20° C. and less than 30° C.", the normal value distribution formed by other factors at 21° C. and the normal value distribution formed by other factors at 29° C. may vary. Hence the specific information itself may be used as one factor, as in this example. Note that the abnormality determination precision is improved by dividing the temperature ranges finely, but the storage capacity required to store the resulting large number of inverse matrices increases. To prevent the abnormality determination precision from falling excessively while economizing on storage capacity, it is effective to make the specific information range having a central normal value which varies in a comparatively linear form wider than the other ranges. For example, by storing the two distributions in FIG. 24 (25° C. to the vicinity of 35° C.) and FIG. 27 (the vicinity of 40° C.) rather than storing the three distributions shown in FIG. 25 (the vicinity of 25° C.), FIG. 26 (the vicinity of 35° C.), and FIG. 27 (the vicinity of 40° C.), the number of normal value distributions to be stored can be reduced to two while improving the abnormality determination precision beyond that of FIG. 25.

The toner resistance value was determined in the following manner. First, a pair of electrodes opposing each other with a gap of approximately 1 cm therebetween was provided in the developing device, whereupon the voltage V applied to one of the electrodes and the current I flowing through the other were measured. The electric resistance value $A=V/I$ was then determined. The electric resistance value A obtained in this manner was the divided by an electric resistance value B measured at a temperature of 25° C., and the value of A/B was set as a factor. Note that the toner resistance value varies according to device settings such as the gap between the electrodes and the condition of the developer. In abnormality determination, however, the important element is not the categorical resistance value, but the variation thereof, and hence a relative value such as that described above may be used as the electric resistance value.

In this printer, the following may be cited as examples of the plurality of information obtaining means provided in the abnormality determining apparatus: the Y, M, C, K optical sensors 816Y, M, C, K, the fixing temperature sensor 806c, the belt optical sensor 855, the current detection sensors 809Y, M, C, K, the CPU 900a, the operation display unit 808, and so on. The RAM 900b and ROM 900c function as the storage means provided in the abnormality determining apparatus. The CPU 900a also functions as the abnormality determining means provided in the abnormality determining apparatus.

Next, a modified device of the printer according to the second embodiment will be described. Note that the basic constitution of this modified device is identical to that of the printer according to the second embodiment, and hence description thereof has been omitted.

This printer is identical to the printer according to the second embodiment in that a plurality of the inverse matrices A having differing content according to the content of the specific information is stored in the storage means, and the inverse matrix A corresponding to the obtained result of the specific information is selected from among the plurality of inverse matrices A. In this printer, however, the plurality of inverse matrices A is not stored in the non-machine writable ROM 900c but in the machine writable RAM 900b, which is different to the printer according to the second embodiment. Moreover, the inverse matrices A are not stored in the RAM in advance during factory shipment. The CPU 900a constructs the plurality of inverse matrices A on the basis of a plurality of obtained results from multiple information (grouped information and specific information) comprising a plurality of information obtained during an initial operating period at the shipment destination. In other words, this printer differs from the printer according to the second embodiment in that the CPU 900a functions as normal index information construction means for constructing a plurality of inverse matrices having differing content on the basis of the obtained results of the grouped information. Note that during the initial operating period at the shipment destination, the various members in the printer are all new, and hence the results of the various information obtained by the various information obtaining means serve as normal data.

Figure 28:
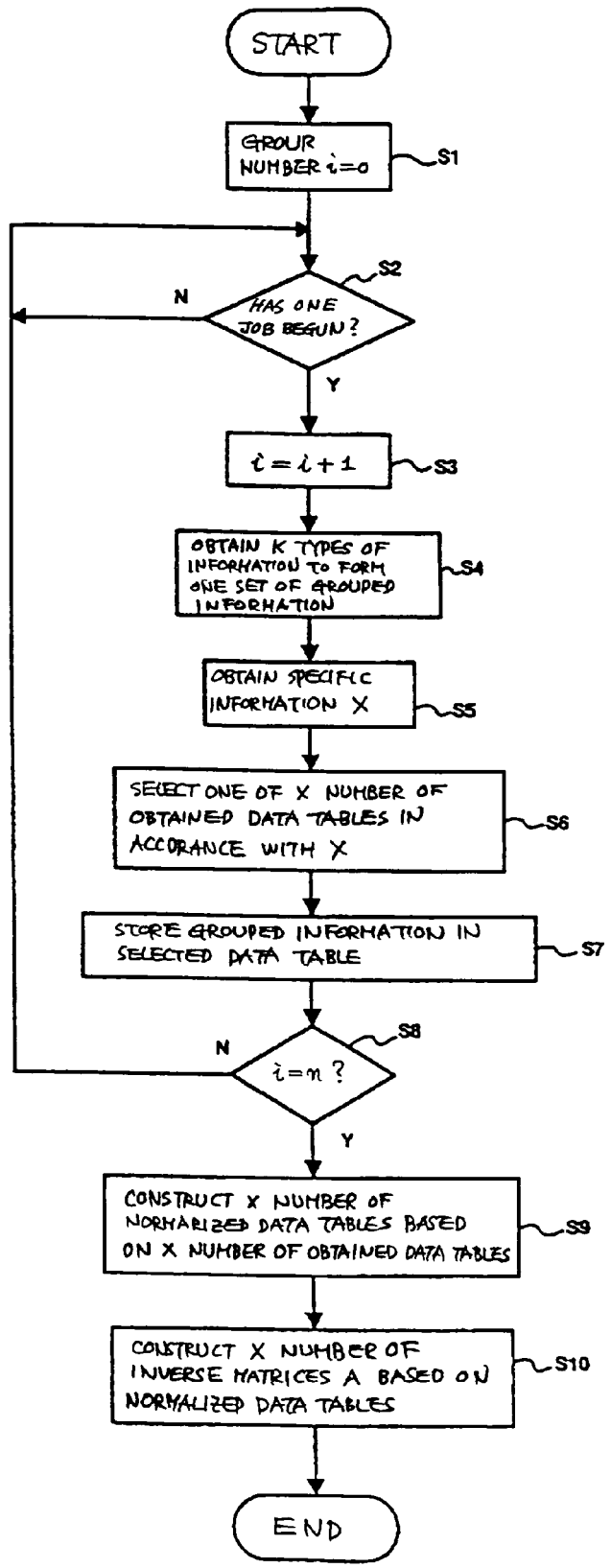
FIG. 28 is a flowchart showing an example of an inverse matrix construction process that is implemented by a control unit of a modified device of the second embodiment.

FIG. 28 is a flowchart showing the flow of inverse matrix construction control, implemented by the control unit 900 of this printer. This inverse matrix construction control is executed during the initial operating period at the shipment destination. Specifically, the initial operating period lasts from the first print job to the nth print job following shipment. The inverse matrix construction control shown in FIG. 28 is implemented on the provision that x number of the obtained data tables shown in FIG. 49* are stored in the RAM 900b of the printer during factor shipment. Note, however, that the obtained data tables contain no data, and are stored in relation to their different numerical value range indices. These indices correspond to the actual measured values of specific information such as the operating mode setting value. In other words, three obtained data tables x1, x2, x3, for example, are stored in relation to numerical value range indices of 1–5, 6–10, and 1–15 respectively so that grouped information corresponding to the specific information within these numerical value ranges can be stored therein.

When the main power source of the printer is switched on for the first time following shipment, inverse matrix construction control begins, whereupon the value of a group number i is initialized to "0" (S1). This group number i is a variable indicating the number of measurements of the grouped information constituted by k types of information. When one job is begun following the initialization of the group number i (Y in S2), "1" is added to the group number i (S3). When one set of grouped information comprising k types if information has been obtained (measured) by the various sensors and data reading (S4), specific information X regarding the operating mode setting value and soon is obtained (S5). Next, an obtained data table having a numerical value range index corresponding to the content (value) of the specific information X is selected from among the aforementioned x number of obtained data tables (S6), and the obtained results of the grouped information are stored therein (S7). A determination is then made as to whether or not the group number i has reached "n" (S8), and if not (N in S8), the control flow is looped to S2. As a result of this loop, the i+1th grouped information is obtained at the next one job and stored in the appropriate obtained data table. When the group number i reaches "n" (Y in S8), the information obtaining process for obtaining n sets of grouped information ends, and the aforementioned information normalization process, correlation coefficient calculation process, and matrix transformation process are performed in succession. More specifically, first x number of normalized data tables are constructed on the basis of the x obtained data tables (S9). Next, the correlation coefficient matrix R is constructed on the basis of the respective normalized data tables, and then x number of inverse matrices A are constructed (S10).

In the printer constituted as described above, the plurality of inverse matrices A are constructed on the basis of the various information obtained during the initial operating period of the printer, rather than a test operation of a different test printer. As a result, variation among finished products in the normal values of the information used to determine an abnormality, caused by precision errors in the various components and so on, can be avoided, thus preventing deterioration of the determination precision. Moreover, the plurality of inverse matrices A is constructed automatically at the shipment destination, and hence cost increases arising when the inverse matrices A are constructed at the factory before shipment by performing a test operation on each finished product can also be avoided.

Next, various specific examples of the printer, in which a more characteristic constitution has been added to this modified device, will be described.

FIRST SPECIFIC EXAMPLE

In the device of this specific example, the plurality of inverse matrices A is constructed automatically during an initial operating period at the shipment destination, for example the operating period up to the initial n jobs. However, it is not always possible to prepare the required conditions for constructing all of the inverse matrices A during this period. For example, when the operating mode setting value is set as the specific information and two inverse matrices A, corresponding respectively to operating mode 1 and operating mode 2, are constructed, a certain number of sets of grouped information must be obtained for each of the inverse matrices A. However, it is typically the case that printing in operating mode 1, using normal paper, is performed frequently, whereas printing in operating mode 2, using OHP sheets, is performed rarely. Hence in the initial operating period, a large amount of grouped information for operating mode 1 may be obtained, but it may be impossible to obtain enough grouped information for operating mode 2 to construct the inverse matrix A. In such a case, if a forced attempt is made to construct the inverse matrix A corresponding to operating mode 2 on the basis of the little grouped information that has been obtained, the abnormality determination precision in operating mode 2 deteriorates.

Hence, in the printer according to the first specific example, a plurality of temporary inverse matrices having differing content is stored in advance in the ROM 900c serving as storage means prior to shipment from the factory. These temporary inverse matrices, which serve as temporary normal index information, are similar to the plurality of inverse matrices A in the printer according to the second embodiment, and are constructed on the basis of grouped information obtained during a test operation of a different test printer. If necessary, the CPU 900a uses a part of these temporary inverse matrices as the inverse matrix A. More specifically, if a predetermined condition such as the number of printouts in operating mode 2 is not fulfilled during the initial operating period such that at least one of the inverse matrices A cannot be constructed, the shortfall is compensated for by a temporary inverse matrix.

Figure 29:
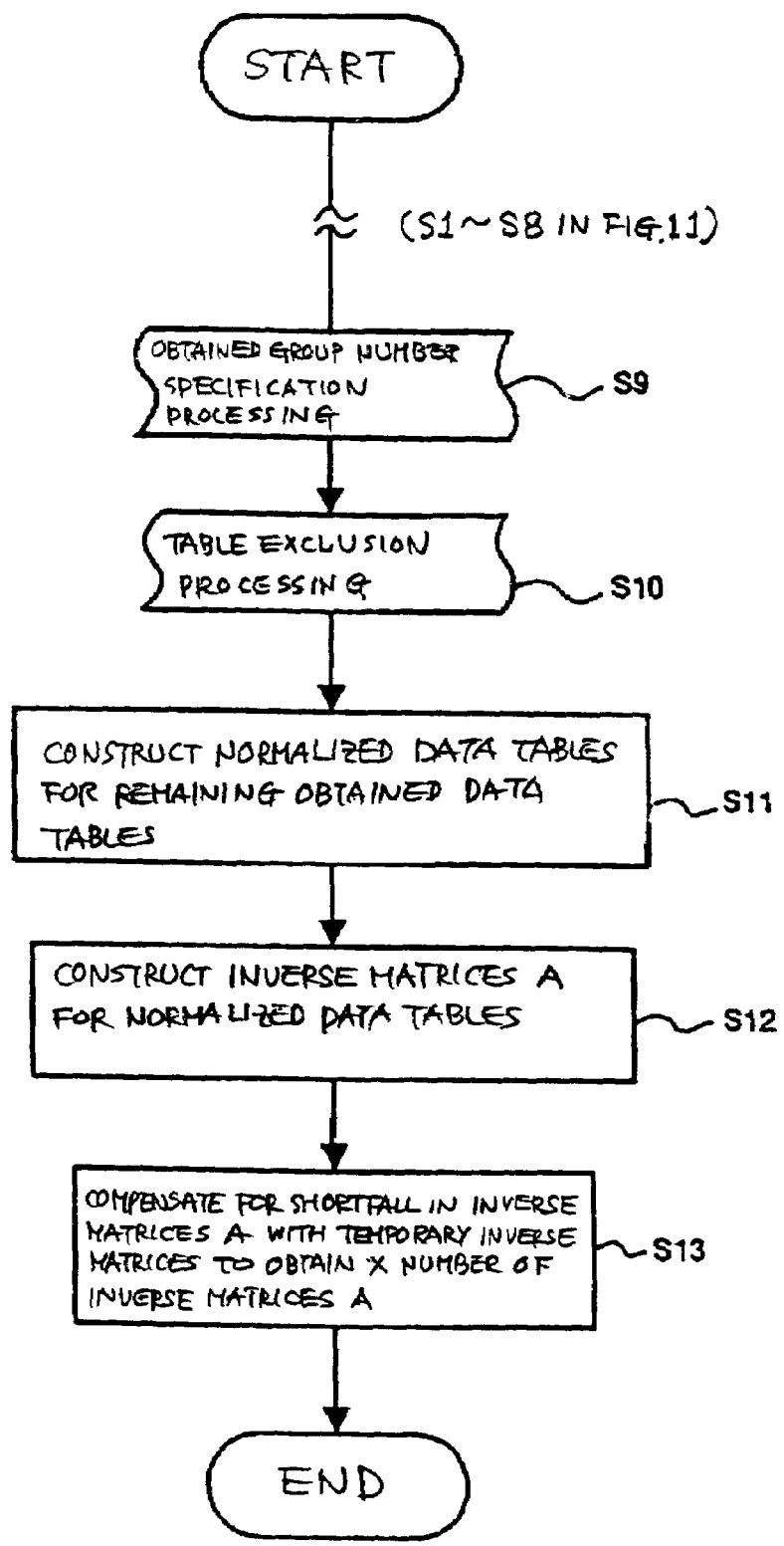
FIG. 29 is a flowchart showing the main parts of the inverse matrix construction process that is implemented by the control unit of a printer according to a first specific example of this modified device.

FIG. 29 is a flowchart showing the flow of inverse matrix construction control, implemented by the control unit 900 of the printer according to the first specific example. The steps S1 to S8 in the flowchart are identical to S1 to S8 in FIG. 28, and hence are not illustrated. When n sets of grouped information are obtained over n print jobs during the initial operating period (Y in S8 of FIG. 28), obtained group number specification processing is implemented (S9). Obtained group number specification processing involves specifying the number of sets of grouped information stored in each of the x number of obtained data tables. When this obtained group number specification processing is implemented, table exclusion processing is performed on the x number of obtained data tables to exclude those tables in which the number of sets of stored grouped information falls below a predetermined threshold from use as source material for the inverse matrices A (S10). By means of this table exclusion processing, the obtained data tables in which the number of sets of stored grouped information falls below a predetermined threshold are excluded from use. The remaining obtained data tables, or in other words the obtained data tables storing the required number of sets of grouped information, are used to construct normalized data tables (S11) The inverse matrices A are then constructed from the respective normalized data tables. Hence when predetermined conditions are not satisfied during the initial operating period, the number of inverse matrices A falls below x. Therefore, the temporary inverse matrices are used to compensate for the shortfall in the inverse matrices A so that finally, x number of inverse matrices A are constructed (S13).

In this printer, constituted as described above, all of the inverse matrices A can be constructed with the required number of data sets or more, even when predetermined conditions, such as an obtained data table in which the number of sets of grouped information falls below the threshold, cannot be satisfied during the initial operating period. As a result, [deterioration of] the abnormality determination precision caused when a forced attempt is made to construct at least one of the plurality of inverse matrices A on the basis of a small number of grouped information sets can be avoided.

SECOND SPECIFIC EXAMPLE

A printer according to the second specific example is similar to the printer according to the first specific example in that when the predetermined conditions cannot be satisfied during the initial operating period such that at least one of the inverse matrices A cannot be constructed, the shortfall is compensated for. However, this printer differs from the printer according to the first specific example in that the compensatory temporary inverse matrices are not stored in the ROM 900c prior to factory shipment, but instead the inverse matrices A are received by data receiving means where necessary. The operation display unit 808 and so on may be cited as examples of these data receiving means. A plurality of the temporary inverse matrices is input by a keyboard operation or the like performed by the user, and received by the operation display unit 808. Alternatively, a recording medium reading device such as a floppy (registered trademark) disk drive or optical disk drive may be provided as data receiving means to read and receive the temporary inverse matrices recorded onto a floppy disk or optical disk. Alternatively, image information receiving means (an input port) for receiving image information transmitted from a personal computer or the like may be caused to function as data receiving means for receiving the temporary inverse matrices.

Figure 30:
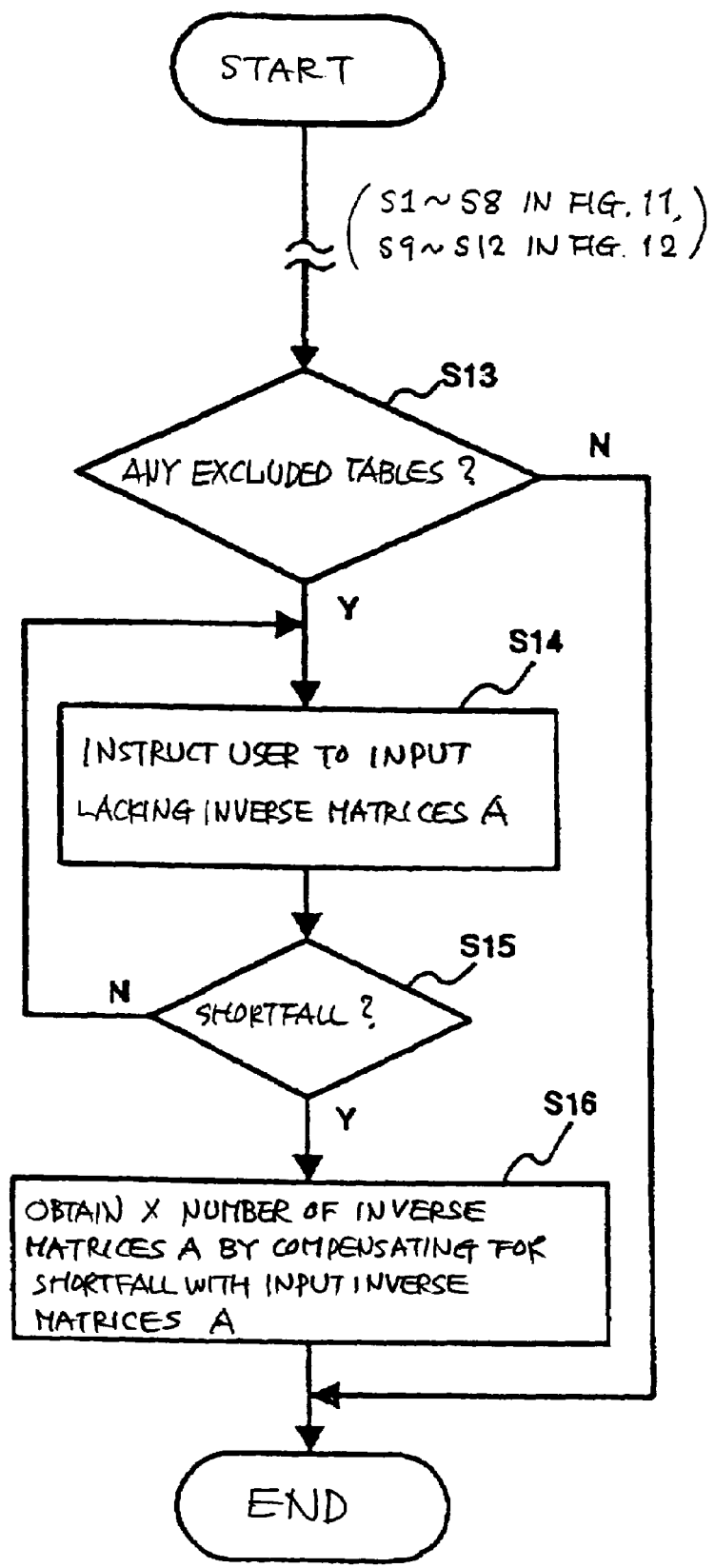
FIG. 30 is a flowchart showing the main parts of the inverse matrix construction process that is implemented by the control unit of a printer according to a second specific example of this modified device.

FIG. 30 is a flowchart showing the flow of inverse matrix construction control, implemented by the control unit 900 of the printer according to the second specific example. The steps S1 to S8 in the flowchart are identical to S1 to S8 in FIG. 28, and hence are not illustrated. Moreover, the steps S9–S12 are identical to S9 to S12 in FIG. 29, and hence are not illustrated. Once the inverse matrices A have been constructed (S12 in FIG. 29) on the basis of the remaining obtained data tables that have not been excluded in the aforementioned table exclusion processing (S10 in FIG. 29), the presence of excluded tables is determined (S13 in FIG. 30). When there are no excluded tables (N in S13), then all of the x number of temporary inverse matrices have been constructed on the basis of the grouped information obtained during the initial operating period, and hence the control flow ends without compensating for the temporary inverse matrices. On the other hand, if an excluded table exists (Y in S13), the user is notified that the lacking inverse matrix A must be inputted. This notification is performed by displaying instruction information such as "Please input the data set shown on page 120 of the manual using the keypad" on the operation display unit 808, for example. Once the plurality of inverse matrices A have been inputted by the operation of the user based on this instruction (Y in S15), the inverse matrix A corresponding to the shortfall, from among the input inverse matrices A, is compensated for so that finally, x number of inverse matrices A are constructed.

Likewise in this printer, constituted as described above, all of the inverse matrices A can be constructed with the required number of data sets or more, even when predetermined conditions, such as an obtained data table in which the number of sets of grouped information falls below the threshold, cannot be satisfied during the initial operating period. As a result, [deterioration of] the abnormality determination precision caused when a forced attempt is made to construct at least one of the plurality of inverse matrices A on the basis of a small number of grouped information sets can be avoided.

Note that up to this point, a printer for forming multi-color images known as full color images has been described, but the present invention may also be applied to a printer for forming monochrome images.

First, before describing the abnormality determining apparatus to which the present invention is applied, an example of an image forming apparatus serving as the detection subject of the abnormality determining apparatus will be described.

Figure 31:
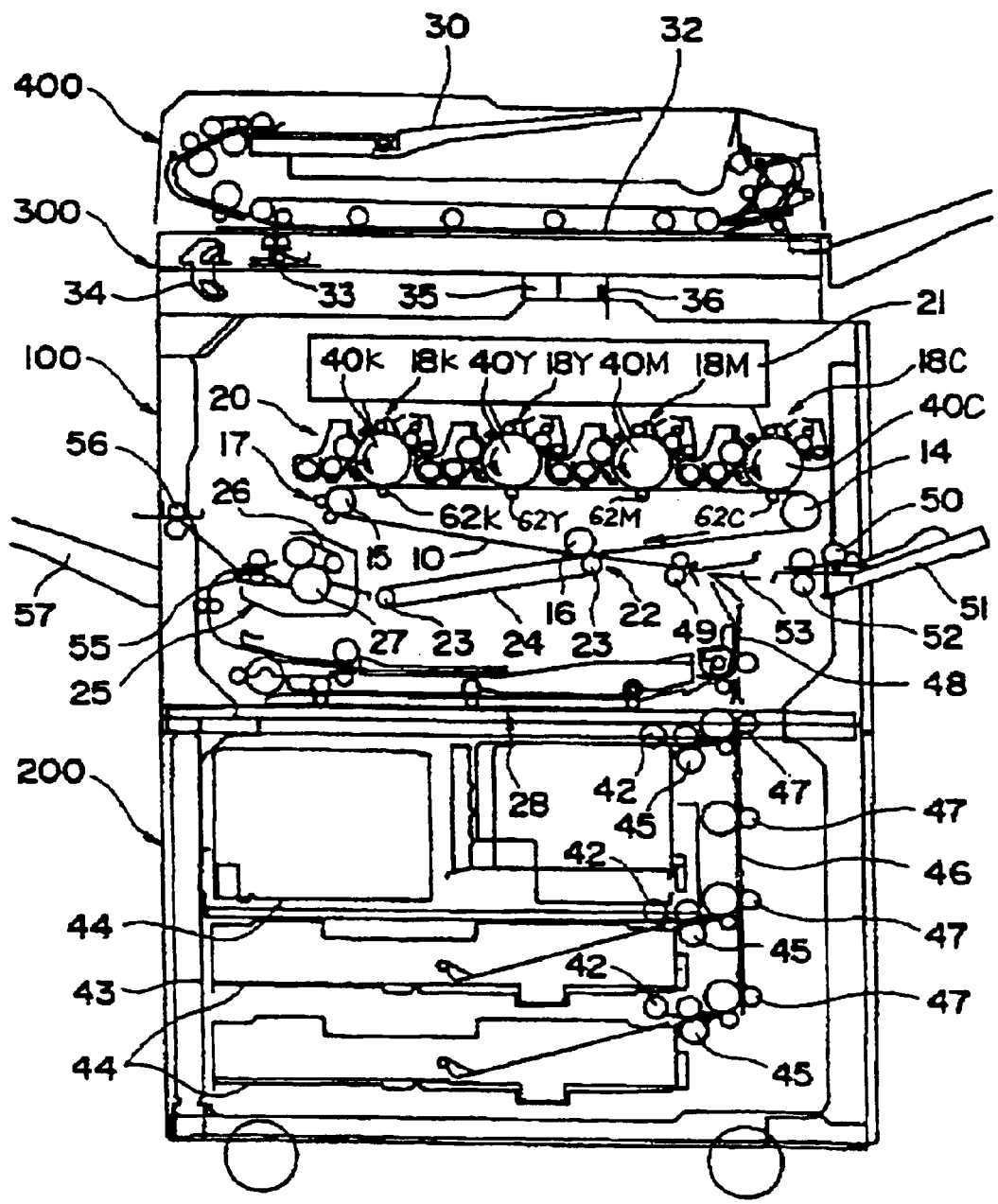
FIG. 31 is a view showing an outline of the constitution of the same copier, serving as an image forming apparatus which may serve as a detection subject of the abnormality determining apparatus to which the present invention is applied.

FIG. 31 is a schematic constitutional diagram showing a copier serving as an image forming apparatus which may be used as the detection subject of the abnormality determining apparatus to which the present invention is applied. The copier comprises image forming means constituted by a printer unit 100 and a paper feed unit 200, a scanner unit 300, and an original conveyance unit 400. The scanner unit 300 is attached to the top of the printer unit 100, and the original conveyance unit 400, constituted by an automatic document feeding device (ADF), is attached to the top of the scanner unit 300.

The scanner unit 300 reads the image information of an original placed on a contact glass 32 using a reading sensor 36, and transmits the read image information to a control unit not shown in the drawing. The control unit controls a laser, LED, or the like, not shown in the drawing, disposed within an exposure device 21 of the printer unit 100 on the basis of the image information received from the scanner unit 300 to irradiate four drum-shaped photosensitive bodies 40K, Y, M, C with laser recording light L. By means of this irradiation, an electrostatic latent image is formed on the surface of the photosensitive bodies 40K, Y, M, C. This latent image is then subjected to a predetermined developing process such that a toner image is developed. Note that the suffixes K, Y, M, C following the reference numerals indicate black, yellow, magenta, and cyan specifications.

In addition to the exposure device 21, the printer unit 100 comprises primary transfer rollers 62K, Y, M, C, a secondary transfer device 22, a fixing device 25, a paper discharge device, a toner supply device not shown in the drawing, and so on.

The paper feed unit 200 comprises an automatic paper feed portion disposed beneath the printer unit 100 and a manual paper feed portion disposed on the side face of the printer unit 100. The automatic paper feed portion comprises two paper cassettes 44 disposed one on top of the other inside a paper bank 43, feed rollers 42 for feeding transfer paper serving as a recording medium from the paper cassettes, a separation roller 45 for separating the fed transfer paper and conveying it to a feed path 46, and so on. Conveyance rollers 47 for conveying the transfer paper to a feed path 48 in the printer unit 100, and so on, are also provided. The manual paper feed portion comprises a manual paper feed tray 51, a separation roller 52 for separating the transfer paper on the manual paper feed tray 51 into single sheets and feeding the paper toward a manual feed path 53, and so on.

A pair of registration rollers 49 is disposed near the end of the feed path 48 of the printer unit 100. The registration roller pair 49 receive the transfer paper fed from the paper cassettes 44 or manual paper feed tray 51, and then, at a predetermined timing, feed the paper to a secondary transfer nip formed between an intermediate transfer belt 10 serving as an intermediate transfer body and a secondary transfer device 22.

When an operator wishes to make a copy of a color image on this copier, s/he sets the original on an original table 30 of the original conveyance unit 400. Alternatively, the operator opens the original conveyance unit 400 and sets the original on the contact glass 32 of the scanner unit 300, and then closes the original conveyance unit 400 so that the original is held down. The operator then presses a start switch not shown in the drawing. When the original is set on the original conveyance unit 400, the scanner unit 300 begins to operate after the original is conveyed to the contact glass 32, and when the original is set on the contact glass 32, the scanner unit 300 begins to operate immediately. A first traveling body 33 and a second traveling body 34 then move such that light emitted from a light source in the first traveling body 33 is reflected toward the second traveling body 34 from the surface of the original. This light is then further reflected by a mirror on the second traveling body 34 so as to pass through an image-forming lens 35 and enter a reading sensor 36. Thus the light is read as image information.

Once the image information has been read in this manner, a drive motor in the printer unit 100, not shown in the drawing, drives one of three support rollers 14, 15, 16 to rotate such that the other two support rollers are driven to rotate thereby. In so doing, an intermediate transfer belt 10 wrapped around the rollers is caused to perform an endless motion. Further, laser recording such as that described above and a development process to be described below are implemented. Monochrome images in black, yellow, magenta, and cyan are then formed on the photosensitive bodies 40K, Y, M, C as the photosensitive bodies 40K, Y, M, C rotate. These monochrome images are then superposed in succession at K, Y, M, and C primary transfer nips formed in locations where the photosensitive bodies 40K, Y, M, C contact the intermediate transfer belt 10, and thereby electrostatically transferred to form a four-color superposed toner image. The toner image is then formed on the photosensitive bodies 40K, Y, M, C.

Meanwhile, the paper feed unit 200 operates one of the three feed rollers such that transfer paper of a size corresponding to the image information is fed, and thus leads the transfer paper to the feed path 48 in the printer unit 100. Having entered the feed path 48, the transfer paper is halted temporarily between the registration roller pair 49, and then fed at an appropriate timing into the secondary transfer nip formed at the contact portion between the intermediate transfer belt 10 and a secondary transfer roller 23 of the secondary transfer device 22. The four-color superposed toner image on the intermediate transfer belt 10 and the transfer paper are then adhered together in synchronization at the secondary transfer nip. Then, as a result of the transfer electric field formed at the nip, nip pressure, and so on, the four-color superposed toner image is subjected to secondary transfer onto the transfer paper, where the toner image combines with the white of the paper to form a full color image.

Having passed through the secondary transfer nip, the transfer paper is conveyed to a fixing device 25 by the endless motion of a conveyor belt 24 of the secondary transfer device 22. The full color image is then fixed by the action of pressure applied by a pressure roller 27 of the fixing device 25 and heat applied by a heating belt, and then passes a discharging roller 56 to be discharged onto a discharge tray 57 provided on the side face of the printer unit 100.

Figure 32:
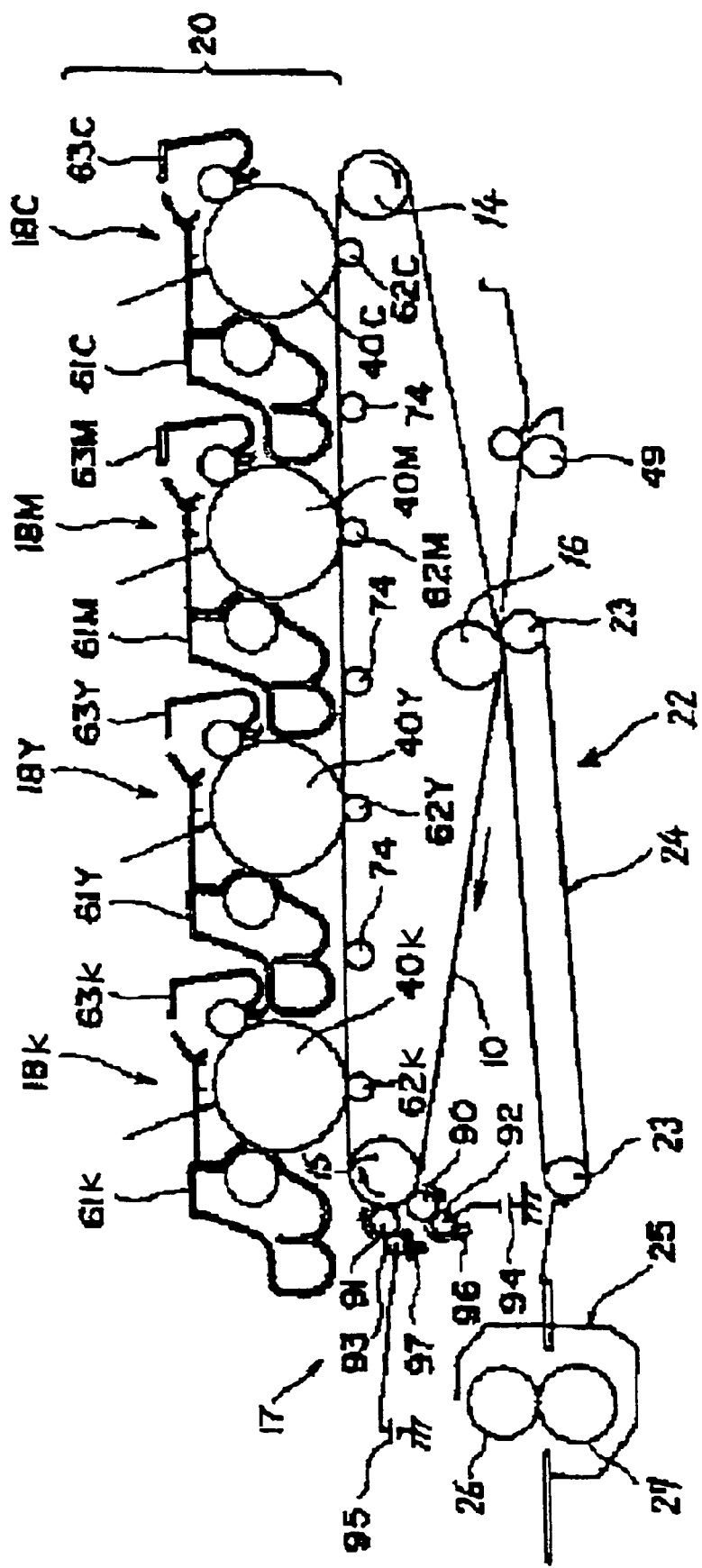
FIG. 32 is a view showing an outline of the constitution of a printer unit in the same copier.

FIG. 32 is an enlarged view of the printer unit 100. The printer unit 100 comprises a belt unit, four process units 18K, Y, M, C for forming toner images in each color, the secondary transfer device 22, a belt cleaning device 17, the fixing device 25, and so on.

The belt unit is caused to perform an endless motion while the intermediate transfer belt 10 wrapped around a plurality of rollers is caused to contact the photosensitive bodies 40K, Y, M, C. At the K, Y, M, C primary transfer nips where the photosensitive bodies 40K, Y, M, C contact the intermediate transfer belt 10, the intermediate transfer belt 10 is pushed toward the photosensitive bodies 40K, Y, M, C from the rear surface side thereof by the primary transfer rollers 62K, Y, M, C. A primary transfer bias is applied to the primary transfer rollers 62K, Y, M, C respectively by power sources not shown in the drawing. As a result, a primary transfer electric field which transfers the toner images formed on the photosensitive bodies 40K, Y, M, C electrostatically toward the intermediate transfer belt 10 is formed at the K, Y, M, C primary transfer nips. Conductive rollers 74 contacting the rear surface of the intermediate transfer belt 10 are disposed between each of the primary transfer rollers 62K, Y, M, C. These conductive rollers 74 prevent the primary transfer bias applied to the primary transfer rollers 62K, Y, M, C from flowing into the adjacent process unit via a medium resistance base layer 11 on the rear surface side of the intermediate transfer belt 10.

The process units 18K, Y, M, C are supported on a common carrier as a single unit comprising the photosensitive bodies 40K, Y, M, C and several other devices, and are removable from the print unit 100. The black process unit 18K, for example, comprises the photosensitive body 40K, and also a developing unit 61K serving as developing means for developing an electrostatic latent image formed on the surface of the photosensitive body 40K into a black toner image, a photosensitive body cleaning device 63K for cleaning residual toner adhered to the surface of the photosensitive body 40K after passing through the primary transfer nip, a neutralizing device, not shown in the drawing, for neutralizing the surface of the photosensitive body 40K after cleaning, a charging device, not shown in the drawing, for uniformly charging the surface of the photosensitive body 40K after neutralization, and soon. Apart from storing toner of different colors, the other color process units 18K, Y, M, C are constituted substantially identically. In this copier, the four process units 18K, Y, M, C are constituted in a so-called tandem form, disposed in series opposing the intermediate transfer belt 10 in the endless motion direction thereof.

Figure 33:
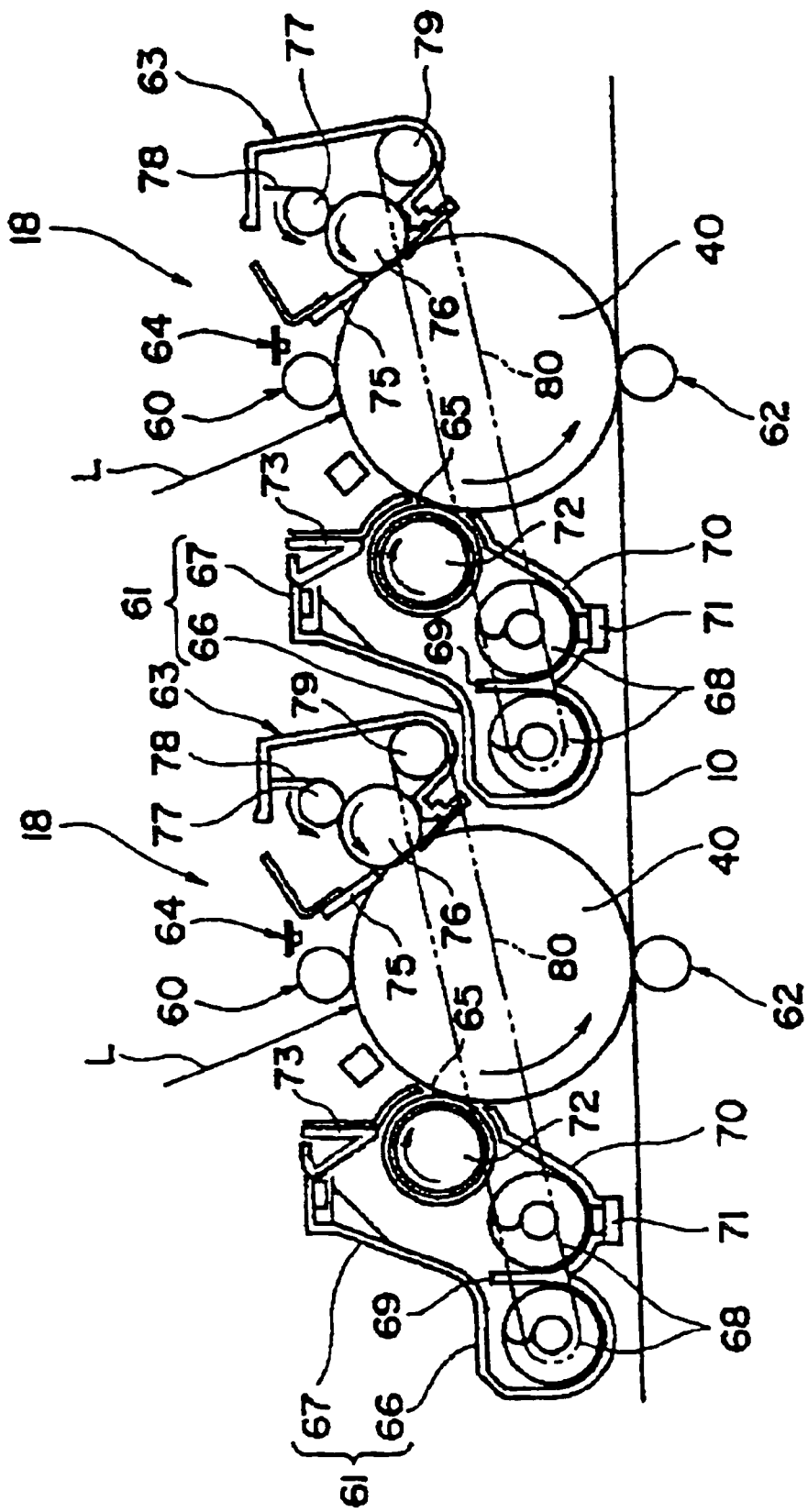
FIG. 33 is a partially enlarged view showing the constitution of a tandem unit in the same copier.

FIG. 33 is a partially enlarged view showing a part of a tandem portion 20 comprising the four process units 18K, Y, M, C. Note that apart from the color of the toner, the four process units 18K, Y, M, C are constituted substantially identically, and hence the suffixes K, Y, M, C have been omitted from the drawing. As shown in the drawing, the process units 18 comprise a charging device 60 serving as charging means, the developing device 61, the primary transfer roller 62 serving as primary transfer means, the photosensitive body cleaning device 63, a neutralizing device 64, and so on, disposed around the photosensitive body 40.

As the photosensitive body 40, a drum-shaped object constituted by an aluminum cylinder or the like coated with an organic photosensitive material having a photosensitive property to form a photosensitive layer is used. Note, however, that an object in the form of an endless belt may be used. As the charging device 60, an object which is rotated by causing a charging roller charged with a charging bias to contact the photosensitive body 40 is used. As corotron charger or the like, which performs charging processing in a state of non-contact with the photosensitive body 40 may be used.

The developing device 61 uses a two-component developer containing a magnetic carrier and a non-magnetic toner to develop latent images. The developing device 61 comprises an agitating unit 66 which supplies the two-component developer stored in the interior of the developing device 61 to a developing sleeve 65 by conveying and agitating the two-development toner simultaneously, and a developing unit 67 which transfers the toner of the two-component developer adhered to the developing sleeve 65 to the photosensitive bodies 40K, Y, M, C.

The agitating unit 66 is provided in a lower position than the developing unit 67, and comprises two screws 68 disposed in parallel, a partition plate provided between the two screws, a toner concentration sensor 71 provided on the bottom face of a developing case 70, and so on.

The developing unit 67 comprises the developing sleeve 65 opposing the photosensitive body 40 through an opening in the developing case 70, a magnet roller 72 provided in the interior of the developing sleeve 65 so as to be incapable of rotating, a doctor blade 73, the tip end of which approaches the developing sleeve 65, and so on. The gap between the doctor blade 73 and developing sleeve 65 is set at approximately 500 [μm] at its narrowest. The developing sleeve 65 has a sleeve-form which is capable of non-magnetic rotation. The magnet roller 72, which is constituted not to rotate with the developing sleeve 65, comprises five magnetic poles N1, S1, N2, S2, S3, for example, in the rotary direction of the developing sleeve 65 from the location of the doctor blade 73. These magnetic poles cause magnetic force to act on the two-component developer on the sleeve in predetermined positions in the rotary direction. As a result, the two-component developer transmitted from the agitating unit 66 is attracted to and carried on the surface of the developing sleeve 65, and a magnetic brush is formed on the surface of the sleeve along the line of magnetic force.

The magnetic brush is restricted to an appropriate layer thickness as it passes through the opposing position with the doctor blade 73 with the rotation of the developing sleeve 65, and is then conveyed to a developing region opposite the photosensitive body 40. The magnetic brush is then transferred onto the electrostatic latent image by the potential difference between the developing bias applied to the developing sleeve 65 and the electrostatic latent image on the photosensitive body 40, and thus contributes to development. The magnetic brush is then returned to the developing unit 67 as the developing sleeve 65 continues to rotate, where it is removed from the surface of the sleeve by the effect of a repulsive magnetic field between the magnetic poles on the magnetic roller 72, and returned to the agitating unit 66. In the agitating unit 66, the two-component developer is replenished with an appropriate amount of toner on the basis of the detection result of the toner concentration sensor 71. The developing sleeve 65 has a diameter of 18 [mm], for example, and the surface thereof is subjected to sandblast processing or processing to form a plurality of grooves having a depth of one to several mm such that the surface roughness (Rz) is approximately 10 to 30 [μm].

Note that instead of the two-component developer, a single-component developer which does not contain a magnetic carrier may be employed in the developing device 61. Further, in this copier the linear speed of the photosensitive body 40 is set at 200 [mm/sec], and the linear speed of the developing sleeve 65 is set at 240 [mm/sec]. The diameter of the photosensitive body 40 is set at 50 [mm], the thickness thereof is set at 30 [μm], the beam spot diameter of the optical system is set at 50×60 [μm], and the light quantity is set at 0.47 [mW]. The charging potential $V_0$ (before exposure) of the photosensitive body 40 is set at 700 [V], the post-exposure potential $V_L$ is set at −120 [V], and the developing bias voltage is set at −470 [V]. In other words, development is performed at a developing potential of 350 [V].

The charging amount of the toner on the developing sleeve 65 is preferably within a range of −10 to −30 [μC/g]. The developing gap between the photosensitive body 40 and developing sleeve 65 may be set within a conventional range of 0.8 to 0.4 [mm], but by reducing this value, the developing efficiency can be improved.

A system whereby a polyurethane rubber cleaning blade 75 is pressed against the photosensitive body 40 is used as the photosensitive body cleaning device 63, but another system may be employed. In this copier, to improve cleanability, the cleaning device 63 comprises a contact conductive fur brush 76, the outer peripheral surface of which contacts the photosensitive body 40 and which is rotatable in the direction of the arrow in the drawing. A metallic electrostatic roller 77 for applying a bias to the fur brush 76 is provided rotatably in the direction of the arrow in the drawing, and the tip end of a scraper 78 is pressed against the electrostatic roller 77. The toner that is removed from the electrostatic roller 77 by the scraper 78 drops onto a collection screw 79 and is thus collected.

The photosensitive body cleaning device 63 constituted in this manner removes residual toner from the photosensitive body 40 using the fur brush 76 rotating in a counter direction to the photosensitive body 40. The toner which adheres to the fur brush 76 is removed by the electrostatic roller 77 which is applied with a bias and rotates in the counter direction to the fur brush 76 while contacting the fur brush 76. The toner which adheres to the electrostatic roller 77 is cleaned by the scraper 78. The toner which gathers in the photosensitive body cleaning device 63 is moved to one side of the photosensitive body cleaning device 63 by the collecting screw 79, returned to the developing device 61 by a toner recycling device 80, and reused.

The neutralizing device 64 is constituted by a neutralizing lamp or the like which emits light in order to remove the surface potential of the photosensitive body 40. Having been neutralized in this manner, the surface of the photosensitive body 40 is uniformly charged by the charging device 60, and then subjected to optical recording processing.

The secondary transfer device 22 is provided below the belt unit in the drawing. The secondary transfer device 22 is caused to perform an endless motion by wrapping the secondary transfer belt 24 around the two rollers 23. One of the two rollers 23 serves as a secondary transfer roller that is charged with a secondary transfer bias by a power source not shown in the drawing. This secondary transfer roller 23 sandwiches the intermediate transfer belt 10 and secondary transfer belt 24 between itself and the roller 16 of the belt unit. Thus the two belts move in the same direction whie contacting each other at the contact portion, thereby forming a secondary transfer nip. By means of a secondary transfer electric field and nip pressure, the four color superposed toner image on the intermediate transfer belt 10 is subjected to secondary transfer onto the transfer paper that is conveyed to the secondary transfer nip from the registration roller pair 49, thus forming a full color image. Having passed through the secondary transfer nip, the transfer paper is separated from the intermediate transfer belt 10 and carried on the surface of the secondary transfer belt 24 to the fixing device 25 as the belt performs its endless motion. Note that secondary transfer may be performed by a transfer charger or the like instead of the secondary transfer roller.

After passing through the secondary transfer nip, the surface of the intermediate transfer belt 10 reaches the support position of the support roller 15. Here, the intermediate transfer belt 10 is interposed between the belt cleaning device 17 which contacts the front surface (outer loop surface) of the belt, and the support roller 15 which contacts the rear surface. The residual toner adhered to the front surface is removed by the belt cleaning device 17, whereupon the belt enters the K, Y, M, C primary transfer nips in succession so that the next four color toner image can be superposed.

The belt cleaning device 17 comprises two fur brushes 90, 91 as cleaning members. These fur brushes 90, 91 each have a diameter of 20 [mm], are constituted by a plurality of acrylic carbon filaments filled into a rotary core at a density of 6.25 [D/F, 100,000/inch$^2$], and exhibit an electric resistance of approximately $1 \times 10^7$ [Ω]. The fur brushes 90, 91 wipe residual toner from the belt mechanically by having the plurality of filaments rotate in a counter direction to the filling direction of the filaments while contacting the intermediate transfer belt 10. The wiped residual toner is also attracted electrostatically and collected by applying a cleaning bias using a power source not shown in the drawing.

Metallic rollers 92, 93 rotate in a forward direction or reverse direction to the fur brushes 90, 91 while contacting the fur brushes 90, 91 respectively. Of the two metallic rollers 92, 93, a negative voltage is applied to the metallic roller 92 positioned at the upstream side in the direction of rotation of the intermediate transfer belt 10 by a power source 94, whereas a positive voltage is applied to the metallic roller 93 positioned at the downstream side by a power source 95. The tip ends of blades 96, 97 contact the metallic rollers 92, 93 respectively. By means of this constitution, while the intermediate transfer belt 10 performs an endless motion in the direction indicated by an arrow in the drawing, the upstream side fur brush 90 cleans the surface of the intermediate transfer belt 10. At this time, if −700 [V], for example, are applied to the metallic roller 92 and −400 [V] are applied to the fur brush 90, first the positive polarity toner on the intermediate transfer belt 10 is transferred electrostatically to the fur brush 90 side. The toner transferred to the fur brush 90 side is then transferred to the metallic roller 92 due to the potential difference, and is scraped off the metal roller 17b by the blade 96.

A lot of toner is left on the intermediate transfer belt 10 even after the upstream fur brush 90 has removed the toner from the intermediate transfer belt 10 in the manner described above. This toner is charged to negative polarity by the negative bias applied to the fur brush 90. This is presumably based on charge injection or discharge. Next, the downstream fur brush 91 is used to perform cleaning by applying a positive bias, and thus the remaining toner can be removed. The removed toner is transferred to the metallic roller 93 from the fur brush 91 by the potential difference, and scraped off by the blade 97. The toner scraped off by the blades 96, 97 is collected in a tank not shown in the drawing.

Although most of the toner is removed from the surface of the intermediate transfer belt 10 by this cleaning performed by the fur brush 91, a little toner still remains. The remaining toner on the intermediate transfer belt 10 is charged to a positive polarity by the positive bias applied to the fur brush 91 as described above. This toner is transferred to the side of the photosensitive bodies 40K, Y, M, C by a transfer electric field applied at the primary transfer position, and collected by the photosensitive body cleaning device 63.

Although the registration roller pair 49 is, in many cases, grounded, a bias may be applied in order to remove paper dust on the transfer paper P. A conductive rubber roller, for example, is used to apply the bias. The roller may have a diameter of 18 [mm], and be covered with conductive NBR rubber having a thickness of 1 [mm]. The electric resistance is equivalent to the volume resistivity of approximately $10 \times 10^9$ [Ω×cm]. A voltage of about −800 [V] is applied to the side on which the toner is transferred. A voltage of about +200 [V] is applied to the rear surface side of the paper.

Generally, in the intermediate transfer system, paper dust cannot easily move to the photosensitive bodies, and hence the transfer of paper dust does not have to be taken into account. Therefore, the registration roller pair 49 may be grounded. The voltage is generally applied as a DC bias, but may be applied as an AC voltage containing a DC offset component in order to charge the transfer paper P more evenly. Thus the transfer paper, having passed through the registration roller pair 49 applied with a bias in this manner, is charged slightly to the negative side. Accordingly, during transfer from the intermediate transfer belt 10 to the transfer paper P, the transfer conditions may vary from those when no voltage is applied to the registration roller pair 49.

Note that in this copier, a transfer paper turning device 28 (see FIG. 31) is provided below the secondary transfer device 22 and fixing device 25 in parallel with the aforementioned tandem portion 20. Thus the transfer paper, having finished image fixing processing on one side, is turned over using a switching claw to switch the path of the transfer paper to the transfer paper turning device side, and returned to the secondary transfer nip. Secondary transfer processing and fixing processing are then implemented on the other side of the transfer paper, whereupon the transfer paper is discharged onto the paper discharge tray.

Figure 34:
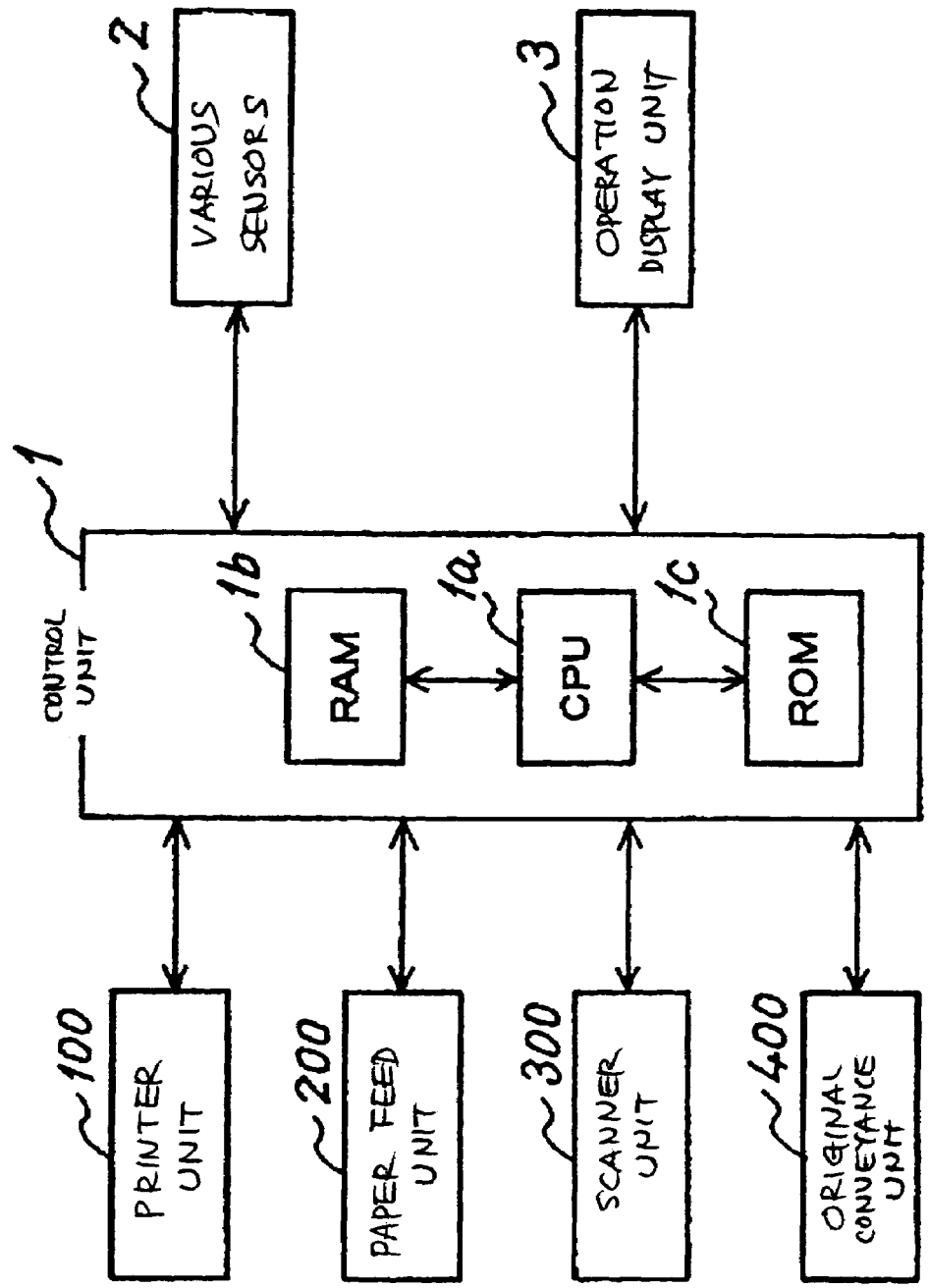
FIG. 34 is a block diagram showing the constitution of a part of an electric circuit in the same copier.

Further, this copier comprises information obtaining means for obtaining various information relating to the condition of the constitutional components of the copier and phenomena occurring in the interior of the copier. These information obtaining means are constituted by a control unit 1, various sensors 2, an operation display device 3, and so on, shown in FIG. 34. The control unit 1 serves as control means for controlling the entire copier, and comprises ROM 1*c* serving as information storage means storing a control program, RAM 1*b* serving as information storage means for storing calculation data, control parameters, and the like, a CPU 1*a* serving as calculation means, and so on. The operation display unit 3 comprises a display unit, not shown in the drawing, constituted by a liquid crystal display or the like for displaying written information and the like, an operating unit, not shown in the drawing, for receiving input information from an operator through a keypad or the like, and transmitting this input information to the control unit 1. The information that can be obtained by the information obtaining means constituted in this manner includes sensing information, control parameter information, input information, image reading information, and so on.

Next, the various information that can be obtained by the information obtaining means in an image forming apparatus such as a copier will be described in detail.

(a) Sensing Information

The items that may be obtained as sensing information include driving relationships, various characteristics of the recording medium, developer characteristics, photosensitive body characteristics, various electrophotographic process conditions, environmental conditions, and various characteristics of the recorded object. This sensing information will be described in outline below.

(a-1) Driving Information Includes:

detecting the rotation speed of the photosensitive drum using an encoder, reading the current value of the drive motor, reading the temperature of the drive motor;

similarly detecting the driving conditions of cylindrical or belt-form rotary components such as the fixing rollers, paper conveyance rollers, and drive rollers; and detecting sound generated by driving using a microphone installed in the interior of the device or outside of the device.

(a-2) Paper Conveyance Conditions Include:

reading the position of the front end/rear end of the conveyed paper using a transmission type or reflection type optical sensor, or a contact type sensor, detecting the occurrence of a paper jam, and reading deviations in the transmission timing of the front end/rear end of the paper, or variation in a perpendicular direction to the conveyance direction;

similarly determining the traveling speed of the paper by means of the detection timing of a plurality of sensors; and determining slippage between the feed roller and the paper during paper feeding by comparing a measured value of the roller rotation speed and the travel of the paper.

(a-3) Various Characteristics of a Recording Medium Such as Paper

This information greatly affects the image quality and sheet conveyance stability. The following methods are used to obtain information relating to the paper type:

the paper thickness is determined by fixing the paper between two rollers and detecting the relative positional displacement of the rollers using an optical sensor or the like, or detecting an equal displacement to the travel of a member that is pushed upward when the paper is introduced;

the surface roughness of the paper is determined by causing a guide or the like to contact the surface of the paper prior to transfer, and detecting the oscillation, sliding sound, or the like produced by this contact;

the gloss of the paper is determined by irradiating luminous flux of a prescribed angle of aperture at a prescribed angle of incidence, and measuring the luminous flux of a prescribed angle of aperture that is reflected in a specular reflection direction using a sensor;

the rigidity of the paper is determined by detecting the amount of deformation (curvature) of a pressed piece of paper;

a determination as to whether or not the paper is recycled paper is performed by irradiating the paper with ultraviolet light and detecting its transmittivity;

a determination as to whether or not the paper is backing paper is performed by irradiating the paper with light from a linear light source such as an LED array, and detecting the light reflected from the transfer surface using a solid state imaging element such as a CCD;

a determination as to whether or not the paper is OHP paper is performed by irradiating the paper with light, and detecting regular reflected light having a different angle to that of the transmitted light;

the moisture content of the paper is determined by measuring the absorption of infrared light or μ wave light;

the curl is detected using an optical sensor, contact sensor, or similar;

the electric resistance of the paper is determined by causing a pair of electrodes (feed rollers or the like) to contact the recording paper and measuring the electric resistance directly, or measuring the surface potential of the photosensitive body or intermediate transfer body following transfer, and estimating the resistance value of the recording paper from the measured value.

(a-4) Developer Characteristics

The characteristics of the developer (toner/carrier) in the device fundamentally affect the electrophotographic process function, and are therefore an important factor in the operation and output of the system. It is vital to obtain information regarding the developer. The following items may be cited as examples of developer characteristics.

Regarding the toner, the charging amount and distribution, fluidity, cohesion, bulk density, electric resistance, external additive amount, consumption amount or remaining amount, fluidity, and toner concentration (mixing ratio of toner and carrier) may be cited as characteristics.

Regarding the carrier, the magnetic property, coating thickness, spent amount, and so on may be cited as characteristics.

Note that it is usually difficult to detect these items individually in the interior of the image forming apparatus. Therefore, it is preferable to detect an overall characteristic of the developer. The overall characteristic of the developer may be measured in the following ways, for example:

a test latent image is formed on the photosensitive body, developed under predetermined developing conditions, and the reflection density (optical reflectance) of the formed toner image is measured;

a pair of electrodes is provided in the developing device, and the relationship between the applied voltage and current (resistance, permittivity, and so on) is measured;

a coil is provided in the developing device, and the voltage-current characteristic (inductance) is measured;

a level sensor is provided in the developing device, and the developer volume is detected. The level sensor may be an optical sensor, a capacitance sensor, or similar.

(a-5) Photosensitive Body Characteristics

Similarly to the developer characteristics, the photosensitive body characteristics relate closely to the electrophotographic process function. Examples of information regarding the photosensitive body characteristics include the photosensitive film thickness, the surface characteristics (coefficient of friction, irregularities), surface potential (before and after each process), surface energy, scattered light, temperature, color, surface position (deflection), linear speed, potential attenuation speed, resistance/capacitance, surface moisture content, and so on. From among these examples, the following information can be detected within the image forming apparatus.

Variation in the capacitance accompanying film thickness variation can be detected by detecting the current flowing from a charging member to the photosensitive body, and simultaneously comparing the voltage applied to the charging member with the voltage-current characteristic of a preset dielectric thickness of the photosensitive body to determine the film thickness.

The surface potential and temperature can be determined by a well-known sensor.

The linear speed is detected by an encoder or the like attached to a rotary shaft of the photosensitive body.

Scattered light from the surface of the photosensitive body is detected by an optical sensor.

(a-6) State of the Electrophotographic Process

As is well-known, toner image formation through electrophotography is performed by a succession of processes comprising: uniform charging of the photosensitive body; latent image formation (image exposure) by means of laser light or the like; development using toner (coloring particles) carrying an electric charge; transfer of the toner image onto a transfer material (in the case of a color image, this is performed by superposing toner onto an intermediate transfer body or the recording medium, which is the final transfer body, or by means of superposition development onto the photosensitive body during development); and fixing of the toner image on the recording medium. The various information at each of these stages greatly affects the image and other system output. It is important to obtain this information in order to evaluate the stability of the system. Specific examples of ways in which information relating to the state of the electrophotographic process is obtained are as follows:

the charging potential and exposure unit potential are detected by a well-known surface potential sensor;

the gap between the charging member and photosensitive body during non-contact charging is detected by measuring the amount of light passing through the gap;

the electromagnetic wave caused by charging is perceived by a wideband antenna;

the sound generated by charging;

the exposure intensity; and the exposure optical wavelength.

(a-7) Formed Toner Image Characteristics

The pile height (height of the toner image) is detected by measuring depth from the vertical direction using a displacement sensor, and measuring shielding length from the horizontal direction using a parallel ray linear sensor.

The toner charging amount is measured by a potential sensor which measures the potential of an electrostatic latent image on a solid portion, and measures the potential when the latent image has been developed, and determined from the ratio thereof to an adhesion amount calculated by a reflection density sensor in the same location.

Dot fluctuation or scattering is determined by detecting a dot pattern image using an infrared light area sensor on the photosensitive body and area sensors of wavelengths corresponding to each color on the intermediate transfer body, and then implementing appropriate processing.

The offset amount (after fixing) is read by sensors in locations corresponding to the surface of the recording paper and the surface of the fixing roller respectively, and determined by comparing the two obtained sensor values.

The remaining transfer amount is determined by disposing an optical sensor after the transfer step on the PD and the belt) and measuring the amount of reflected light from the remaining transfer pattern following the transfer of a specific pattern.

Color unevenness during superposition is detected by a full color sensor which detects the surface of the recording paper following fixing.

Image density and color are detected optically (by either reflected light or transmitted light; the projection wavelength is selected according to the color). To obtain density and single color information, this detection may be performed on the photosensitive body or intermediate transfer body, but to measure a color combination, such as color unevenness, the detection must be performed on the paper.

Gradation is determined using an optical sensor by detecting the reflection density of a toner image formed on the photosensitive body or a toner image transferred onto a transfer body at each gradation level.

Definition is detected using a monocular sensor with a small spot diameter or a high resolution line sensor by reading a developed or transferred image to determine a repeated line pattern.

Graininess (sense of roughness) is determined by the same method used to detect the definition, by reading a halftone image and calculating the noise component.

Resist skew is determined by providing an optical sensor at each end of the main scanning direction after the resist, and measuring the difference between the ON timing of the registration roller and the detection timing of the two sensors.

Mis-color registration is detected at the edge portions of a superposed image on the intermediate transfer body or recording paper by a monocular small-diameter spot sensor or a high resolution line sensor.

Banding (density unevenness in the conveyance direction) is detected by measuring density unevenness in the sub scanning direction of the recording paper using a small-diameter spot sensor or a high resolution line sensor, and measuring the signal quantity at a specific frequency.

Glossiness (unevenness) is detected by providing a piece of recording paper formed with a uniform image so as to be scanned by a regular reflection-type optical sensor.

Fogging is detected using a method of reading an image background portion using an optical sensor for scanning a comparatively wide region on the photosensitive body, intermediate transfer body, or recording paper, or a method of obtaining image information for each area of the background region using a high resolution area sensor, and counting the number of toner particles in the image.

(a-8) Physical Characteristics of Printed Objects in the Image Forming Apparatus Image deletion/fading and so on is determined by scanning a toner image on the photosensitive body, intermediate transfer body, or recording paper using an area sensor, and subjecting the obtained image information to image processing.

Scattering is determined by scanning an image on the recording paper using a high resolution line sensor or an area sensor, and calculating the amount of toner scattered around the periphery of the pattern portion.

Rear end blank spots and betacross blank spots are detected by a high resolution line sensor on the photosensitive body, intermediate transfer body, or recording paper.

Curling, rippling, and folding are detected by a displacement sensor. It is effective to dispose a sensor in a location near to the two end parts of the recording paper to detect folding.

Contamination and flaws on the cross-cut surface are detected by an area sensor provided vertically in a delivery tray by capturing an image of and analyzing the cross-cut surface when a certain amount of delivered paper has accumulated.

(a-9) Environmental Conditions

To detect temperature, a thermocouple system which extracts as a signal a thermoelectromotive force generated at a contact point joining two different metals or a metal and a semiconductor, a resistivity variation element using temperature-based variation in the resistivity of a metal or semiconductor, a pyroelectric element in which, with a certain type of crystal, the charge in the crystal is polarized with an increase in temperature to generate a surface potential, a thermomagnetic effect element which detects change in magnetic property according to temperature, and so on may be employed.

To detect humidity, an optical measurement method for measuring the optical absorption of $H_2O$ or an OH group, a humidity sensor which measures variation in the electric resistance value of a material due to water vapor adsorption, and so on may be employed.

Various gases are detected by measuring change in the electric resistance of an oxide semiconductor basically accompanying gas adsorption.

To detect airflow (direction, flow speed, gas type), an optical measurement method or the like may be used, but an air-bridge type flow sensor which, when installed in the system, is capable of reducing the size of the system, is particularly useful.

To detect air pressure and pressure, methods such as using a pressure sensitive material to measure the mechanical displacement of a membrane may be employed. Similar methods may be used to detect oscillation.

(b) Control Parameter Information

An operation of the image forming apparatus is determined by the control unit, and hence it is effective to use the input/output parameters of the control unit directly.

(b-1) Image Formation Parameters

These are direct parameters output as a result of calculation processing performed by the control unit for the purpose of image formation, such as the following:

set values of the process conditions set by the control unit, for example the charging potential, developing bias value, fixing temperature set value, and so on;

similarly, set values of various image formation parameters for halftone processing, color correction, and so on;

various parameters set by the control unit to operate the device, for example the paper conveyance timing, the execution period of a preparatory mode prior to image formation, and so on.

(b-2) User Operating History

Frequency of various operation selected by user such as number of colors, number of sheets, and image quality instruction.

Frequency of paper size set by user.

(b-3) Power Consumption

The total power consumption over the entire period or a specific time unit (one day, one week, one month, etc.), or the distribution, variation (derivative), and cumulative value (integral) thereof.

(b-4) Information Regarding Consumption of Consumables

Usage of the toner, photosensitive body, and paper over the entire period or a specific time unit (one day, one week, one month, etc.), or the distribution, variation (derivative) and cumulative value (integral) thereof.

(b-5) Information Regarding the Occurrence of a Fault

The frequency with which a fault occurs (by type) over the entire period or a specific time unit (one day, one week, one month, etc.), or the distribution, variation (derivative), and cumulative value (integral) thereof.

(c) Input Image Information

The following information can be obtained from image information transmitted from a host computer as direct data or image information obtained after being read from an original image by a scanner and subjected to image processing.

The cumulative number of color pixels is determined by counting image data by GRB signal for each pixel.

Using a method such as that described in the aforementioned Japanese Patent Publication No. 2621879, for example, an original image can be divided into characters, halftone dots, photographs, and background, and thus the ratio of the character portion, halftone portion, and so on can be determined. The ratio of colored characters can be determined in a similar manner.

By counting the cumulative value of the color pixels in each of a plurality of regions partitioned in the main scanning direction, the toner consumption distribution in the main scanning direction can be determined.

The image size is determined according to image size signals generated by the control unit or the distribution of color pixels in the image data.

The character type (size, font) is determined from the attribute data of the characters.

The various information cited above can be obtained by well-known techniques in a typical image forming apparatus. The information obtaining means of the copier described up to this point are capable of obtaining at least the information described in the following sections (1) to (12).

(1) Temperature

The copier comprises a temperature sensor using a resistance variation element to obtain temperature information due to the simple principles and constitution of the resistance variation element and the possibility of reducing the element to an extremely small size.

(2) Humidity

A humidity sensor which can be reduced to a small size is useful. The basic principles thereof are that water vapor is adsorbed to a moisture-sensitive ceramic, and that ion conduction increases due to the adsorbed water such that the electric resistance of the ceramic decreases. The moisture-sensitive ceramic material is a porous material such as an alumina-based ceramic, apatite-based ceramic, $ZrO_2$—MgO based ceramic, or similar.

(3) Oscillation

The oscillation sensor is basically the same as a sensor which measures air pressure and pressure, and a sensor using silicon, which can be reduced to an extremely small size and installed in the system easily, is particularly useful. The motion of an oscillator manufactured on a thin silicon diaphragm can be measured by measuring volumetric change between the oscillator and a counter electrode provided opposite the oscillator, or using the piezoresistance effect of the Si diaphragm itself.

(4) Toner Concentration (for Four Colors)

The toner concentration is detected for each color. A known sensor may be used as the toner concentration sensor. For example, the toner concentration may be detected using a sensing system disclosed in Japanese Unexamined Patent Application Publication H6-289717, which measures variation in the magnetic permeability of the developer in a developing device.

(5) Photosensitive Body Uniform Charging Potential (for Four Colors)

The uniform charging potential is detected in the photosensitive bodies 40K, Y, M, C of each color using a well-known potential sensor or the like.

(6) Post-Development Potential of Photosensitive Body (for Four Colors)

The surface potential of the photosensitive bodies 40K, Y, M, C following optical recording is detected in the same manner as that described in (5) above.

(7) Colored Area Ratio (for Four Colors)

The colored area ratio is determined for each color from the ratio of the total cumulative value of the pixels to be colored and the total cumulative value of all of the pixels, which is learned from the input image information.

(8) Development Toner Amount (for Four Colors)

The toner adhesion amount per unit area on each of the toner images developed on the photosensitive bodies 40K, Y, M, C is determined on the basis of the optical reflectance produced by a reflection photosensor. The reflection photosensor irradiates a physical object with LED light, and detects the reflected light using a light-receiving element. A correlative relationship is established between the toner adhesion amount and the optical reflectance, and hence the toner adhesion amount can be determined on the basis of the optical reflectance.

(9) Slanting of Paper Front End Position

A pair of optical sensors is disposed at a point on the paper feeding path from the feed roller of a paper feeding portion 200 to the secondary transfer nip to detect the transfer paper at both ends of an orthogonal direction to the conveyance direction, and thus the two ends of the conveyed transfer paper in the vicinity of the front end thereof are detected. The two optical sensors are used to measure the time required for the paper to pass through, using the time at which a feed roller drive signal is issued as a reference, and slanting of the transfer paper in relation to the conveyance direction is determined on the basis of a difference in this time.

(10) Paper Discharge Timing

The transfer paper is detected by an optical sensor after passing through a pair of discharge rollers (see 56 in FIG. 31). Similarly in this case, measurement is performed with the time at which the feed roller drive signal is issued as a reference.

(11) Photosensitive Body Total Current (for Four Colors)

The current flowing out to an earth from the photosensitive bodies 40K, Y, M, C is detected. This current can be detected by providing current measuring means between the photosensitive body substrate and the ground terminal.

(12) Drive Power of Photosensitive Body (for Four Colors)

The drive power (current×voltage) consumed by the drive source (motor) of the photosensitive bodies during driving is detected by an ammeter, a voltmeter, and so on.

Third Embodiment

Next, a third embodiment of the abnormality determining apparatus to which the present invention is applied will be described.

First, the basic constitution of the abnormality determining apparatus according to the third embodiment will be described. The abnormality determining apparatus is used to determine the presence of an abnormality in the interior of the copier described up to this point, which serves as a detection subject.

Figure 35:
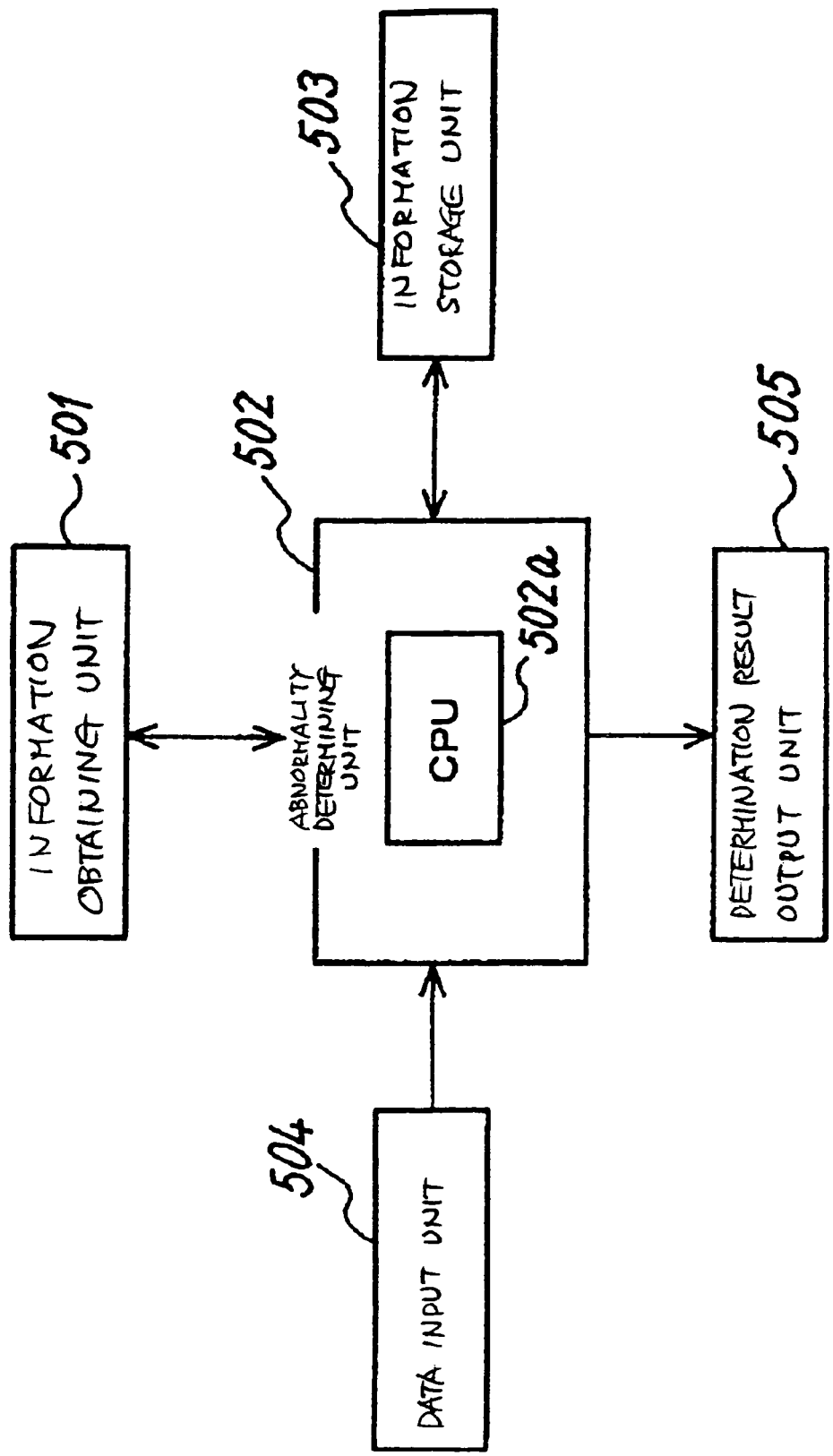
FIG. 35 is a block diagram showing the constitution of the main parts of an electric circuit in an abnormality determining apparatus according to a third embodiment of the present invention.

FIG. 35 is a block diagram showing the main parts of an electric circuit in the abnormality determining apparatus according to the third embodiment. In the diagram, the abnormality determining apparatus comprises an information obtaining unit 501 serving as information obtaining means for obtaining information about an object, an abnormality determining unit 502 serving as abnormality determining means, an information storage unit 503 serving as information storage means, a data input unit 504 serving as data input means, and so on. A determination result output unit 505 serving as determination result outputting means for outputting the result of a determination performed by the abnormality determining means is also provided.

The information obtaining unit 501 obtains the information of (1) to (12) from the copier, not shown in the drawing, serving as the detection subject. The information of (1) to (12) obtained by the information obtaining unit 501 is transmitted to the abnormality determining unit 502. The abnormality determining unit 502 comprises calculation means (a CPU 501a in the illustrated example) for performing various calculations required to determine an abnormality. Hence the information transmitted from the information obtaining unit 501 is used as is in the calculation processing for determining an abnormality, or used after being stored in the information storage unit 503. More specifically, predetermined calculations are implemented on the basis of the information of (1) to (12) transmitted from the information obtaining unit 501, and the presence of an abnormality in the copier is determined on the basis of the result of a comparison between the calculation result and a predetermined threshold stored in the information storage unit 503.

The result of the determination performed by the abnormality determining unit 502 is output by the determination result output unit 505. This output may be output as characters to be recognized by a user of the copier, output as an image display, audio output, and so on, and also includes a mode in which determination result information is output to an external device such as a personal computer or printer. By means of this output, the result of the determination performed by the abnormality determining unit 502 is recognized by the user of the copier, a remote serviceperson, or similar. Note that the information obtaining unit 501 is constituted by RAM, ROM, a hard disk, or similar, and that a control program and information such as algorithms, for example, are stored as well as the various information obtained by the information obtaining unit 501. The data input unit 504 receives data input for storing the threshold, to be described below, in the information storage unit 503, and transmits the threshold data received in this manner to the information storage unit 503 via the abnormality determining unit 502.

Next, the characteristics constitution of the abnormality determining apparatus according to the third embodiment will be described.

The abnormality determining unit 502 is constituted to determine a general abnormality comprising a plurality of types of abnormality, and the plurality of individual abnormalities constituting this general abnormality, as an abnormality in the copier. More specifically, three abnormalities relating to a paper jam, deterioration of the photosensitive bodies, and variation in the image density are determined respectively as the plurality of individual abnormalities. The general abnormality includes these three individual abnormalities.

When determining the three individual abnormalities, an individual abnormality threshold corresponding to each individual abnormality is read from the information storage unit 503 and compared with the aforementioned calculation result. These individual abnormality thresholds are stored in the information storage unit 503 by means of data input through the data input unit 504 serving as data input means.

In the abnormality determining apparatus constituted in this manner, the presence of the individual abnormalities is determined only when the general abnormality including the three individual abnormalities is detected, and hence complicated control required to confirm the presence or absence of each individual abnormality upon each determination can be avoided. Moreover, when the general abnormality is detected, a specification is made as to which of the three individual abnormalities included in the general abnormality has been detected. By means of this specification, the maintenance response following detection of the general abnormality can be prevented from becoming too complicated.

Also in the abnormality determining apparatus, the three individual abnormality thresholds used respectively to determine the three individual abnormalities are set initially by a serviceperson or user and updated by the user through an input operation performed on the data input means. By means of this initial setting and updating, the individual abnormalities can be determined with a degree of precision suited to each individual user.

This abnormality determining apparatus may be constituted integrally with the copier serving as the detection subject to function as a part of the copier, or may be constituted separately to the copier to determine the presence of an abnormality on the basis of the information of (1) to (12) transmitted from the copier.

Figure 36:
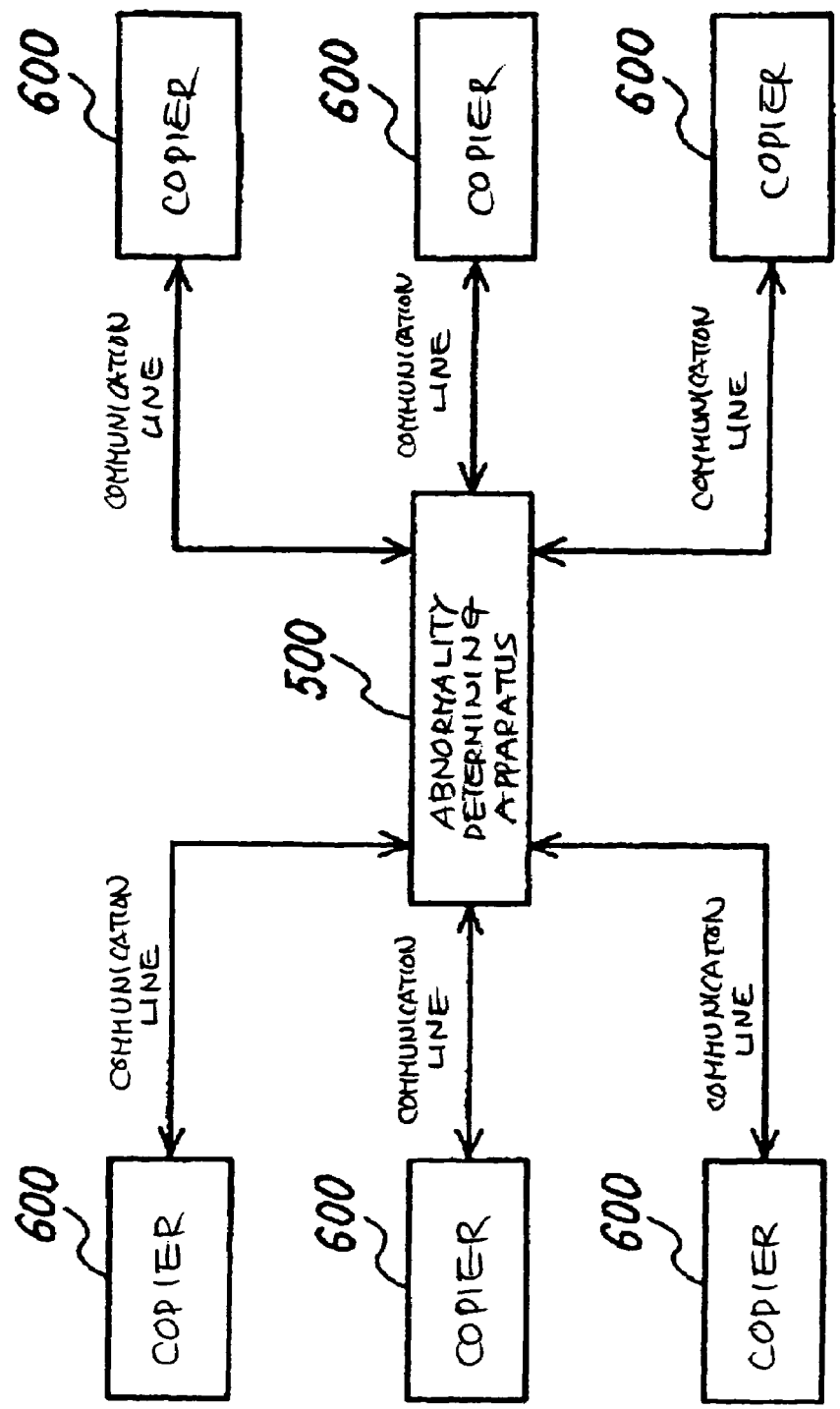
FIG. 36 is a connection diagram showing an example in which the same abnormality determining device is constituted separately to the same copier.
Figure 37:
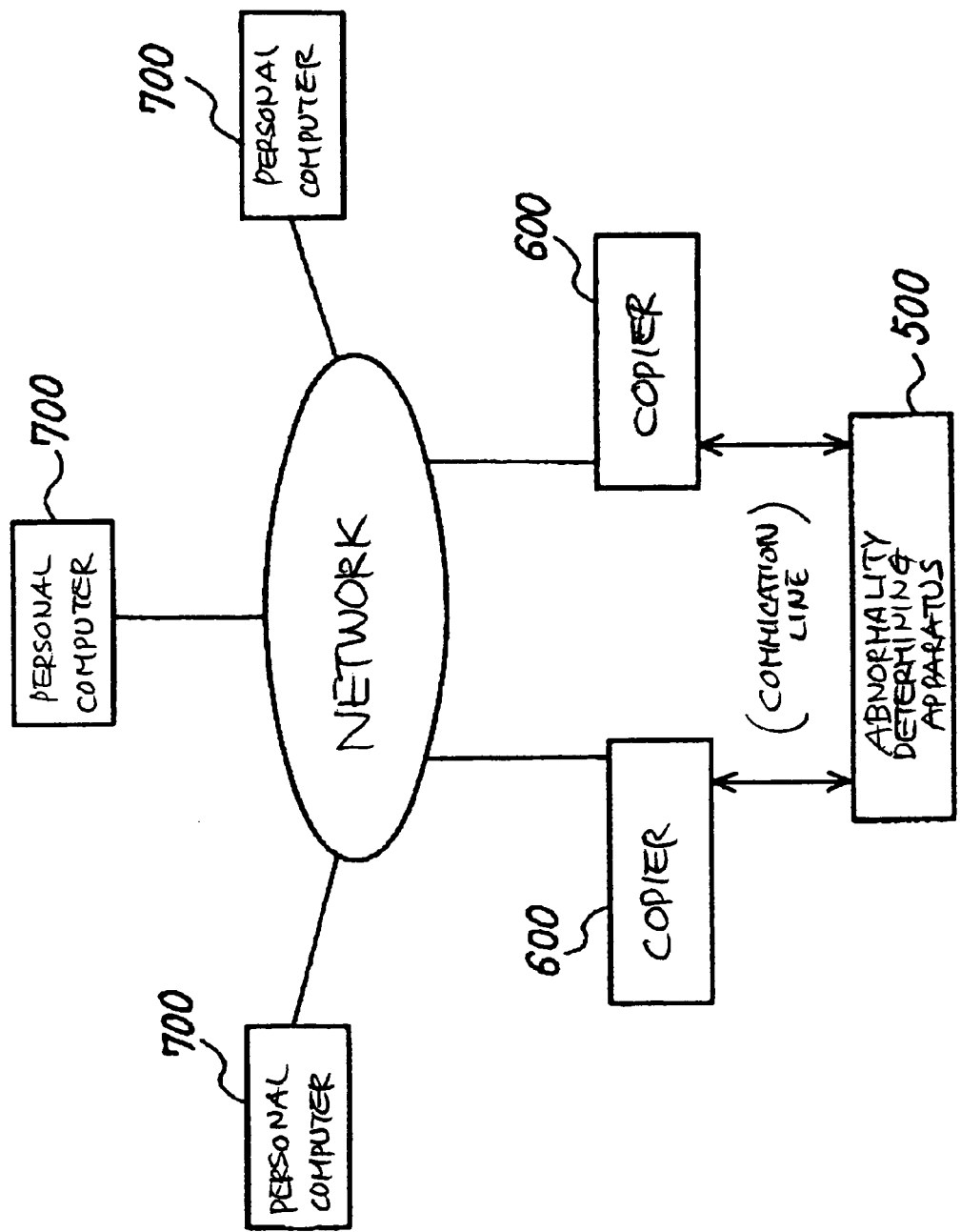
FIG. 37 is a connection diagram showing another example in which the same abnormality determining device is constituted separately to the same copier.

In the latter case, that is when the abnormality determining apparatus is constituted separately from the copier, a plurality of copiers 600 can be managed together using a remote single abnormality determining apparatus 500, as shown in FIG. 36. Further, as shown in FIG. 37, a plurality of the copiers 600 connected to a plurality of personal computers 700 on a network such as an in-house LAN or the Internet can be managed together with a single abnormality determining apparatus 500 via a communication line. When performing general management of this type, if the data input portion 504 is constituted to receive data input regarding the individual abnormality thresholds transmitted over the communication line, then data regarding the individual abnormality thresholds can be input into the abnormality determining apparatus by a user in a remote location. Further, if the determination result output unit 505 is constituted to output the determination result over the communication line, then the determination result can be transmitted to various copiers disposed in different remote locations, and thus notify the respective users of the determination result. The communication line may be wired or wireless, may use optical fiber as well as electric lines, and may take any form. Note that when the abnormality determining apparatus is constituted separately from the copier, the information obtaining means comprising the control unit, various sensors, operation density unit (1, 2, 3 in FIG. 34), and so on do not function as the information obtaining unit 501 of the abnormality determining apparatus. Instead, reception means for receiving various information transmitted from the copier over the wired or wireless communication line function as the information obtaining unit 501 of the abnormality determining apparatus.

Figure 38:
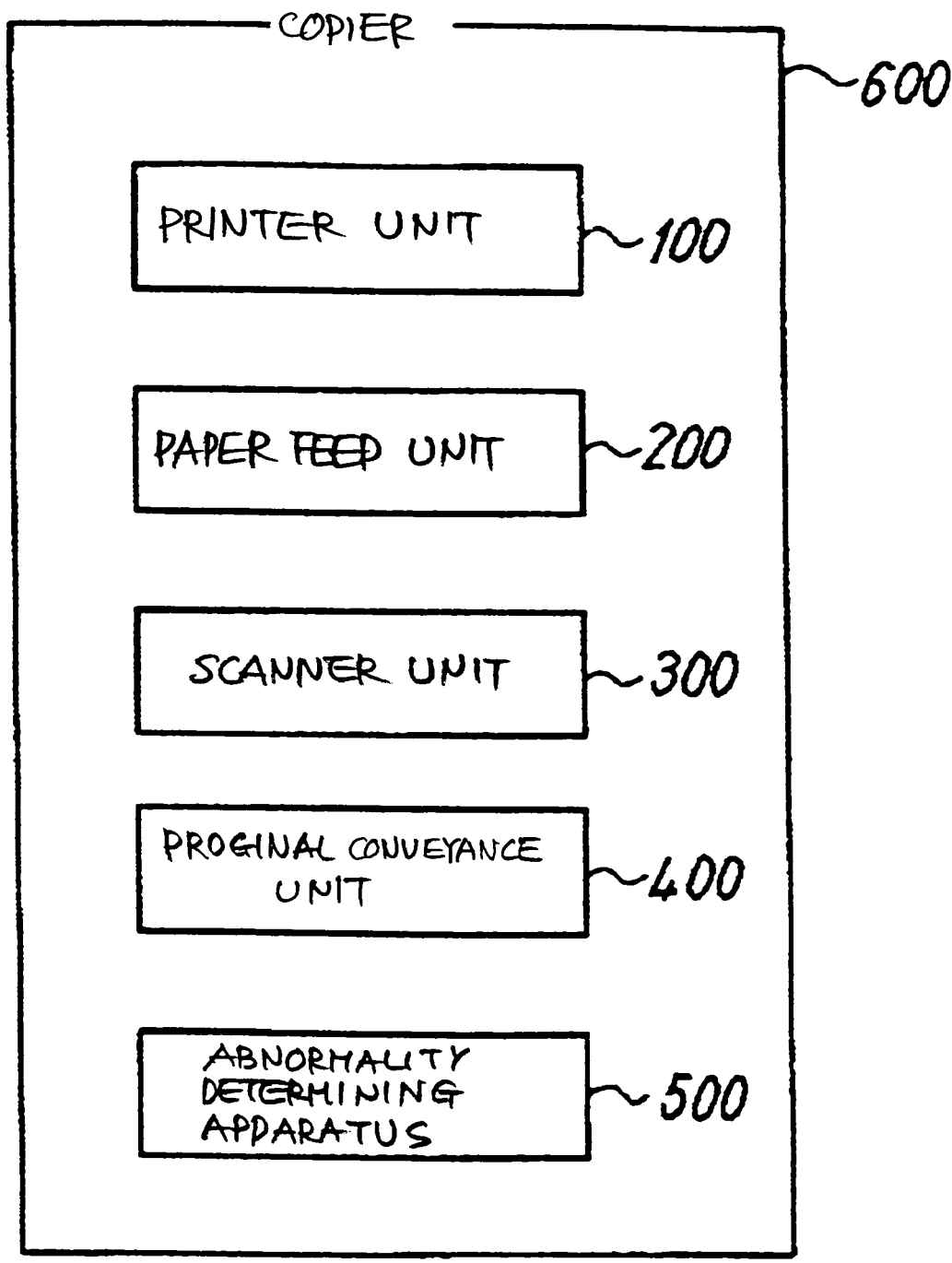
FIG. 38 is a view showing an example in which the same abnormality determining device is constituted integrally with the same copier.

In the former case, on the other hand, that is when the abnormality determining apparatus 500 is constituted integrally with the copier 600 to function as a part of the copier 600, as shown in FIG. 38, the information obtaining means of the copier 600 also function as the information obtaining means of the abnormality determining apparatus 500. More specifically, the information obtaining means comprising the control unit 1, various sensors 2, operation density unit 3, and so on, shown in FIG. 34, function as the information obtaining unit 501 of the abnormality determining apparatus. In this case, the control unit 1 of the copier may double as the abnormality determining unit (502 in FIG. 35) and the information storage unit (503 in FIG. 35) of the abnormality determining apparatus. Furthermore, the operation display unit 3 of the copier may double as the data input unit (504 in FIG. 35) and determination result output unit (505 in FIG. 35) of the abnormality determining apparatus. If the determination result output unit is constituted to output determination results via a communication line, a remote repair service organization can be notified of an abnormality in the copier automatically.

As described above, the abnormality determining apparatus may be constituted integrally with or separately from the copier. In the following, however, an example in which the abnormality determining apparatus is constituted integrally with the copier will be described.

The abnormality determining apparatus determines the presence of the general abnormality and individual abnormalities described above by determining a Mahalanobis distance using an MTS method on the basis of grouped information comprising the plurality of types of information (1) to (12) obtained by the information obtaining unit 501. To realize this determination, a normal group data set obtained in advance is stored in the information storage unit 503. The abnormality determining unit 502 determines the Mahalanobis distance on the basis of the normal group data set and the grouped information comprising all, or a partial combination of, the information of (1) to (12).

To determine the Mahalanobis distance, the normal group data set and an inverse matrix thereof must be constructed before determining the presence of an abnormality. The aforementioned FIG. 49 shows an obtained data table used in a normal data obtaining process performed to construct the normal group data set on the basis of the information of (1) to (12) obtained from the copier in a normal state. In this obtained data table, an example is illustrated in which n sets of grouped information comprising k types of information are obtained. Note that the process of obtaining the information (1) to (12) that is performed in this normal data obtaining process is not an information obtaining process performed in order to determine an abnormality, but simply a process performed to construct the normal group data set. The information obtaining process performed to determine an abnormality is implemented when the normal group data set has been constructed as a result of this normal data obtaining process.

The normal data obtaining process is performed by obtaining from the copier, which is operated in a normal state, a plurality of combinations of the information of (1) to (12) as normal grouped information. A standard device for obtaining a single normal group data set common to a plurality of finished copiers to be shipped from the factory may be used as the copier from which the data is to be obtained, or each of the finished copiers may be operated to obtain individual and unique normal group data sets.

In the normal data obtaining process, first, k types of information $y_{11}$, $y_{12}$, . . . , $y_{1k}$, constituting a first set of grouped information, are obtained respectively by the information obtaining means of the copier, and stored in the obtained data table of FIG. 49 as data on the first row of the table. Next, k types of information $y_{21}$, $y_{22}$, . . . , $y_{2k}$, constituting a second set of grouped information, are obtained respectively by the information obtaining means, and stored in the obtained data table as data on the second row of the table. The third group to the nth set of grouped information are then obtained similarly and stored in the obtained data table as data on the third row to the nth row of the table. Finally, the average and standard deviation σ of the respective n groups are determined for the k types of information constituting each set of grouped information, and stored in the obtained data table as data on the n+1 and n+2 rows. Thus the data in the constructed obtained data table are used as the normal group data set.

Once the normal data obtaining process is complete, an information normalization process is implemented to construct a normalized data table. FIG. 50 shows a normalized data table constructed in this information normalization process. This normalized data table is constructed on the basis of the obtained data table shown in FIG. 49.

Data normalization refers to processing for transforming absolute value information of the various information into variable information. The normalized data of the various information is calculated on the basis of the above equation (2).

Once this information normalization process is complete, a correlation coefficient calculation process is performed. In the correlation coefficient calculation process, a correlation coefficient $r_{pq}$ ($r_{pq}$) is calculated on the basis of the above equation (3) for all possible combinations ($_kC_2$ variants) of two different types of the k types of normalized data in the n groups of normalized data sets.

When the correlation coefficient $r_{pq}$ ($r_{pq}$) has been calculated for all of the combinations, k×k correlation coefficient matrices R having 1 as its diagonal element and the the correlation coefficient $r_{pq}$ as the remaining elements of the rows p and columns q. The content of the correlation coefficient matrix R is as shown in the above equation (4).

Once this correlation coefficient calculation process is complete, a matrix transformation process is implemented. By means of this matrix transformation process, the correlation coefficient matrix R shown in the above equation (4) is transformed into an inverse matrix A ($R^{-1}$) shown in the above equation (5).

Figure 39:
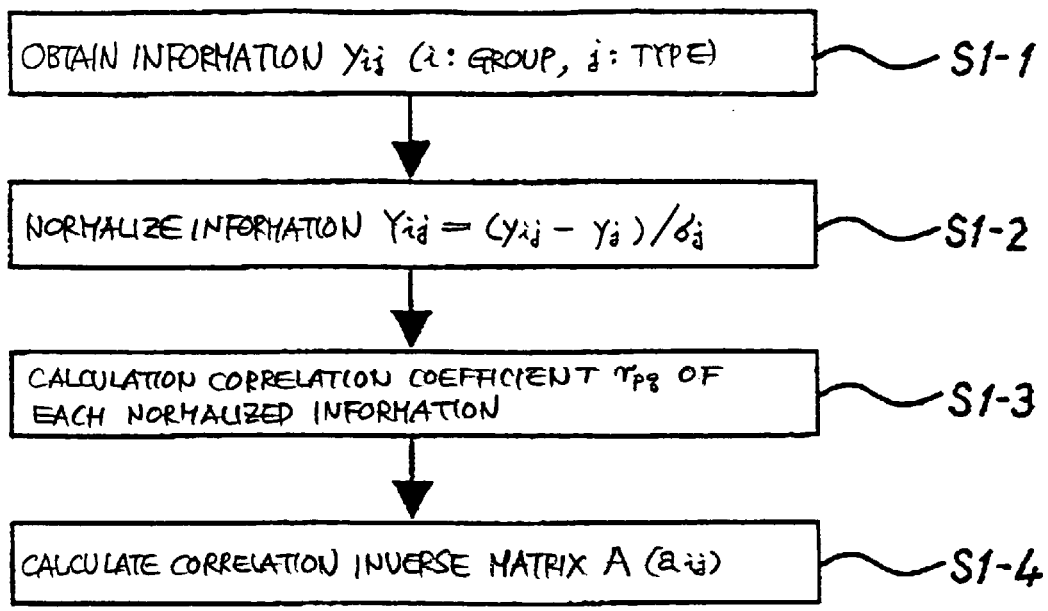
FIG. 39 is a flowchart showing a series of processes for constructing an inverse matrix, from a normal data obtaining process to a matrix transformation process.

FIG. 39 is a flowchart showing the series of processes from the normal data obtaining process to the matrix transformation process. In the flowchart, first n groups of k pieces of information relating to the condition of the copier are obtained (step 1-1: hereafter, step will be abbreviated to S). Next, an average value and standard deviation σ are calculated on the basis of the above relation expression (7) for each type (j) of information, and a normalized data table is constructed from the calculation results (S1-2). The correlation coefficient matrix R is then constructed on the basis of the normalized data table (S1-3), and then transformed into the inverse matrix A (S1-4).

The inverse matrix A is constructed by this series of processes comprising the normal data obtaining process, information normalization process, correlation coefficient calculation process, and matrix transformation process. All or apart of these processes may be implemented by the abnormality determining apparatus. When all of the processes are implemented, there is no need to pre-store the normal group data set in the information storage means of the copier during factory shipment. Instead, the information of (1) to (12) can be obtained as normal grouped information during an initial operating period, in which an abnormality is highly unlikely to occur, and the normal group data set and inverse matrix A can be constructed from this information. Directly after shipment, the copier is in a newly-finished, normal state, and hence the obtained results of the various information obtained during the initial operating period may be treated as normal values. When any one of the series of processes described above is not implemented by the abnormality determining apparatus, the inverse matrix A must be stored in the information storage means of the copier during factory shipment. In this case, the pre-stored inverse matrix A may be constituted by an inverse matrix common to each finished copier which is constructed on the basis of a normal group data set obtained from the aforementioned standard device, or individual inverse matrices may be constructed by obtaining individual normal group data sets from each finished copier. Note that the normal group data set may be pre-stored such that the abnormality determining apparatus can implement transformation of the inverse matrix A from the normal group data set.

As noted above, a common normal group data set for each finished copier, which is obtained from a standard device, may be used, or each finished copier may be operated individually to obtain unique normal group data sets. In the latter case, variation among finished products in the normal values of the various information used to determine an abnormality, caused by precision errors in the various components and so on, can be avoided, thus preventing deterioration of the determination precision. Moreover, by constituting the abnormality determining apparatus so as to obtain the normal group data set during the initial operating period after factory shipment, cost increases due to the labor required to test run the finished products at the factory prior to shipment in order to obtain the respective normal group data sets can be avoided.

Regardless of the manner in which the normal group data set is obtained, the inverse matrix A constructed as described above is stored in the information storage unit 503 of the abnormality determining apparatus during abnormality determination. The abnormality determining unit 502 then calculates the Mahalanobis distance D on the basis of all of the grouped information, comprising all of the information of (1) to (12) obtained by the information obtaining unit 501, the inverse matrix A, and the aforementioned equation (6).

Figure 40:
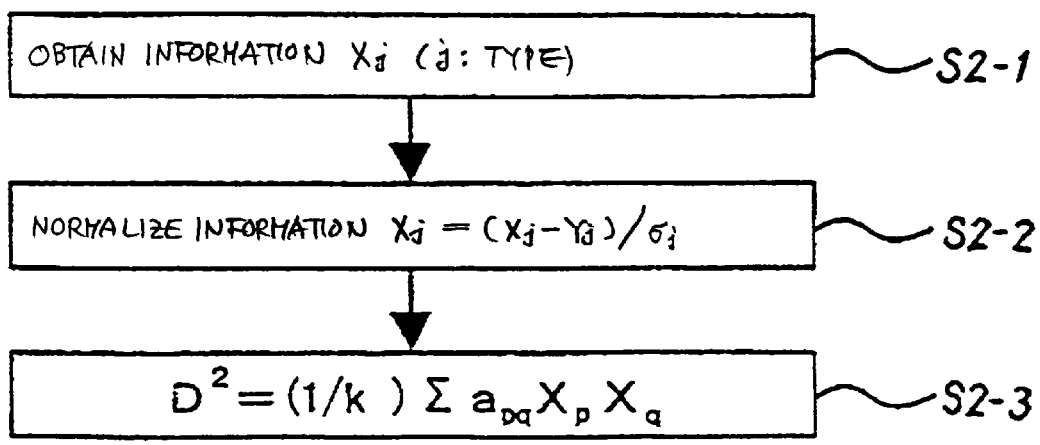
FIG. 40 is a flowchart showing a procedure for calculating a Mahalanobis distance D.

FIG. 40 is a flowchart showing a procedure for calculating the Mahalanobis distance D. In this procedure, first k types of data $x_1, x_2, \ldots, x_k$ in any condition are obtained (S2-1). The data types correspond to $y_{11}, y_{12}, \ldots, y_{1k}$, and so on. Next, the obtained data are normalized respectively to $X_1, X_2, \ldots, X_k$ on the basis of the relation expression (7). Then, using the aforementioned equation (6), which is determined using the element $a_{kk}$ of the constructed inverse matrix A, the square of the Mahalanobis distance D is calculated. The symbol $\Sigma$ in the drawing denotes the sum relating to the suffixes p and q. Note that in the copier, the information of (1) to (12) is obtained, but since the information in (4) to (8), (11), and (12) is obtained for the four colors (four types), the k in $x_k$ equals 5+7×4=33 [types].

The abnormality determining unit 502 determines the presence of a general abnormality by comparing the Mahalanobis distance D for the all-type grouped information (grouped information constituted by 33 types of information) determined in this manner with the general abnormality threshold. As the Mahalanobis distance D increases beyond [1], the detected data move further away from a normal state. When the Mahalanobis distance D exceeds the general abnormality threshold, it is determined that a general abnormality is "present".

When it is determined that a general abnormality is present, the abnormality determining apparatus determines the presence of the three individual abnormalities (paper jam, photosensitive body deterioration, image density variation) included in the general abnormality, respectively. FIG. 52 is a table showing an example of a relationship between the various individual abnormalities in the copier and the grouped information required to determine their presence.

As shown in FIG. 52, an abnormality relating to a paper jam can be determined on the basis of grouped information comprising the following 7 items and 13 types of information from among the 12 items and 33 types (5 items+7 items×four colors) of information from (1) to (12): (1) temperature; (2) humidity; (3) oscillation; (7) colored area ratio×four colors; (8) development toner amount×four colors; (9) slanting of paper front end position; and (10) paper discharge timing. Hereafter, this grouped information will be referred to as first grouped information.

An abnormality relating to deterioration of the photosensitive body can be determined on the basis of grouped information comprising the following 7 items and 22 types of information: (1) temperature; (2) humidity; (5) uniform charging potential of the photosensitive body×four colors; (6) potential of the photosensitive body after exposure×four colors; (7) colored area ratio×four colors; (11) total current of photosensitive body×four colors; and (12) drive power of photosensitive body×four colors. Hereafter, this grouped information will be referred to as second grouped information.

An abnormality relating to variation in the image density can be determined on the basis of grouped information comprising the following 7 items and 22 types of information: (1) temperature; (2) humidity; (4) toner concentration×four colors; (5) uniform charging potential of the photosensitive body×four colors; (6) potential of the photosensitive body after exposure×four colors; (7) colored area ratio×four colors; and (8) development toner amount×four colors. Hereafter, this grouped information will be referred to as third grouped information.

As is clear from FIG. 52, the first, second, and third group information each have a different combination of information. This is due to the fact that the information required to determine an abnormality differs according to the type of abnormality. By determining the Mahalanobis distance D for each of the first, second, and third grouped information in the example in FIG. 52, the type of abnormality can be narrowed down. Hence when the abnormality determining apparatus determines the presence of a general abnormality, the Mahalanobis distance D of each of the first, second, and third grouped information is determined. By comparing the respective determined Mahalanobis distances D with the individual abnormality thresholds, the presence of an abnormality relating to a paper jam, deterioration of the photosensitive body, and variation in the image density is determined. Note that the values of the individual abnormality thresholds for determining the individual abnormalities relating to a paper jam, deterioration of the photosensitive body, and variation in the image density typically differ from the value of the general abnormality threshold. Accordingly, the three Mahalanobis distances D determined on the basis of the first, second, and third grouped information respectively are compared to the corresponding individual abnormality threshold relating to a paper jam, deterioration of the photosensitive body, and variation in the image density.

To determine the three Mahalanobis distances D, inverse matrices A having the same combinations as the first, second, and third grouped information obtained from the copier must be constructed. In FIG. 52, for example, if a common inverse matrix A comprising the 12 items and 33 types (5 items+7 items×four colors) of information is used in common for all of the first, second, and third group information, abnormalities cannot be determined accurately. In the case of the first grouped information, the Mahalanobis distance D must be determined using an inverse matrix A comprising the same 7 items and 13 types of information.

Therefore, inverse matrices A for determining the Mahalanobis distance D in each category must be prepared prior to determination.

There are two main methods of preparing the inverse matrix A for the respective grouped information. In the first method, unique inverse matrices A are constructed for each set of grouped information. In the second method, the inverse matrix A is stored only for the all-type grouped information comprising all of the types of information included in each set of grouped information. When this method is used, the individual inverse matrices A for the first, second, and third grouped information are constructed respectively on the basis of an arbitrary combination of normal values selected from the inverse matrix A constituted by the collection of all-type grouped information. In FIG. 52, for example, only the inverse matrix A constituted by the collection of all-type grouped information (12 items, 33 types) is stored. The inverse matrix A constituted by the collection of first grouped information corresponding to a paper jam is then constructed by selecting 7 items and 13 types of information from the all-type grouped information. With this method, the amount of information to be stored in the information storage unit 503 can be reduced, compared with the first method.

Note that an example has been described in which both the general abnormality and the individual abnormalities are determined on the basis of the Mahalanobis distance D. However, the individual abnormalities may be determined using a calculation result other than the Mahalanobis distance D.

In this abnormality determining apparatus, a serviceperson or user inputs the three individual abnormality thresholds relating to a paper jam, deterioration of the photosensitive body, and image density variation into the data input unit 504 in accordance with the user information, and hence the serviceperson or user is capable of performing initial setting and updating of these thresholds. Examples of the user information reflected in the three individual abnormality thresholds include the copier maintenance proficiency and degree of fault perception. The reason for reflecting this information in the individual abnormality thresholds is as described above. Other examples of user information that may be reflected in the individual abnormality thresholds include the intended use of the copier, the industry sector, the department, the relationship between paper size and usage frequency, and the relationship between the type of output image and output frequency. Naturally, the required image quality, and therefore the user's degree of fault perception, differ when the intended use of the copier is to produce a written product such as an instruction manual, and when the intended use is to create a personal printout, test-print an image, and so on. It is also possible for a fault to be perceived or not depending on the paper size, regardless of personal differences. For example, when the vicinity of the end part of a drum-form photosensitive body is damaged, the resulting image disturbance occurs near the end portion of comparatively large paper, but does not occur on comparatively small paper. Hence, this type of image disturbance is more likely to be perceived by a user who uses comparatively large paper frequently, regardless of personal differences. Further, deterioration of the image quality is more likely to be perceived on a photographic image than a text image, regardless of personal differences, and hence image quality deterioration is more likely to be perceived by a user who outputs photographic images frequently. By reflecting the intended use of the copier, the industry sector, the department, the relationship between paper size and usage frequency, and the relationship between the type of output image and the output frequency in the three individual abnormality thresholds, the individual abnormalities can be detected with a precision corresponding to each individual user.

An examples of a method for reflecting user information in the thresholds is multiplication of a coefficient corresponding to the user information by a standard threshold. This standard threshold is determined on the basis of a typical user (a user with a typical level of proficiency and so on). FIG. 53 shows an example of a standard threshold relating to the three individual abnormality thresholds relating to a paper jam, deterioration of the photosensitive body, and variation in the image density.

The standard threshold shown in FIG. 53 is merely one example thereof, and the value that is actually set is not limited thereto. Moreover, an example is shown in which the standard threshold increases in succession of deterioration of the photosensitive body, paper jam, and variation in the image density, but the actual succession is not limited thereto.

FIG. 54 shows an example of the relationship between the proficiency level, serving as user information, and the threshold coefficient.

In FIG. 54, as the proficiency level rises from low, to medium, to high, the threshold coefficient increases from "0.9", to "1.0", to "1.2". The reason for this is as follows. As the value of the Mahalanobis distance D increases, so does the extent of the abnormality. Accordingly, as the individual abnormality threshold that is compared to the Mahalanobis distance D decreases, the abnormality is detected more acutely. Meanwhile, as the proficiency level of the user rises, even when the extent of the abnormality stays the same, it is more unlikely that a request for repairs will be issued. Therefore, to match the abnormality detection precision to each individual user, the individual abnormality thresholds must be increased so that an abnormality is less likely to be detected as the proficiency level of the user rises. Hence the threshold coefficient to be multiplied by the individual abnormality threshold rises from "0.9", to "1.0", to "1.2" as the proficiency level increases from low, to medium, to high.

FIG. 55 shows an example of the relationship between the degree of fault perception, serving as user information, and the threshold coefficient.

In FIG. 55, the threshold coefficient decreases from "1.2", to "1.0", to "0.8" as the degree of fault perception increases from low, to medium, to high. The reason for this is as follows. As noted above, an abnormality is detected more acutely as the individual abnormality threshold to be compared to the Mahalanobis distance D decreases. Meanwhile, as the user's degree of fault perception rises, even when the extent of the abnormality stays the same, it is more likely that a request for repairs will be issued. Therefore, to match the abnormality detection precision to each individual user, the individual abnormality thresholds must be decreased so that an abnormality is more likely to be detected as the user's degree of fault perception rises. Hence the threshold coefficient to be multiplied by the individual abnormality threshold decreases from "1.2", to "1.0", to "0.8" as the degree of fault perception rises from low, to medium, to high.

FIG. 56 shows an example of the relationship between the industry sector and department of the user, and the threshold coefficient.

When the industry sector of the user is printing-related and the department of the user is production-related, it is highly likely that the intended use of the copier will be to produce written materials. It is therefore highly likely that the user will have an acute perception of decreases in image quality and increases in the frequency of paper jams. Hence in FIG. 56, the threshold coefficient is set to a minimum value of "0.8" in this case.

FIG. 57 shows a relationship between the type of output image, the output frequency, and the threshold coefficient.

An abnormality in the image quality (variation in the image density, for example) typically becomes more likely to be perceived in order of written documents, drawings, advertising leaflets, and photographs, regardless of personal differences among users in the degree of perception. Hence a user who outputs written documents more often than other types of images is less likely to perceive an abnormality in the image quality, regardless of personal differences. In contrast, a user who outputs photographs more often than other types of images is more likely to perceive an abnormality in the image quality. Therefore, in the example in FIG. 57, the threshold coefficients are set in consideration of the output frequency order of the four types of images comprising written documents, drawings, advertising leaflets, and photographs, and the order in which abnormalities are perceived in these four types of images. For example, an abnormality in the image quality is least likely to be perceived, regardless of personal differences, when written documents, drawings, advertising leaflets, and photographs are printed with a decreasing order of output frequency. In this case, the threshold coefficient takes a value of "1.00", which is lower than all of the other output frequency orders. Conversely, an abnormality in the image quality is most likely to be perceived, regardless of personal differences, when photographs, advertising leaflets, drawings, and written documents are printed with a decreasing order of output frequency. In this case, the threshold coefficient takes a value of "1.50", which is higher than all of the other output frequency orders.

As described above, by reflecting user information in the individual abnormality thresholds (relating to a paper jam, deterioration of the photosensitive body, variation in the image density), the individual abnormalities can be detected with a precision corresponding to each individual user.

As well as user information, it is desirable that information regarding the environment in which the copier is placed be reflected in the individual abnormality thresholds (relating to a paper jam, deterioration of the photosensitive body, and variation in the image density). The reason for this is as follows. Even when the calculation result of the Mahalanobis distance D stays the same, it is possible for the degree of perception of an abnormality to vary according to the environment, regardless of personal differences. For example, even when the calculation result of the Mahalanobis distance D stays the same, paper jams may occur more or less frequently depending on the humidity of the environment in which the copier is used. In such a case, inappropriate notification of the occurrence of an abnormality due to a varying degree of abnormality perception depending to the environment, regardless of personal differences, can be prevented by setting the individual abnormality thresholds in accordance with information relating to the environment of the copier.

When an old copier is replaced with a new one due to circumstances such as the old copier reaching the end of its life span, the individual abnormality thresholds (relating to a paper jam, deterioration of the photosensitive body, and variation in the image density) in the new copier are preferably set initially to the same values as those of the individual abnormality thresholds used in the old copier. The reason for this is as follows. Initial setting of the individual abnormality thresholds rarely results in values which are perfectly suited to the user at that time, and hence it is preferable that the individual abnormality thresholds be gradually updated to appropriate values in accordance with the degree of abnormality perception and so on of the user by means of repeated abnormality detection. By updating the individual abnormality thresholds in this manner, when an old copier is replaced with a new one, the individual abnormality thresholds used in the old copier are updated to values which are more suited to the user than the initially set values, and are therefore highly likely to approach the requirements of the user. If the old individual abnormality thresholds are not employed in the new copier, and values which reflect the user information in a general sense are employed instead, these values become far removed from the requirements of the user. This is why the individual abnormality thresholds are set initially to the same values as those used in the old copier. In so doing, deterioration of the abnormality detection precision caused by initial setting of the individual abnormality thresholds in a new copier to values which reflect the user information in a general sense can be avoided.

Further, the individual abnormality thresholds (relating to a paper jam, deterioration of the photosensitive body, and variation in the image density) are preferably updated in accordance with information regarding the repair request history of the user based on the occurrence of abnormalities. By updating the individual abnormality thresholds in this manner, the individual abnormality thresholds can be modified gradually from their initial setting to values corresponding to the requirements of the user.

The normal group data set stored in the information storage unit 503 is preferably updated according to the relationship between the determination result of the general abnormality and the result of an inspection of the copier. More specifically, when an abnormality is confirmed in the copier despite the general abnormality having been determined as "absent", this indicates that non-normal grouped information is included in the normal group data set. As a result, the normal space range in the Mahalanobis space becomes larger than usual, making it impossible to detect abnormalities. In this case, the normal group data set is updated by deleting the non-normal grouped information from the normal group data set. The normal group data set may then be updated by adding new normal grouped information to replace the deleted grouped information. By deleting the non-normal grouped information, mis-detections due to such grouped information being included in the normal group data set can be avoided. Note that non-normal grouped information can be identified by extracting data having a large standard deviation from the normalized data table described above.

In this abnormality determining apparatus, the information obtaining unit 501 and abnormality determining unit 502 are constituted to vary the frequency with which the various information is obtained and the frequency with which the presence of the general abnormality is determined according to the Mahalanobis distance D, which serves as the calculation result of the general abnormality. More specifically, when the Mahalanobis distance D of the general abnormality nears the general abnormality thresholds to a certain extent, the various information obtaining frequency and the determination frequency are increased. The reason for this will now be described using FIGS. 41, 42, and 43.

Figure 41:
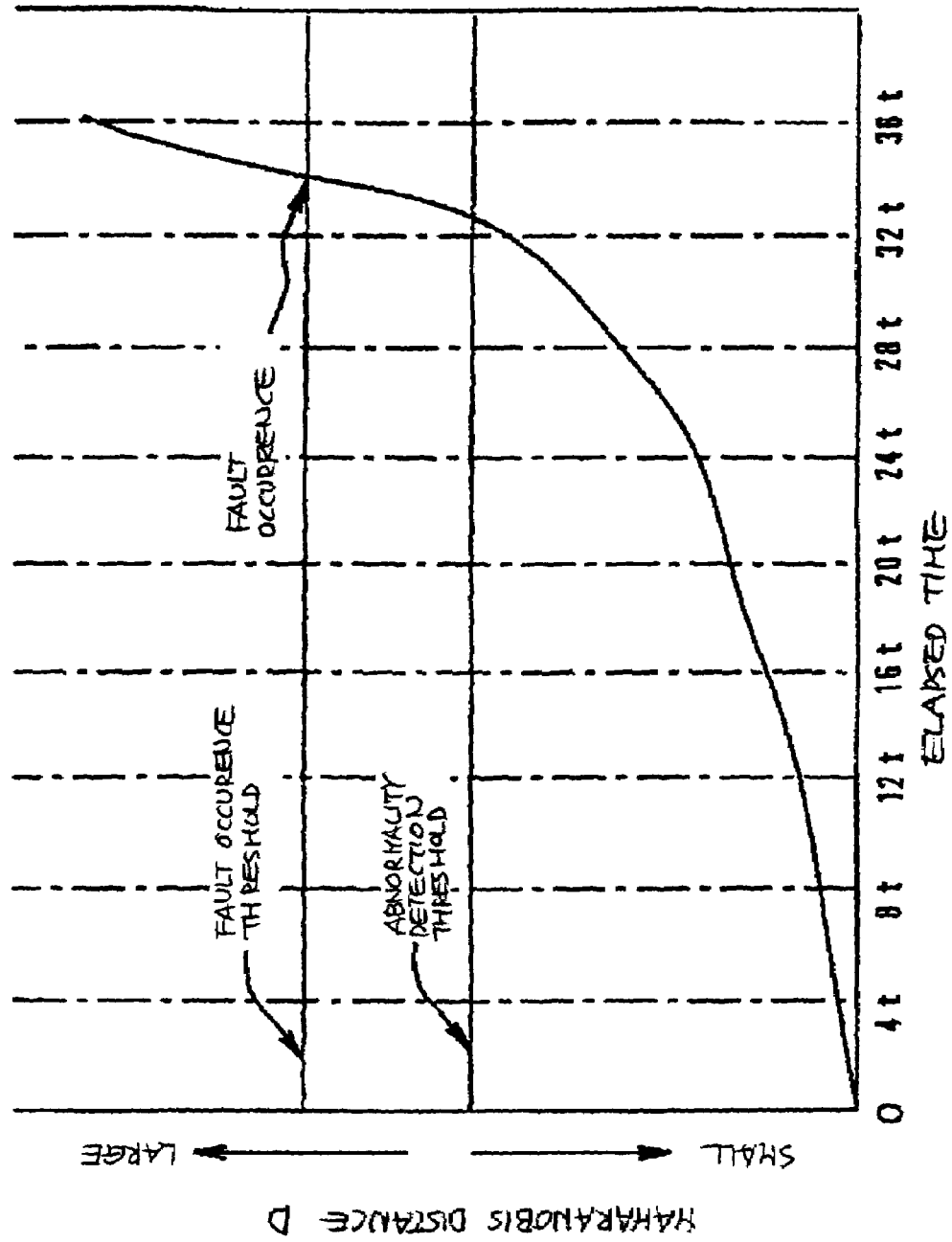
FIG. 41 is a graph showing an example of a relationship between the Mahalanobis distance D of a general abnormality in the same copier, and an elapsed time (running time)

FIG. 41 is a graph showing an example of a relationship between the Mahalanobis distance D of the general abnormality in this copier and the elapsed time (operating time).

In the graph, the abnormality detection threshold is the general abnormality threshold used to determined the presence of the general abnormality. The fault occurrence threshold takes the same value as the Mahalanobis distance D when an individual abnormality has progressed to the extent that a fault occurs in the copier. When the Mahalanobis distance D increases to the fault occurrence threshold, a fault occurs in the copier. Depending on the type of individual abnormality included in the general abnormality, the increase rate of the Mahalanobis distance D begins to rise rapidly after approaching the fault occurrence threshold to a certain extent, as shown in the graph. In such a case, general abnormality detection slows greatly.

Figure 42:
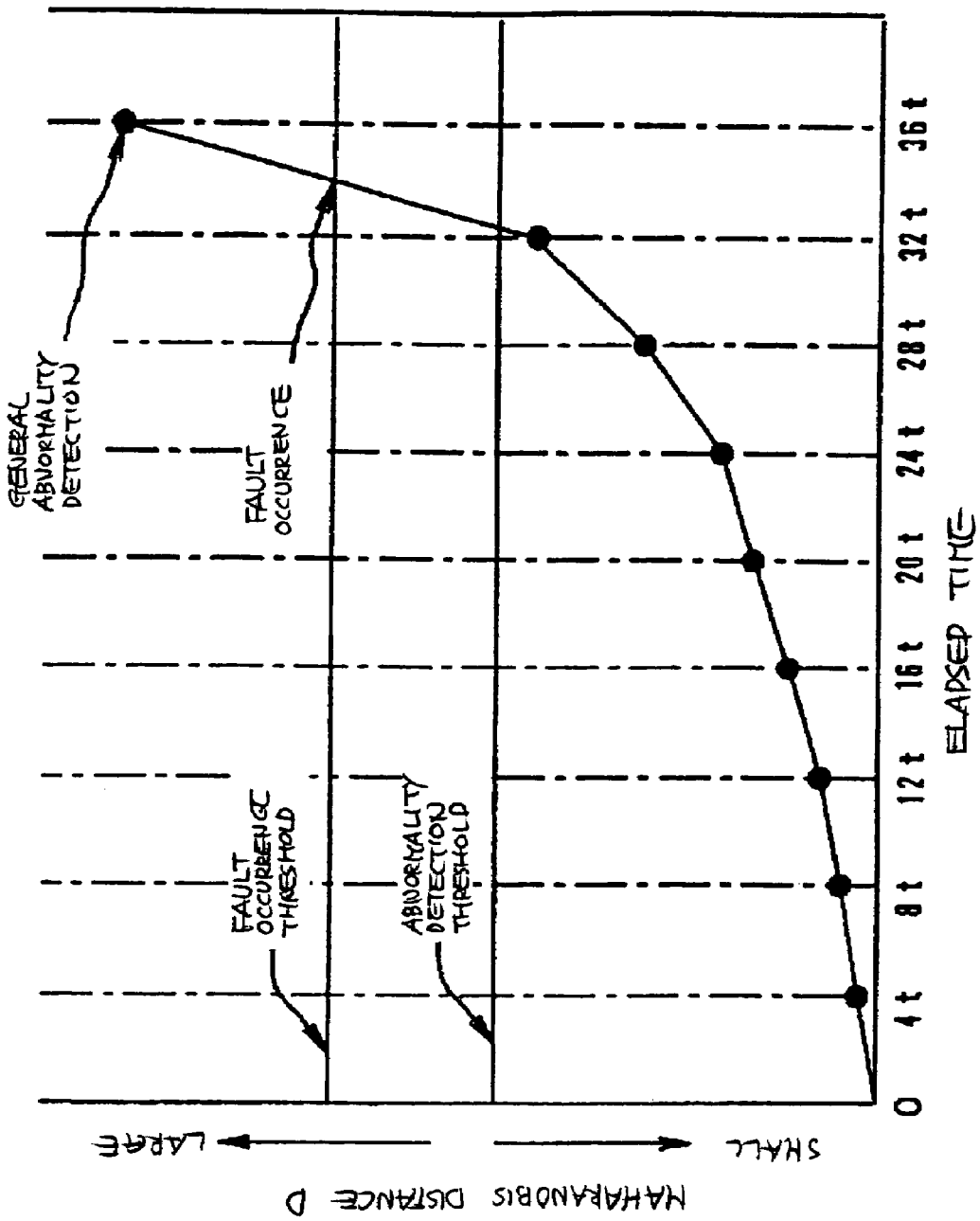
FIG. 42 is a graph showing a relationship between the Mahalanobis distance D when the general abnormality is determined at a time interval of 4t, and an elapsed time, in the same copier having the characteristics illustrated in FIG. 41.

Specifically, FIG. 42 is a graph showing the relationship between the Mahalanobis distance D when the presence of the general abnormality is determined at time intervals of 4t, and the elapsed time, in the copier having the characteristics shown in FIG. 41. In the graph, a fault occurs between a time 32t and a time 36t, but at the time 32t the Mahalanobis distance D has not yet reached the abnormality detection threshold, and hence the general abnormality is not detected. After the time 32t, the next general abnormality determination is performed at the time 36t, but during this period, the abnormality progresses rapidly so that the general abnormality occurs before the time 36t. Hence, in the example shown in the drawing, the general abnormality is detected after a fault has occurred, and thus the occurrence of the general abnormality cannot be predicted.

Figure 43:
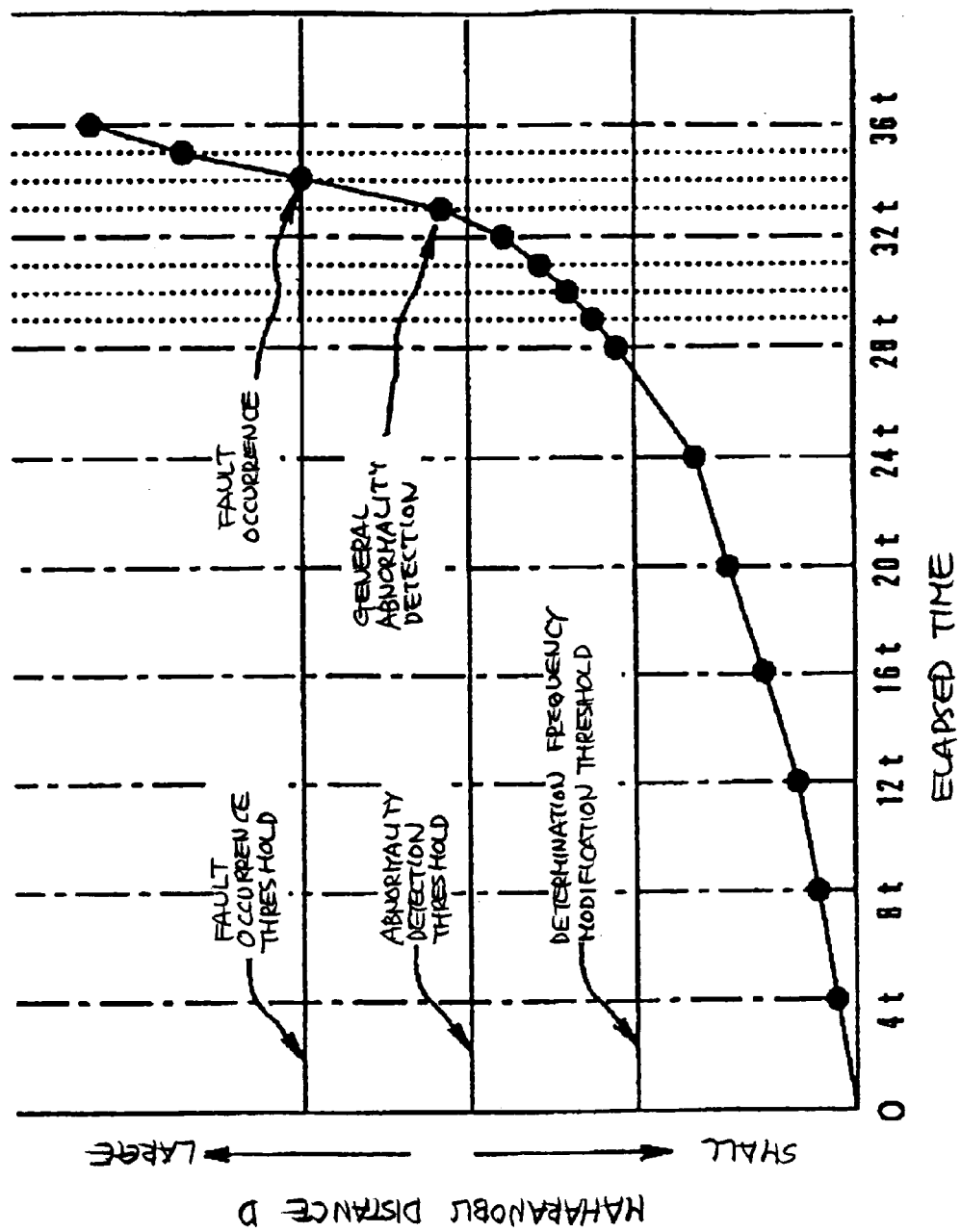
FIG. 43 is a graph showing an example of a relationship between the Mahalanobis distance D and the elapsed time, when the determination frequency of the general abnormality is raised at the stage where the Mahalanobis distance D of the general abnormality nears an abnormality detection threshold to a certain extent.

FIG. 43 is a graph showing an example of the relationship between the Mahalanobis distance D, in a case where the general abnormality determination frequency is raised when the Mahalanobis distance D of the general abnormality approaches the abnormality detection threshold to a certain extent, and the elapsed time. In the graph, a determination frequency modification threshold is used to determine whether or not to modify the determination frequency of the general abnormality, and is set to a smaller value than the abnormality detection threshold. In the illustrated example, the Mahalanobis distance D becomes gradually larger as time passes, and from a time 24t, the increase rate (increase amount per unit time) of the Mahalanobis distance D begins to increase. Slightly before a time 28t, the Mahalanobis distance D reaches the determination frequency modification threshold. The abnormality determining unit 502 recognizes this at the time 28t, and raises the determination frequency of the general abnormality from 4t to 1t. The Mahalanobis distance D then reaches the abnormality detection threshold at a time 32.5t. At a time 33t, which is only slightly later than 32.5t, the presence of the general abnormality is detected by the abnormality determining unit 502, and at a time 34t, a fault occurs. By raising the determination frequency at the time 28t, the general abnormality is detected before a fault occurs. Therefore, by constituting the abnormality determining unit 502 to modify the frequency with which the general abnormality is determined in accordance with the Mahalanobis distance D of the calculation result, situations in which it becomes impossible to predict the occurrence of the general abnormality due to a rapid increase in the increase rate of the Mahalanobis distance D can be avoided.

Depending on the determination result, it is desirable that the image forming conditions be modified or a part of an image forming operation be restricted. More specifically, the following responses in (a) to (c) may be considered.

(a) Halting the Device

In cases such as when the Mahalanobis distance D reaches the abnormality threshold or the increase rate of the Mahalanobis distance D rises over time, the device may be halted forcibly and a request for maintenance transmitted to the user.

(b) Restricting the Image Forming Operation or Modifying the Control Parameters
 (b-1) Modifying the color mode
 (b-2) Modifying the recording speed
 (b-3) Modifying the screen ruling in the halftone portion of the image
 (b-4) Modifying the halftone processing method
 (b-5) Restricting the types of paper that can be used
 (b-6) Modifying the registration control parameters
 (b-7) Modifying the image formation process parameters (uniform charging potential, exposure amount, development bias, transfer bias, etc.).

(c) Replenishing or Replacing Consumables of Components

Replenishment or replacement may be performed automatically on the basis of the Mahalanobis distance D calculation result.

Figure 44:
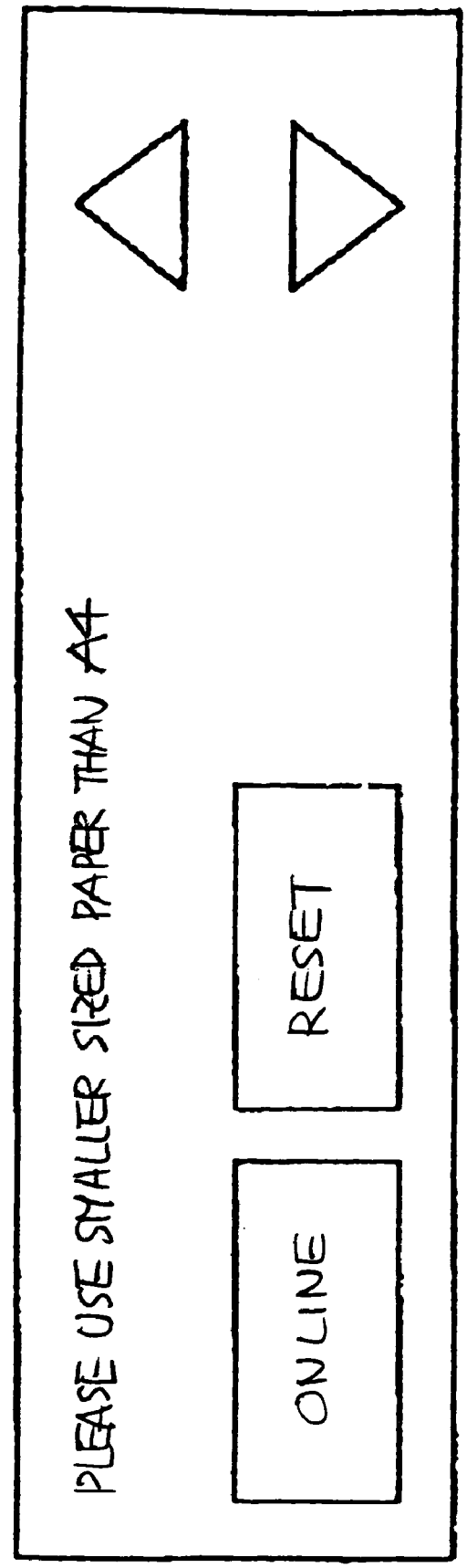
FIG. 44 is a pattern diagram showing an example of a display screen on an operating display unit of the same copier when function limitation is performed by function limiting means.

Depending on the type of the individual abnormality, it may be possible to continue operations until preparations for repairs are complete by restricting the functions of the copier even when a fault occurs as the individual abnormality progresses. For example, assuming that the vicinity of the end portion of the drum axis of a drum-shaped photosensitive body is greatly damaged, when printing is performed on large paper which uses substantially the entire axial direction region of the photosensitive body, a dramatic deterioration in image quality, contamination, and so on occur near the end portion of the paper. However, when printing is performed on small paper which need not use the damaged region of the photosensitive body, such image quality deterioration and contamination do not occur. Hence by restricting the functions of the copier such that the use of large paper is prohibited when the vicinity of the end portion of the drum axis of the drum-shaped photosensitive body is greatly damaged, the copier can be operated to implement printing until preparations for repairs are complete. For this purpose, the abnormality determining apparatus is provided with function restricting means for restricting the functions of the copier in accordance with the occurrence of the individual abnormalities. FIG. 44 is a pattern diagram showing an example of a display screen on the operation display unit of the copier that is displayed when function restriction is performed by the function restricting means. This is an example of a display screen displayed to indicate that image quality deterioration and contamination can be avoided by using paper that is smaller than A4 size.

Fourth Embodiment

Next, a fourth embodiment of the abnormality determining apparatus to which the present invention is applied will be described.

Figure 45:
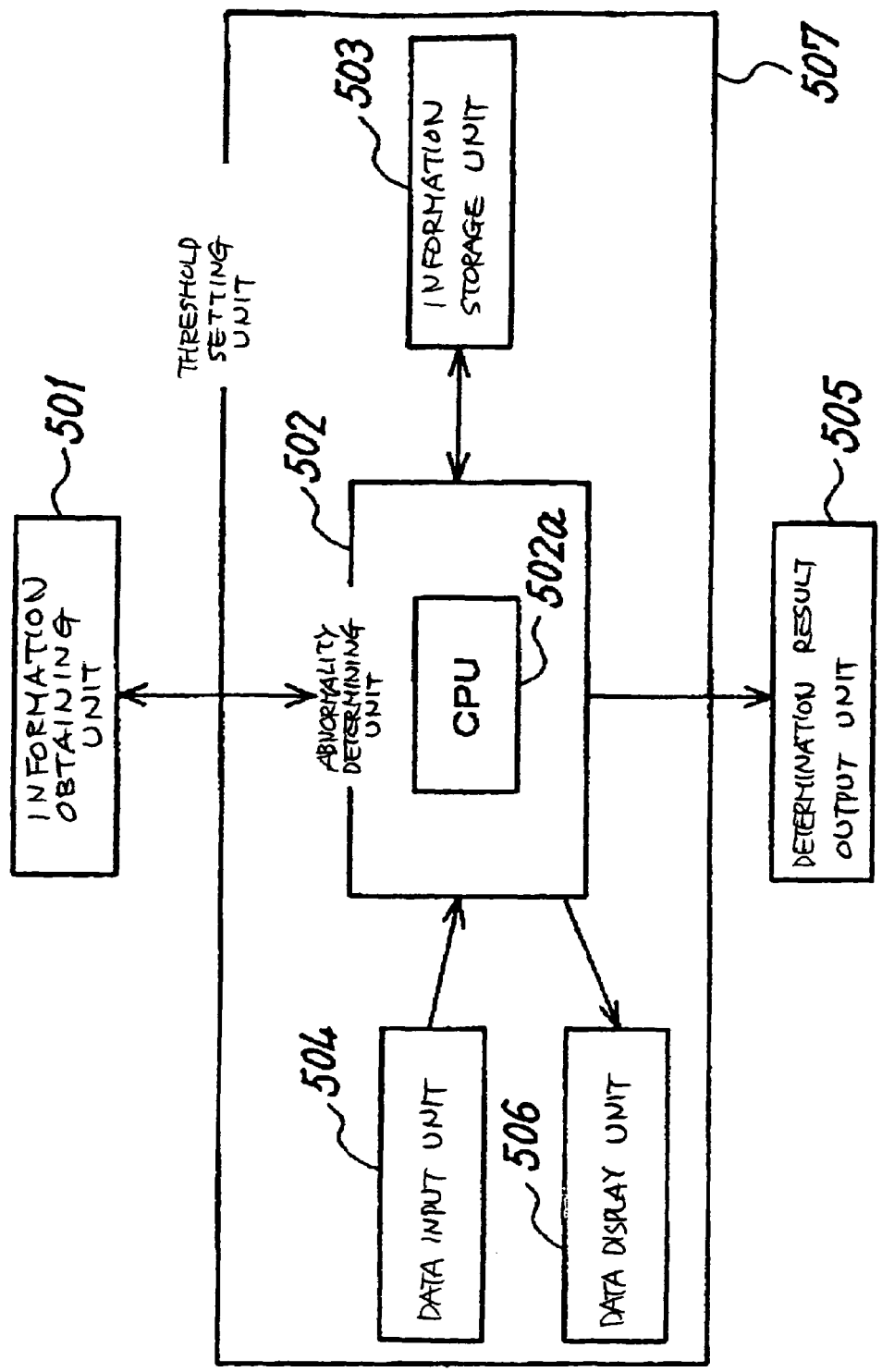
FIG. 45 is a block diagram showing the constitution of the main parts of an electric circuit in an abnormality determining apparatus according to a fourth embodiment of the present invention.

FIG. 45 is a block diagram showing the main parts of an electric circuit in the abnormality determining apparatus according to the fourth embodiment. Comparing this diagram to FIG. 35, it can be seen that the constitution of the electric circuit of this abnormality determining apparatus is substantially identical to that of the abnormality determining apparatus according to the third embodiment described above, but differs in comprising a data display unit 506, and in that a threshold setting unit 507 serving as threshold setting means is constituted by the abnormality determining unit 502, information storage unit 503, data input unit 504, and data display unit 506.

Likewise in this abnormality determining apparatus, the information obtaining unit 501 is used to obtain the aforementioned information of (1) to (12) from the detection subject copier. The abnormality determining unit 502 determines the presence of the general abnormality and the three individual abnormalities relating to a paper jam, deterioration of the photosensitive body, and variation in the image density, which are included in the general abnormality, on the basis of various data stored in the information storage means and the information of (1) to (12) obtained by the information obtaining unit 501. Determinations as to the presence of the respective abnormalities are performed similarly to the third embodiment, i.e. by comparing the Mahalanobis distance D to the unique individual abnormality thresholds of the three individual abnormalities. The presence of the three individual abnormalities is determined only when the general abnormality is detected. The data display unit 506 is constituted by a liquid crystal display or the like, and displays images on the basis of image signals transmitted from the abnormality determining unit 502.

The threshold setting unit 507 constituted by the abnormality determining unit 502, information storage unit 503, data input unit 504, and data display unit 506 sets the general abnormality threshold and the respective individual abnormality thresholds relating to a paper jam, deterioration of the photosensitive body, and variation in the image density, which are stored in the information storage unit 503. A specific method of performing this setting is as follows. A question implementation program for asking the user predetermined questions in order to obtain user information is stored in the information storage unit 503. The abnormality determining unit 502 displays various question information on the data display unit 506 on the basis of this question implementation program. Examples of these questions include "If paper jams began to occur frequently, would you be capable of searching for the cause?", "Are you capable of replacing a photosensitive body by yourself?", and so on. Once the user has input response data to each of these questions into the data input unit 504, the abnormality determining unit 502 stores the input response data in the information storage unit 503 as user information.

Once the question implementation program is complete, a plurality of user information is stored in the information storage unit 503. The abnormality determining unit 502 then performs initial setting of the three individual abnormality thresholds relating to a paper jam, deterioration of the photosensitive body, and variation in the image density on the basis of the user information and the various data stored in the information storage unit 503. The various data used at this time are the data shown in FIGS. 53 to 57, for example. As a result of this initial setting, the user information is reflected in the three individual abnormality thresholds relating to a paper jam, deterioration of the photosensitive body, and variation in the image density, and hence the determination precision of the individual abnormalities is matched to the user.

The abnormality determining apparatus constituted in this manner differs greatly from the abnormality determining apparatus according to the third embodiment in that the data input into the data input unit 504 are user information rather than the individual abnormality thresholds themselves. Instead of having the user input the individual abnormality thresholds, user information is input in the form of responses to questions. In most cases, the user is unaware of the abnormality determination method. If the user is forced to calculate and input the respective individual abnormality thresholds relating to a paper jam, deterioration of the photosensitive body, and variation in the image density while referring to a manual or the like, s/he may feel inconvenienced. However, by inputting user information in the form of responses to questions and setting the individual abnormality thresholds on the basis of these responses, as in this abnormality determining apparatus, situations such as that described above, in which the user feels inconvenienced, can be avoided. Moreover, situations in which the user is forced to perform complicated calculations in order to determine the individual abnormality thresholds can be avoided.

The threshold setting unit 507 not only performs initial setting of the individual abnormality thresholds relating to a paper jam, deterioration of the photosensitive body, and variation in the image density on the basis of the user information, but also alters these thresholds if necessary. More specifically, as noted above, the initially set individual abnormality thresholds are rarely perfectly suited to the user. In most cases, the individual abnormality thresholds do not become complete unless they are adjusted little by little through real experience. It is therefore desirable that the individual abnormality thresholds corresponding to the respective individual abnormalities be updated gradually in accordance with the detection precision of each individual abnormality. For this purpose, the threshold setting unit 507 in this abnormality determining apparatus is constituted to alter the individual abnormality thresholds relating to a paper jam, deterioration of the photosensitive body, and variation in the image density on the basis of predetermined data input into the data input unit 504 by the user. These predetermined data are preferably input by the user in the following manner. A threshold update program is stored in the information storage unit 503. The user is told in advance to activate this threshold update program by performing a predetermined operation on the data input unit 504 using a manual or the like. When the threshold update program is activated by the user operation, display such as "How did you feel about the timing of the abnormality notification? Please press the appropriate key. 1: The notification was too early, 2: The notification was too late" is displayed on the data display unit 506. When the user presses the corresponding key, display such as "How about the type of abnormality? Please press the appropriate key. 1: Paper jam, 2: Deterioration of photosensitive body, 3: Variation in image density" is then displayed. When the user presses the corresponding key, the individual abnormality threshold of the corresponding abnormality is altered on the basis of the information "the notification was too early" or "the notification was too late". This information corresponds to the aforementioned predetermined data. In the case of "the notification was too early", the individual abnormality threshold should be increased, and in the case of "the notification was too late", the individual abnormality threshold should be decreased.

Figure 46:
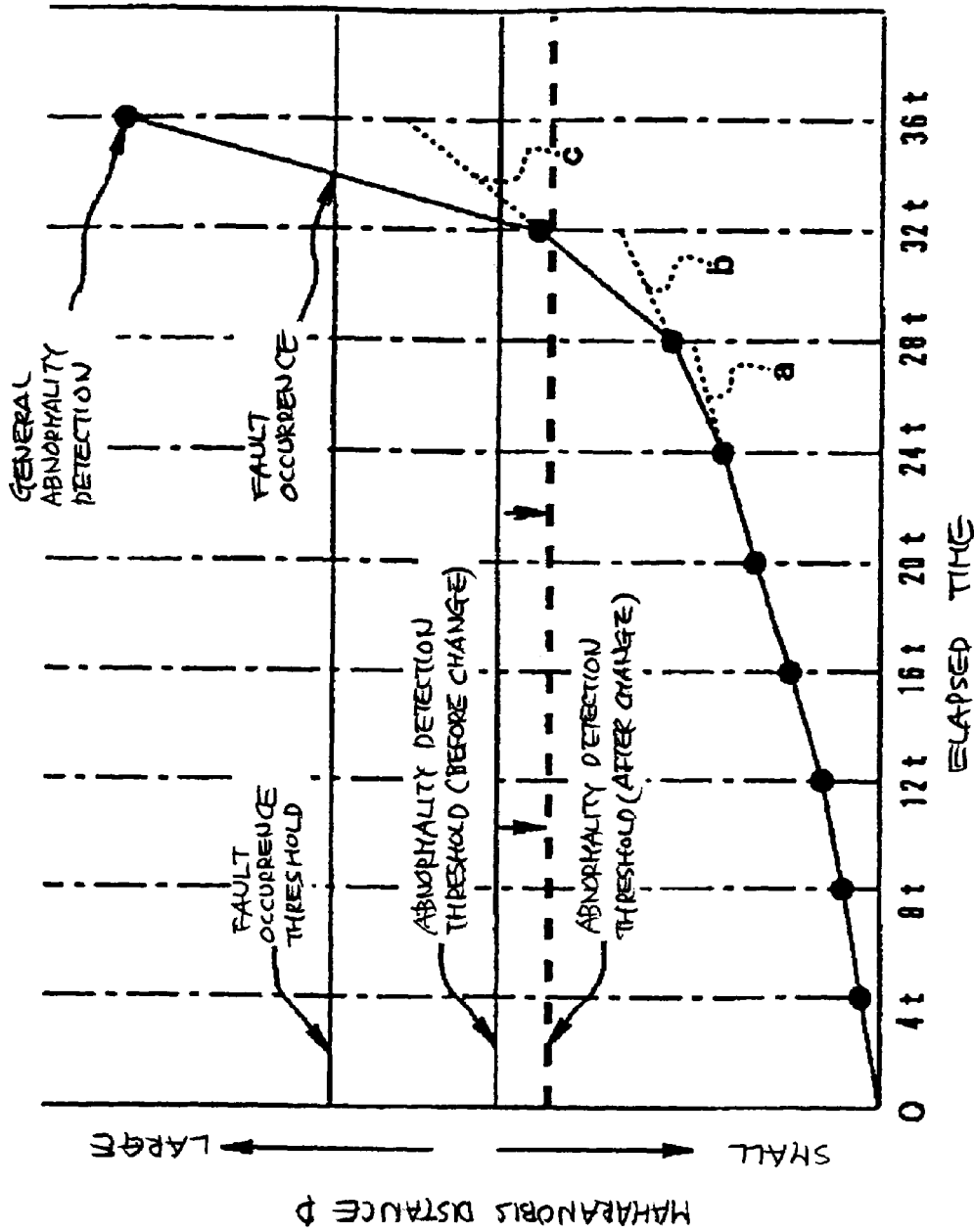
FIG. 46 is a view in which an extended line for facilitating understanding of variation in the Mahalanobis distance D has been added to a graph showing an example of the relationship between the Mahalanobis distance D of the general abnormality in the same printer, and the elapsed time.

The threshold setting unit 507 is also constituted to change the general abnormality threshold in accordance with the rate of change in the Mahalanobis distance D serving as the calculation result of the general abnormality. The reason for this constitution is as follows. FIG. 46 is a graph showing an example of the relationship between the Mahalanobis distance D of the general abnormality in this printer and the elapsed time, to which a line of extension has been added to facilitate understanding of the manner in which the Mahalanobis distance D changes. In the drawing, a bar graph in the period from a time 12t to a time 24t comprises a diagonal line which rises to the right in a substantially rectilinear fashion, indicating that the rate of change in the Mahalanobis distance D per unit time is substantially constant. From the time 24t onward, however, the rate of change per unit time begins to increase with time, and hence the drawing becomes a line graph. A dotted line a in the drawing shows the Mahalanobis distance D if the rate of change from the time 24t to a time 28t were the same as that from the time 20t to the time 24t. However, it can be seen from the actual graph that the rate of change increases at a sharp angle. The rate of change increases similarly from the time 28t to a time 32t, and from the time 32t to a time 36t. In the illustrated example, similarly to that of FIG. 42 described above, the general abnormality can no longer be detected at the time 32t, when "Mahalanobis distance D<abnormality detection threshold" is established, and at the time 36t, a fault may occur before the general abnormality is detected. Therefore, the threshold setting unit 507 of this abnormality determining apparatus reduces the abnormality detection threshold as shown in the drawing when the rate of change increases over two consecutive time periods. As a result, the abnormality detection threshold used at the time 32t takes the new smaller value, enabling the general abnormality to be detected at the time 32t. By detecting the general abnormality, situations in which the occurrence of the general abnormality cannot be predicted due to a rapid increase in the increase rate of the Mahalanobis distance D can be avoided.

Figure 47:
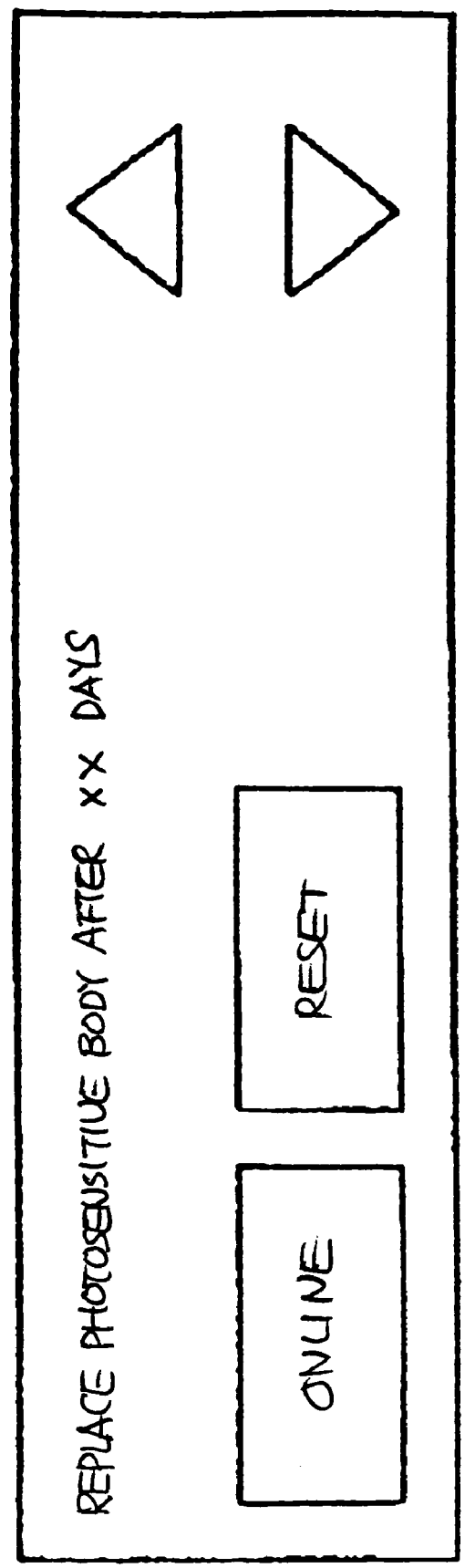
FIG. 47 is a pattern diagram showing an example of an image output to a data display unit when an abnormality relating to deterioration of a photosensitive body is detected.

Note that instead of changing the general abnormality threshold in accordance with the rate of change in the Mahalanobis distance D, the frequency with which the presence of the general abnormality is determined may be increased at the point where the Mahalanobis distance D approaches the general abnormality threshold to a certain extent, as in the abnormality determining apparatus according to the third embodiment described above. Further, in this abnormality determining apparatus, the operation display unit 3 of the copier shown in FIG. 34 may double as the data input unit 504 and data display unit 506 of the abnormality determining apparatus shown in FIG. 45. Also in this abnormality determining apparatus, the determination result is output to the data display unit 506 similarly to the abnormality determining apparatus according to the third embodiment described above. FIG. 47 shows an example of a screen that is output on the data display unit 506 when an abnormality relating to deterioration of the photosensitive body is detected. This abnormality determining apparatus also comprises similar function restricting means to those of the abnormality determining apparatus according to the third embodiment.

Fifth Embodiment

Next, a fifth embodiment, pertaining to the printer to which the present invention is applied, will be described. Note that the description of the second embodiment, referring to FIGS. 18 to 20 and FIGS. 49 to 51, is applied substantially to this embodiment, and therefore duplicate description has been omitted, and only different elements are described below.

The printer according to this embodiment is constituted as follows. Normal relationship information indicating the normal relationship between the value of first specific information, constituted by at least one of the plurality of types of information obtained individually by the plurality of information obtaining means described above, and the value of second specific information, which is different to the first specific information, is stored. The control unit 900 serving as determining means corrects the obtained value of the second specific information on the basis of the obtained value of the first specific information and the normal relationship information, and uses the corrected value to determine the presence of an abnormality.

More specifically, taking an example in which the first specific information is the operating mode setting value, drum/mode normal relationship data tables for the photosensitive bodies 811Y, M, C, K of each color are stored respectively in the ROM 900c serving as data storage means. The drum/mode normal relationship data table shows the relationship, determined in advance through experiment, between the operating mode setting value and the normal value of the photosensitive bodies 811Y, M, C, K. Taking as an example a case in which the normal value of the linear drum speed of the Y photosensitive body 811Y is confirmed in advance through experiment as being "102" in mode 1 and "51" in mode 2, the Y drum/mode normal relationship data table takes a form in which associations are made between "1 and 102" and "2 and 51". Similarly, the M, C, and K drum/mode normal relationship data tables illustrating the relationship between the operating mode setting value and the normal value of the linear drum speed for the other colors M, C, K, confirmed in advance through experiment, are stored in the ROM 900c. In this printer, the operating mode setting value functions as the first specific information, constituted by at least one of the plurality of types of information obtained individually by the plurality of information obtaining means. The Y, M, C, K linear drum speed is information calculated on the basis of the results of detection by the Y, M, C, K optical sensors 816Y, M, C, K, and hence functions as the second specific information, which is constituted by different information to the first specific information, and obtained by the information obtaining means. Hence in this printer, the Y, M, C, K drum/mode normal relationship data tables serving as normal relationship information showing the normal relationship between the value of the first specific information and the value of the second specific information, are stored in the ROM 900c.

In the above example, the printer also stores belt/mode normal relationship data tables in the ROM 900c serving as data storage means. The belt/mode normal relationship data table illustrates the relationship, determined in advance through experiment, between the operating mode setting value and the normal value of the linear belt speed. For example, when the normal value of linear belt speed is confirmed in advance through experiment as being "98" in mode 1 and "49" in mode 2, the belt/mode normal relationship data table takes a form in which associations are made between "1 and 98" and "2 and 49". The linear belt speed is information calculated on the basis of the results of detection by the belt optical sensor 855 described above, and hence functions as the second specific information, which is constituted by different information to the operating mode setting value of the first specific information, and obtained by the information obtaining means. Hence in this printer, the belt/mode normal relationship data tables also functions as normal relationship information showing the normal relationship between the value of the first specific information and the value of the second specific information.

The control unit 900 corrects the obtained value of the linear drum speed of each color, serving as the second specific information, on the basis of the obtained value of the operating mode setting value, serving as the first specific information, and the Y, M, C, K drum/mode normal relationship data tables, and uses the corrected value to determine the presence of an abnormality. More specifically, when the printer is in a normal state, the Y linear drum speed is "102" in mode 1 and "51" in mode 2. In other words, the normal value of the former is obtained by adding the normal value of the Y linear drum speed in mode 2 to the difference (to be referred to as "normal value difference" hereafter) between the mode 2 normal value and the normal value of the Y linear drum speed in mode 1. Hence, when the Y linear drum speed is obtained in mode 2 on the basis of the output of the Y optical sensor, the control unit 900 corrects the obtained value to a value corresponding to mode 1 by adding the obtained value to the normal value difference, and uses the corrected value to determine the presence of an abnormality. It is assumed, for example, that the obtained value of the linear drum speed of the Y photosensitive body 811Y in operating mode 2 is "54". Hence the control unit 900 corrects this obtained value to "105" by adding the obtained value to the normal value difference of "51", and uses the corrected value to determine the presence of an abnormality.

The control unit 900 also corrects the obtained value of the linear belt speed, serving as the second specific information, on the basis of the obtained value of the operating mode setting value, serving as the first specific information, and the belt/mode normal relationship data table, and uses the corrected value to determine the presence of an abnormality. More specifically, when the printer is in a normal state, the linear belt speed is "98" in mode 1 and "49" in mode 2, as described above. In other words, the normal value of the former is obtained by adding the normal value of the Y linear drum speed in mode 2 to the difference (to be referred to as "normal value difference" hereafter) between the mode 2 normal value and the normal value of the Y linear drum speed in mode $1^{iv}$. Hence, when the linear belt speed is obtained in mode 2 on the basis of the output of the Y optical sensor$^v$, the control unit 900 corrects the obtained value to a value corresponding to mode 1 by adding the obtained value to the normal value difference, and uses the corrected value to determine the presence of an abnormality. It is assumed, for example, that the linear belt speed in operating mode 2 is "52". Hence the control unit 900 corrects this obtained value to "101" by adding the obtained value to the normal value difference of "49", and uses the corrected value to determine the presence of an abnormality.

FIG. 21 is a graph showing an example of the relationship between the square value of the Mahalanobis distance D, calculated by the MTS method using the inverse matrix A stored in the ROM 900c, with the linear belt speed and linear drum speed. The printer stores the inverse matrix A for realizing the relationship shown in the graph in the ROM 900c, and in this case, the inverse matrix A serves as standard information presuming that the operating mode setting value is set to mode 1. Since the graph is premised on mode 1, the center of distribution of the linear belt speed and linear drum speed are both approximately 100 [mm/sec].

In the grouped information having the sample number $S_5$ in FIG. 51 described above, the linear belt speed and linear drum speed are both 70 [mm/sec]. It is assumed that this information was obtained under mode 1 conditions. When this information is used to determine the presence of an abnormality without being corrected, the square value of the Mahalanobis distance D calculated as a result indicates an abnormality, as can be seen clearly in FIG. 21. Hence when the grouped information having the sample number $S_5$ is obtained under mode 1 conditions, it is determined that an abnormality is present in the printer.

Conversely, it is assumed that both the linear belt speed and linear drum speed in the grouped information having the sample number $S_5$ were obtained under operating mode 2 conditions. The obtained values of the linear belt speed and linear drum speed are then corrected to "119" and "121" by adding "49" and "51" thereto respectively. As can be seen clearly in FIG. 21, the square value of the Mahalanobis distance D according to these corrected values indicates an abnormality. Hence when the grouped information having the sample number $S_5$ is obtained under mode 2 conditions, it is again determined that an abnormality is present in the printer.

Hence in this printer, the actual obtained value of the linear belt speed and linear drum speed serving as the second specific information can be used to make the following predictions. In cases where the obtained values of the linear belt speed and linear drum speed correspond to values obtained when the operating mode setting value, serving as the first specific information, does not correspond to the predetermined value of mode 1, the values that would be obtained if the operating mode setting value did correspond to mode 1 can be predicted on the basis of the aforementioned normal value difference. Then, after correcting the linear belt speed and linear drum speed to identical values to the predicted values obtained in this manner, the Mahalanobis distance D can be determined to detect an abnormality on the basis of the respective corrected values and the mode 1 inverse matrix A. With this constitution, mistaken determinations due to differences in the normal values of the obtained values of the linear belt speed and linear drum speed, serving as the second specific information, according to the value of the operating mode setting value, serving as the first specific information, can be avoided.

Figure 58:
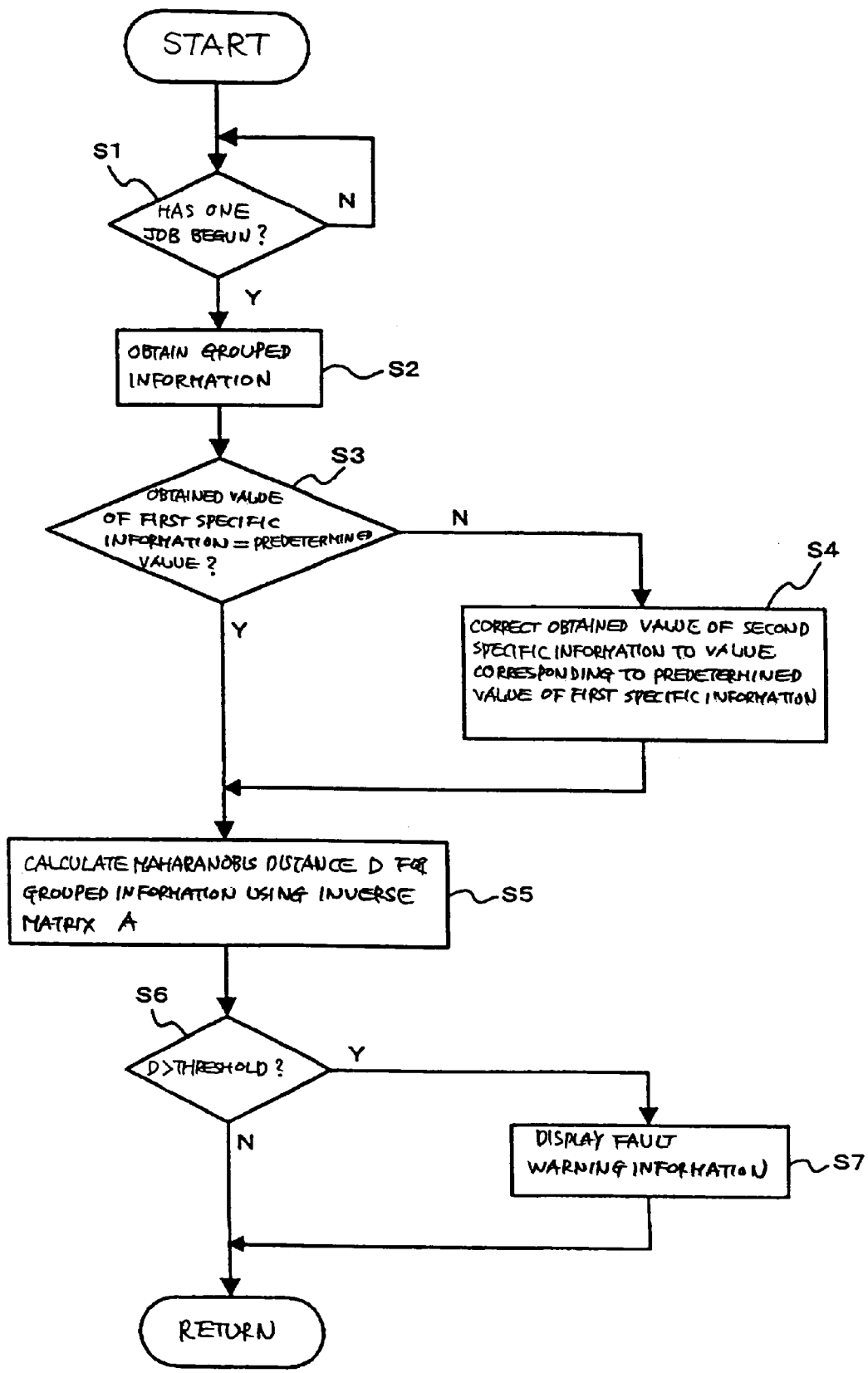
FIG. 58 is a flowchart showing an example of an abnormality determination control flow that is implemented by a control unit in a printer according to a fifth embodiment of the present invention.

FIG. 58 is a flowchart showing an example of the flow of abnormality determination control, implemented by the control unit 900. In this abnormality determination control, first the control remains on standby until one job begins. The term "one job" denotes an operation of the various devices required to print one sheet of transfer paper. When it is determined that one job has begun (Y in S1), grouped information comprising a combination of the linear belt speed, linear drum speed, and so on is obtained in actuality (S2). A determination is then made as to whether or not the obtained value of the first specific information (the operating mode setting value, for example) in this grouped information corresponds to a predetermined value (operating mode 1, for example) (S3). If it is determined that the first specific information does not correspond to the predetermined value (N in S3), the second specific information (the linear drum speed and linear belt speed, for example) in the grouped information obtained in S2 is corrected to a value corresponding to the predetermined value of the first specific information (mode 1, for example) (S4). This correction is performed on the basis of the normal relationship information, confirmed in advance through experiment, showing the normal relationship between the value of the first specific information and the value of the second specific information, the obtained value of the first specific information, and the obtained value of the second specific information. For example, when the linear belt speed is obtained in mode 2, the aforementioned normal value difference is specified on the basis of the obtained value of the first specific information, indicating mode 2, and the belt/mode normal relationship data table. The obtained value of the second specific information is then corrected to a value corresponding to the predetermined value of the first specific information on the basis of the normal value difference. Once the obtained value of the second specific information has been corrected in this manner, the Mahalanobis distance D of the grouped information comprising the corrected second specific information is calculated on the basis of the inverse matrix A stored in the ROM 900c (S5). The inverse matrix A is constructed on the basis of the grouped information obtained when the first specific information corresponds to the predetermined value.

If, on the other hand, the first specific information is determined to correspond to the predetermined value in S3 (Y in S3), the control flow advances to S5 without correcting the second specific information in the grouped information obtained in S2, where the Mahalanobis distance D of the grouped information is calculated.

When the Mahalanobis distance D has been calculated, a determination is made as to whether or not the calculation result exceeds a predetermined threshold (S6). If the Mahalanobis distance D exceeds the threshold (Y in S6), it is highly likely that an abnormality has occurred in the printer for some reason. It is therefore determined that an abnormality has occurred, and fault warning information is displayed on the operation display unit 808 (S7). The control flow then returns to S1. If, on the other hand, the Mahalanobis distance D does not exceed the threshold (N in S6), it is unlikely that an abnormality has occurred, and hence the control flow returns to S1 without determining the presence of an abnormality.

Note that to facilitate understanding, an example was described in which the Mahalanobis distance D is determined in a two-dimensional space constituted by the linear belt speed and linear drum speed. However, more types of abnormalities can be detected when the Mahalanobis distance D is determined in a space having more dimensions. Also, the specific information such as the operating mode setting value may be included in the inverse matrix A, but need not be included therein.

Further, an example was described in which data tables are stored in the ROM 900c as normal relationship information showing the normal relationship between the first specific information and second specific information, but the relationship between the first and second specific information may be indicated by an algorithm. In this case, the algorithm may be stored as the normal relationship information.

Further, an example was described in which an inverse matrix A based on a normal data set obtained when the operating mode setting value corresponds to mode 1 is stored, but an inverse matrix A based on a normal data set obtained in mode 2 may be stored. Alternatively, an inverse matrix A based on a normal data set obtained in a condition corresponding to an intermediate mode that is not used during actual printing may be stored. In these cases, the obtained value of the second specific information should be corrected to a value corresponding to the mode value.

Further, an example was described in which the first specific information refers to the operating mode setting value, but the present invention may also be applied when the first specific information refers to humidity information or temperature information. For example, the electric resistance values of each color toner, which are calculated on the basis of current values obtained by the Y, M, C, K toner current detection sensors 809Y, M, C, K, differ in their normal value distribution according to the internal temperature of the printer. Therefore, an abnormality can be determined in the following manner. First, an inverse matrix A used when the temperature information constituting the first specific information takes a predetermined value is stored in the ROM 900c for the grouped information comprising the information regarding the electric resistance values of the toner. Also, the normal relationship between the temperature and the toner electric resistance values when the entire printer is in a normal state is confirmed in advance, and the resulting normal relationship information is stored in the ROM 900c. Then, on the basis of the actual obtained values of the toner electric resistance values, the actual obtained temperature value, and the normal relationship information, the obtained electric resistance values are corrected to values that would be obtained if the temperature corresponded to the aforementioned predetermined value. The Mahalanobis distance D may then be determined for the grouped information comprising the corrected electric resistance values. In so doing, an inverse matrix A such as that of the graph in FIG. 25, which is capable of avoiding mistaken determinations, can be used instead of an inverse matrix A such as that of the graph in FIG. 24, which causes the toner electric resistance value to be determined mistakenly as normal over a wide range (i.e. widens the Mahalanobis distance D distribution).

Further, an example was described in which only one inverse matrix A is stored as standard information, but a plurality of inverse matrices A corresponding respectively to first specific information of differing values may be stored. In this case, the inverse matrix in which the value of the corresponding first specific information is closest to the obtained value of the first specific information may be selected from the plurality of inverse matrices A, and the Mahalanobis distance D may be determined on the basis of this inverse matrix A and the grouped information comprising the corrected second specific information. In so doing, an abnormality in the printer can be determined using not only an inverse matrix A exhibiting a Mahalanobis distance D distribution such as that shown in FIG. 25, for example, but also an inverse matrix A exhibiting distributions such as those shown in FIGS. 26 and 27, for example.

In this printer, the following may be cited as examples of the plurality of information obtaining means provided in the abnormality determining apparatus: the Y, M, C, K optical sensors 816Y, M, C, K; the fixing temperature sensor 806c; the belt optical sensor 855; the current detection sensors; the CPU 900a; and the operating display unit 808. The RAM 900b and ROM 900c function as the storage means provided in the abnormality determining apparatus. The CPU 900a also functions as the abnormality determining means provided in the abnormality determining apparatus.

Next, various specific examples of printers in which a more characteristic constitution has been added to the printer according to the fifth embodiment will be described.

FIRST SPECIFIC EXAMPLE

Figure 59:
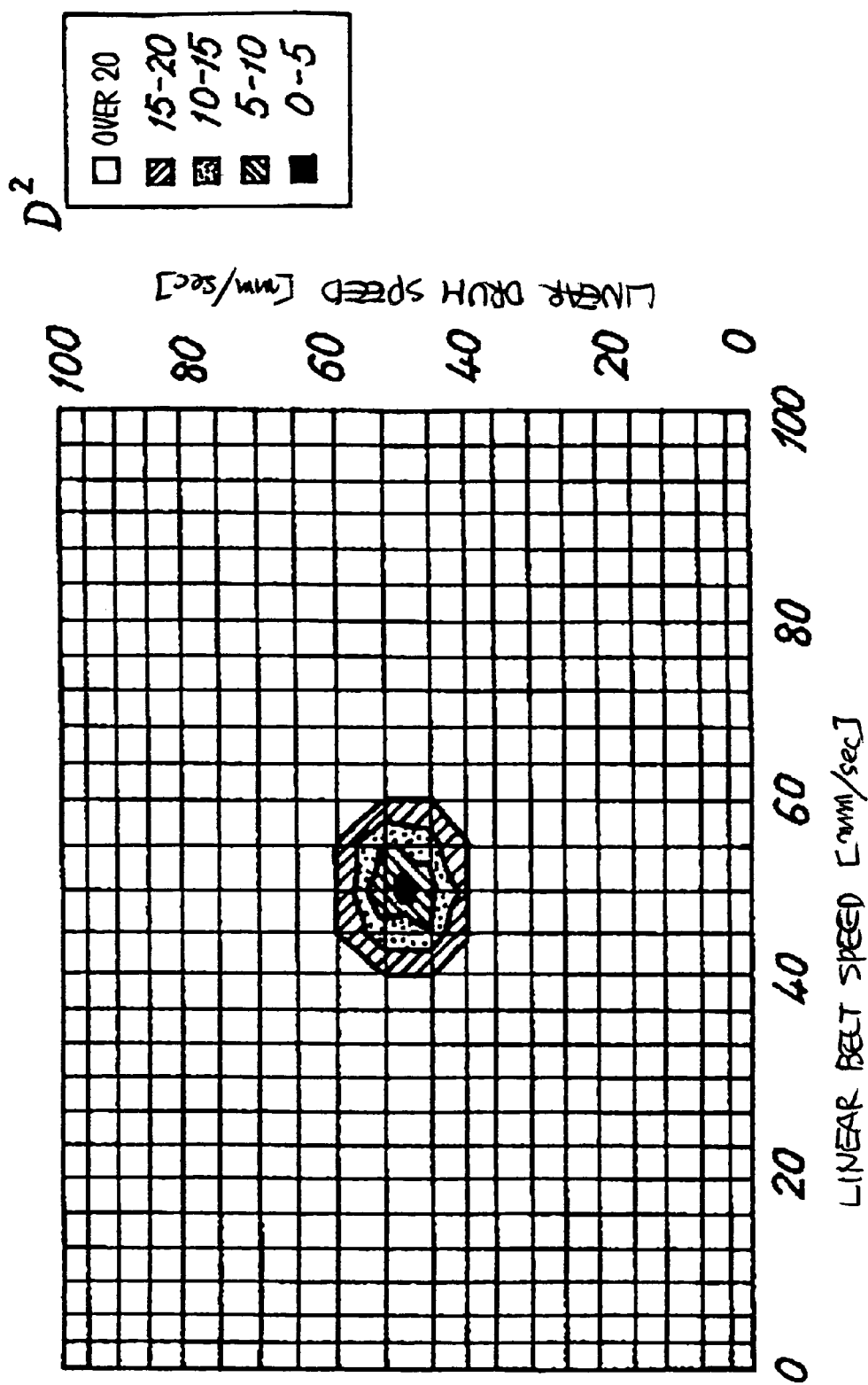
FIG. 59 is a graph showing a relationship between a square value of the Mahalanobis distance calculated by an MTS method using an inverse matrix for mode 2, a linear belt speed, and a linear drum speed, in the same printer.

FIG. 59 is a graph showing a relationship between the square value of the Mahalanobis distance D, calculated by the MTS method using an inverse matrix constructed on the basis of a normal data set obtained when the operating mode setting value corresponds to mode 2, the linear belt speed, and the linear drum speed. Since the graph is premised on mode 2, the center of distribution of the linear belt speed and linear drum speed are both approximately 50 [mm/sec]. The following can be learned when this graph is compared with the graph in FIG. 21, which is premised on mode 1. Focussing on the range in which the square value of the Mahalanobis distance D is within 20, the graph of mode 1 has a wider distribution than the graph of mode 2. This is due to the fact that as the numerical value of the information increases, the value of the Mahalanobis distance D is typically distributed more widely.

In the fifth embodiment, an example was described in which the linear belt speed and linear drum speed are corrected by adding the obtained values thereof to the normal value difference, which is the difference between the normal value in mode 2 and the normal value in mode 1. However, when correction is performed in this way, errors may occur for the following reason. When the entire printer is in a normal state, the distribution of the Mahalanobis distance D is wider when based on mode 1 than when based on mode 2, as can be seen by comparing FIGS. 21 and 59. Moreover, the normal value difference used to correct the linear speeds is a specific numerical value such as "51", and therefore has no distribution. Only the narrow distribution in mode 2 is reflected in the corrected value obtained by adding the obtained values of the linear speeds in mode 2 to this normal value difference, and hence the corrected value is positioned further toward the center of the distribution than the actual value in mode 1. As a result, corrected values which should exceed the threshold do not exceed the threshold, leading to mistaken determinations of a normal state when an abnormality is present.

In the printer according to this first specific example, the obtained value of the second specific information, such as a linear speed, is corrected in the following manner rather than being corrected by means of addition to the normal value difference. First, a value corresponding to the predetermined value of the first specific information and a value corresponding to the first specific information obtained in reality by the information obtaining means are determined on the basis of the normal relationship information. The obtained value of the second specific information is then corrected by multiplying the ratio of the two values. More specifically, taking an example in which the first specific information and second specific information refer to the operating mode setting value and the linear belt speed respectively, a value corresponding to the predetermined value of mode 1, and a value corresponding to the actual obtained value of the operating mode setting value are specified from the aforementioned belt/mode normal relationship data table. The ratio of the two values is then calculated. If the two values are identical, or in other words if the operating mode setting value corresponding to the inverse matrix A and the operating mode setting value when the linear belt speed is obtained both indicate mode 1, then the linear belt speeds corresponding respectively thereto are also identical, and hence the ratio of the two values is "1". If, on the other hand, the operating mode setting value when the linear belt speed is obtained indicates mode 2, then the ratio of the linear belt speed corresponding to mode 1 in the belt/mode normal relationship data table and the linear belt speed corresponding to mode 2 is not "1". Instead, the ratio (to be referred to as "normal value ratio" hereafter) is approximately 2, and when multiplied, reaches a numerical value which widens the distribution of the latter linear belt speed so as to correspond to the distribution of the former linear belt speed. Hence in this printer, the obtained value of the second specific information is corrected by multiplying the normal value ratio, and therefore mistaken determinations caused by correction errors can be suppressed in comparison with a case in which correction is performed by adding the normal value difference.

SECOND SPECIFIC EXAMPLE

The printer according to a second specific example is identical to the printer according to the [fifth] embodiment in that the obtained value of the second specific information is corrected on the basis of the obtained value of the first specific information and the normal relationship information, but differs from the printer according to the [fifth] embodiment in that the inverse matrices A used in the MTS method are not stored in the machine non-writable ROM 900c, but in the machine writable RAM 900b. The printer according to the second specific example also differs from the printer according to the [fifth] embodiment in that the inverse matrices A are not stored in the RAM in advance during factory shipment. The CPU 900a is designed to construct the inverse matrices A on the basis of a plurality of obtained results for multiple types of information (including specific information as well as grouped information) constituted by a plurality of information obtained during the initial operating period at the shipment destination. In other words, the CPU 900a functions as standard information constructing means for constructing the inverse matrices A on the basis of the obtained-results of the grouped information, which is also different to the printer according to the [fifth] embodiment. Note that all of the components inside the printer are new during the initial operating period at the shipment destination, and therefore the obtained results of the various information obtained by the various information obtaining means serve as normal data.

Figure 60:
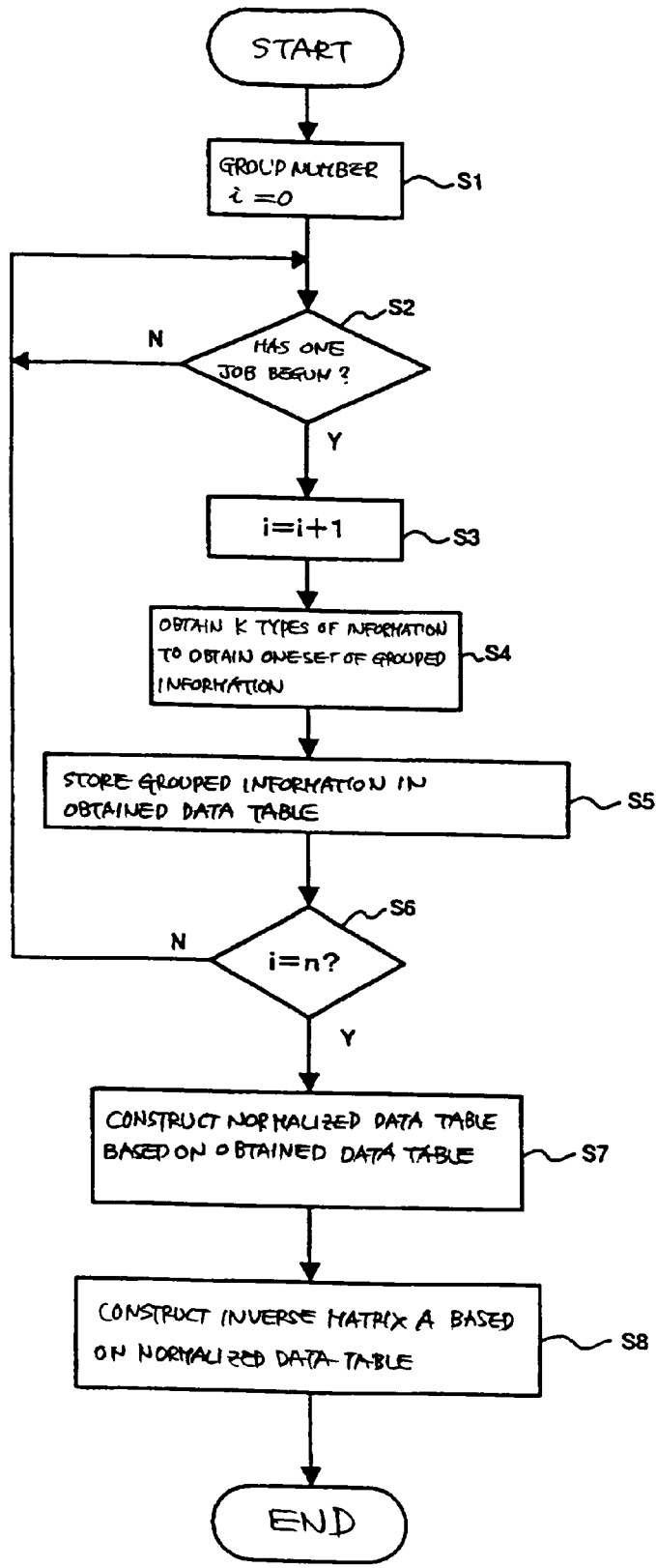
FIG. 60 is a flowchart showing an example of an inverse matrix construction process that is implemented by the control unit of a printer according to a second specific example of the fifth embodiment.

FIG. 60 is a flowchart showing the flow of inverse matrix construction control, implemented by the control unit 900 of this printer. This inverse matrix construction control is executed during the initial operating period at the shipment destination. Specifically, the initial operating period lasts from the first print job to the nth print job following shipment. Implementation of the inverse matrix construction control shown in FIG. 60 is premised on the obtained data table shown in FIG. 49 being stored in the RAM 900b of the printer during factory shipment. Note, however, that the obtained data table is empty.

When the main power source of the printer is switched on for the first time after shipment, inverse matrix construction control begins, and the value of the group number i is initialized to "0" (S1). The group number i is a variable showing the number of measurements of the grouped information constituted by k types of information. Following this initialization, one job begins (Y in S2), and "1" is added to the group number i (S3). One set of grouped information comprising k types of information is then obtained (measured) by the various sensors and data reading (S4), and then stored in the obtained data table (S5). Next, a determination is made as to whether or not the group number i has reached "n" (S6). If not (N in S6), the control flow is looped back to S2. As a result of this loop, the i+1 [th] grouped information is obtained at the next one job and stored in the obtained data table. When the group number i reaches "n" (Y in S6), the information obtaining process for obtaining n sets of grouped information ends, and the aforementioned information normalization process, correlation coefficient calculation process, and matrix transformation process are performed in succession. More specifically, first a normalized data table is constructed on the basis of the obtained data table (S7). Next, the correlation coefficient matrix R is constructed on the basis of the normalized data table, and then the inverse matrices A are constructed on the basis of the construction result (S8).

Figure 61:
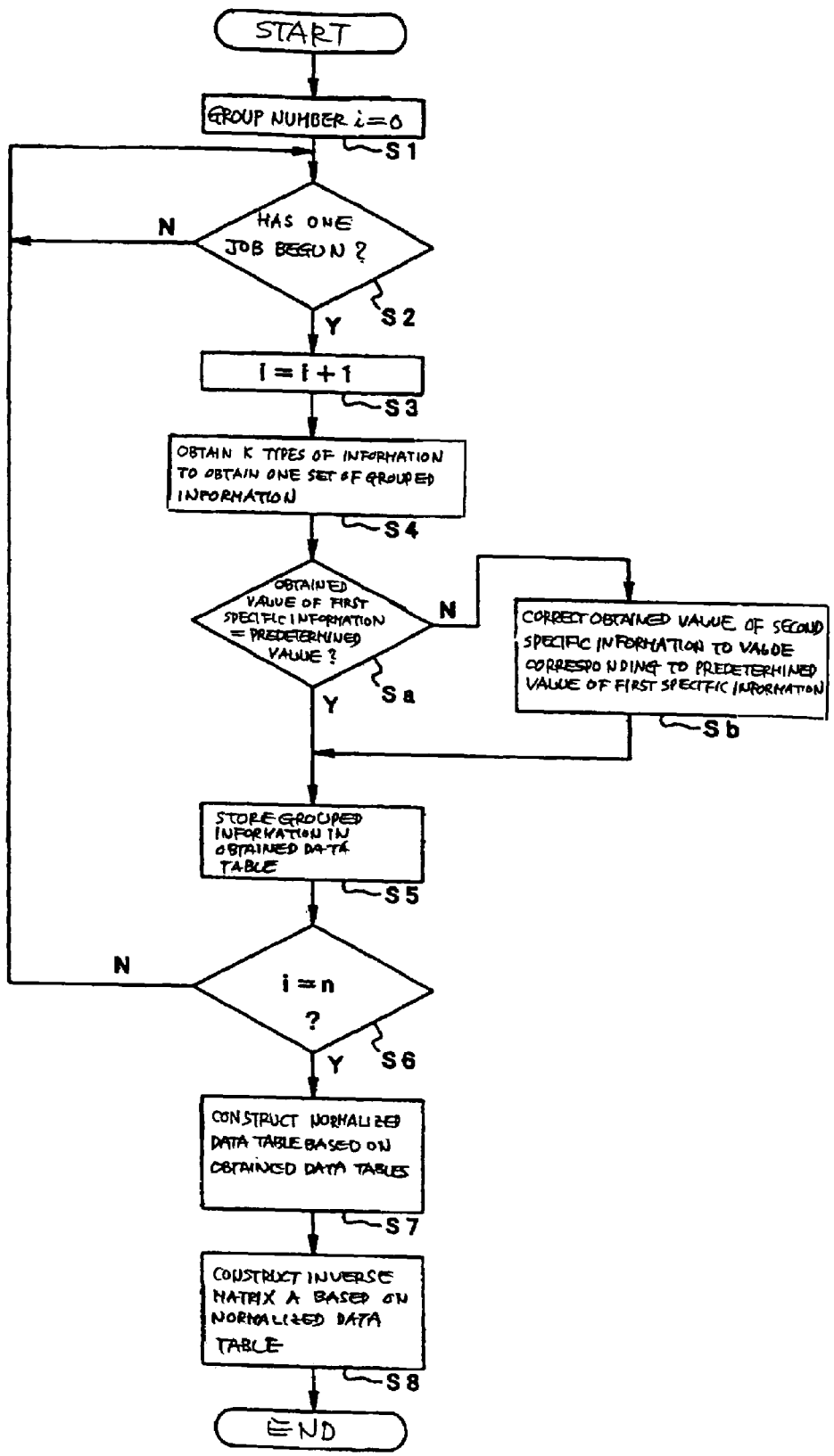
FIG. 61 is a flowchart showing a modified device of the same inverse matrix construction process.

Note that it is conceivable that during the inverse matrix construction control shown in FIG. 60, condition modification may be performed to alter the normal value of the second specific information such as the operating mode setting value. In such a case, it is preferable that the second specific information be corrected, if necessary, during the inverse matrix construction control so that the standard information of the device is reflected accurately in the constructed inverse matrices A. More specifically, inverse matrix construction control such as that shown in FIG. 61 is implemented in place of the inverse matrix construction control shown in FIG. 60. The inverse matrix construction control shown in the drawing differs from the inverse matrix construction control shown in FIG. 60 in that steps Sa and Sb are performed between S4 and S5. When one set of grouped information is obtained by obtaining k types if information (S4), a similar determination to that of the abnormality determination control in FIG. 58 is made as to whether or not the obtained value of the first specific information takes the predetermined value (Sa). If so (Y in Sa), the grouped information is stored in the obtained data table without correcting the value of the second specific information in the grouped information (S5). If not, on the other hand (N in Sa), the obtained value of the second specific information is corrected to a value corresponding to the predetermined value of the first specific information (Sb), whereupon the grouped information comprising the corrected second specific information is stored in the obtained data table.

In the printer constituted as described above, the inverse matrices A are constructed on the basis of the various information obtained during the initial operating period of the printer, rather than being constructed on the basis of a test operation of another test printer. Hence, variation among finished products in the normal values of the information used to determine an abnormality, caused by precision errors in the various components and so on, can be avoided, thus preventing deterioration of the determination precision. Moreover, the plurality of inverse matrices A is constructed automatically at the shipment destination, and hence cost increases arising when the inverse matrices A are constructed at the factory before shipment by performing a test operation on each finished product can also be avoided.

Note that up to this point, a printer for forming multi-color images known as full color images has been described, but the present invention may also be applied to a printer for forming monochrome images. Further, when the first specific information is constituted by information that is capable of taking successive values, such as temperature, rather than the operating mode setting value, the value ranges that the first specific information may take may be partitioned into several ranges such as "less than 10 degrees", "at least 10 degrees to less than 30 degrees", and "30 degrees or more", and the normal relationship information may be set to correspond to each of these ranges. In so doing, the second specific information can be corrected even when the first specific information is constituted by information that is capable of taking successive values. Further, in the first specific example, the second specific information relating to the plurality of operating mode setting values (two types comprising mode 1 and mode 2) is corrected to a value corresponding to one of the operating mode setting values (a value corresponding to 100 [mm/sec]), but may be corrected to correspond to a value (10 [mm/sec], for example) that is not realized at the actual operating mode setting values. Also in the first specific example, the second specific information relating to the two operating mode setting values is corrected to a value corresponding to one of the operating mode setting values, but the second specific information relating to three or more operating mode setting values may be corrected respectively to values corresponding to two or more operating mode setting values. Even in this case, the volume of standard information to be stored can still be reduced, enabling a reduction in cost.

The first through fifth embodiments of the present invention were described in detail above, but the features of each embodiment will now be listed.

(1) In the abnormality determining apparatus according to the first embodiment, the modified devices thereof, and each specific example thereof, the information storage unit 503 serving as information storage means stores a plurality of normal group data sets having different values, and the abnormality determination unit 502 serving as determining means selects the normal group data set to be used to determine the presence of an abnormality in the detection subject copier from among the plurality of normal group data sets at a predetermined timing. With this constitution, as described above, mistaken determinations caused by differences in the normal values of the information obtained by the information obtaining unit 501 depending on the content of the specific information such as the operating mode can be avoided.

(2) In the printer according to the second embodiment, the CPU 900a, serving as normal index information constructing means, is provided to construct a plurality of inverse matrices A having different content on the basis of a plurality of obtained results relating to multiple types of information constituted by a plurality of types of information obtained by the plurality of information obtaining means. With this constitution, for the reasons described above, deterioration of the determination precision due to component errors in the finished printers can be avoided, and cost increases caused during a test operation performed to construct the inverse matrices for each finished printer prior to shipment can also be avoided.

(3) In the printer according to the second embodiment and the modified devices thereof, inverse matrices A for the respective data sets are used as the plurality of normal index information, and the control unit 900 serving as determining means calculates a Mahalanobis distance D on the basis of these inverse matrices A and uses the Mahalanobis distance D to determine the presence of an abnormality. With this constitution, unlike a conventional image forming apparatus in which abnormalities are detected simply by comparing standard data and obtained data, faults having causes that cannot be specified clearly can be predicted using an MTS method.

(4) In the first specific example and second specific example of the modified device according to the second embodiment, a modified device constitution is used as the abnormality determining apparatus. In the printer according to the first specific example, a plurality of temporary inverse matrices serving as temporary normal index information and having different content is stored in the ROM 900c serving as storage means. Moreover, in cases where at least one of the plurality of inverse matrices A cannot be constructed due to predetermined conditions not being satisfied during a predetermined time period, the control unit 900 serving as normal index information construction means is constituted to perform processing to compensate for the lacking inverse matrix A with a temporary inverse matrix. With this constitution, for the reasons described above, deterioration of the abnormality determination precision caused by unsatisfied predetermined conditions at the shipment destination can be avoided.

(5) In the printer according to the second specific example of the modified device according to the second embodiment, the operation display unit 808 serving as data receiving means is provided to receive external data. In cases where at least one of the plurality of inverse matrices A cannot be constructed due to predetermined conditions not being satisfied during a predetermined time period at the shipment destination, the control unit 900 serving as normal index information construction means is constituted to perform processing to compensate for the lacking inverse matrix A with an inverse matrix A received by the data receiving means. Likewise with this constitution, for the reasons described above, deterioration of the abnormality determination precision caused by unsatisfied predetermined conditions at the shipment destination can be avoided.

(6) In the printer according to the second embodiment and modified devices thereof, means for obtaining temperature information, humidity information, or an operating mode setting value are used as at least one of the information obtaining means, and inverse matrices A having different content according to the temperature, humidity, or operating mode setting value are used as the plurality of inverse matrices A. With this constitution, mistaken determinations due to differences in the normal values of the obtained information depending on the content of the temperature, humidity, or operating mode setting value constituting the specific information can be avoided.

(7) In the abnormality determining apparatus according to the third embodiment, by initially setting at least one of the individual abnormality thresholds relating to a paper jam, deterioration of the photosensitive body, and variation in the image density, which are used individually in the respective processes for determining each individual abnormality, in accordance with information regarding the environment in which the detection subject copier is disposed, or in other words by reflecting environmental information in the individual abnormality thresholds, it becomes possible, for the reasons described above, to avoid providing notification of the occurrence of an abnormality at an inappropriate timing due to a varying degree of abnormality perception depending to the environment, regardless of personal differences.

(8) Further, in the abnormality determining apparatus according to the third embodiment, by initially setting at least one of the three individual abnormality thresholds in accordance with information regarding the frequency of maintenance technician visits to the location in which the copier is disposed, or information regarding the distance from the maintenance service providing organization to the disposal location, it becomes possible, for the reasons described above, to avoid situations in which the timing of abnormality detection is delayed due to an excessive time lag between a request for repairs from the user to the service organization and the actual departure of the serviceperson to the location of the user.

(9) Further, in the abnormality determining apparatus according to the third embodiment, when replacing an old copier with a new one, by initially setting the three individual abnormality thresholds used to determine the presence of an abnormality in the new copier to the same respective values as the three individual abnormality thresholds of the old copier, it becomes possible, for the reasons described above, to avoid deterioration of the abnormality detection precision caused by initially setting values reflecting the user information in a general sense as the individual abnormality thresholds.

(10) Further, in the abnormality determining apparatus according to the third embodiment, by updating at least one of the three individual abnormality thresholds in accordance with information regarding the repair request history of the user, based on the occurrence of abnormalities, the individual abnormality thresholds can be changed gradually from their initial setting to values corresponding to the requirements of the user.

(11) In the abnormality determining apparatuses of the third embodiment and fourth embodiment, in which the Mahalanobis distance is determined as a calculation result during a calculation process performed in the process for determining the general abnormality, on the basis of the normal group data set stored in the information storage unit 503 serving as information storage means and the information obtained by the information obtaining unit 501 serving as information obtaining means, it becomes possible, for the reasons described above, to avoid mistaken determinations due to the inclusion of non-normal grouped information in the normal group data set by updating the normal data set on the basis of the determination as to the presence of the general abnormality and the result of an inspection of the copier.

(12) Further, in the abnormality determining apparatus according to the third embodiment, by using a device which receives data input regarding the individual abnormality thresholds that is transmitted over a communication line as the data input unit 504 serving as data input means, data input into the abnormality determining apparatus of the individual abnormality thresholds can be performed by a user in a remote location.

(13) In the abnormality determining apparatus according to the fourth embodiment, by providing the threshold setting unit 507 serving as threshold setting means, the user may input user information rather than the individual abnormality thresholds themselves. As a result, situations in which the user is forced to perform complicated calculations in order to determine the individual abnormality thresholds can be avoided.

(14) In the abnormality determining apparatus according to the fourth embodiment, the threshold setting unit 507 asks the user predetermined questions, and obtains user information on the basis of response data input into the data input unit 504 by the user. In so doing, user information can be drawn from the user in a natural manner, without making the user aware of the need to adjust the abnormality determination precision, and initial setting can be performed to values matching the user information.

(15) In the abnormality determining apparatus according to the fourth embodiment, the threshold setting unit 507 is constituted to modify the three individual abnormality thresholds relating to a paper jam, deterioration of the photosensitive body, and variation in the image density, which are used respectively to determine the presence of the individual abnormalities, on the basis of predetermined data input into the data input unit 504 by the user. With this constitution, for the reasons described above, the three individual abnormality thresholds can be adjusted little by little on the basis of the actual experience of the user toward values that are perfectly suited to the user.

(16) Further, in the abnormality determining apparatus according to the fourth embodiment, the threshold setting unit 507 is constituted to modify the general abnormality threshold, which is used to determine the presence of the general abnormality, in accordance with the rate of change in the Mahalanobis distance D, which is the calculation result of the general abnormality. By means of such a constitution, for the reasons described above, situations in which occurrence of the general abnormality cannot be predicted due to a rapid rise in the increase rate of the Mahalanobis distance D can be avoided.

(17) In the abnormality determining apparatuses of the third embodiment and fourth embodiment, the abnormality determining unit 502 serving as determining means is constituted to determine the Mahalanobis distance D on the basis of the normal group data set, stored in the information storage unit 503, and the obtained results of the information obtaining unit 501, and determine the presence of the general abnormality on the basis of the result of a comparison between the Mahalanobis distance D and the general abnormality threshold. By means of this determination, the general abnormality incorporating the plurality of individual abnormalities can be detected easily.

(18) Further, in the abnormality determining apparatus according to the third embodiment, the abnormality determining unit 502 is constituted to modify the frequency with which the presence of the general abnormality is determined in accordance with the Mahalanobis distance D, which is the calculation result of the general abnormality. By means of this constitution, as described above, situations in which occurrence of the general abnormality cannot be predicted due to a rapid rise in the increase rate of the Mahalanobis distance D can be avoided.

(19) Further, in the abnormality determining apparatuses of the third embodiment and fourth embodiment, by providing function restricting means for restricting the functions of the copier in accordance with the type of individual abnormality that has occurred, the copier can be operated to implement printing until preparations for repairs are complete.

(20) In the printer according to the first specific example of the fifth embodiment, the inverse matrix A serving as standard information takes a value corresponding to the predetermined value of the first specific information, for example mode 1. Further, the control unit 900 serving as determining means determines, in relation to the second specific information, a value corresponding to the predetermined value of the first specific information (mode 1, for example) and a value corresponding to the obtained value obtained in reality on the basis of normal relationship information such as a belt/mode normal relationship data table. The obtained value of the second specific information is then corrected by multiplying the ratio of the normal value, which is the ratio of these two values. With this constitution, for the reasons described above, mistaken determinations due to correction errors can be suppressed further than in a case where the obtained value of the second specific information is corrected by addition to the normal value difference.

(21) Further, in the printer according to the fifth embodiment and the specific examples thereof, the inverse matrices A of data sets are used as standard information, and the control unit 900 serving as determining means is constituted to calculate the Mahalanobis distance D on the basis of the inverse matrices A and use the calculation result to determine the presence of an abnormality. With this constitution, unlike a conventional image forming apparatus in which abnormalities are detected simply by comparing standard data and obtained data, faults having causes that cannot be specified clearly can be predicted using an MTS method.

(22) In the printer according to the second specific example of the fifth embodiment, the CPU 900*a* is provided as standard information constructing means for constructing the inverse matrices A serving as standard information on the basis of the plurality of obtained values of multiple types of information constituted by the plurality of types of information obtained by the plurality of information obtaining means. With this constitution, for the reasons described above, deterioration of the determination precision due to component errors in the finished printers can be avoided, and cost increases caused during a test operation performed to construct the inverse matrices for each finished printer prior to shipment can also be avoided.

(23) In the printer according to the fifth embodiment and the specific examples thereof, means for obtaining temperature information, humidity information, or the operating mode setting value are used as at least one of the information obtaining means, and inverse matrices having different content according to the temperature, humidity, or operating mode setting value are used respectively as the inverse matrices A. With this constitution, mistaken determinations due to the normal values of the obtained information differing according to specific information such as the temperature, humidity, or operating mode setting value can be avoided.

As described above, in the present invention a plurality of normal data sets and the like for determining a Mahalanobis distance is prepared as normal index information serving as an index of a normal state of a detection subject, and by selecting these normal data sets according to the content of specific information such as the operating mode setting, mistaken determination due to the normal values of information obtained by the information obtaining means differing according to the content of the specific information can be avoided. Furthermore, a plurality of thresholds to be compared to the calculation results obtained through calculations based on the information obtained by the information obtaining means is prepared as the normal index information, and by selecting these thresholds according to the content of specific information such as user information input by a user, deterioration of the determination precision due to a change in the user of the detection subject can be avoided.

Further, in the present invention a plurality of types of information is obtained by the plurality of information obtaining means. The presence of an abnormality is then determined by selecting normal index information which corresponds to the obtained results of specific information (the operating mode, for example), which is at least one of the plurality of types of information, from among the plurality of normal index information having different content according to the content of the specific information. By detecting abnormalities in this way, normal index information which is suited to the specific information at the time of abnormality determination can be selected from among the plurality of normal index information having different content according to the content of the specific information, and used to determine an abnormality, and hence mistaken determinations due to the normal values of the obtained results of the information obtaining means differing according to the content of the specific information can be avoided.

Also in the present invention, the presence of a general abnormality which is capable of incorporating a plurality of types of abnormality in the detection subject is determined. When it is determined that the general abnormality is present, individual determinations are made as to the presence of the individual abnormalities that may be incorporated into the general abnormality, thus enabling the type of abnormality to be specified. In so doing, the presence of the individual abnormalities need only be determined when the general abnormality has been confirmed as "present", rather than determining the presence of all of the individual abnormalities every time the presence of the general abnormality is determined, and hence complicated control caused by individual determinations for each type of abnormality can be suppressed. Further, by specifying the type of abnormality that has occurred when the general abnormality is determined as "present", complicated maintenance responses following the determination can be avoided.

In the abnormality determining method of the present invention, the plurality of individual abnormality thresholds required to determine the presence of the individual abnormalities respectively are subjected to initial setting in accordance with user information such as proficiency level and degree of fault perception. In so doing, the presence of each individual abnormality can be determined with a precision which is suited to each individual user.

Further, in the abnormality determining apparatus of the present invention, the plurality of individual abnormality thresholds required to determine the presence of the individual abnormalities respectively may be initially set or updated in accordance with user information which is input into the data input means by a serviceperson or the user. By means of such initial setting or updating, the presence of each individual abnormality can be determined with a precision which is suited to each individual user.

Further, in the abnormality determining apparatus of the present invention, by initially setting or updating the plurality of individual abnormality thresholds required to determine the presence of the individual abnormalities respectively in accordance with user information obtained from the user by threshold setting means, the presence of each individual abnormality can be determined with a precision which is suited to each individual user.

In the present invention, the presence of an abnormality can be determined with a precision that is suited to each individual user while avoiding complicated control to determine the presence of each type of abnormality individually and complicated maintenance responses following the determination.

Also in the present invention, the plurality of types of information obtained respectively by the plurality of information obtaining means includes first specific information such as operating mode setting information and temperature information, and second specific information such as the paper conveyance speed, the normal value of which varies according to the value of the first specific information. When it is assumed that the detection subject is in a normal state, the values taken by the second specific information when the first specific information is at a predetermined value and when the first specific information takes the obtained value of the information obtaining means can be determined on the basis of normal index information stored in the data storage means, and the difference between and ratio of these values can be obtained. Moreover, even when the actual obtained value of the second specific information corresponds to a value obtained when the first specific information is not at the predetermined value, it is possible to predict the value that the actual obtained value of the second specific information would take if the first specific information were at the aforementioned predetermined value on the basis of this difference and ratio. In the present invention, the actual obtained value of the second specific information can be corrected to the same value as the predicted value obtained in this way. With this constitution, even when the standard information only corresponds to the predetermined value of the first specific information, and the second specific information is obtained when the first specific information takes a different value to its predetermined value, the obtained value of the second specific information can be corrected to a value corresponding to the predetermined value. By determining the presence of an abnormality in the detection subject from the relationship between the second specific information corrected in this way and the standard information, mistaken determinations due to the normal value of the obtained value of the second specific information differing according to the value of the first specific information can be avoided.

Various modifications will become possible for those skilled in the art after receiving the teachings of the present disclosure, without departing from the scope thereof.

What is claimed is:

1. An abnormality determining method for determining the presence of an abnormality in a detection subject on the basis of normal index information serving as an index of a normal state of the detection subject, comprising steps of:
   obtaining a plurality of types of information by an information obtaining unit;
   preparing, as said normal index information, a plurality of normal index information having different values; and
   selecting from said normal index information, at a predetermined timing, the normal index information to be used to determine the presence of an abnormality in said detection subject.

2. The abnormality determining method as claimed in claim 1, wherein a normal data set, which is a collection of normal data obtained from said detection subject in a normal state, is selected as said normal index information at said predetermined timing.

3. The abnormality determining method as claimed in claim 1, wherein a threshold to be compared to a predetermined calculation result is selected as said normal index information at said predetermined timing.

4. An abnormality determining apparatus comprising:
   information storage means for storing normal index information serving as an index of a normal state of a detection subject;
   information obtaining means for obtaining a plurality of types of information; and
   determining means for determining the presence of an abnormality in said detection subject on the basis of said normal index information stored in said information storage means, and the information obtained by said information obtaining means,
   wherein said information storage means store a plurality of said normal index information having different values, and said determining means select the normal index information to be used to determine the presence of an abnormality in said detection subject from said plurality of normal index information at a predetermined timing.

5. The abnormality determining apparatus as claimed in claim 4, wherein said determining means are constituted to select a normal data set, which is a collection of normal data obtained from said detection subject in a normal state, as said normal index information at said predetermined timing.

6. The abnormality determining apparatus as claimed in claim 4, wherein said determining means are constituted to select a threshold to be compared to a predetermined calculation result as said normal index information at said predetermined timing.

7. The abnormality determining apparatus as claimed in claim 4, wherein said information storage means store said threshold to be compared to a predetermined calculation result and said normal data set, which is a collection of normal data obtained from said detection subject in a normal state, and said determining means are constituted to calculate a Mahalanobis distance on the basis of said normal data set and the obtained information obtained by said information obtaining means, and determine the presence of an abnormality in said detection subject on the basis of a comparison between the calculation result and said threshold.

8. The abnormality determining apparatus as claimed in claim 4, wherein said determining means are constituted to select said normal index information in accordance with the disposal environment of said detection subject.

9. The abnormality determining apparatus as claimed in claim 8, wherein environment detection means for detecting humidity, temperature, or air pressure are provided, and said determining means are constituted to select said normal index information in accordance with the detection result of said environment detection means.

10. The abnormality determining apparatus as claimed in claim 4, wherein said information obtaining means are constituted to obtain operating mode information of said detection subject as one of said plurality of types of information, and said determining means are constituted to select said normal index information in accordance with the obtained result of said operating mode information obtained by said information obtaining means.

11. The abnormality determining apparatus as claimed in claim 4, wherein said information obtaining means are constituted to obtain user operating history information relating to said detection subject as one of said plurality of types of information, and said determining means are constituted to select said normal index information in accordance with the operating history information obtained by said information obtaining means.

12. The abnormality determining apparatus as claimed in claim 4, wherein said information obtaining means are constituted to obtain environment history information regarding the disposal location of said detection subject as one of said plurality of types of information, and said determining means are constituted to select said normal index information in accordance with the environment history information obtained by said information obtaining means.

13. An abnormality determining method comprising the steps of:
storing normal index information, serving as an index of a normal state of a detection subject, in information storage means;
obtaining information about an object using information obtaining means; and
determining the presence of an abnormality in said detection subject on the basis of the normal index information in said storage means and the obtained results of said information obtaining means,
wherein a plurality of means for obtaining different types of information is used as said information obtaining means, a plurality of information having different content depending on the content of specific information, which is at least one of the plurality of types of information obtained individually by said plurality of information obtaining means, is used as said normal index information, and in said determining step, information corresponding to the obtained results of said specific information obtained by said information obtaining means is specified from the plurality of normal index information and used to determine the presence of an abnormality.

14. An abnormality determining apparatus comprising:
information storage means for storing normal index information serving as an index of a normal state of a detection subject;
information obtaining means for obtaining information about an object; and
determining means for determining the presence of an abnormality in said detection subject on the basis of the normal index information in said information storage means and the obtained results obtained by said information obtaining means,
wherein a plurality of said information obtaining means is provided for obtaining different types of information, a plurality of information having different content depending on the content of specific information, which is at least one of the plurality of types of information obtained individually by said plurality of information obtaining means, is used as said normal index information, and said determining means specify information corresponding to the obtained results of said specific information, obtained by said information obtaining means, from the plurality of normal index information, and use said specified information to determine the presence of an abnormality.

15. The abnormality determining apparatus as claimed in claim 14, further comprising normal index information constructing means for constructing said plurality of normal index information having different content on the basis of a plurality of obtained results of multiple types of information constituted by said plurality of types of information.

16. The abnormality determining apparatus as claimed in claim 14, wherein inverse matrices of respective data sets are used as said plurality of normal index information, and said determining means calculate a Mahalanobis distance on the basis of said inverse matrices and use the calculated Mahalanobis distance to determine the presence of an abnormality.

17. The abnormality determining apparatus as claimed in claim 16, further comprising normal index information constructing means for constructing said plurality of normal index information having different content on the basis of the plurality of obtained results of the multiple types of information constituted by said plurality of types of information,
wherein said information storage means store a plurality of temporary normal index information having different content, and said normal index information constructing means are constituted such that when at least one of said plurality of normal index information cannot be constructed due to predetermined conditions not being satisfied within a predetermined time period, processing is performed to compensate for the lacking normal index information with said temporary normal index information.

18. The abnormality determining apparatus as claimed in claim 16, further comprising:
normal index information constructing means for constructing said plurality of normal index information having different content on the basis of the plurality of obtained results of the multiple types of information constituted by said plurality of types of information; and data receiving means for receiving data from outside, wherein said normal index information constructing means are constituted such that when at least one of said plurality of normal index information cannot be constructed due to predetermined conditions not being satisfied within a predetermined time period, processing is performed to compensate for the lacking normal index information with normal index information received by said data receiving means.

19. An image forming apparatus comprising:

recording medium conveying means for conveying a recording medium;

visible image forming means for forming a visible image on the recording medium conveyed by said recording medium conveying means; and abnormality determining means for determining the presence of an abnormality in the entire apparatus or a part thereof, said abnormality determining means comprising:

information storage means for storing normal index information serving as an index of a normal state of a detection subject;

information obtaining means for obtaining information about an object; and determining means for determining the presence of an abnormality in said detection subject on the basis of the normal index information in said information storage means and the obtained results obtained by said information obtaining means, wherein a plurality of said information obtaining means is provided for obtaining different types of information, a plurality of information having different content depending on the content of specific information, which is at least one of the plurality of types of information obtained individually by said plurality of information obtaining means, is used as said normal index information, and said determining means specify information corresponding to the obtained results of said specific information, obtained by said information obtaining means, from the plurality of normal index information, and use said specified information to determine the presence of an abnormality.

20. The image forming apparatus as claimed in claim 19, wherein means for obtaining temperature information, humidity information, or an operating mode setting value are used as one of said plurality of information obtaining means, and information having different content according to the temperature, humidity, or operating mode setting value is used respectively as said plurality of normal index information.

21. An abnormality determining method for implementing an information obtaining comprising steps of:

obtaining information about an object using information obtaining means, determining the presence of an abnormality in a detection subject on the basis of the obtained information of said information obtaining means, performing a predetermined calculation on the basis of the information obtained by said information obtaining means, comparing the calculation result of said calculating step with a predetermined threshold, being implemented in said determining step, and an abnormality being determined as present when said calculation result reaches said threshold, exceeds said threshold, or falls below said threshold in said comparing step, and determining the presence of a general abnormality, which is capable of incorporating a plurality of types of abnormality, by comparing said calculation result based on said plurality of types of obtained information to a general abnormality threshold, and an individual abnormality determining step in which the presence of individual abnormalities, which are a plurality of types of abnormality that can be incorporated into said general abnormality, is determined in succession only when said general abnormality is determined as present in said general abnormality determining step, by comparing said calculation result based on at least one of said plurality of types of obtained information to an individual abnormality threshold for each individual abnormality, are implemented in said determining step, and initial setting is performed for said general abnormality threshold and at least one of the plurality of individual abnormality thresholds corresponding individually to said individual abnormalities in accordance with information regarding a user of said detection subject.

22. The abnormality determining method as claimed in claim 21, wherein initial setting is performed on said plurality of individual abnormality thresholds respectively in accordance with said user information.

23. The abnormality determining method as claimed in claim 21, wherein initial setting is performed on said general abnormality threshold and at least one of said plurality of individual abnormality thresholds in accordance with information about the environment in which said detection subject is disposed.

24. The abnormality determining method as claimed in claim 21, wherein initial setting is performed on said general abnormality threshold and at least one of said plurality of individual abnormality thresholds in accordance with information regarding the frequency of maintenance technician visits to a location in which said detection subject is disposed, or information regarding a distance from a maintenance service providing organization to said disposal location.

25. The abnormality determining method as claimed in claim 21, wherein, when said detection subject is to be replaced, said general abnormality threshold and said plurality of individual abnormality thresholds to be used to determine the presence of an abnormality in a new detection subject are initially set to the same respective values as those used in the respective individual abnormality determining steps for determining the presence of an abnormality in an old detection subject.

26. The abnormality determining method as claimed in claim 21, wherein at least one of said plurality of individual abnormality thresholds is updated in accordance with information regarding a repair request history of the user based on the occurrence of an abnormality.

27. The abnormality determining method as claimed in claim 21, wherein a Mahalanobis distance is calculated as said calculation result in said calculating step of said general abnormality determining step, on the basis of a normal data set stored in information storage means and the obtained information of said information obtaining means, and said normal data set is updated on the basis of whether said general abnormality is determined to be present in said general abnormality determining step, and a result of an inspection of said detection subject.

28. An abnormality determining apparatus comprising:
information obtaining means for obtaining information about an object; and
determining means for implementing a predetermined calculation on the basis of the information obtained by said information obtaining means, and determining an abnormality in said detection subject as present when the result of said calculation reaches a predetermined threshold, exceeds said threshold, or falls below said threshold,
wherein said determining means are constituted to determine the presence of a general abnormality, which is capable of incorporating a plurality of types of abnormality, by comparing said calculation result based on said plurality of types of obtained information to a general abnormality threshold, and determine in succession the presence of individual abnormalities, which are a plurality of types of abnormality that can be incorporated into said general abnormality, only when said general abnormality is determined as present, by comparing said calculation result based on at least one of said plurality of types of obtained information to an individual abnormality threshold for each individual abnormality.

29. The abnormality determining apparatus as claimed in claim 28, further comprising data input means for receiving data input of said general abnormality threshold and at least one of the plurality of individual abnormality thresholds corresponding individually to said individual abnormalities, and storing said thresholds in information storage means.

30. The abnormality determining apparatus as claimed in claim 29, wherein said data input means are constituted to receive said plurality of individual abnormality thresholds respectively.

31. The abnormality determining apparatus as claimed in claim 29, wherein means for receiving data input of said general abnormality threshold or said individual abnormality thresholds transmitted over a communication line are used as said data input means.

32. The abnormality determining apparatus as claimed in claim 28, further comprising threshold setting means for setting said general abnormality threshold and at least one of the plurality of individual abnormality thresholds corresponding individually to said individual abnormalities.

33. The abnormality determining apparatus as claimed in claim 32, wherein said threshold setting means are constituted to set said plurality of individual abnormality thresholds respectively.

34. The abnormality determining apparatus as claimed in claim 33, wherein said threshold setting means ask said user predetermined questions, and obtain said user information on the basis of response data to said questions that is input by said user into data input means.

35. The abnormality determining apparatus as claimed in claim 34, wherein said threshold setting means are constituted to modify said general abnormality threshold and at least one of said plurality of individual abnormality thresholds corresponding individually to said individual abnormalities on the basis of predetermined data input into said data input means by said user.

36. The abnormality determining apparatus as claimed in claim 32, wherein said threshold setting means are constituted to modify said general abnormality threshold on the basis of a rate of change of said calculation result for said general abnormality.

37. The abnormality determining apparatus as claimed in claim 32, wherein said determining means are constituted to determine a Mahalanobis distance as said calculation result on the basis of a normal data set stored in information storage means and the obtained result by said information obtaining means, and determine the presence of said general abnormality on the basis of the result of a comparison between said Mahalanobis distance and said general abnormality threshold.

38. The abnormality determining apparatus as claimed in claim 32, wherein said determining means are constituted to modify the frequency with which the presence of said general abnormality is determined in accordance with said calculation result for said general abnormality.

39. The abnormality determining apparatus as claimed in claim 32, further comprising function restricting means for restricting a function of said detection subject when one of said individual abnormalities occurs, in accordance with the type of said occurring individual abnormality.

40. An image forming apparatus comprising:
visible image forming means for forming a visible image on a recording medium; and
abnormality determining means for determining the presence of an abnormality in the apparatus, said abnormality determining means comprising:
information storage means for storing normal index information serving as an index of a normal state of a detection subject;
information obtaining means for obtaining a plurality of types of information; and
determining means for determining the presence of an abnormality in said detection subject on the basis of said normal index information stored in said information storage means, and the information obtained by said information obtaining means,
wherein said information storage means store a plurality of said normal index information having different values, and said determining means select the normal index information to be used to determine the presence of an abnormality in said detection subject from said plurality of normal index information at a predetermined timing.

41. An image forming apparatus comprising:
visible image forming means for forming a visible image on a recording medium; and
abnormality determining means for determining the presence of an abnormality in the apparatus,
said abnormality determining means comprising:
information storage means for storing normal index information serving as an index of a normal state of a detection subject;
information obtaining means for obtaining information about an object; and
determining means for determining the presence of an abnormality in said detection subject on the basis of the normal index information in said information storage means and the obtained results obtained by said information obtaining means,
wherein a plurality of said information obtaining means is provided for obtaining different types of information, a plurality of information having different content depending on the content of specific information, which is at least one of the plurality of types of information obtained individually by said plurality of information obtaining means, is used as said normal index information, and said determining means specify information corresponding to the obtained results of said specific information, obtained by said information obtaining means, from the plurality of normal index information, and use said specified information to determine the presence of an abnormality.

42. An image forming apparatus comprising:
visible image forming means for forming a visible image on a recording medium; and
abnormality determining means for determining the presence of an abnormality in the apparatus,
said abnormality determining means comprising:
information obtaining means for obtaining information about an object; and
determining means for implementing a predetermined calculation on the basis of the information obtained by said information obtaining means, and determining an abnormality in said detection subject as present when the result of said calculation reaches a predetermined threshold, exceeds said threshold, or falls below said threshold,
wherein said determining means are constituted to determine the presence of a general abnormality, which is capable of incorporating a plurality of types of abnormality, by comparing said calculation result based on said plurality of types of obtained information to a general abnormality threshold, and determine in succession the presence of individual abnormalities, which are a plurality of types of abnormality that can be incorporated into said general abnormality, only when said general abnormality is determined as present, by comparing said calculation result based on at least one of said plurality of types of obtained information to an individual abnormality threshold for each individual abnormality.

43. An abnormality determining apparatus comprising:
data storage means for storing data;
information obtaining means for obtaining information about an object; and
determining means for determining the presence of an abnormality in a detection subject on the basis of standard information stored in said data storage means, and the obtained results of said information obtaining means,
wherein a plurality of said information obtaining means is provided for obtaining a plurality of different types of information, said data storage means store normal relationship information showing a normal relationship between a value of first specific information, which is at least one of the plurality of types of information obtained individually by said plurality of information obtaining means, and a value of second specific information, which is different information to said first specific information, and said determining means correct an obtained value of said second specific information on the basis of the obtained value of said first specific information and said normal relationship information, and use the correction result to determine the presence of an abnormality.

44. The abnormality determining apparatus as claimed in claim 43, wherein said standard information takes a value corresponding to a predetermined value of said first specific information, and said determining means determine, on the basis of said normal relationship information, the value of said second specific information that corresponds to said predetermined value of said first specific information, and the value of said second specific information corresponding to the obtained value of said first specific information, obtained in reality by said information obtaining means, and corrects the obtained value of said second specific information by multiplying a ratio of the two values.

45. The abnormality determining apparatus as claimed in claim 43, wherein an inverse matrix of a data set is used as said standard information, and said determining means calculate a Mahalanobis distance on the basis of said inverse matrix and the corrected value of said second specific information, and use the calculation result to determine the presence of an abnormality.

46. The abnormality determining apparatus as claimed in claim 43, further comprising standard information constructing means for constructing said standard information on the basis of a plurality of obtained values for multiple types of information constituted by said plurality of types of information.

47. An image forming apparatus comprising:
recording medium conveying means for conveying a recording medium;
visible image forming means for forming a visible image on the recording medium conveyed by said recording medium conveying means; and
abnormality determining means for determining the presence of an abnormality in the entire apparatus or a part thereof,
said abnormality determining means comprising:
data storage means for storing data;
information obtaining means for obtaining information about an object; and
determining means for determining the presence of an abnormality in a detection subject on the basis of standard information stored in said data storage means, and the obtained results of said information obtaining means,
wherein a plurality of said information obtaining means is provided for obtaining a plurality of different types of information, said data storage means store normal relationship information showing a normal relationship between a value of first specific information, which is at least one of the plurality of types of information obtained individually by said plurality of information obtaining means, and a value of second specific information, which is different information to said first specific information, and said determining means correct an obtained value of said second specific information on the basis of the obtained value of said first specific information and said normal relationship information, and use the correction result to determine the presence of an abnormality.

48. The image forming apparatus as claimed in claim 47, wherein said first specific information is temperature information, humidity information, or operating mode setting information.

* * * * *